(12) United States Patent
Hyatt et al.

(10) Patent No.: US 12,380,046 B2
(45) Date of Patent: **\*Aug. 5, 2025**

(54) HOST-TO-DEVICE CXL COMMUNICATION INCLUDING MULTI-FABRIC BRIDGING, ALSO OVER NVLink, UALink, AND ETHERNET

(71) Applicant: UnifabriX Ltd., Haifa (IL)

(72) Inventors: Ronen Aharon Hyatt, Haifa (IL); Gaya Opal Hyatt, Haifa (IL); Ethan Sharon Hyatt, Haifa (IL)

(73) Assignee: UnifabriX Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/017,423

(22) Filed: Jan. 11, 2025

(65) Prior Publication Data
US 2025/0199978 A1 Jun. 19, 2025

Related U.S. Application Data

(63) Continuation-in-part of application No. 18/981,443, filed on Dec. 13, 2024.
(Continued)

(51) Int. Cl.
G06F 13/38 (2006.01)
G06F 13/40 (2006.01)
G06F 13/42 (2006.01)

(52) U.S. Cl.
CPC .......... *G06F 13/387* (2013.01); *G06F 13/409* (2013.01); *G06F 13/4282* (2013.01)

(58) Field of Classification Search
CPC ... G06F 13/387; G06F 13/409; G06F 13/4282
See application file for complete search history.

(56) References Cited

U.S. PATENT DOCUMENTS 11,360,906 B2 6/2022 Duan
11,740,958 B2 8/2023 Das Sharma
(Continued)

OTHER PUBLICATIONS

Hyatt Ronen, "CXL in the AI Era: A Midterm Report—Technology, Achievements, Challenges, Innovation". May 9, 2024. USPTO Tech Fair.
(Continued)

*Primary Examiner* — Henry Tsai
*Assistant Examiner* — Harry Z Wang
(74) *Attorney, Agent, or Firm* — Active Knowledge Ltd.

(57) ABSTRACT

Embodiments for communicating between a Compute Express Link (CXL) host and a CXL device. A CXL Endpoint receives, from the host, first messages conforming to a first CXL.io protocol and second messages conforming to a first non-CXL.io protocol. A CXL Root Port receives, from the device, third messages conforming to a second CXL.io protocol and fourth messages conforming to a second non-CXL.io protocol. A computer terminates the first CXL.io protocol, processes at least some of the first messages without translating and sending corresponding translated first messages to the device, terminates the first non-CXL.io protocol, translates at least a quarter of the second messages, and makes the translated second messages available to the CXL Root Port for communication with the device. Optionally, each of the first and second non-CXL.io protocols is selected from at least one of CXL.mem or CXL.cache.

30 Claims, 79 Drawing Sheets

Related U.S. Application Data

(60) Provisional application No. 63/719,640, filed on Nov. 12, 2024, provisional application No. 63/701,554, filed on Sep. 30, 2024, provisional application No. 63/695,957, filed on Sep. 18, 2024, provisional application No. 63/678,045, filed on Jul. 31, 2024, provisional application No. 63/652,165, filed on May 27, 2024, provisional application No. 63/641,404, filed on May 1, 2024, provisional application No. 63/609,833, filed on Dec. 13, 2023.

(56) References Cited

U.S. PATENT DOCUMENTS

| | | |
|---|---|---|
| 11,789,878 B2 | 10/2023 | Graniello |
| 11,816,036 B2 | 11/2023 | Vasudevan |
| 11,847,459 B2 | 12/2023 | Agarwal |
| 11,995,017 B2 | 5/2024 | Norrie |
| 12,040,991 B2 | 7/2024 | Kar |
| 2020/0242042 A1 | 7/2020 | Svennebring |
| 2020/0344329 A1* | 10/2020 | Cannata ............ H04L 41/0803 |
| 2021/0232520 A1 | 7/2021 | Choudhary |
| 2021/0240655 A1 | 8/2021 | Das Sharma |
| 2022/0004488 A1 | 1/2022 | Paul |
| 2022/0263913 A1* | 8/2022 | Zhang ............... G06F 3/0604 |
| 2022/0269433 A1* | 8/2022 | Pal .................... G06F 13/4027 |
| 2022/0398207 A1* | 12/2022 | Norrie ................ G06F 13/4022 |
| 2022/0405212 A1* | 12/2022 | Kakaiya ............ G06F 12/1425 |
| 2023/0022544 A1 | 1/2023 | Willhalm |
| 2023/0029026 A1 | 1/2023 | Guim Bernat |
| 2023/0036751 A1 | 2/2023 | Guim Bernat |
| 2023/0229498 A1 | 7/2023 | Agarwal |
| 2023/0325265 A1 | 10/2023 | Balle |
| 2023/0359578 A1 | 11/2023 | Lee |
| 2023/0376427 A1 | 11/2023 | Oh |
| 2023/0393997 A1 | 12/2023 | Shah |
| 2024/0289286 A1 | 8/2024 | Sun |
| 2024/0378161 A1* | 11/2024 | Kwon ................ G06F 13/4022 |

OTHER PUBLICATIONS

Mellor Chris, "UnifabriX taking CXL external memory mainstream", Jan. 15, 2025, https://blocksandfiles.com/2025/01/15/unifabrix-taking-cxl-external-memory-mainstream/.

Compute Express Link (CXL) Specification Revision 3.1, Aug. 7, 2023, Compute Express Link Consortium, Inc.

Compute Express Link (CXL) Specification Revision 2.0, Oct. 2020, Compute Express Link Consortium, Inc.

Compute Express Link (CXL) Specification Revision 1.1, Jun. 2019, Compute Express Link Consortium, Inc.

Debendra Das Sharma, Robert Blankenship, and Daniel Berger. 2024. An Introduction to the Compute Express Link (CXL) Interconnect. ACM Comput. Surv. 56, 11, Article 290 (Jul. 2024).

CXL* Type 3 Memory Device Software Guide, System Firmware, UEFI and OS Software Implementation Guide. Revision 1.0. Jul. 2021. Intel.

PCI Express® Base Specification Revision 6.2. Jan. 25, 2024. PCI-SIG Specification.

PCI Express* 6.0 Retimer Supplemental Features and Standard BGA Footprint Specification. Revision 0.9. Jul. 2024. Intel.

4th Gen Intel® Xeon® Scalable Processor XCC (Codename Sapphire Rapids) Uncore Performance Monitoring Guide. Revision 001. Apr. 2024. Intel.

OSFP MSA Specification for OSFP Octal Small Form Factor Pluggable Module. Rev 5.1. Sep. 12, 2024.

* cited by examiner

HOST-TO-DEVICE CXL COMMUNICATION INCLUDING MULTI-FABRIC BRIDGING, ALSO OVER NVLink, UALink, AND ETHERNET

CROSS-REFERENCE TO RELATED APPLICATIONS

This application is a Continuation-In-Part of U.S. patent application Ser. No. 18/981,443, filed 13 Dec. 2024, which claims priority to U.S. Provisional Patent Application No. 63/609,833, filed 13 Dec. 2023. This application also claims priority to: U.S. Provisional Patent Application No. 63/641,404, filed 1 May 2024, U.S. Provisional Patent Application No. 63/652,165, filed 27 May 2024, U.S. Provisional Patent Application No. 63/678,045, filed 31 Jul. 2024, U.S. Provisional Patent Application No. 63/695,957, filed 18 Sep. 2024, U.S. Provisional Patent Application No. 63/701,554, filed 30 Sep. 2024, and U.S. Provisional Patent Application No. 63/719,640, filed 12 Nov. 2024.

BACKGROUND

In modern computing systems, interconnect technologies such as PCI Express (PCIe) and Compute Express Link (CXL) provide communication pathways between host processors and various devices, including accelerators, memory, and storage. PCIe, a widely adopted interconnect standard, enables host-to-device communication through a well-defined transaction layer protocol. In a typical PCIe configuration, a host processor initiates read and write transactions that are routed through a PCIe switch hierarchy to a target device. The device responds to these transactions, and data is transferred using packets that include headers, data payloads, and error-checking information. PCIe supports various transaction types, including memory-mapped I/O (MMIO) and direct memory access (DMA), allowing the host to interact with device registers and transfer data to and from device memory.

CXL builds upon the PCIe infrastructure and introduces enhanced capabilities for host-to-device communication, particularly in the context of cache coherency and memory pooling. CXL utilizes three primary protocols: CXL.io, CXL.cache, and CXL.mem. CXL.io is an enhanced version of the PCIe protocol, providing a low-latency path for I/O transactions. CXL.cache enables devices and hosts to coherently interact with each other using cache semantics, while CXL.mem allows hosts to access device-attached memory using load/store operations. In a CXL-enabled system, a host can communicate with a device using any of these protocols, depending on the specific requirements of the interaction. For example, a host may use CXL.io for control and configuration, CXL.cache for coherent data sharing, and CXL.mem for accessing device memory.

While both PCIe and CXL provide robust mechanisms for host-to-device communication, they are typically based on straightforward interactions between the host and the device. In these interactions, the protocol used for communication is consistent throughout the path from the host to the device. Neither PCIe nor CXL, in their standard implementations, support a scenario where an intermediary entity between the host and the device abstracts the identity or the behaviors of the transacting peers, such as via elaborated protocol processing that includes both terminating a first protocol and translating a second protocol into a third protocol before reaching its destination. This limitation restricts the flexibility and efficiency of communication in heterogeneous systems that may involve multiple interconnects and protocols.

SUMMARY

Some of the disclosed embodiments describe solutions that enable advanced host-to-device communication scenarios, where abstractions and protocol processing takes place, including termination of a first protocol and translation of a second protocol that can occur at an intermediary point between the host and the device. In one embodiment, an apparatus configured to enable communication between a host and a device is provided. The apparatus includes a Compute Express Link (CXL) Endpoint configured to receive, from a host, first messages conforming to a first CXL.io protocol and second messages conforming to a first non-CXL.io protocol. A CXL Root Port is configured to receive, from a device, third messages conforming to a second CXL.io protocol and fourth messages conforming to a second non-CXL.io protocol. A computer within the apparatus is configured to terminate the first CXL.io protocol, process at least some of the first messages in a manner that does not necessitate translating and sending corresponding translated first messages to the device, terminate the first non-CXL.io protocol, translate at least a quarter of the second messages (translated second messages), and make the translated second messages available to the CXL Root Port for communication with the device.

In another embodiment, a method comprises receiving, by a Compute Express Link (CXL) Endpoint from a host, first messages conforming to a first CXL.io protocol and second messages conforming to a first non-CXL.io protocol. The method further includes receiving, by a CXL Root Port from a device, third messages conforming to a second CXL.io protocol and fourth messages conforming to a second non-CXL.io protocol. The method involves terminating the first CXL.io protocol, processing at least some of the first messages in a manner that does not necessitate translating and sending corresponding translated first messages to the device, terminating the first non-CXL.io protocol, translating at least a quarter of the second messages (translated second messages), and sending the translated second messages to the device.

In a further embodiment, an apparatus comprises a first switch port configured to communicate with a host utilizing first messages conforming to a first CXL.io protocol and second messages conforming to a first non-CXL.io protocol. A second switch port is configured to communicate with a device utilizing third messages conforming to a second CXL.io protocol and fourth messages conforming to a second non-CXL.io protocol. A computer within the apparatus is configured to terminate transactions routed to the computer and associated with the first CXL.io protocol, process at least some of the first messages in a manner that does not necessitate translating and sending corresponding translated first messages to the device, terminate transactions routed to the computer and associated with the first non-CXL.io protocol, translate at least a quarter of the second messages (translated second messages), and make the translated second messages available to the second switch port for communication with the device.

DETAILED DESCRIPTION

Figure 1:
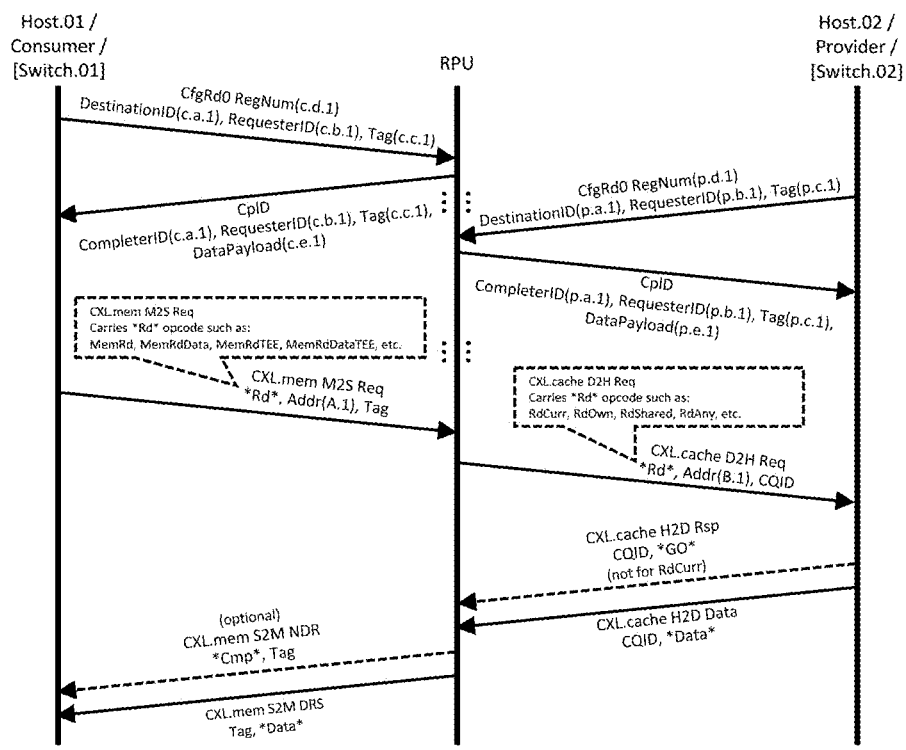
FIG. 1 illustrates one embodiment of a transaction flow diagram (TFD) representing terminating and blocking Configuration Request TLPs, followed by terminating and translating possible superset combinations of opcodes.

The term "Compute Express Link" (CXL) refers to currently available and/or future versions, variations and/or equivalents of the open standard as defined by the CXL Consortium. CXL Specification Revisions 1.1, 2.0, 3.0, and 3.1 are herein incorporated by reference in their entirety.

The term "PCI Express" (PCIe) refers to current and future versions, variations, and equivalents of the standard as defined by PCI-SIG (Peripheral Component Interconnect Special Interest Group). PCI Express Base Specification Revisions 5.0, 6.0, 6.1, and 6.2 are herein incorporated by reference in their entirety.

The term "CXL device" refers to an electronic component that identifies itself as CXL-capable through a standardized device identification mechanism, such as the presence of Device Vendor Specific Extended Capability (DVSEC). A CXL device may incorporate capabilities for coherent caching functionality, memory functionality, and/or accelerator functionality. CXL devices may be designed as Single Logical Devices (SLDs), Multi-Logical Devices (MLDs), Multi-Headed Devices (MH-devices), Dynamic Capacity Devices (DCDs), Global Fabric Attached Memory Devices (GFDs), or devices supporting other CXL-related features defined or to be defined in current or future CXL specification revisions. A CXL device may present one or more logical interfaces over one or more physical ports, may support dynamic partitioning of resources, and may include capabilities for connecting to one or more hosts, through various topologies including direct attachment, CXL switches, CXL fabric infrastructure, and/or other CXL-compatible intermediary components. A CXL device may maintain its identity as a CXL device regardless of its operational state, including during initialization, enumeration, or when operating in fallback modes such as PCIe.

In the context of CXL, the terms "host" or "CXL host" refer to a computing entity or system that includes a Root Complex and resides at the root of a CXL topology. A host may include a CPU and expose one or more Root Ports. A host may advertise its CXL support via a mechanism defined in the CXL specification, and may incorporate capabilities for CXL interfaces and protocols (for example, CXL.io, CXL.cache, CXL.mem, and/or any future CXL protocols). The host may possibly include capabilities for connecting to CXL devices through various topologies, including, for example, direct attachment, CXL switches, CXL retimers, CXL redrivers, CXL fabric infrastructure, RPUs, MxPUs, or any current or future CXL-compatible intermediary components or infrastructure. Various types of computing entities may possibly be designed as hosts including, for example, CPU-based or GPU-based cards, chips, or servers, processors, embedded controllers with root capabilities, accelerators configured with root capabilities, and other computing components with root capabilities. The host may act as a master in CXL transactions and may include capabilities for single-domain or multi-domain operation, memory pooling or sharing, host-side security features, and possibly support additional features or functionalities, standardized or proprietary, to be defined by future revisions of the CXL specification or possibly implemented by the host beyond those specified in the CXL specification.

In the context of CXL, the term "application host" refers to a host that executes workloads or applications that utilize one or more CXL protocols to support its computational tasks, which may include accessing memory, maintaining cache coherency, offloading computations, or other operations over one or more CXL links.

The term "Resource Provisioning Unit" (RPU), which may also be referred to as "Resource Composer" (ResC) in some cases, refers to a processing module configured to execute at least one or more of the following non-limiting non-exhaustive operations: management commands, configurations, reconfigurations, management of pooled resources, address translations, protocol translations, message translations, and/or management/allocation/control of CXL fabric resources. The RPU may be implemented in various hardware, firmware, and/or software configurations, such as an ASIC, an FPGA, a logical and/or physical module inside a CPU/GPU/MxPU (defined below), a hardware accelerator, a fabric manager, a host machine, a controller, a CXL device, a switch, a memory pool controller, and/or a network node. The RPU may be implemented as a single module and/or a single computer (which covers anything having a processor, memory, and a communication interface), and/or as a distributed computation entity running on a combination of computing machines, such as ASICs, FPGAs, hosts, servers, network devices, CPUs, GPUs, accelerators, fabric managers, and/or switches.

Usually, hypervisor allocates memory to virtual machines (VMs), and assigns each VM its own address space (at the hypervisor's level). The operating system of a VM allocates memory to the processes run by the VM, and assigns each process its own address space (at the VM's level). A process may have threads that share the same virtual addresses.

The term "Non-Volatile Memory Express" (NVMe) refers to current and future variations, extensions, and equivalents of the logical-device interface specification for accessing non-volatile storage media in computing systems. This definition encompasses NVMe over Fabrics (NVMe-oF) and any subsequent adaptations of the NVMe protocol for networked or distributed storage environments. NVMe implementations may span a range of performance levels and cost structures, including but not limited to: software-based solutions (such as NVMe over TCP or NVMe over CXL), partially hardware-accelerated implementations (which may incorporate specialized processing on network interface controllers or other components), and smart front-end units or fully hardware-based solutions designed to achieve up to maximum data throughput and minimal latency. This definition is intended to cover all current and future NVMe-based technologies that facilitate high-performance, low-latency access to non-volatile storage, regardless of the specific underlying hardware architecture or network topology.

The term "Native Flash Interface" (NFI) refers to any direct, low-level communication protocol, electrical specification, or control mechanism designed for interfacing with flash memory, such as NAND flash or NOR flash. NFI encompasses protocols that manage operations on flash pages and/or flash blocks (including but not limited to read page, write page, erase block, and addressing), and defines the command structures and physical signaling methods between the flash controller and the flash memory (also known as flash media in some cases). Optionally, NFI may include features such as access to raw data and metadata, access to and control of deep low-level analog operating parameters and controls (such as read-reference voltages), mechanisms for manipulating and sensing (also known as reading) pages/cells analog voltages, access to and control of error correction, executing vendor-specific commands, and/or controlling flash memory characteristics without intermediary abstraction layers. This definition intends to cover existing implementations, such as the Open NAND Flash Interface (ONFI) and JEDEC Toggle NAND, as well as future interfaces that maintain direct, low-level interaction with flash memory. The term NFI does not encompass higher-level storage protocols, such as NVMe, PCIe, SATA, or SAS, which do not directly access the flash pages or blocks, but instead operate as broader communication protocol standards that abstract and mask the internal characteristics of the underlying flash memory (such as by using NVMe blocks that are different from the flash pages, because NVMe blocks refer to logical units used by the OS and applications to interact with a storage device, while SSD blocks refer to physical units within the flash memory used for low-level memory operations).

The terms "Provider" and "Consumer" are used to describe entities in a resource allocation and utilization framework, encompassing a wide range of scenarios and implementations, and should be interpreted according to the context of specific embodiments and/or claims. The Provider-Consumer relationship is not limited to any specific type of resource and may include any form of physical and/or logical resources, with possibilities for shared, partitioned, exclusive, or other mode of use. The term "Provider" may refer to any entity, system, component, process, application, service, virtual machine, container, or any other logical or physical entity that makes available, offers, allocates, and/or grants access to one or more resources; these resources may include, but are not limited to, one or more of memory resources, storage resources, computational resources, network resources, and/or any other type of shareable asset or capability; the act of "providing" may involve direct allocation, virtualization, pooling, partitioning, and/or any other mechanism by which resources are made accessible or usable by other entities. The term "Consumer" may refer to any entity, system, component, process, application, service, virtual machine, container, or any other logical or physical entity that utilizes, accesses, receives, and/or otherwise consumes the resources made available by a Provider; the act of "consuming" may involve direct usage, indirect access, temporary or permanent allocation, sharing resources with other Consumers, retaining exclusive access to the resources, and/or any other form of resource utilization or interaction. An entity may function as a Provider, a Consumer, or both simultaneously or at different times, depending on the context and requirements of the specific embodiment or claim. The Provider-Consumer relationship is context-dependent, without implying specific implementation details, protocols, technologies, or limitations as these definitions are intended to be technology-agnostic and applicable across various technological domains. Additionally, the granularity and nature of what constitutes a "resource" in this relationship are flexible, ranging from fine-grained computational units to large-scale system capabilities.

The term "Multi-Headed Device" (MHD) refers to a CXL Type 3 device equipped with multiple CXL ports, with each port being designated as a "head". For example, CXL Specification Revision 3.1 defines two types of MHD, which include (i) Multi-Headed Single Logical Device (MH-SLD) that exposes multiple Logical Devices (LDs), each with a dedicated link, and (ii) Multi-Headed Multi-Logical Device (MH-MLD) that contains multiple links, where each link supports either MLD or SLD operation (optionally configurable), and at least one link supports MLD operation.

The term "DRAM" refers to Dynamic Random Access Memory and encompasses all types of dynamic RAM, including but not limited to asynchronous DRAM, synchronous DRAM (SDRAM), High-Bandwidth Memory (HBM), or any other current or future variations of dynamic RAM technologies commonly used in computer systems, servers, and related hardware. This includes, without limitation, single data rate SDRAM (SDR SDRAM), double data rate SDRAM (DDR SDRAM), graphics DDR SDRAM (GDDR SDRAM), low power DDR SDRAM (LPDDR SDRAM), and any subsequent generations or improvements upon these technologies that are utilized as the primary/directly accessible memory in computing systems. Furthermore, DRAM may also refer to other current or future memory technologies, either volatile memory or non-volatile memory, that serve a similar purpose as DRAM and are used for "system memory" or "main memory" in computer systems, even if they do not strictly adhere to the traditional dynamic RAM design principles, as long as they provide similar functionality to DRAM. Examples of several in-development technologies that may potentially replace DRAM as system memory, and are specifically intended to be covered by the term DRAM as used here, include Ferroelectric Field-Effect Transistors (Fe-FETs) or FeRAM, Nanotube RAM, Spin-Transfer Torque Magnetic Random-Access Memory (STT-MRAM), Phase Change Random-Access Memory (PCRAM or PCM), or Resistive Random-Access Memory (ReRAM).

The term "connected" in the context of phrases such as "memory channels connected to memory", "memory interfaces connected to DRAM", or "High Bandwidth Memory (HBM) connected to a GPU die" refers to a direct or indirect physical or electrical connection that allows for the transmission of data or signals between the connected elements, while preserving at least the main characteristics of the original format and content of the data or signals being transmitted, and may involve passive components (such as silicon interposers) or active components (such as retimers). In this specific context, the term "connected" does not encompass connections that involve transformations such as protocol translation, modulation change, modifications to error correction schemes, protocol termination, serialization-deserialization, and/or clock domain crossing.

"Coupled", on the other hand, is a broader term referring to direct or indirect cooperation and/or interaction, such as direct or indirect physical contact, electrical connection, and/or software and/or hardware interface. The connection between two elements coupled to each other may (or may not) involve one or more of passive components, active components, protocol translation, modulation change, modifications to error correction schemes, alteration of packet headers or payloads, protocol termination, encoding-decoding, serialization-deserialization, clock domain crossing, signal conversion, and/or any other modification to the data or signals being transmitted.

The terms "xPU", "CPU/GPU", and "CPU or GPU" refer to: (i) CPU or GPU, individually; or (ii) a combination of a CPU and GPU within a single integrated circuit (IC) package, including but not limited to configurations such as a System on a Chip (SoC), Integrated CPU-GPU, Integrated Processor, or Accelerated Processing Unit (APU).

The terms "semiconductor device" and "Modified CPU or GPU" (MxPU) refer to at least one semiconductor chip housed within an IC package, bare die packaging, or other suitable packaging. The semiconductor chip is a piece of semiconducting material containing one or more integrated circuits (ICs), which may include various types of electronic components such as transistors, diodes, resistors, capacitors, and/or interconnects. Examples of semiconductor devices/MxPUs include, but are not limited to, Central Processing Units (CPUs), Graphics Processing Units (GPUs), Integrated CPU-GPU, Domain-Specific Accelerators (DSAs), Field-Programmable Gate Arrays (FPGAs), System-on-Chips (SoCs), Application-Specific Integrated Circuits (ASICs), dies or chiplets with appropriate logic, memory devices, controllers, possible combinations thereof, and other appropriate types of integrated circuits. The term "die" includes chiplets and other forms of semiconductor dies.

The term "inter-socket link" (ISOL), also known as "inter-processor link" or "inter-processor interconnect", refers to any current or future high-speed communication link that facilitates data transfer between two or more processor sockets on a motherboard, or within a closely coupled multi-socket system, including but not limited to communication between CPUs, GPUs, or a combination of both. These links are typically implemented through one or more ports or interfaces on the processors, collectively referred to herein as "ISOL ports". In CPUs, these ports are often referred to as "interconnect ports" or by technology-specific names. For example, in Intel CPUs, the port connecting to the Ultra Path Interconnect (UPI) is called a "UPI port" or "UPI link". In GPUs, similar concepts apply; for instance, NVIDIA GPUs use "NVLink ports" to connect to the NVLink interconnect. Non-limiting examples of inter-socket links include Intel's Ultra Path Interconnect (UPI), AMD's Infinity Fabric (IF), Nvidia's NVLink, and Ultra Accelerator Link (UALink). Each of these technologies implements its own specific port or interface design to facilitate the inter-socket communication.

The term "processor interconnect" refers to current and/or future implementations of high-speed communication and data transfer between processors (e.g., between CPUs, GPUs, and/or DSAs) within a computing environment, which includes, but is not limited to, inter-socket links (ISOL), direct inter-processor links such as those used in multi-socket configurations or GPU-to-GPU communications, switched fabric architectures that enable multiple processors to communicate through a central switching mechanism, node controller-based topologies, optical interconnects utilizing photonic technologies for high-bandwidth low-latency communication between processors, chiplet-based designs where multiple processing elements on separate dies are connected within a single package, heterogeneous computing interconnects that link different types of processors (e.g., CPUs, GPUs, DSAs, FPGAs, or AI accelerators), and/or other connectivity technologies designed to support efficient, low-latency interactions among multiple processors. The processor interconnect may implement various protocols and/or standards designed for high-performance computing, supporting point-to-point connections, hierarchical topologies, and/or mesh networks, and may incorporate features for coherency, virtualization, and/or dynamic reconfiguration.

The term "on-chip interconnect" refers to the communication infrastructure within a semiconductor device (such as a CPU, GPU, or MxPU), which enables data transfer between various components and modules in the semiconductor device, such as cores, caches, memory controllers, and/or other modules within a CPU/GPU/MxPU. This term is intended to encompass all current and future on-chip interconnect architectures, including but not limited to: point-to-point interconnects with dedicated communication channels; shared bus architectures using a common set of wires or shared medium; hierarchical bus structures with multiple levels of buses; crossbar interconnects providing a switched matrix for simultaneous communication; Network-on-Chip (NoC) architectures employing packet-based communication and routing protocols; hybrid interconnects combining different topologies; and/or advanced hybrid interconnects such as hierarchical NoCs or configurable interconnect fabrics.

The term "Physical Layer" or "PHY" refers to hardware and protocol responsible for transmission and reception of signals. The PHY may include, but is not limited to, the Flex Bus Physical Layer as specified in the various CXL specifications, or other physical layers, such as Ethernet, NVIDIA NVLink, Ultra Ethernet Transport (UET), or any other appropriate current or future communication technologies. These other physical layers may transport, convey, carry, or otherwise communicate CXL data, either through direct support or by encapsulating, embedding, incorporating, integrating, and/or adapting the CXL data into their native data formats, structures, and/or transmission protocols.

CXL Specification Revision 3.1, herein incorporated by reference in its entirety, exhibits variability in its use of terms such as message, transaction, command, opcode, request, and response in contexts that are not always strictly differentiated. For example, terms like "MemRd message", "MemRd Command", and "MemRd opcode" can all be considered valid designations and may be used to refer to similar or related concepts. Similarly, as a second example, the terms "CXL.mem message", "CXL.mem transaction", "CXL.mem request", and "CXL.mem response" are also acceptable and may be used in overlapping contexts. Therefore, for the sake of simplicity and depending on the context, this specification may use terms such as "message" and "transaction" broadly, potentially encompassing concepts that may be more specifically referred to as commands, opcodes, requests, or responses in certain contexts. Additionally, for the sake of simplicity and depending on the context, references to CXL.mem messages and CXL.cache messages may also encompass CXL.mem transactions and CXL.cache transactions, and vice versa, because CXL transactions utilize messages.

Furthermore, CXL Specifications occasionally describe CXL.cache and CXL.mem using various terms such as protocols, channels, interfaces, and transactional interfaces. For simplicity, these terms may be used interchangeably in this specification, depending on the context, to refer to the general concept of CXL communications and interactions. The nuanced differences between terms such as message, command, and opcode, or the nuanced differences between terms such as protocol, channel, and interface, can be found in the relevant CXL Specification Revision if necessary for a particular context.

The term "CXL fabric" refers to a variety of configurations enabling high-speed communication and/or resource sharing among various components in a CXL environment/ecosystem, such as processors, memory expanders, accelerators, storage devices, and other peripherals. These configurations may include one or more of (i) point-to-point configurations, where a host, such as a CPU, is coupled to a CXL device (e.g., a CXL memory expander, an accelerator, or other peripherals) without necessitating a switch, (ii) switched fabric configurations that utilize one or more CXL switches enabling connectivity between hosts and devices, (iii) any other configurations and/or topology adhering to CXL protocols for coherent and scalable interconnectivity, such as daisy-chained devices, tree, mesh, or star configurations, and/or (iv) hybrid configurations that combine CXL links/protocol with other current or future communication links/protocols such as PCIe, Ethernet, NVLink, UET, or other emerging interconnect technologies.

The term "CXL memory processor" refers to an apparatus comprising a processor, which implements, configures, provides services, and/or participates in providing services that perform memory-related functions, configurations, and/or services within a CXL fabric, depending on the specific functionality, configuration, and/or service described in each embodiment or claim. A CXL memory processor may be utilized to provide, enable, and/or facilitate any combination, partial functionalities, and/or management of one or more of the following non-limiting exemplary elements: CXL device, memory buffer, memory expander (e.g., memory buffer coupled with DRAM), memory controller, memory accelerator, memory device, CXL types 3 memory device, Domain Specific Accelerator (DSA), Multi-headed Multi-Logical Device (HD-MLD), Multi-headed Single Logical Device (MH-SLD), device-attached memory, host-attached memory, fabric-attached memory, memory pooling, switch, and/or CXL switch subset component providing a subset of CXL switch capabilities (such as an element providing a subset of CXL switch capabilities related to memory pooling, as defined in one or more of CXL Specification Revisions 2.0, 3.0, 3.1, 4.0 or future versions). Depending on the context, a CXL memory processor may be implemented according to one or more of the Modified CPU or GPU (MxPU) embodiments discussed herein.

Moreover, it is to be understood that the abovementioned list of exemplary elements is not exhaustive, and a CXL memory processor may encompass other memory-related functionalities, configurations, operations, services, and/or optimizations, as long as its interface(s) to CXL entities are at least partially compatible with current and/or future CXL Specification Versions; this compatibility may include: supporting one or more CXL protocol layers, implementing one or more CXL device types, utilizing CXL-defined memory access mechanisms, participating in CXL-based coherency protocols, and/or leveraging CXL-specific features or capabilities.

Furthermore, a CXL memory processor may incorporate additional functionalities and/or services that extend beyond the current CXL Specifications, as long as they are designed to interoperate with or enhance CXL-based systems; examples of such functionalities may include: (i) memory caching, compression, encryption, and/or error correction schemes that improve parameters such as efficiency, latency, security, and/or reliability of CXL memory, (ii) advanced memory allocation, migration, or tiering mechanisms that improve the placement and/or movement of data across CXL memory resources, and/or (iii) specialized memory-centric computing paradigms, such as in-memory processing or near-data computing, which may leverage CXL memory processors to achieve higher performance or energy efficiency. In one example, a CXL memory processor operating as a memory accelerator, and/or enabling/facilitating the operation of a memory accelerator, may perform one or more of the following operations: processing in memory, caching, sparse memory translations, sparse memory operations, malware detection, memory compression, memory encryption, in-memory database acceleration, memory-based AI acceleration, enhancing memory virtualization, and/or supporting data deduplication at the memory level. In another example, a CXL memory processor may operate as, and/or enable/facilitate/support the operation of a system operating as: a memory pool, a memory device, a CXL type 3 memory device, a CXL type 2 memory device, a CXL type 1 memory device, and/or an RPU.

The term "Configuration Space" in the context of CXL encompasses several layers. Fundamentally, CXL devices utilize the PCIe Configuration Space (up to 4 KB per function) for core PCIe functions, such as device discovery, capability identification, and basic configuration, including a 256-byte PCI-compatible region to maintain backward compatibility. Furthermore, CXL defines extended configuration mechanisms, such as through PCIe Designated Vendor-Specific Extended Capabilities (DVSECs), and/or targeting a unique Capability ID optionally via PCIe configuration read/write transactions. These CXL DVSECs encompass registers controlling features like CXL.io, CXL.cache, CXL.mem, power management, RAS, and hot-plug, providing access to CXL-specific functionality. Additionally, some CXL components, such as switches and memory devices, may utilize Memory Mapped I/O (MMIO) registers for configuration-related purposes like memory mapping and dynamic capacity management. CXL devices may utilize certain PCIe Configuration Space registers differently than standard PCIe devices, and some CXL devices may not implement the full PCIe Configuration Space, as detailed in the respective sections of the CXL specification, which allows for CXL-specific behaviors and optimizations while building upon the established PCIe framework.

The term "node controller" refers to a hardware component in a multi-socket computing system that manages communication and coherency between sockets, where each socket typically holds or houses one or more CPUs or GPUs. The node controller primarily interfaces with inter-socket links (ISOL) such as Ultra Path Interconnect (UPI), NVLink, or similar proprietary or standardized interconnects designed for high-bandwidth, low-latency communication between processors. Key functions of the node controller may include one or more of: facilitating data transfer and communication between sockets using ISOL protocols; maintaining cache coherency across multiple CPUs or GPUs in different sockets; managing distributed memory access and coherency across the system's memory hierarchy; routing memory and I/O requests between local and remote sockets; implementing various cache coherency protocols suitable for multi-socket architectures; supporting different memory coherency models, including hardware-managed and software-managed approaches; providing address translation and memory mapping services across sockets; enabling scalability of multi-socket systems beyond typical two or four-socket configurations; optimizing data movement and reducing latency between sockets; supporting advanced features such as cache directory management or snoop filtering to improve system performance; facilitating load balancing and resource allocation across multiple sockets; providing mechanisms for partitioning and isolation in multi-socket environments; and/or implementing security and access control features for inter-socket communication. The node controller may be integrated into the package of a CPU or GPU, implemented as a separate chip on the system board, or implemented through a combination of on-die and off-die components. It may be designed to support various processor architectures and may incorporate programmable elements to allow for flexibility and feature updates.

In the context of RPUs, the term "protocol termination" and its variations, such as "terminate and translate CXL protocols", "terminate first and second CXL protocols and translate messages conforming to the terminated protocols", "terminate CXL.mem and CXL.cache protocols", or "terminate the first and second CXL.cache protocols", refer to operations where messages conforming to protocol(s) are intercepted and processed by the RPU. Protocol termination involves performing at least one of translation or selective filtering; where translation involves transforming one or more intercepted messages conforming to a first protocol to one or more messages conforming to a second protocol, potentially generating multiple transactions in the second protocol domain; and selective filtering involves dropping or filtering specific intercepted messages without corresponding translation. Protocol termination ensures that at least certain transactions conforming to one or more terminated protocols, and their associated field values (e.g., tags, addresses, and optionally opcodes), do not traverse the entire communication path between communicating entities at the edges of the terminated protocols (such as a provider and a consumer). Note that, depending on the specific use case or context, "protocol termination" and its variations may or may not involve translating the intercepted messages conforming to the first protocol to the messages conforming to the second protocol.

For example, a protocol termination between CXL.mem and CXL.cache protocols may operate as follows: when a CXL.mem request (e.g., MemRd, MemRdData, MemRdTEE) arrives at an RPU, the RPU terminates the CXL.mem request, including its protocol-specific field values (e.g., *Rd*, Addr(X), Tag). The RPU may then translate the CXL.mem request into one or more CXL.cache requests (e.g., RdCurr, RdOwn, RdShared) with field values adapted to the CXL.cache protocol (e.g., *Rd*, Addr(Y), CQID), expand the request by generating multiple CXL.cache transactions for a single CXL.mem request, and/or filter/drop certain CXL.mem requests without generating corresponding CXL.cache transactions.

In the context of RPUs and/or protocol termination, references to "first" and "second" CXL protocols may denote either distinct protocol types, which are different protocols with differing semantics and functionalities, such as the first protocol being CXL.mem and the second protocol being CXL.cache, or different instantiations of the same protocol type operating in separate domains or with distinct configurations, such as the first protocol being a CXL.mem instance using a first physical address space and the second protocol being another CXL.mem instance using a second physical address space.

As used herein, the terms "CXL.mem" and "CXL.mem protocol" may be used interchangeably, and the terms "CXL.cache" and "CXL.cache protocol" may be used interchangeably. The use of either form of each term does not imply any limitation or difference in the scope or functionality of the protocols described.

Throughout this disclosure, including all embodiments and examples described herein, terms such as send/sending, receive/receiving, communication/communicating, or exchange/exchanging when used to describe a computer and/or other elements involved in data, message, packet, or other information exchanges, may refer to any direct or indirect operation(s) that facilitate information transfer to/from the computer and/or the other elements. When a computer is said to send information, it is not required to directly transmit the information; similarly, when the computer is said to receive information, it is not required to directly obtain the information. Instead, the computer may initiate, cause, make available, control, direct, participate in, or otherwise facilitate such transfer. The information transfer may occur directly or indirectly through one or more intermediary components, and may include routing, forwarding, or other suitable data transfer mechanisms over any suitable communication path and/or connection.

In a similar manner, when a Port/Endpoint/Interface is said to send/receive/exchange/communicate information to/from/with another entity (which may be a host, device, switch, port, interface, RPU, retimer, etc.), it is not required to directly send/receive/exchange information with the other entity. Instead, the port/interface may communicate through any suitable intermediate medium, component, or entity that facilitates transfer of the information. Such communication may involve one or more intermediary components, protocols, or mechanisms that encrypt, process, convert, buffer, route, or otherwise handle the information between the port/interface and the other entity.

Sentences in the form of "a port/interface configured to communicate with a host/device" are to be interpreted as "a port/interface configured to support communication with a host/device", which refer to direct coupling between the port/interface and the host/device, or to indirect coupling between the port/interface and the host/device, such as via one or more switches, retimers, and/or redrivers.

Various embodiments described herein involve interconnected computers. The term "computer" refers to any device, integrated circuit (IC), or system that includes at least a processor or processing element, memory to store instructions or data, and a communication interface. This definition encompasses a wide range of implementations, including but not limited to: traditional computers (such as desktop PCs, laptops, servers, and hosts), mobile devices (like smartphones, tablets, and wearable devices), embedded systems (including microcontrollers and single-board computers), specialized computing elements (such as GPUs, FPGAs, ASICs, and DSPs), System-on-Chip (SoC) or System-on-Module (SOM) designs, network nodes or elements, and any IC or chip incorporating processing capabilities, memory, and a communication interface. The computer may be implemented in various forms, such as a processor with its associated memory and a communication interface, a controller of any type comprising a processor, memory, and a communication interface, an IC having processing capabilities with some form of memory and a communication interface, a computer-on-a-chip, or any other computing element capable of executing a set of computer instructions and interfacing for data exchange. Furthermore, references to a "computer" or a "processor" include any collection of one or more computers and/or processors (which may be located on different printed circuit boards and/or at different locations) that individually or jointly execute one or more sets of computer instructions, meaning that the singular term "computer" is intended to imply one or more computers, which jointly perform the functions attributed to "the computer". Key components of a computer, as defined here, include: (1) a processor or processing element, which can be of any type, including but not limited to, CPU, GPU, embedded controller, accelerator, single-core or multi-core microprocessors, digital signal processor (DSP), application-specific integrated circuit (ASIC), field-programmable gate array (FPGA), or any combination thereof; (2) memory, which may include any form of volatile or non-volatile, removable or non-removable storage media, such as RAM, ROM, DDR, embedded memory, flash memory, hard drives, solid-state drives, or any other suitable form of data storage; and (3) a communication interface, which refers to any mechanism that allows the processor to send and/or receive data, signals, or instructions; examples of possible communication interfaces include memory interfaces, accelerator interfaces, specialized data transfer interfaces, buses, interconnects, external network interfaces, internal interfaces (including internal proprietary interfaces), or any other arrangement facilitating component-level and/or system-level data exchange. Optional additional components of the computer may include a computer-readable medium for storing programs, data, or instructions; a user interface for interaction with users, if applicable; network interface cards (NICs) for network connectivity; storage devices for persistent data storage; co-processors or accelerators (e.g., GPUs, FPGAs) for specialized workloads; memory modules (e.g., DIMMs) for expanding system memory; a baseboard management controller (BMC) for remote management and monitoring; and various peripherals such as expansion cards, and/or electrical/optical input/output devices.

It is noted that the computer in an apparatus comprising CXL interfaces/ports may be implemented as part of one or more of the CXL interfaces/ports or as a separate component in addition to the CXL interfaces/ports. In various embodiments, the term "computer" may encompass any computing elements that may be integrated within one or more CXL interfaces/ports or implemented as one or more separate components in addition to the CXL interfaces/ports. Whether the computer functionality is integrated into one or more of the CXL interfaces/ports or implemented externally as one or more distinct components, it is understood that relevant operations attributed to the computer may also be performed by one or more of the CXL interfaces/ports, and conversely, relevant operations attributed to one or more of the CXL interfaces/ports may be performed by the computer. This includes relevant processing operations described in this specification in relation to the computer, RPU, MxPU, xPU, switch, or the CXL interfaces/ports. Accordingly, the description does not limit the scope of the embodiments to any specific configuration of the computer relative to the CXL interfaces/ports, and implementations may utilize any combination of integrated or separate computing functionalities.

Figure 2:
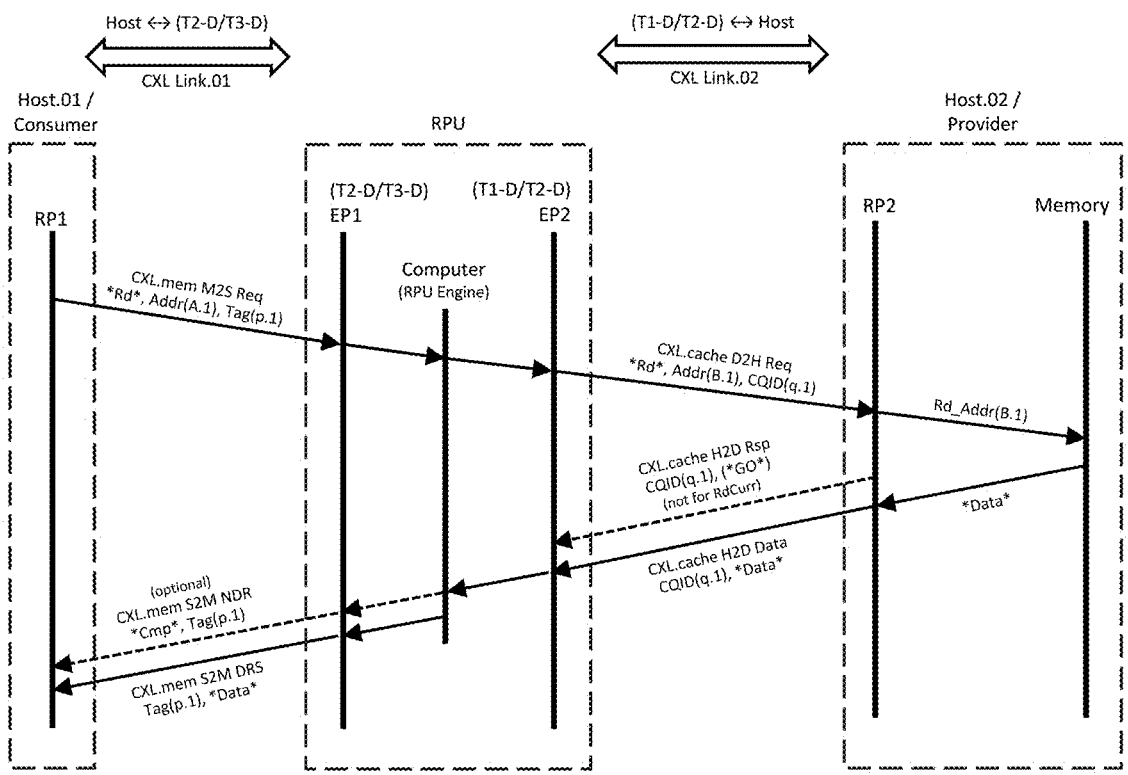
FIG. 2 illustrates one embodiment of a TFD representing possible superset combinations of opcodes.

Some of the drawings appearing in this specification use object-oriented notation of periods (dot operators) in entity names (e.g., in the name "Host.01") to indicate hierarchical or schematic levels. Referring to FIG. 1 and FIG. 2 as an example, Host.01 serves as the consumer of memory resources, utilizing the memory of Host.02 to execute workloads. The Root Port (RP) of Host.01 is the CXL port through which the messages associated with the transactions are communicated. Within the context of this document, the terms "Root Port" and "host" may be used interchangeably when appropriate.

In some embodiments, the memory of Host.02, accessed by the RPU according to CXL.cache, is exposed to Host.01 by the RPU via CXL.mem, which simulates the presence of a large memory expander for Host.01, rather than a direct connection to another host's memory. In the transaction flow diagrams (TFDs) presented herein, also known as sequence diagrams, the X-axis represents the system components, entities, or agents involved in the transaction, and the Y-axis represents the temporal sequence or transaction flow, showing the progression of events from top to bottom, such that each step in the transaction is represented lower on the diagram than the previous step. Referring to FIG. 2 as an example, the X-axis components from left to right include Host.01, first CXL Link, RPU, second CXL link, and Host.02; and the Y-axis from top to bottom indicates the sequence of operations. Vertical lines headed by EP or RP may denote performing CXL transactions. For example, the vertical line below the text "(T2–D/T3–D) EP1" indicates a CXL.mem transaction, and the vertical line below the text "(T1-D/T2-D) EP2" indicates a CXL.cache transaction. Some of the TFDs are further annotated on the top with arrows indicating the types of CXL devices and hosts coupled. For example, the hollow bidirectional arrow on the top to the left illustrates the coupling of Host.01 as RP1 to at least one of a CXL type 2 or type 3 device at the RPU, and the hollow bidirectional arrow on the top to the right illustrates Host.02 coupled as RP2 to at least one of a CXL type 1 or type 2 device at the RPU.

The vertical line denoted by "Computer" (also possibly referred to as RPU Engine) denotes the engine that translates between messages conforming to the different CXL protocols in order to facilitate communication between Host.01 and Host.02. The RPU may optionally include additional modules such as a cache and/or a prefetcher that may initiate transactions not initiated by one of the hosts, as further described below. In some embodiments, Host.02 incorporates a CPU, enabling it to run a software agent that enhances system performance through prefetching. This agent may utilize advanced techniques, including machine learning and/or AI algorithms and system-level prefetching, to improve data retrieval processes. It should be noted that this software agent is just one possible implementation, and other embodiments may use different approaches to enhance system performance.

It is to be understood that references to CXL.mem messages and CXL.cache messages may also encompass CXL.mem transactions and CXL.cache transactions, and vice versa, because CXL transactions utilize messages. In addition, references CXL messages may also encompass CXL commands.

Asterisks (*) may function as wildcard characters within the context of a specific embodiment and/or example, representing a subset of opcodes from a larger set. This subset includes opcodes that are relevant to the revisions or being discussed, encompassing both existing opcodes and potential future opcodes that may be introduced in subsequent versions of the CXL standard, provided they are applicable to the embodiment in question. For example, the wildcard opcode MemRd* may represent a subset of relevant opcodes, which may include, but is not limited to: MemRd, MemRdData, MemRdFwd, MemRdTEE, MemRdDataTEE, or other opcodes that may be introduced in future CXL standard revisions, revisions or they are relevant to the specific embodiment under consideration. Likewise, the wildcard opcode *Rd* may represent an even broader subset of relevant opcodes, which may encompass, but is not limited to: MemRd, MemRdData, MemRdFwd, MemRd-TEE, MemRdDataTEE, MemSpecRd, or MemSpecRdTEE, provided these opcodes are applicable to the specific embodiment being described. It is noted that the wildcard notation does not extend to opcodes that are irrelevant to the embodiment in question, even if such opcodes exist within the broader CXL standard.

Figure 7:
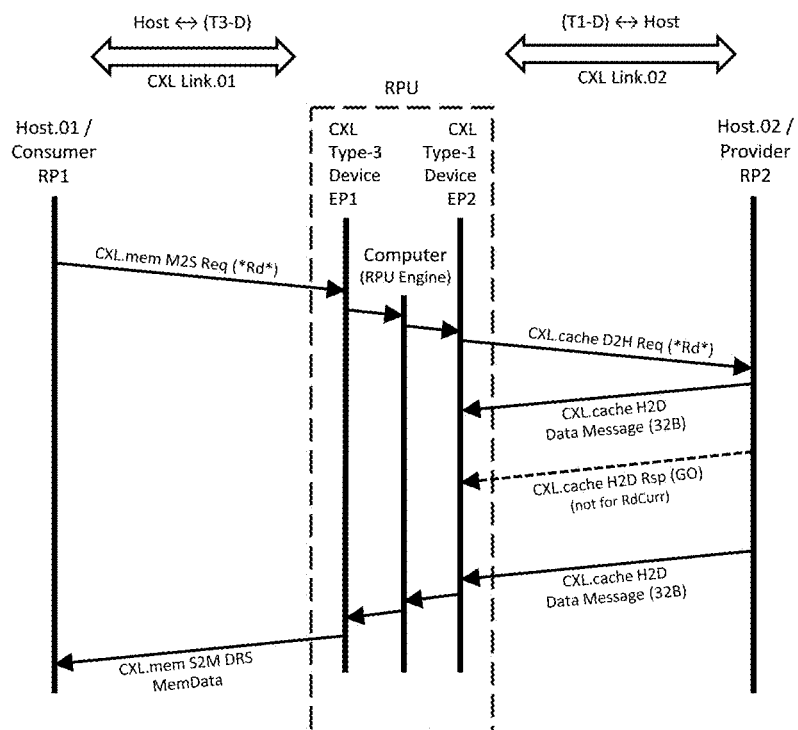
FIG. 7 illustrates one embodiment of an RPU including CXL Type-3 and Type-1 Device Endpoints.

The wildcard form "*Data*" refers to information contained in messages comprising the same form of Data or different forms of Data, and could represent any suitable Data message, request, or response format supported by the CXL Specification. *Data* may also denote messages having the same payload, even if split into multiple messages (e.g., 2×32B on CXL.cache), or messages having different payloads, such as when transferring between different data sizes (e.g., transferring 64B cachelines to 32B chunks, or transferring from a CPU that uses 128B cachelines to CXL that uses 64B cachelines), or when encryption is enabled in Host.02 Memory and/or on the CXL links, such as when using CXL Integrity and Data Encryption (CXL IDE) or when using different encryption keys on different CXL links or channels. In addition, *Data* is intended to cover all forms of Data transmission and references to Data defined in the CXL Specification, such as in the case of CXL.mem S2 M DRS where the opcode MemData is followed by the Data itself, and CXL.cache H2D Data read where the CXL Specification refers to the Data as "Data". *Data* may also encompass any metadata associated with the primary data payload. Splitting the payload to multiple messages is depicted in FIG. 7 that illustrates one example of sending a CXL.cache H2D Rsp (GO) message between two 32B CXL.cache H2D Data messages (2×32B) on (CXL.cache). This sequence supports operations such as Type-3 Device M2S Read operations in CXL 1.x and CXL 2.0 protocols, or HDM-H Address Region Optimized Read operations in CXL 3.x protocols, for a typical implementation of an RPU that translates between (Type-3 Device)- and -(Type-1 Device).

Depending on the context, each line, arrow, label, and/or box illustrated in the figures may represent one or more lines, arrows, labels, and/or boxes. For example, *Rd* M2S request, *Rd* D2H request, or H2D Data message may encompass one or more *Rd* or Data messages (which are relevant to the specific embodiment), even though each may be represented by a single arrow, as illustrated for example in FIG. 1 and FIG. 2. Additionally, optional messages, such as the illustrated *Cmp*S2 M NDR message, may be explicitly depicted or implicitly included within the mandatory messages, such as the illustrated Data S2 M DRS messages.

It is specifically noted that the TFDs presented herein are schematic representations, which means that the number, order, timings, dimensions, and other properties of the information illustrated in the TFDs are non-limiting examples. Every modification, variation, or alternative allowed by a current or future CXL Specification Revision that is relevant to a diagram, is also intended to be included within the scope of said diagrams. Furthermore, the scope of these diagrams extends to encompass implementations that may deviate from the strict CXL Specifications due to factors such as hardware bugs, relaxed designs, or implementation-specific optimizations. This includes, but is not limited to, cases where the actual behavior of CXL-compliant or CXL-compatible devices or components, such as hosts, or switches, differ from the specification in ways that do not fundamentally alter the underlying principles of the transactions. For instance, a device may respond with both NDR and DRS messages in a scenario where the specification only requires a DRS, or a host may accept messages in a different order than specified, as long as the overall transaction integrity is maintained. Moreover, the claimed methods and systems are also intended to cover implementations that may deviate from the CXL Specifications due to practical considerations such as bugs, relaxed design choices, or other deviations that do not fundamentally alter the principles of the transactions.

For example, CXL.cache H2D Data may be either 1×(64B) or 2×(32B) Data messages, and a GO response may be received before the corresponding Data messages, after the corresponding Data messages, or between the corresponding Data messages (such as when a 64B cacheline is split into two 32B Data messages and the *GO* response comes between the two 32B messages). As a second example, the order of CXL.mem S2 M NDR (No Data Response) and S2 M DRS (Data Response) messages may vary for certain operations, and the presence and positioning of Extended Metadata (EMD) in responses may differ based on device capabilities and configuration. And as a third example, timing and presence of CXL.io credit return messages may vary based on implementation-specific flow control mechanisms, and the use and positioning of Vendor Defined Messages (VDMs) may differ across implementations.

Furthermore, protocol-specific features introduced, or to be introduced, in different CXL Specification Revisions are considered part of the scope for relevant diagrams when applicable. Additionally, depending on the context, various nuances, modifications, flexibilities, and/or alternatives permitted by a relevant CXL Specification Revision may also be applied to relevant certain elements of the TFDs herein. This includes, but is not limited to, variations in message formats, optional protocol features, and implementation-specific optimizations allowed within the bounds of the CXL Specifications or reasonable practical extensions beyond them.

As additional non-limiting examples, (i) CXL.mem read transactions may vary in data block sizes, such as 1×(128B) or 4×(32B) messages, depending on the configuration specified in the CXL Specification Revision or as implemented in specific hardware; (ii) the timing of Data transfers may be adjusted based on system requirements, for instance, burst mode transfers versus sequential transfers, as specified in the relevant CXL Specification Revision or as optimized in particular implementations; and (iii) error handling mechanisms such as retry logic or error correction codes (ECC) may vary in implementation as allowed by the CXL Specification Revision or as necessitated by specific hardware constraints or optimizations.

It is understood that as CXL technology evolves, new features, message types, and/or protocol modifications may be introduced in future revisions or implemented in hardware before being formally specified. The scope of the drawings herein, and especially the transaction flow diagrams (TFDs), is intended to encompass such future developments and practical implementations to the extent that they are logical extensions or modifications of the illustrated concepts and do not fundamentally alter the underlying principles of the illustrated transactions, even if they deviate from the strict letter of the CXL Specifications in non-essential ways.

Unless specifically indicated, using letters and/or numbers in transactions, messages, packets, and/or fields, neither necessarily imply that the transactions, messages, packets, and/or fields are consecutive, nor necessarily imply a required order. In some cases, the letters and/or numbers indicate variables holding the corresponding field values. For example, when using notation like Tag(p.c.1), Tag (p.c.2), and Tag(p.c.3), as depicted for example in FIG. 8A, these simply indicate different variables holding field values for Tag, where exemplary values could be Tag(p.c.1)=(0x3), Tag(p.c.2)=(0x7), and Tag(p.c.3)=(0x2), without implying any particular order unless specifically indicated.

Some of the embodiments and Transaction Flow Diagrams use a hierarchical object-oriented notation system that comprises various identifier components. This notation may follow a format of ItemType (EntityID.GroupingID.IndexID), which may also be represented in a shorthand form as ItemType(x.y.z). The "ItemType" portion of the notation may correspond to any element or component involved in a transaction, wherein such elements may possibly include, for example, fields within TLP headers, fields within CXL messages, data payload sections, or other transaction-related components. The "EntityID", which may be denoted by the first index position (x), may identify entities involved in transactions, possibly including abbreviated identifiers such as "p" for Provider or "c" for Consumer, or more detailed identifiers such as "Provider.01" or "Consumer.01", especially when multiple entities of the same type exist. The "GroupingID", which may be represented by the second index position (y), may associate related items within transaction flows, wherein such associations may, for example, link together related tags, such as Tag(p.c.1), Tag(p.c.2), and Tag(p.c.3), or may connect related identifiers such as DestinationID(p.a.1) and CompleterID(p.a.1). The "IndexID", which may occupy the third index position (z), may provide additional qualification or specification of items, possibly differentiating between multiple instances of similar elements within transactions, such as distinct tags (e.g., Tag (p.c.1), Tag(p.c.2), Tag(p.c.3)), or different data payloads. This notation system may be adapted or modified to accommodate various transaction scenarios, entity relationships, and hierarchical structures, and may be implemented in different ways depending on specific requirements or preferences.

CXL.cache and CXL.mem protocols use tag field values to correlate requests with their corresponding responses and Data transfers. Examples of tags include Tag (16-bit) for CXL.mem requests, CQID(12-bit) for device-initiated CXL.cache requests, UQID(12-bit) for host-initiated CXL.cache requests, and BITag (12-bit) for Back-Invalidate messages. When the RPU translates between the CXL.mem and CXL.cache transactions, it also converts the tag values because the channels are independent, and each channel uses its own tag field values. This tag conversion maintains the correlation between requests and responses across different CXL protocols, ensuring that transactions are properly tracked and managed as they move between CXL.mem and CXL.cache domains. It is noted that CXL.io uses tag fields inherited from PCIe in its Transaction Layer Packets (TLPs), however, for the sake of clarity and simplicity, some of the TFDs may omit illustration of the CXL.io interface, which is understood to be present in CXL transactions.

Drawings, such as FIG. 1, use notations such as Host.01/ Consumer/[Switch.01], which indicate their relevancy to various routing schemes, such as Hierarchy Based Routing (HBR) and Port Based Routing (PBR) introduced in CXL Specification Revisions 2.0 and 3.0 respectively. HBR provides a hierarchical structure similar to traditional PCIe topologies, while PBR enables more flexible and scalable fabric topologies, particularly beneficial for multi-host environments and large-scale memory pooling scenarios. Detailed information about these routing mechanisms can be found in section 7, and especially on subsection 7.7 "CXL Fabric Architecture" in CXL Specification Revision 3.1. It is noted that the TFDs and address translations presented herein, while not always explicitly labeled as such, are generally applicable to HBR and PBR, and are expected to remain relevant to future routing schemes that may be developed. The underlying principles of data movement, address translation, and protocol interactions depicted and explained herein often remain consistent across various routing mechanisms, with the primary differences potentially lying in the specific routing decisions and identifiers used. For example, where an HBR system may use bus/device/function addressing, a PBR system would use Port IDs (PIDs) for routing decisions, and future routing schemes may introduce other addressing or identification methods. However, the fundamental flow of transactions, the sequence of operations, and the conceptual address translations, protocol terminations, and other mechanisms described herein would probably remain relevant across these different implementations and future developments. Therefore, unless specifically noted otherwise, it is to be understood that the described diagrams, translations, and explanations may be adaptable to both current (HBR and PBR) and potential future routing implementations, with the appropriate routing-specific considerations applied in each case.

At least some of the embodiments described herein may utilize standard CXL transactions as outlined in the relevant CXL Specification Revisions. The following non-comprehensive list of references to CXL Specification Revision 3.1, published on Aug. 7, 2023, which is herein incorporated by reference in its entirety, provides details of at least some of the CXL.mem transactions applicable to the embodiments. These references include, for example, Section 3.3 titled "CXL.mem", Section 3.3.2 "CXL.mem Protocol Description", Section 3.3.5 "M2S Request (Req)", and Section 3.3.9 "S2 M No Data Response (NDR)". In embodiments where the RPU functions as a CXL Type-3 Device, relevant descriptions may be found in Section 3.6 "Flows to HDM-H in a Type 3 Device" and FIG. 3-42 "Read from Host to HDM-H". Alternatively, in embodiments where the RPU functions as a Type-2 Device, relevant descriptions may be found in Section 3.5.2 "Flows for Type 1 Devices and Type 2 Devices", Section 3.5.2.2 "Requests from Host", FIG. 3-27 "Example Cacheable Read from Host", FIG. 3-28 "Example Read for Ownership from Host", and FIG. 3-29 "Example Non-Cacheable Read from Host".

Furthermore, the following non-comprehensive list of references to CXL Specification Revision 3.1 describes at least some of the CXL.cache transactions that may be relevant to some of the embodiments. These references include, for example, Section 3.2 "CXL.cache", Section 3.2.3 "CXL.cache Wire Description", Section 3.2.3.1 "D2H Request", Section 3.2.3.5 "H2D Response", Section 3.2.3.3 "D2H Data", and FIG. 3-10 "CXL.cache Channels". Additionally, CXL.cache transaction details may also be found in Section 3.2.4 "CXL.cache Transaction Description" and Section 3.5.2 "Flows for Type 1 Devices and Type 2 Devices". It should be noted that the above lists of references are non-comprehensive, and other sections of the CXL Specification Revision 3.1, as well as other sources, may also be relevant to the embodiments described herein.

Figure 4A:
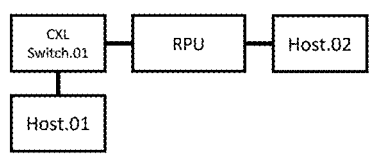
FIG. 4A, FIG. 4B, FIG. 4C, FIG. 4D, and FIG. 4E illustrate schematic examples of possible configurations that include one or more switches, which may be added to the TFDs herein.
Figure 4B:
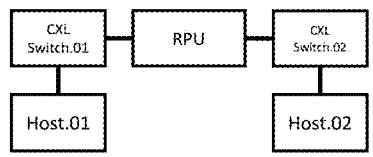
Figure 4C:
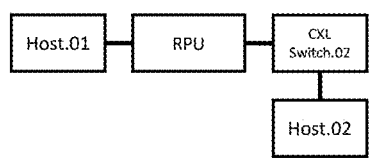
Figure 4D:
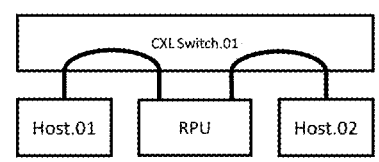
Figure 4E:
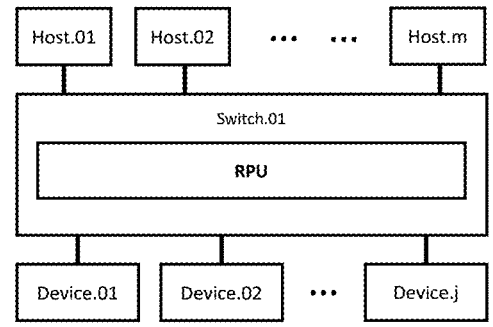

It is noted that while some TFDs, such as FIG. 1, depict communications between transaction-modifying components (such as RPUs, hosts, devices, consumers, and/or provider), these representations are not limited to the illustrated elements and may encompass various configurations involving one or more intermediate transaction-preserving nodes, such as CXL switches, retimers, and/or redrivers. FIG. 4A to FIG. 4E illustrate schematic examples of possible configurations that further include one or more switches, which may be added to the TFDs herein. FIG. 4A illustrates a configuration where Host.01 is coupled to a CXL Switch.01 that is coupled to the RPU that is coupled to Host.02. FIG. 4B illustrates another possible configuration where Host.01 is coupled to CXL Switch.01 that is coupled to the RPU that is coupled to CXL Switch.02 that is coupled to Host.02. FIG. 4C illustrates still another possible configuration where Host.01 is coupled to the RPU that is coupled to CXL Switch.02 that is coupled to Host.02. FIG. 4D illustrates still another possible configuration where CXL Switch.01 couples Host.01, RPU, and Host.02, possibly according to a certain revision of the CXL Specification. FIG. 4E illustrates still another possible configuration where Switch.01 includes the RPU functionality; in this setup, Host.01, Host.02, Device.01, and Device.02 are coupled to Switch.01 that operates according to one or more of the embodiments disclosed herein. These examples demonstrate that the figures, description, and claims may represent a variety of interconnect topologies and optional intermediate transaction-preserving node configurations, wherein the specific arrangement and number of intermediate transaction-preserving nodes may vary depending on various factors. The inclusion of intermediate transaction-preserving nodes, such as CXL switches, retimers, and/or redrivers, typically does not fundamentally alter the nature of the transactions or communications between the transaction-modifying components, thus when interpreting the figures, description, and claims, it should be understood that they may represent more complex topologies involving one or more transaction-preserving nodes.

Similarly, unless explicitly specified otherwise, references to communications between transaction-modifying components—such as RPUs, hosts, devices, consumers, and providers—should be interpreted as encompassing both direct communications and/or indirect communications via one or more intermediate transaction-preserving nodes, such as switches, retimers, and/or redrivers. And unless explicitly stated otherwise, the illustrations, descriptions, and claims related to communications between the transaction-modifying components are intended to cover a range of possible configurations, including direct and/or indirect communication paths.

The notation "number [q:p]" refers to a bit field or bit range, which defines a subset of bits in a binary number, beginning at bit position p and ending at bit position q in ascending order. This notation is widely used in digital design and hardware description languages, such as VHDL, Verilog, and other related programming languages. Notations like address [n:0] or HPA [n:0] indicate that the variable (e.g., address or HPA) contains (n+1) bits, ranging from bit 0 to bit n, in ascending order of bit position, where bit n represents the MSB and bit 0 represents the LSB.

Figure 3:
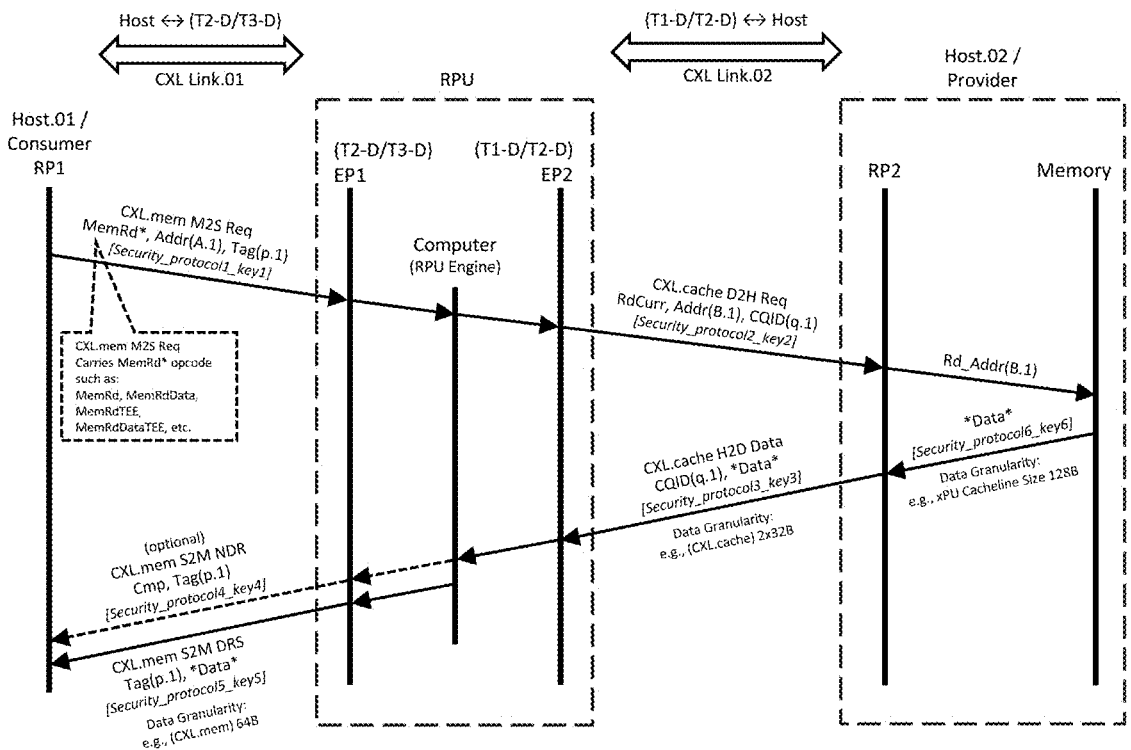
FIG. 3 illustrates one embodiment of a TFD demonstrating how an RPU acts as an intermediary between Host.01 and Host.02, translating between CXL.mem and CXL.cache protocols and managing the associated addresses and tags across the two interfaces.

FIG. 3 illustrates one embodiment of a transaction flow diagram (TFD) demonstrating how an RPU acts as an intermediary between Host.01 and Host.02, translating between CXL.mem and CXL.cache protocols and managing the associated addresses and tags across the two interfaces. The RPU's first Endpoint (EP1), which supports at least one of a CXL Type 2 or Type 3 device, is coupled over CXL.mem to the Root Port of Host.01 (RP1). The RPU's second Endpoint (EP2), which supports at least one of a CXL Type 1 or Type 2 device, is coupled over CXL.cache to the Root Port of Host.02 (RP2). The transaction flow begins with RP1 sending to EP1, over the CXL.mem interface, a Master to Subordinate (M2S) request message comprising a MemRd* opcode, associated host physical address (HPA) Addr(A.1) of Host.01, and a Tag (which is a 16-bit field in CXL Specification Revisions 1.1 to 3.1). The RPU stores the Tag for the one or more S2 M messages to be sent to Host.01. The diagram also illustrates multiple layers of security protocols that may be implemented in various CXL scenarios, including CXL over other transports such as CXL-over-UET. These security protocols are represented as Security_protocol1_key1, Security_protocol4_key4 and Security_protocol5_key5 for CXL Link.01, and as Security_protocol2_key2 and Security_protocol3_key3 for CXL Link.02, which may include CXL IDE (Integrity and Data Encryption), encryption in transit, and independent keys for Tx and Rx on each CXL link.

The computer (which may also be referred to as RPU Engine) translates the CXL.mem M2S Req MemRd* to a CXL.cache D2H Req RdCurr. The M2S Req MemRd* refers to an M2S request message comprising a MemRd* opcode, an HPA of Host.01 (Addr(A.1)), and a Tag. The D2H Req RdCurr refers to a D2H request message comprising a RdCurr opcode, an HPA of Host.02 (Addr(B.1)), and a Command Queue ID (CQID) (which is 12-bit in CXL Specification Revisions 1.1 to 3.1). The protocol translation involves converting at least the following: the MemRd* opcode to the RdCurr opcode, the HPA Addr(A.1) to the HPA Addr(B.1), and the Tag to the CQID. The Tag is converted to the CQID in conjunction with a mapping between the Tags and the CQIDs, where the mapping is optionally maintained by the computer, and may have various implementations, such as (i) maintaining a lookup table with Tag-CQID pairs, (ii) using a hash function to generate the CQIDs from the Tags, and/or (iii) using a portion of the Tag bits as the CQID when there are no collisions.

The D2H Req RdCurr is sent from EP2 to RP2 over the CXL.cache interface. Upon receipt of the D2H Req RdCurr, *Data* is read from HPA Addr(B.1) of Host.02 and sent to RP2. It is noted that the Data sent from Host.02 to the RPU, and then from the RPU to Host.01, may have different forms, and may be related to the Data or identical to the Data. In a first example, Host.02 CPU uses 128B cacheline, while the CXL.cache link may use 64B cacheline split into 2×32B transfer granularity, and the CXL.mem link may use 64B cacheline. It is noted that future CXL revisions may adopt other sizes such as 128B.

In a second example, both Host.02 CPU and the CXL link use cacheline of 64B bytes, the data inside Host.02 is encrypted using Security_protocol6_key6, the CXL.cache H2D Data may be encrypted using Security_protocol3_key3 for CXL IDE encryption in transit, and the CXL.mem MemData may be encrypted using Security_protocol5_key5 for CXL IDE encryption in transit. In some cases, Data that may have different forms, such as the forms described in the above examples, is denoted as *Data*.

CXL Integrity and Data Encryption (IDE) provides confidentiality, integrity, and replay protection for data transmitted across a CXL link. In accordance with CXL Specification Revision 3.1, the IDE mechanism utilizes the AES-GCM security algorithm with a 256-bit key size for ensuring confidentiality, integrity, and replay protection. Independent keys may be used for transmit (Tx) and receive (Rx) operations on each CXL link. In some embodiments, certain protocols and keys may be shared under specific circumstances. For example, Security_protocol4_key4 and Security_protocol5_key5 may both operate over the same CXL link in the same direction, and thus may share the same security protocol and key. The current CXL.io IDE framework is based on the PCIe IDE specification. CXL-.cachemem IDE may leverage CXL.io-based mechanisms for discovery, negotiation, device attestation, and key exchange procedures.

The *Data* transmitted between the Provider and Consumer may vary across different segments of the communication path for several reasons. For example, variations may arise due to (i) encryption being performed using different protocols and keys, as illustrated in the figure, or (ii) differences in data unit granularity, e.g. a Provider may utilize a cacheline size of 128 bytes, while the CXL.cache protocol may handle data messages with a granularity of 32 bytes, and the CXL.mem protocol may operate with data message sizes of 64 bytes.

RP2 sends an H2D Data message (containing the *Data*) to EP2. The computer then translates the CXL.cache H2D Data message to a CXL.mem S2 M DRS message containing the *Data* and the Tag. The RPU may also send an S2 M NDR Cmp (completion) message to RP1 over the CXL.mem interface. The S2 M NDR Cmp includes the Tag, and whether the message is sent depends on the specific requirements of Host.01 processor (e.g., when using certain Intel processors) or the specific opcode used. This multi-layered security approach allows for scenarios where different transport layers may implement their own independent security schemes, resulting in multi-layer security or multi-layer encryption. It also accommodates mixed security scenarios where some transport layers implement security while others do not.

For the sake of clarity and simplicity, some of the transaction flow diagrams (TFDs) herein, including FIG. 3, omit illustrations of the CXL.io channel, which is understood to be present in the CXL transactions. Furthermore, in the context of CXL messages, the notations Addr and Address are equivalent notations referring to physical address.

The translation from CXL.mem MemRd* to CXL.cache RdCurr is a lightweight processing implementation cache-wise, providing high performance, low latency, and high bandwidth, with reasons for its high performances including: CXL.mem RdCurr does not change the existing state in any cache, including in Host.02, which facilitates performance in systems where Host.02 includes more than one CPU, as it reduces coherency traffic, with RdCurr being the least disruptive opcode to the caching subsystem on Host.02, it not needing to track the cacheline in the entity that issued the RdCurr, and RdCurr reads the Data without a GO message, which means less traffic on CXL Link.02.

FIG. 2 illustrates one embodiment of a TFD representing possible superset combinations of opcodes relative to the above discussed TFD of FIG. 3. The TED of FIG. 2 begins with RP1 sending to EP1, over the CXL.mem interface, an M2S request message comprising a *Rd* opcode, associated HPA Addr(A.1) of Host.01, and a Tag. The asterisks in *Rd* indicate that this could represent any suitable superset combination of read opcodes supported by the CXL.mem protocol, such as MemRd, MemRdData, MemRdTEE, MemRdDataTEE, etc. The RPU stores the Tag for the one or more S2 M messages to be sent to Host.01.

The computer translates the CXL.mem M2S Req *Rd* to a CXL.cache D2H Req *Rd*. The D2H Req *Rd* refers to a D2H request message comprising a *Rd* opcode, an HPA Addr(B.1) of Host.02, and a CQID. The protocol translation involves converting at least the following: the CXL.mem M2S Req *Rd* opcode to the CXL.cache D2H Req *Rd* opcode, the HPA Addr(A.1) to the HPA Addr(B.1), and the Tag to the CQID. The asterisks in CXL.cache D2H Req *Rd* indicate that this could represent any suitable superset combination of read opcodes supported by the CXL.cache protocol, such as RdCurr, RdOwn, RdShared, RdAny, etc.

The D2H Req *Rd* is sent from EP2 to RP2 over the CXL.cache interface. Upon receipt of the D2H Req *Rd*, the *Data* is read from HPA Addr(B.1) of Host.02, and RP2 sends an H2D Data message to EP2, which includes the CQID and the *Data*. Then the computer translates the CXL.cache H2D Data message to a CXL.mem S2 M DRS message containing the *Data* and the Tag. Depending on the specific requirements of Host.01 processor or the specific opcode used, the RPU may send an S2 M NDR containing *Cmp* and the Tag to RP1 over the CXL.mem interface.

As written above, the wildcard form *Data* refers to information contained in messages comprising the same form of Data or different forms of Data, and could represent any suitable Data message, request, or response format supported by the CXL Specification, including split messages, different sizes, and/or encrypted data. In addition, *Data* is intended to cover all forms of Data transmission and references to Data defined in the CXL Specification.

FIG. 1 illustrates one embodiment of a TFD representing terminating and blocking Configuration Request TLPs, followed by terminating and translating possible superset combinations of opcodes. The diagram shows the interactions between Host.01 (which may also be referred to as Consumer or a host coupled via Switch.01), the RPU, and Host.02 (which may also be referred to as Provider or a host coupled via Switch.02). After device initialization, Host.01 sends to the RPU, over the CXL.mem interface, an M2S request message comprising *Rd* opcode, Addr(A.1), and a Tag. The asterisks in *Rd* indicate that this could represent any suitable superset combination of read opcodes supported by the CXL.mem protocol, such as MemRd, MemRdData, MemRdTEE, MemRdDataTEE, etc. The RPU then translates the CXL.mem M2S Req *Rd* to a CXL.cache D2H Req *Rd* with Addr(B.1) and a CQID, which is sent to Host.02. The asterisks in CXL.cache D2H Req *Rd* indicate that this could represent any suitable superset combination of read opcodes supported by the CXL.cache protocol, such as RdCurr, RdOwn, RdShared, RdAny, etc. Upon receipt of the D2H Req *Rd*, Host.02 may respond with a CXL.cache H2D Rsp message containing CQID and *GO* (not for RdCurr), followed by a CXL.cache H2D Data message with CQID and *Data*. The RPU then translates these responses back to the CXL.mem protocol. It may optionally send a CXL.mem S2 M NDR *Cmp* message to Host.01, depending on the specific requirements or opcode used. Finally, the RPU sends a CXL.mem S2 M DRS message containing the Tag and *Data* to Host.01, completing the transaction flow.

Figure 5:
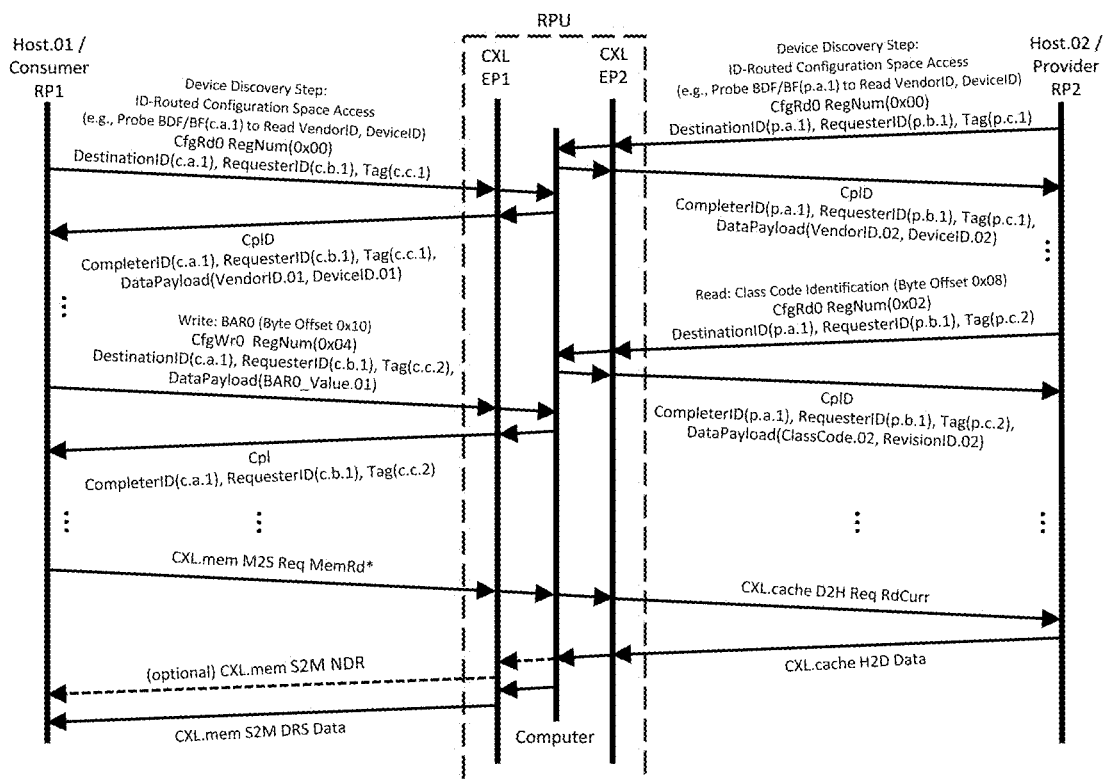
FIG. 5 illustrates one embodiment of an RPU that terminates and blocks CXL.io or PCIe Configuration Request TLPs, and terminates and translates CXL.mem and CXL.cache messages.

FIG. 5 illustrates one embodiment of an RPU that terminates and blocks CXL.io or PCIe Configuration Request TLPs, and terminates and translates CXL.mem and CXL.cache messages sent between a Consumer (Host.01/RP1) and a Provider (Host.02/RP2). The RPU includes first and second Endpoints (EP1, EP2) configured to communicate with the Root Ports (RP1, RP2) of the Consumer and the Provider, respectively. The RPU terminates and responds to the illustrated Configuration Read Request (CfgRd0) and Configuration Write Request (CfgWr0).

On the Provider side (the right side of the figure), the RPU terminates CfgRd0 Device Discovery to Read VendorID and DeviceID received from the Provider, and returns to the Provider CplD, where the CfgRd0 received from the Provider includes at least RegNum (0x00) DestinationID(p.a.1), RequesterID(p.b.1), and Tag(p.c.1), and the CplD returned to the Provider includes at least CompleterID(p.a.1), RequesterID(p.b.1), Tag(p.c.1), and DataPayload (VendorID.02, DeviceID.02). The RPU additionally terminates CfgRd0 received from the Provider to Read Class Code Identification at Byte Offset 0x08 of the second Endpoint (EP2), where the CfgRd0 includes at least RegNum (0x02), DestinationID(p.a.1), RequesterID(p.b.1), and Tag(p.c.2), and returns to the Provider CplD that includes at least CompleterID(p.a.1), RequesterID(p.b.1), Tag(p.c.2), and DataPayload (ClassCode.02, RevisionID.02). While the figure illustrates these two specific Configuration Request TLPs from the Provider, additional Configuration Request TLPs are typically exchanged during the configuration phase to read and write various configuration registers.

On the Consumer side (the left side of the figure), the RPU terminates CfgRd0 Device Discovery to Read VendorID and DeviceID received from the Consumer, and returns to the Consumer CplD, where the CfgRd0 received from the Consumer includes at least RegNum (0x00), DestinationID (c.a.1), RequesterID(c.b.1), and Tag (c.c.1), and the CplD returned to the Consumer includes at least CompleterID (c.a.1), RequesterID(c.b.1), Tag (c.c.1), and DataPayload (VendorID.01, DeviceID.01). The RPU further terminates Configuration Write Request Cfg Wr0 received from the Consumer to write to Base Address Register 0 (BAR0) of the first Endpoint (EP1), where the CfgWr0 includes at RegNum (0x04), RequesterID(c.b.1), least DestinationID(c.a.1), Tag (c.c.2), and DataPayload (BAR0_Value.01), and returns to the Consumer Cpl that includes at least CompleterID(c.a.1), RequesterID(c.b.1), and Tag (c.c.2). Similar to the Provider side, these illustrated Configuration Request TLPs represent just two examples from the many Configuration Request TLPs that are typically exchanged during the configuration phase.

In contrast to terminating and blocking the Configuration Request TLPs, the RPU terminates and translates CXL.mem messages, such as a CXL.mem M2S Req MemRd received from the Consumer, to CXL.cache messages, such as a CXL.cache D2H Req RdCurr sent to the Provider. In response, the Provider sends CXL.cache H2D Data, which the RPU translates into CXL.mem S2 M DRS Data for the Consumer. Optionally, CXL.mem S2 M NDR Cmp may be generated and sent to the Consumer.

FIG. 7 illustrates one embodiment of an RPU including CXL Type-3 and Type-1 Device Endpoints. In the illustrated example, the GO message is returned between the two 2×32B Data messages on the CXL.cache link, while the CXL.mem S2 M DRS is not accompanied by a CXL.mem S2 M NDR. Examples of scenarios where the RPU does not return an NDR include a Type-3 Device M2S Read according to CXL Specification Revisions 1.1 and 2.0, and the HDM-H Address Region optimized read flow in a Type-3 Device according to CXL Specification Revision 3.1, where only a Data message is returned, which is in contrast with the HDM-D/HDM-DB Address Regions, where both NDR and Data messages are returned.

In one embodiment, device discovery may be performed during system initialization as a component of the PCIe enumeration process, which is typically handled by the system's BIOS, firmware, or operating system. The device discovery process may include several steps, including (1) a Bus, Device, and Function Scanning: PCIe devices are addressed using a tuple of Bus Number, Device Number, and Function Number (known as BDF, or Bus Device Function). The Root Complex (RC) may systematically probe all possible BDF combinations to detect coupled devices; (2) Configuration Space Access: For each potential BDF, the RC may attempt to access the device's PCI Configuration Space to read the Vendor ID and Device ID. A valid response from this read operation may indicate the presence of a device at that BDF location; (3) Class Code Identification: The RC may read the Class Code from the device's Configuration Space, which may be used to determine the device type, such as a storage controller or a network adapter; and (4) Capability Discovery: If a device is identified, the RC may examine the device's Capability List within its Configuration Space. This list may disclose various features supported by the device, including PCIe-specific capabilities, CXL capabilities (for a CXL Device), power management capabilities, and/or extended features such as SR-IOV or Atomic Operations.

The reading of Configuration Spaces may occur in various sequences, potentially depending on the interconnected entities and specific system requirements. In a Host-Host configuration, such as those illustrated in FIG. 5 and FIG. 8A, several configuration orderings are possible. In one example, the RPU EP2 coupled to the provider is configured before configuring the RPU EP1 coupled to the consumer. Configuring the provider-side of the RPU first may allow a provider, acting as a Memory Pool, to establish parameters that it chooses to expose to the consumer via EP1, such as, for example, the number of HDMs, the size of HDMs, and/or the CXL Device Type. In a second example, the configuration of both RPU EP1 coupled to the consumer and RPU EP2 coupled to the provider may occur concurrently. This simultaneous configuration may be implemented when both are configured by an external controller, such as an Orchestration Controller. And in a third example, the RPU EP1 coupled to the consumer may be configured before the RPU EP2 coupled to the provider. Such a sequence may be employed when an external controller configures parameters of memory allocations exposed to the consumer via RPU EP1, such as the number of HDMs, and subsequently allocates the provider or set of providers that support these allocations.

CXL.io leverages the Transaction Layer defined in the PCIe specification and uses TLPs to execute a variety of operations, including memory read procedures. TLPs, which are usually referred to herein as CXL.io or PCIe TLPs, are the packetized form of data used to communicate transaction requests and completions across the PCIe link. TLPs encapsulate various types of transactions, such as memory reads and writes (memory TLPs), configuration accesses (Configuration Request TLPs), and/or message requests. CXL.io uses several types of TLPs, similar to PCIe, for communication and management purposes. The types include: (i) Normal TLPs for the transmission of communication data between components; these packets facilitate fundamental transaction operations such as memory read requests, memory write commands, and the corresponding completion acknowledgments; the Normal TLPs serve as a primary means for carrying payload data within the CXL.io framework, ensuring efficient and consistent data exchanges between interconnected elements. (ii) Vendor-Defined Messages (VDMs) integrated within set of supported TLP types to enable device-specific communication and the execution of custom functionalities, encompassing specialized operations like error reporting mechanisms and power management tasks; VDMs provide a framework that extends beyond the standard TLP structure, offering device manufacturers the flexibility to implement unique features while maintaining compatibility with the overarching protocol. (iii) Poisoned TLPs are used by CXL.io to mark and signal data corruption or memory poisoning; these packets identify and communicate corrupted payload data as they propagate through the system, thereby enabling downstream components and devices to invoke appropriate error handling procedures. (iv) No-Operation TLPs (NOP-TLPs) are special types of TLPs that do not contain any meaningful payload data, employed primarily for link management purposes and serve as placeholders or control signals within the communication channel. And (v) Port-Based Routing (PBR) TLP Header (PTH), which For Port-Based Routing (PBR) configurations within the CXL.io framework, especially when operating over a PBR fabric or within PBR switches, non-NOP TLPs are appended with a fixed PBR TLP Header (PTH) used to enforce and manage the correct routing and delivery of packets across complex network topologies.

It is noted that the message notations used herein are generally consistent with the CXL specification, and notations such as M2S RwD, D2H Req, H2D Rsp, S2 M NDR, and D2H Data refer to their corresponding messages (i.e., M2S RwD message, D2H Req message, etc.).

In modern computing systems, there's a growing need for efficient and flexible memory access across different components. One challenge arises when attempting to bridge communication between CXL hosts, where a consumer may initiate memory requests using the CXL.mem and a provider may handle requests using CXL.cache. To address this, one method includes receiving a CXL.mem request from the consumer, translating it into a corresponding CXL.cache request, and forwarding it to the provider. Upon receiving a CXL.cache response from the provider, the response is translated back to the CXL.mem format and sent to the consumer. This approach generally involves an RPU that includes Endpoints to communicate with both the consumer and the provider, and a computer configured to perform protocol translations between the CXL.mem and CXL.cache protocols, thus enabling interoperability between hosts that would otherwise be unable to communicate directly. The RPU may be implemented on a card, on a motherboard, or as a semiconductor device.

In one embodiment, a method for translating between Compute Express Link (CXL) protocols includes receiving, from a consumer, CXL.io or PCIe Configuration Request Transaction Layer Packets (Configuration Request TLPs), and terminating the Configuration Request TLPs. the method may further include receiving, from the consumer, a CXL.mem Master-to-Subordinate Request (M2S Req), and translating the CXL.mem M2S Req to a CXL.cache Device-to-Host Request (D2H Req). the method may further include sending, to a provider, the CXL.cache D2H Req, receiving, from the provider, a CXL.cache Host-to-Device Data (H2D Data) message, and sending, to the consumer, a CXL.mem Subordinate-to-Master Data Response (S2 M DRS) corresponding to the H2D Data message. It is noted that the message notations used herein are generally consistent with the CXL specification, and it is noted that notations such as M2S Req, D2H Req, H2D Data, S2 M DRS, S2 M NDR, and H2D Rsp refer to their corresponding messages (i.e., M2S Req message, D2H Req message, H2D Data message, etc.).

In certain aspects of the method, the Configuration Request TLPs include at least two of: Type 0 Configuration Read Request (CfgRd0), Type 0 Configuration Write Request (CfgWr0), Type 1 Configuration Read Request (CfgRd1), or Type 1 Configuration Write Request (CfgWr1). The method may further include a second provider that is security-hardened, for which Configuration Request TLPs from the consumer may be sent without being terminated. Additionally or alternatively, the provider (such as a security-hardened provider) may be configured to effectively ignore CfgRd0, CfgWr0, CfgRd1, and/or CfgWr1 TLPs received from the consumer. For example, CfgRd0 and CfgWr0 requests, typically used for device discovery and configuration, may be terminated at the RPU, preventing them from reaching a first provider for security or to simplify the configuration process; however, for a second provider that is security-hardened, these requests may be passed through without termination for a possibly more flexible configuration scheme where certain devices can be directly configured by the consumer. In some embodiments, the method may further include receiving memory Transaction Layer Packets (memory TLPs) from the consumer, and sending, to the provider, data indicative of at least one of the following parameters related to the memory TLPs: addresses, traffic class, or attributes.

Figure 6:
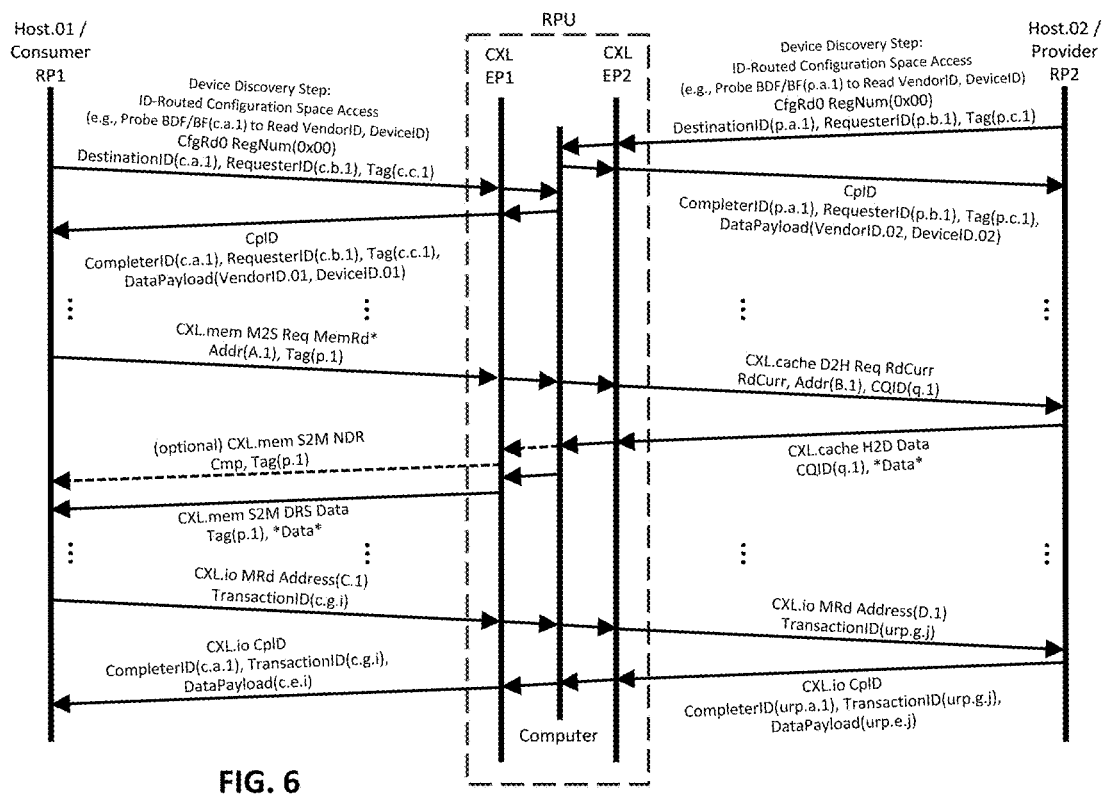
FIG. 6 illustrates one embodiment of an RPU that processes different types of CXL.io and/or PCIe TLPs differently.

FIG. 6 illustrates one embodiment of an RPU that processes different types of CXL.io and/or PCIe Transaction Layer Packets (TLPs) differently. CXL.io leverages PCIe's Transaction Layer and uses TLPs to execute a variety of operations, including memory read procedures. The RPU terminates and blocks one type of TLPs, such as Configuration Request TLPs illustrated by CfgRd0, and terminates and translates another type of TLPs, such as CXL.io MRd. The RPU includes first and second Endpoints (EP1,EP2) configured to communicate with the Root Ports of the Consumer and the Provider, respectively. During operation, the RPU terminates CfgRd0 Device Discovery to Read VendorID and DeviceID received from the Consumer, and returns CplD to the Consumer; where the CfgRd0 received from the Consumer includes at least RegNum (0x00), DestinationID(c.a.1), RequesterID(c.b.1), and Tag (c.c.1), and the CplD returned to the Consumer includes at least CompleterID(c.a.1), RequesterID(c.b.1), Tag (c.c.1), and DataPayload (VendorID.01, DeviceID.01). The RPU additionally terminates CfgRd0 Device Discovery to Read VendorID and DeviceID received from the Provider, and returns CplD to the Provider; where the CfgRd0 received from the Provider includes at least RegNum (0x00), DestinationID (p.a.1), RequesterID(p.b.1), and Tag(p.c.1), and the CplD returned to the Provider includes at least CompleterID (p.a.1), RequesterID(p.b.1), Tag(p.c.1), and DataPayload (VendorID.02, DeviceID.02).

Still referring to the figure, the RPU supports memory operations wherein CXL.mem messages, such as the illustrated CXL.mem M2S Req MemRd received from the Consumer that includes Addr(A.1) and Tag(p.1), are translated to CXL.cache messages, such as the illustrated CXL.cache D2H Req RdCurr sent to the Provider that includes Addr(B.1) and CQID(q.1). In the illustrated example the Provider responds with CXL.cache H2D Data that includes CQID(q.1) and Data, which the RPU translates into CXL.mem S2 M DRS Data that includes Tag(p.1) and Data for the Consumer. Optionally, CXL.mem S2 M NDR Cmp that includes Tag(p.1) is also generated and sent to the Consumer. When the RPU receives from the Consumer a first CXL.io MRd TLP, which includes at least TransactionID(c.g.i) and Address (C.1), it translates it to a second CXL.io MRd TLP, which includes at least TransactionID (urp.g.j) and Address (D.1), to be sent to the Provider. And when the RPU receives from the Provider a first CXL.io CplD, which includes CompleterID(urp.a.1), TransactionID (urp.g.j), and DataPayload (urp.e.j), it translates it to a second CXL.io CplD, which includes CompleterID(c.a.1), TransactionID(e.g.i), and DataPayload(c.e.i), to be sent to the Consumer. Regarding the CplD and DataPayload, it is noted that there may be one or more completion messages per a single MRd, based on criteria such as the Read Completion Boundary (RCB) of the Completer. Consequently, the data requested by a single MRd may be partitioned into multiple completions, each with its corresponding DataPayload contents. Although typically the RPU may handle MRd requests of 64B cacheline sizes, the RPU may handle requests of other sizes as well.

Optionally, the method may further include blocking more than half of the TLPs sent by the consumer and provider after Link Layer Initialization. Optionally, the method may further include receiving from the consumer memory TLPs comprising CXL.io MRd comprising physical addresses; and may further include performing address translations from memory address space in CXL.io MRd TLP type of the consumer to memory address space in CXL.io MRd TLP type of the provider.

Optionally, the method may further include receiving, from the consumer, memory TLPs conforming to Short Address Format of 32-bit address, performing format translation, and sending to the provider memory TLPs conforming to Long Address Format of 64-bit address. Optionally, the method may further include receiving, from the consumer, a CXL.io memory transaction, and utilizing non-transparent bridging (NTB) to enable the consumer to read data, from the provider, based on mapping a physical address space window of the provider to a physical address space window of the consumer via a Base Address Register (BAR). Optionally, the method may further include: receiving from the provider second Transaction Layer Packets (second TLPs); terminating the second TLPs; sending to the consumer translations of the following terminated second TLP types: Memory Read (MRd), Memory Write (MWr), and Completion with Data(CplD); and blocking the following terminated second TLP types: Configuration Read (CfgRd0, CfgRd1) requests, Configuration Write (CfgWr0, CfgWr1) requests, and Completion for Locked Memory Read (CplDLk).

In some embodiments of the method, the CXL.mem M2S Req includes: a first *Rd* opcode, a first address, and a Tag; the CXL.cache D2H Req includes: a second *Rd* opcode, a second address, and a Command Queue ID (CQID); the CXL.cache H2D Data message includes the CQID and *Data*; and the CXL.mem S2 M DRS includes the Tag and the *Data*. The Tag and CQID fields are defined by the CXL specification, and it is noted that in the context of CXL messages, the names Tag and CQID usually refer herein to the values of the Tag and CQID fields. Optionally, the first *Rd* opcode of the M2S Req is selected from MemRd, MemRdData, MemRdTEE, or MemRdDataTEE; the second *Rd* opcode of the D2H Req is selected from RdCurr, RdOwn, RdShared, or RdAny; and further comprising sending an S2 M NDR *Cmp* before, concurrently, or after sending the S2 M DRS. Optionally, the first *Rd* opcode of the M2S Req is selected from MemRd, MemRdData, MemRdTEE, or MemRdDataTEE; the second *Rd* opcode of the D2H Req is selected from RdOwn, RdShared, or RdAny; and further comprising sending an H2D Rsp *GO* before, concurrently, or after sending the H2D Data message.

Additionally, the method may further include storing the Tag received in the CXL.mem M2S Req, maintaining a mapping table that associates the Tag with the CQID, utilizing the mapping table for matching incoming CXL.cache H2D Data messages with pending CXL.mem M2S Req, and utilizing the stored Tag for generating the CXL.mem S2 M DRS. The received Tag to be populated in the CXL.mem S2 M DRS may be stored in the RPU or in memory accessible to the RPU. Optionally, the method may include a flow control mechanism for regulating rate of CXL.mem to CXL.cache translations based on capacity of a destination CXL.cache device. In some embodiments, the first address belongs to Host Physical Address (HPA) of the consumer, the second address belongs to HPA of the provider, and the consumer communicates with the provider according to CXL.mem and/or CXL.cache without an intermediate standard CXL switch between the consumer and provider.

In certain embodiments, the method may further include encapsulating at least one of (i) the CXL.mem M2S Req and S2 M DRS, or (ii) the CXL.cache D2H Req and H2D Data, for transmission over a non-CXL network protocol stack. Additionally, the method may further include dynamically selecting the non-CXL network protocol stack based on at least one of: available bandwidth, latency requirements, or network congestion. Optionally, the method may further include encapsulating at least one of (i) the CXL.mem M2S Req and S2 M DRS, or (ii) the CXL.cache D2H Req and H2D Data, for transmission utilizing one of: CXL over Ultra Ethernet Transport (UET), CXL over Ethernet, CXL over NVLink, CXL over Ultra Accelerator Link (UALink), CXL over RDMA over Ethernet (RoCE), or CXL over RDMA over InfiniBand. Encapsulation of CXL messages over non-CXL network protocol stack, combined with translation between CXL.mem and CXL.cache protocols, may extend and/or enhance CXL-based communication by overcoming physical limitations of native CXL links. This embodiment may expand the potential range and scope of CXL-based memory access, facilitating interoperability between diverse CXL devices, and potentially bridging gaps in existing system architectures. By leveraging established network protocols such as Ethernet, NVLink, UALink, or InfiniBand, the encapsulation may increase the effective range of CXL communication, enabling remote memory access and shared memory architectures across physically distributed systems. It may further enhance system flexibility, allowing for more versatile integration of different CXL-capable entities in computing environments. Depending on the chosen underlying transport protocol, there may also be opportunities to leverage higher bandwidth connections, potentially improving overall system performance and improving resource disaggregation in data centers by enabling more dynamic and efficient allocation of memory resources across different physical servers or racks, thereby optimizing resource utilization and potentially reducing hardware costs. In one embodiment, a non-transitory computer-readable medium includes instructions that, when executed by a processor, cause the processor to perform the method described above.

In one embodiment, an apparatus includes a Compute Express Link (CXL) Type 2 or Type 3 device (EP1) configured to receive from a consumer: CXL.io or PCIe Configuration Request TLPs, and a CXL.mem Master-to-Subordinate Request (M2S Req). The apparatus further includes a computer configured to terminate the Configuration Request TLPs; and translate the CXL.mem M2S Req to a CXL.cache Device-to-Host Request (D2H Req). The apparatus further includes a CXL Type 1 or Type 2 device (EP2) configured to send to a provider the CXL.cache D2H Req, and then receive a CXL.cache Host-to-Device Data(H2D Data) message. The EP1 is further configured to send, to the consumer, a CXL.mem Subordinate-to-Master Data Response (S2 M DRS) corresponding to the H2D Data message.

In some embodiments of the apparatus, the CXL.mem M2S Req includes: a first *Rd* opcode, a first address, and a Tag; the CXL.cache D2H Req includes: a second *Rd* opcode, a second address, and a Command Queue ID(CQID); the CXL.cache H2D Data message includes the CQID and *Data*; and the CXL.mem S2 M DRS includes the Tag and the *Data*. Optionally, the first *Rd* opcode of the M2S Req is selected from MemRd, MemRdData, MemRdTEE, or MemRdDataTEE, and the second *Rd* opcode of the D2H Req is selected from RdCurr, RdOwn, RdShared, or RdAny; and wherein the EP1 is further configured to send an S2 M NDR *Cmp* before, concurrently, or after the S2 M DRS. It is noted that according to current CXL specification revisions, the S2 M DRS and S2 M NDR *Cmp* are sent over different channels of the CXL interface. The S2 M NDR *Cmp* may be sent before, concurrently, or after the S2 M DRS. Optionally, the first *Rd* opcode of the M2S Req is selected from MemRd, MemRdData, MemRdTEE, or MemRdDataTEE, and the second *Rd* opcode of the D2H Req is selected from RdOwn, RdShared, or RdAny; and wherein the EP2 is further configured to receive an H2D Rsp *GO* before, concurrently, or after the H2D Data message. It is noted that according to the current CXL specification revisions, the H2D Data and H2D Rsp *GO* are sent over different channels of the CXL interface. The H2D Rsp *GO* may be sent before, concurrently, or after the H2D Data message. Optionally, the apparatus may further include memory configured to store the Tag received in the CXL.mem M2S Req, and wherein the computer is further configured to utilize the stored Tag to generate the CXL.mem S2 M DRS. In certain aspects, the apparatus is implemented as: (i) a card comprising at least one of the following connectors: Mini Cool Edge IO (MCIO), Quad Small Form-Factor Pluggable Double Density (QSFP-DD), CD (400 Gb/s) Form Factor Pluggable (CDFP), Octal Small Form Factor Pluggable Module (OSFP), or Octal Small Form Factor eXtra Dense Pluggable Module (OSFP-XD); (ii) a card mounted in a CXL slot of a motherboard of a consumer configured to send the M2S Req; (iii) a card mounted in a CXL slot of a motherboard of a provider configured to send the H2D Data; or (iv) a semiconductor device including of at least two transceivers each capable of operating in at least one of Non-Return-to-Zero (NRZ) or 4-level Pulse Amplitude Modulation (PAM4) signaling.

In one embodiment, a system includes a first host configured to send, to a Resource Provisioning Unit (RPU), a CXL.mem Master-to-Subordinate Request (M2S Req), wherein CXL denotes Compute Express Link. The RPU is configured to translate the CXL.mem M2S Req to a CXL.cache Device-to-Host Request (D2H Req), and to send the CXL.cache D2H Req to a second host. The second host is configured to respond, to the RPU, with a CXL.cache Host-to-Device Data(H2D Data) message. The RPU is further configured to send, to the first host, a CXL.mem Subordinate-to-Master Data Response (S2 M DRS) corresponding to the H2D Data message. In some embodiments of the system, the CXL.mem M2S Req includes: a first *Rd* opcode, a first address, and a Tag; the CXL.cache D2H Req includes: a second *Rd* opcode, a second address, and a CQID; the CXL.cache H2D Data message includes the CQID and *Data*; and the CXL.mem S2 M DRS includes the Tag and the *Data*. Optionally, the first *Rd* opcode of the M2S Req is selected from MemRd, MemRdData, MemRdTEE, or MemRdDataTEE, and the second *Rd* opcode of the D2H Req is selected from RdCurr, RdOwn, RdShared, or RdAny. Optionally, the M2S Req is received over a first CXL link in which the RPU is exposed to the first host as either a CXL Type-2 Device or a CXL Type-3 Device, and the D2H Req is sent over a second CXL link in which the RPU is exposed to the second host as either a CXL Type-1 Device or a CXL Type-2 Device.

In one embodiment, an apparatus includes a first switch port configured to receive from a consumer: CXL.io or PCIe Configuration Request TLPs, and a CXL.mem Master-to-Subordinate Request (M2S Req); wherein CXL denotes Compute Express Link. The apparatus further includes a computer configured to terminate transactions that utilize the Configuration Request TLPs that are routed to the computer; and translate the CXL.mem M2S Req to a CXL.cache Device-to-Host Request (D2H Req). The apparatus further includes a second switch port configured to send to a provider the CXL.cache D2H Req, and then receive a CXL.cache Host-to-Device Data(H2D Data) message. The first switch port is further configured to send, to the consumer, a CXL.mem Subordinate-to-Master Data Response (S2 M DRS) corresponding to the H2D Data message. Optionally, the apparatus functions as a switch, and each of the first and second switch ports belong to one of: a Hierarchy Based Routing (HBR) switch port, a Port Based Routing (PBR) switch port, a Virtual CXL Switch (VCS) that includes a single Upstream Switch Port (USP) and one or more Downstream Switch Ports (DSPs), a Switch Interface Port, or a Switch Physical Port. Examples of HBR switch ports include: HBR Upstream Switch Port (HBR USP) connecting towards a host or root complex, and HBR Downstream Switch Port (HBR DSP) connecting towards CXL devices or other switches in the downstream direction. Examples of PBR switch ports include: PBR Upstream Switch Port (PBR USP) connecting towards a host or root complex, PBR Downstream Switch Port (PBR DSP) connecting towards CXL devices or other switches in the downstream direction, PBR Fabric Port (PBR FPort) connecting to other PBR switches in the fabric, PBR Edge Switch Port at the edge of the PBR fabric to interface between the PBR fabric and non-PBR components, and PBR Inter-Switch Link Port connecting PBR switches to each other within the fabric.

Figure 8A:
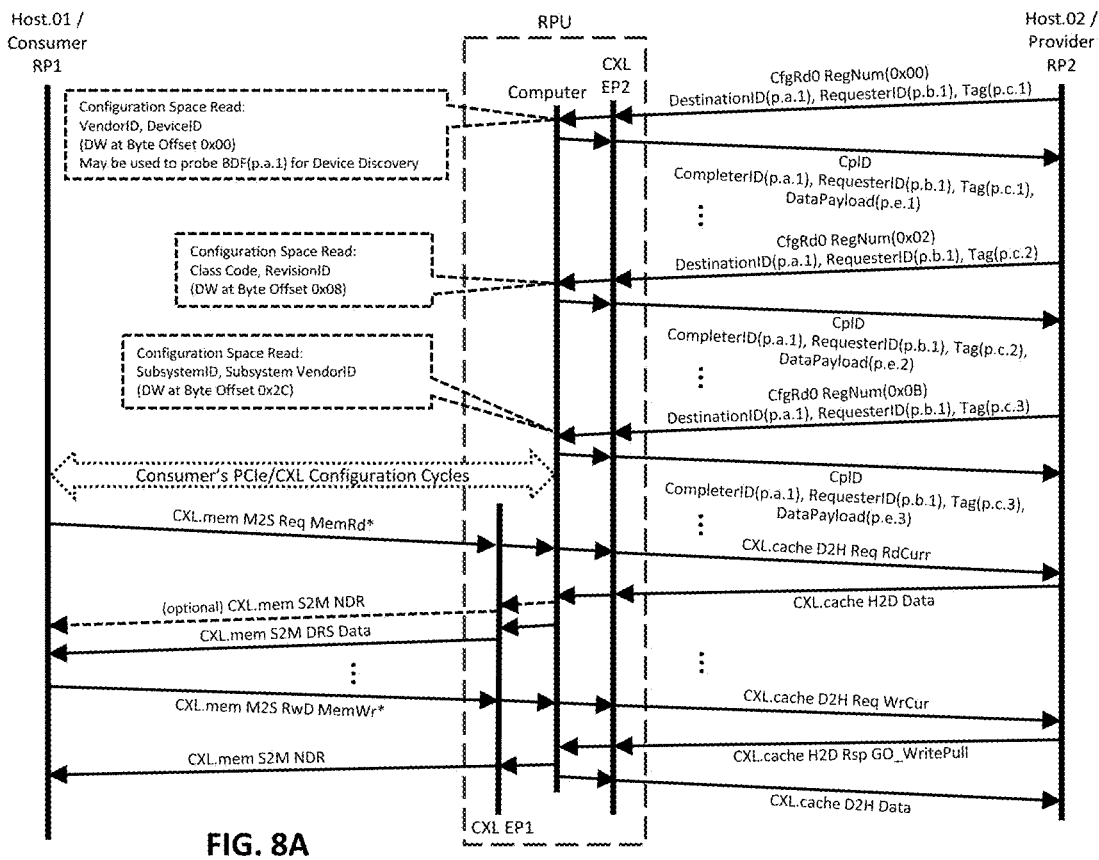
FIG. 8A illustrates one embodiment of an RPU where its second Endpoint (EP2) forwards to the RPU's computer CfgRd0 communications from a provider's side.
Figure 8B:
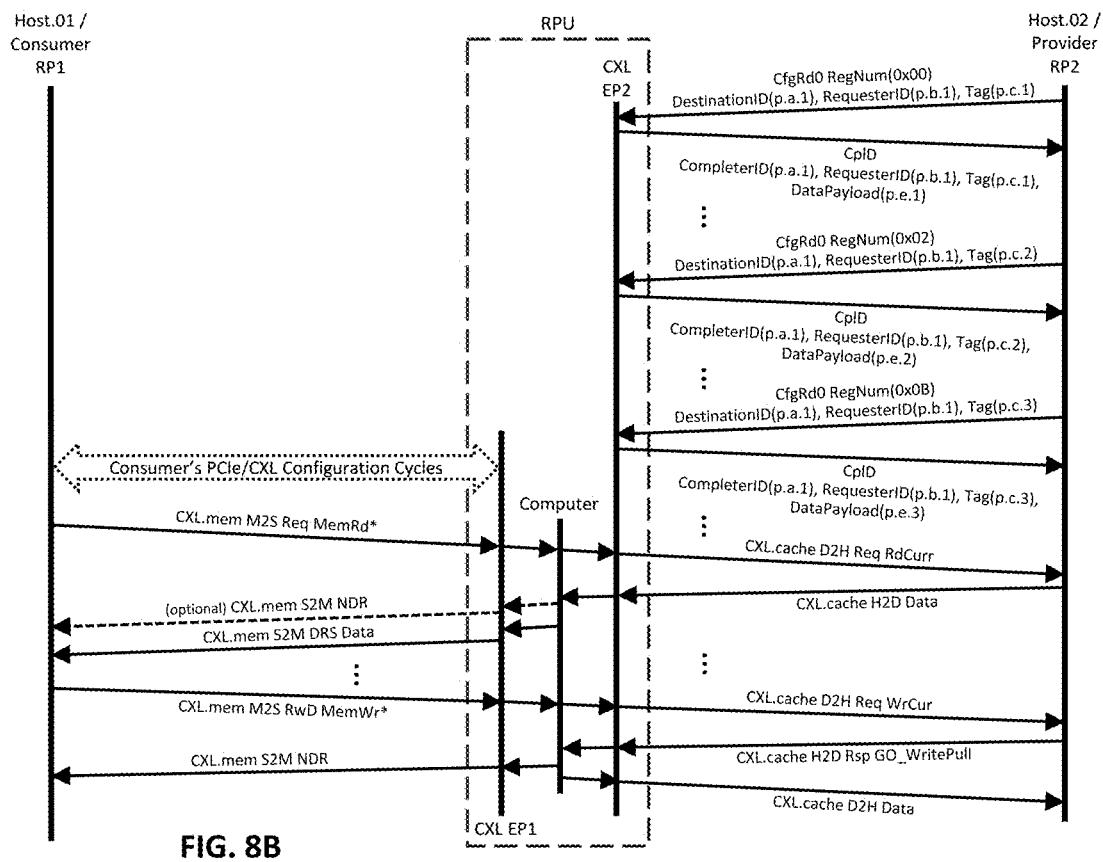
FIG. 8B illustrates a possibly simpler implementation wherein the RPU's EP2 processes a first subset of the communications and forwards a second subset of the communications to the RPU's computer.

In one embodiment, a method for translating between CXL protocols includes receiving, from a provider, a Type 0 Configuration Read Request (CfgRd0) comprising Register Number 0x00, refraining from sending the CfgRd0 to a consumer, and sending a Completion with Data(CplD) to the provider. The method further includes receiving, from the consumer, a second CfgRd0 comprising Register Number 0x00, refraining from sending the second CfgRd0 to the provider, and sending a second CplD to the consumer. In this embodiment, after sending the CplD and the second CplD, the method includes receiving, from the consumer, a first CXL message comprising: a *Rd* opcode and a first physical address (PA) from a Host Physical Address (HPA) space of the consumer; translating the first CXL message to a second CXL message comprising a second PA from an HPA space of the provider; and sending the second CXL message to the provider. The computer that implements the protocol termination for communications between a provider and a consumer may have various embodiments, such as the embodiments illustrated in FIG. 8A and FIG. 8B. Specifically, FIG. 8A illustrates an implementation wherein the RPU's second Endpoint (EP2) forwards communications to the RPU's computer, where the illustrated communications from the provider's side include configuration read requests (CfgRd0) from the provider and CXL responses. The computer processes the communications, where the processing includes protocol termination, generation of completion with data (CplD) responses corresponding to the configuration read requests, and generation of translated CXL messages for transmission to the consumer. The protocol termination by the computer may support various processing options, such as modification of device personality/characteristics, software-defined applications, and/or programmable communication handling rules. Continuing the example, FIG. 8B illustrates a possibly simpler implementation wherein the RPU's EP2 processes a first subset of communications and forwards a second subset of communications to the RPU's computer. Although this version of the EP2 performs protocol termination for the CfgRd0 requests, generates corresponding CplD responses, and forwards CXL messages to the computer for CXL protocol processing and generation of translated CXL messages for transmission to the consumer, it is specifically noted that the term 'computer' is intended to cover also the processing means of EP2. Moreover, even when the EP2 stores and exposes configuration values to the provider, such as VendorID and DeviceID, and possibly specific registers to configure the BARs and additional parameters needed for proper operation and for generating CplD responses, the term 'computer' may still encompass any processing means related to the EP2 and/or to other elements related to the RPU.

Figure 9:
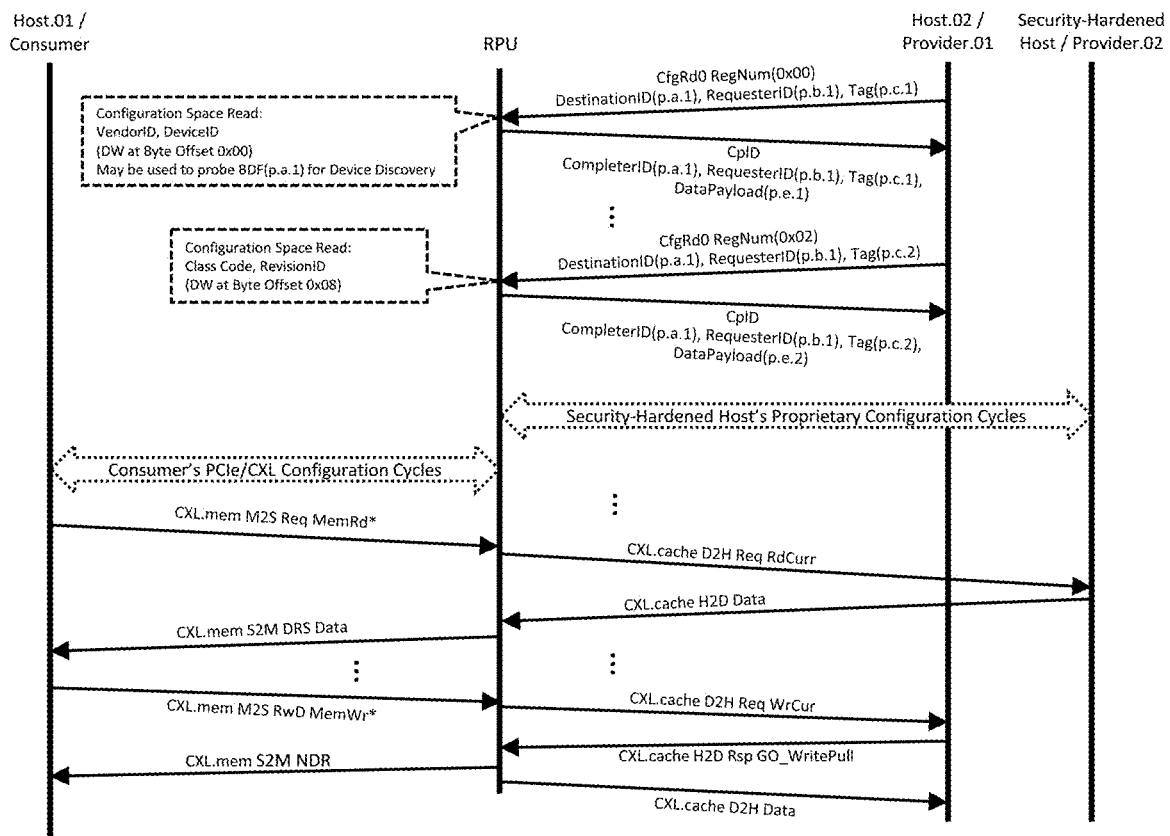
FIG. 9 and FIG. 10 illustrate embodiments of a system comprising a consumer, an RPU, a provider, and a security-hardened provider.
Figure 10:
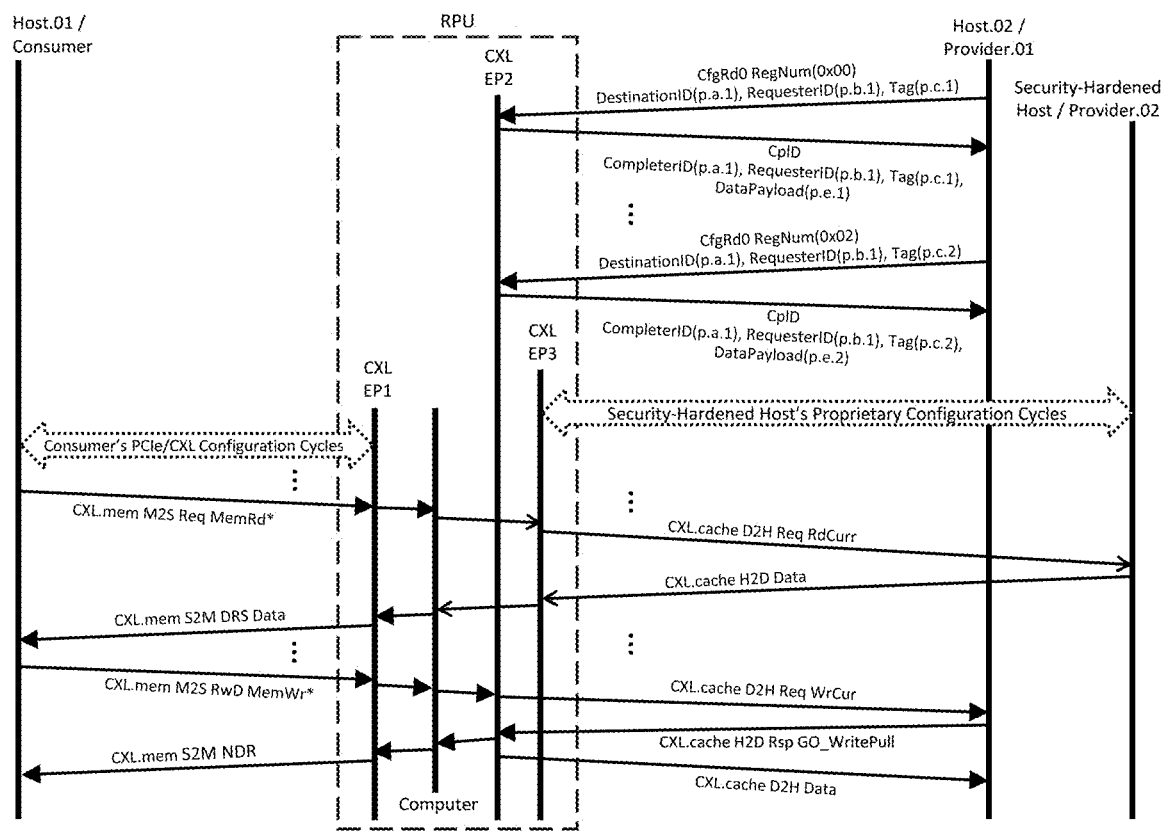

In some embodiments, the method may further include performing proprietary configuration cycles with a security-hardened provider, wherein the proprietary configuration cycles do not include at least one of receiving from the security-hardened provider a third CfgRd0 comprising Register Number 0x00, or refraining from sending the third CfgRd0 to the consumer. The method may further include, after the proprietary configuration cycles, receiving from the consumer a third CXL message comprising: a *Rd* opcode and a third PA from the HPA space of the consumer, translating the third CXL message to a fourth CXL message comprising a fourth PA from an HPA space of the security-hardened provider, and sending the fourth CXL message to the security-hardened provider. FIG. 9 illustrates one embodiment of a system comprising a consumer, an RPU, a provider, and a security-hardened provider. FIG. 10 illustrates the different Endpoints of the RPU that are coupled to the different hosts. e.g., EP2 coupled to the provider and EP3 coupled to the security-hardened provider. A security-hardened provider/host may be implemented using various techniques to enhance the protection of confidential workloads and data within a CXL system. For example, a trusted execution environment (TEE) host may leverage a hardware-based TEE to isolate sensitive operations and prevent unauthorized access to memory. Such a host may utilize CXL.mem to communicate with the RPU, ensuring that data transferred to or from the accelerator is protected within the TEE's secure boundary. Alternatively, a root of trust (RoT) host may prioritize secure boot and attestation mechanisms. It may incorporate a dedicated hardware ROT module for secure key storage and perform measured boot to verify system integrity before interacting with CXL devices. A firewall host design could position a hardened host between the accelerator and the broader CXL fabric, enabling inspection and filtering of CXL.io traffic, which may provide strong access control and prevent unauthorized devices from communicating with the accelerator. A hardened host may combine multiple security mechanisms, creating a hybrid approach. For example, a hybrid host may combine a TEE with a ROT and/or firewall functionality, offering layered security measures. A security-hardened host may also implement proprietary configuration mechanisms. For instance, it may employ out-of-band configuration using a secure channel instead of standard PCIe configuration cycles. Alternatively, a security-hardened host may utilize firmware-based configuration, pre-defining all necessary settings, or it may employ protected configuration registers accessible only by authorized entities. A secure device onboarding process involving authentication and attestation may also be incorporated into the configuration process.

In certain embodiments, the method may further include, before the receiving of the first CXL message, receiving from the provider a third CfgRd0 comprising Register Number 0x02, refraining from sending the third CfgRd0 to the consumer, and sending a third CplD to the provider. The method may further include, before the receiving of the first CXL message, receiving from the consumer a fourth CfgRd0 comprising Register Number 0x02, refraining from sending the fourth CfgRd0 to the provider, and sending a fourth CplD to the consumer. It is noted that system firmware or an OS may probe Configuration Space devices in various sequences, potentially accessing address 0x02 before address 0x00, for example. Generally, the PCIe specification does not mandate specific ordering requirements for these accesses, and the disclosed embodiments are not limited to any particular order unless otherwise stated. optionally, the method may further include, before the receiving of the first CXL message, receiving from the provider a fifth CfgRd0 comprising Register Number 0x0B, refraining from sending the fifth CfgRd0 to the consumer, and sending a fifth CplD to the provider; and further comprising, before the receiving of the first CXL message, receiving from the consumer a sixth CfgRd0 comprising Register Number 0x0B, refraining from sending the sixth CfgRd0 to the provider, and sending a sixth CplD to the consumer. Optionally, the method may further include performing proprietary configuration cycles with a security-hardened provider, wherein the proprietary configuration cycles do not include at least one of receiving from the security-hardened provider a seventh CfgRd0 comprising Register Number 0x02 and an eighth CfgRd0 comprising Register Number 0x0B, or refraining from sending the seventh CfgRd0 and the eighth CfgRd0 to the consumer. The method may further include, after the proprietary configuration cycles, receiving from the consumer a third CXL message comprising: a *Rd* opcode and a third PA from the HPA space of the consumer, translating the third CXL message to a fourth CXL message comprising a fourth PA from an HPA space of the security-hardened provider, and sending the fourth CXL message to the security-hardened provider.

In some embodiments, the method may further include receiving, from the provider, a third CXL message, translating the third CXL message to a fourth CXL message, and sending the fourth CXL message to the consumer. Optionally, the first, second, third, and fourth CXL messages conform to CXL.io protocol. optionally, the method may further include utilizing non-transparent bridging (NTB) to enable the consumer to read data, from the provider, based on mapping a physical address space window of the provider to a physical address space window of the consumer via a Base Address Register (BAR).

A Base Address Register (BAR) is used to determine the amount of system memory space a Function needs and provides the base address for mapping to the Function memory space. The Function is an addressable entity in Configuration Space associated with a single Function Number, used to refer to one Function of a Multi-Function Device, or to the only Function in a Single-Function Device. The size of a BAR, either 32 bits or 64 bits, determines the maximum size of the memory region it can address. A 32-bit BAR can address a maximum of 4 GB of memory space, and a 64-bit BAR can address up to 16 exabytes. For PCIe Endpoints, 64-bit addressing is mandatory for all BARs marked as prefetchable, which means the memory region can be accessed in advance to improve performance. For non-prefetchable BARs, 32-bit addressing is allowed. Devices such as the RPUs, NICs, GPUs, accelerators, or SSDs that need physical address space window from the host may request it utilizing BARs. Optionally, the RPU may be further configured to translate between a 32-bit BAR utilized by one side and a 64-bit BAR utilized by the other side.

Figure 11A:
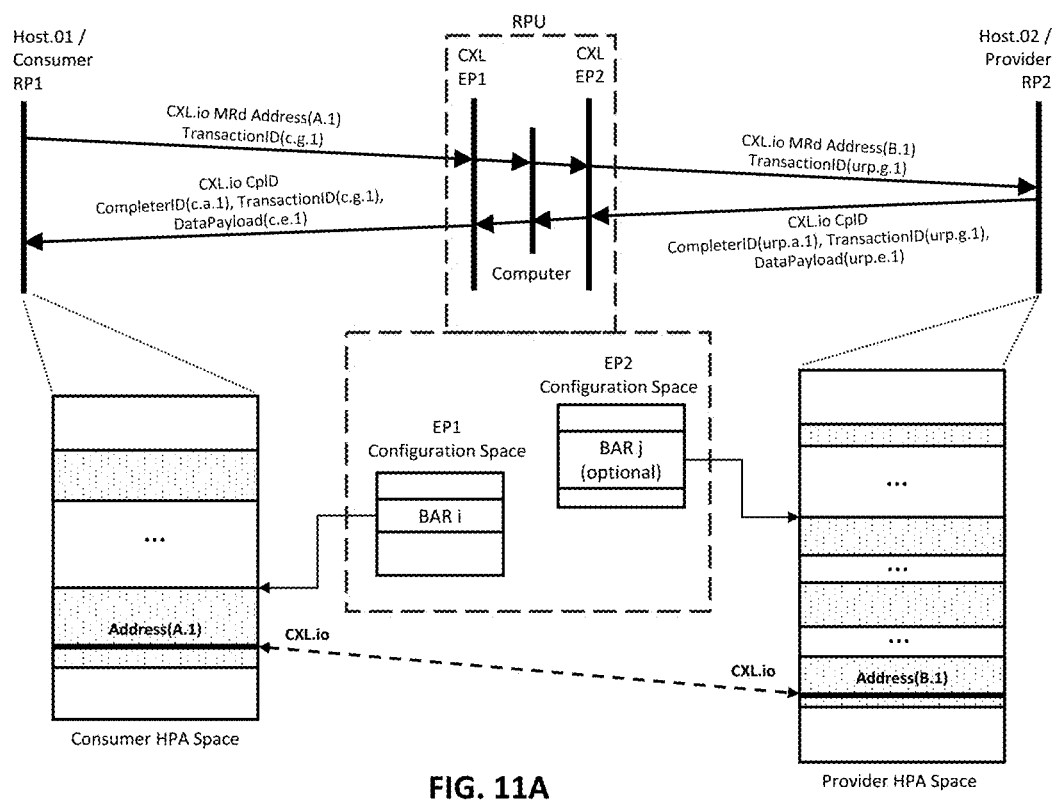
FIG. 11A illustrates one embodiment of Host-to-Host communication with terminated CXL.io and CXL non-transparent bridging (NTB)

FIG. 11A illustrates one embodiment of Host-to-Host communication with terminated CXL.io and CXL non-transparent bridging (NTB) where a physical address space window of a provider is mapped to a physical address space window of a consumer via at least one Base Address Register (BAR). The Consumer allocates a memory address space window for BAR (i), and the RPU further maps it via EP2 to a corresponding contiguous address space window at the Provider, or multiple possibly non-contiguous windows, using an address mapping technique such as a page-based mapping. This enables the consumer to read data from the provider. The dashed arrow shows a unidirectional NTB, with the optional BAR (j) showing the opposite direction, making the NTB bidirectional.

In one example, the RPU may offer multiple memory windows, and there may be one or more CplD completion messages for a single CXL.io MRd TLP, for example, based on the Read Completion Boundary (RCB) of the Completer, which then data requested by a single MRd may be partitioned into multiple completions, each having corresponding DataPayload contents. Optionally, the RPU may split the CXL.io MRd requests from the Consumer and repartition the lengths of the requests sent to the Provider, which is in contrast with a PCIe Switch that is not allowed to split a packet into smaller packets. For example, a PCIe Switch is not allowed to divide a single packet with a 256-byte payload into two packets of 128 bytes payload each.

Figure 11B:
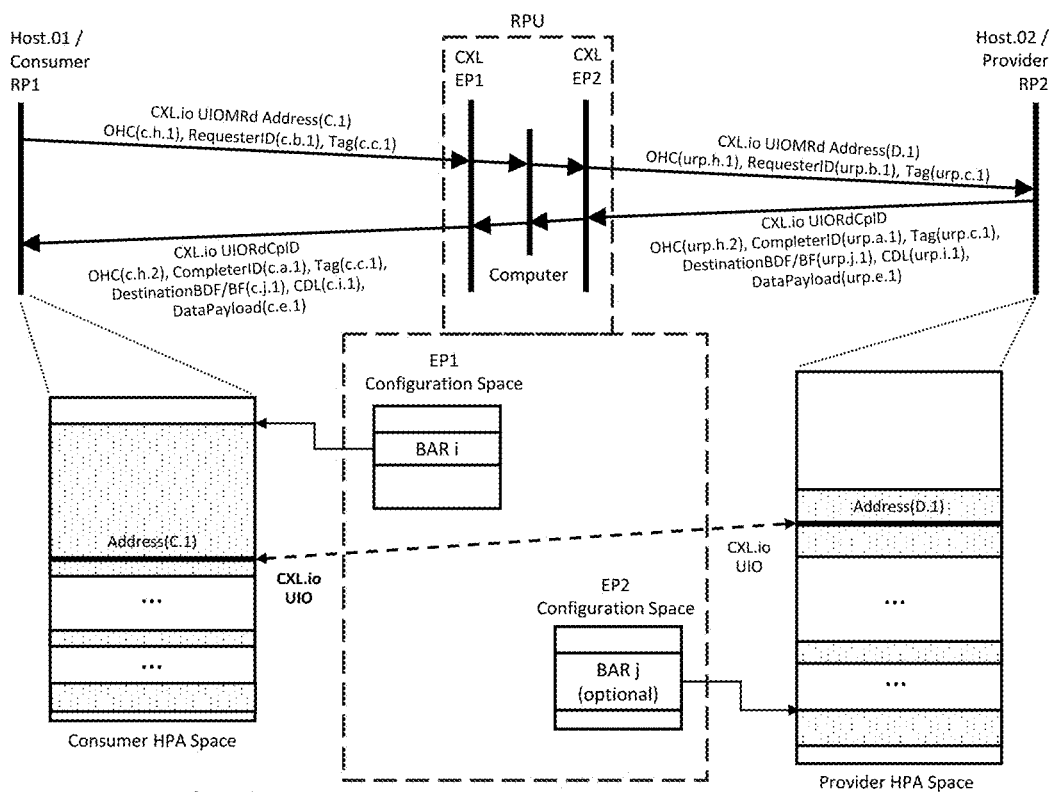
FIG. 11B illustrates one embodiment of Host-to-Host communication with terminated CXL.io and Unordered I/O (UIO) non-transparent bridging (NTB)

FIG. 11B illustrates one embodiment of Host-to-Host communication with terminated CXL.io and Unordered I/O (UIO) non-transparent bridging (NTB) where a physical address space window of the consumer is mapped via a Base Address Register (BAR) to a physical address space window of the Provider, or to multiple possibly non-contiguous windows, using an address mapping technique such as a page-based mapping, enabling the consumer to read data from the provider. In one example, there may be one or more CXL.io UIORCplD completion messages for a single CXL.io UIOMRd TLP, for example, based on the Read Completion Boundary (RCB) of the Completer, in which data requested by a single CXL.io UIOMRd may be partitioned into multiple completions, each having corresponding DataPayload contents.

In some embodiments of the method, the first and fourth CXL messages conform to CXL.mem protocol, and the second and third CXL messages conform to CXL.cache protocol. Optionally, the first CXL message is a Master-to-Subordinate Request comprising a MemRd* opcode and a Tag; the second CXL message is a Device-to-Host Request comprising a RdCurr opcode and a CQID; the third CXL message is Host-to-Device Data message comprising *Data* and the CQID; and the fourth CXL message is Subordinate-to-Master Data Response comprising the Tag and the *Data*. Optionally, the first CXL message is a Master-to-Subordinate Request comprising a MemWr* opcode, *Data*, and a Tag; the second CXL message is a Device-to-Host Request comprising a WrCur or a MemWr opcode and a CQID; the third CXL message is a Host-to-Device Data message comprising a *WritePull* opcode, the CQID, and a Unique Queue ID(UQID); and the fourth CXL message is Subordinate-to-Master No Data Response comprising the Tag; and further comprising sending, to the provider, a CXL.cache D2H Data comprising the *Data* and the UQID. Optionally, the method may further include performing proprietary configuration cycles with a security-hardened provider, wherein the proprietary configuration cycles do not include at least one of receiving from the security-hardened provider a third CfgRd0 comprising Register Number 0x00, or refraining from sending the third CfgRd0 to the consumer. The method may further include, after the proprietary configuration cycles, receiving from the consumer a fifth CXL.mem Master-to-Subordinate Request comprising a MemRd* opcode and a Tag, translating the fifth CXL.mem message to a sixth CXL.cache Device-to- Host Request comprising a RdCurr opcode and a CQID, and sending the sixth CXL.cache Device-to-Host Request to the security-hardened provider.

In some embodiments, the sending of the second CXL message to the provider further includes encapsulating the second CXL message utilizing one of: CXL over UET, CXL over Ethernet, CXL over NVLink, CXL over Ultra Accelerator Link (UALink), CXL over RDMA over Ethernet (ROCE), or CXL over RDMA over InfiniBand. And in one embodiment, a non-transitory computer-readable medium includes instructions that, when executed by a processor, cause the processor to perform the method described above.

In one embodiment, an apparatus includes a first Endpoint (EP1) coupled to a consumer; a second Endpoint (EP2) coupled to a provider; and a computer configured to: receive, from the provider via the EP2, a Type 0 Configuration Read Request (CfgRd0) comprising Register Number 0x00, refrain from sending the CfgRd0 to the consumer, and send Completion with Data(CplD) to the provider. The computer is further configured to receive, from the consumer via the EP1, a second CfgRd0 comprising Register Number 0x00, refrain from sending the second CfgRd0 to the provider; and send a second CplD to the consumer. After sending the CplD and the second CplD, the computer is further configured to: receive, from the consumer via the EP1, a first CXL message comprising: a *Rd* opcode and a first physical address (PA) from an HPA space of the consumer; translate the first CXL message to a second CXL message comprising a second PA from an HPA space of the provider; and send, via the EP2, the second CXL message to the provider.

In certain embodiments, the apparatus further includes a third Endpoint (EP3) coupled to a security-hardened provider, and wherein the computer is further configured to: perform proprietary configuration cycles with the security-hardened provider, wherein the proprietary configuration cycles do not include at least one of receiving from the security-hardened provider a third CfgRd0 comprising Register Number 0x00, or refraining from sending the third CfgRd0 to the consumer. After the proprietary configuration cycles, the computer is further configured to: receive from the consumer a third CXL message comprising: a *Rd* opcode and a third PA from the HPA space of the consumer, translate the third CXL message to a fourth CXL message comprising a fourth PA from an HPA space of the security-hardened provider, and send the fourth CXL message to the security-hardened provider via the EP3. Optionally, the apparatus supports special handling for security-hardened providers through proprietary configuration cycles that bypass standard CfgRd0 exchanges, which enables secure communication while maintaining its translation capabilities between the consumer and the security-hardened provider address spaces.

In some embodiments, before receiving the first CXL message, the computer is further configured to: receive, from the provider via the EP2, a third CfgRd0 comprising Register Number 0x02, refrain from sending the third CfgRd0 to the consumer, and send a third CplD to the provider; and receive, from the consumer via the EP1, a fourth CfgRd0 comprising Register Number 0x02, refrain from sending the fourth CfgRd0 to the provider, and send a fourth CplD to the consumer. The apparatus further handles multiple configuration space read requests targeting different registers, including those for Class Code and RevisionID at register 0x02, maintaining separation between consumer and provider configuration spaces while providing appropriate responses to both sides. Optionally, before receiving the first CXL message, the computer is further configured to: receive, from the provider via the EP2, a fifth CfgRd0 comprising Register Number 0x0B, refrain from sending the fifth CfgRd0 to the consumer, and send a fifth CplD to the provider; and receive, from the consumer via the EP1, a sixth CfgRd0 comprising Register Number 0x0B, refrain from sending the sixth CfgRd0 to the provider, and send a sixth CplD to the consumer. The apparatus still further handles additional registers such as SubsystemID and Subsystem VendorID at register 0x0B, maintaining consistent handling of configuration requests across multiple register addresses while preserving isolation between consumer and provider configuration spaces.

Optionally, the apparatus may further include a third Endpoint (EP3) coupled to a security-hardened provider, and wherein the computer is further configured to: perform proprietary configuration cycles with the security-hardened provider, wherein the proprietary configuration cycles do not include at least one of receiving from the security-hardened provider a seventh CfgRd0 comprising Register Number 0x02 and an eighth CfgRd0 comprising Register Number 0x0B, or refraining from sending the seventh CfgRd0 and the eighth CfgRd0 to the consumer. After the proprietary configuration cycles, the computer is further configured to: receive from the consumer via the EP1 a third CXL message comprising: a *Rd* opcode and a third PA from the HPA space of the consumer, translate the third CXL message to a fourth CXL message comprising a fourth PA from an HPA space of the security-hardened provider, and send, via the EP3, the fourth CXL message to the security-hardened provider. Optionally, the apparatus may support security-hardened providers by extending proprietary configuration cycles across multiple register addresses while maintaining its translation capabilities for CXL messages and physical addresses between the consumer and security-hardened provider address spaces.

In some embodiments, the computer is further configured to: receive, from the provider via the EP2, a third CXL message, translate the third CXL message to a fourth CXL message, and send, via the EP1, the fourth CXL message to the consumer. The apparatus supports bidirectional translation of CXL messages between the consumer and provider, enabling complete communication flows while maintaining proper protocol translation in both directions. In some embodiments, the first and fourth CXL messages conform to CXL.mem protocol, and the second and third CXL messages conform to CXL.cache protocol. The apparatus may support protocol translation between CXL.mem and CXL.cache, enabling communication between devices using different CXL protocols while maintaining proper message translation. Optionally, the first CXL message is a Master-to-Subordinate Request comprising a MemRd* opcode and a Tag; the second CXL message is a Device-to-Host Request comprising a RdCurr opcode and a CQID; the third CXL message is a Host-to-Device Data message comprising *Data* and the CQID; and the fourth CXL message is a Subordinate-to-Master Data Response comprising the Tag and the *Data*. The apparatus may implement specific message translation between CXL.mem and CXL.cache protocols for read operations, maintaining proper tracking of Tags and CQIDs while ensuring data consistency across protocol boundaries. Optionally, the first CXL message is a Master-to-Subordinate Request comprising a MemWr* opcode, *Data*, and a Tag; the second CXL message is a Device-to-Host Request comprising a WrCur or a MemWr opcode and a CQID; the third CXL message is a Host-to-Device Data message comprising a *WritePull* opcode, the CQID, and a Unique Queue ID(UQID); the fourth CXL message is a Subordinate-to-Master No Data Response comprising the Tag; and the computer is further configured to send, via the EP2 to the provider, a CXL.cache D2H Data comprising the *Data* and the UQID.

Optionally, the apparatus may further include a third Endpoint (EP3) coupled to a security-hardened provider, and wherein the computer is further configured to: perform proprietary configuration cycles with the security-hardened provider, wherein the proprietary configuration cycles do not include at least one of receiving from the security-hardened provider a third CfgRd0 comprising Register Number 0x00, or refraining from sending the third CfgRd0 to the consumer. After the proprietary configuration cycles, the computer is further configured to: receive from the consumer via the EP1 a fifth CXL.mem Master-to-Subordinate Request comprising a MemRd* opcode and a Tag, translate the fifth CXL.mem message to a sixth CXL.cache Device-to-Host Request comprising a RdCurr opcode and a CQID, and send, via the EP3, the sixth CXL.cache Device-to-Host Request to the security-hardened provider. The apparatus may implement specialized handling for security-hardened providers while supporting its protocol translation capabilities, enabling secure communication with providers that implement custom security protocols while maintaining proper translation between the CXL.mem and CXL.cache protocols.

In one embodiment, a system includes a first host; a second host; and a Resource Provisioning Unit (RPU) coupled between the first host and the second host, wherein the RPU includes: a first Endpoint (EP1) coupled to the first host, a second Endpoint (EP2) coupled to the second host, and a computer. The RPU is configured to: receive, from the second host via the EP2, a Type 0 Configuration Read Request (CfgRd0) comprising Register Number 0x00, refrain from sending the CfgRd0 to the first host, and send Completion with Data(CplD) to the second host; and receive, from the first host via the EP1, a second CfgRd0 comprising Register Number 0x00, refrain from sending the second CfgRd0 to the second host, and send a second CplD to the first host. After sending the CplD and the second CplD, the RPU is further configured to: receive, from the first host via the EP1, a first CXL message comprising: a *Rd* opcode and a first physical address (PA) from an HPA space of the first host; translate the first CXL message to a second CXL message comprising a second PA from an HPA space of the second host; and send, via the EP2, the second CXL message to the second host.

In some embodiments, the RPU further includes a third Endpoint (EP3) coupled to a security-hardened host coupled to the RPU. The RPU is further configured to: perform proprietary configuration cycles with the security-hardened host, wherein the proprietary configuration cycles do not include at least one of receiving from the security-hardened host a third CfgRd0 comprising Register Number 0x00, or refraining from sending the third CfgRd0 to the first host. After the proprietary configuration cycles, the RPU is further configured to: receive from the first host a third CXL message comprising: a *Rd* opcode and a third PA from the HPA space of the first host, translate the third CXL message to a fourth CXL message comprising a fourth PA from an HPA space of the security-hardened host, and send the fourth CXL message to the security-hardened host via the EP3. The system may support specialized handling for security-hardened hosts through proprietary configuration cycles that bypass standard CfgRd0 exchanges, which enables secure communication while maintaining translation capabilities between first host and security-hardened second host address spaces.

Optionally, before receiving the first CXL message, the computer is further configured to: receive, from the second host via the EP2, a third CfgRd0 comprising Register Number 0x02, refrain from sending the third CfgRd0 to the first host, and send a third CplD to the second host; receive, from the first host via the EP1, a fourth CfgRd0 comprising Register Number 0x02, refrain from sending the fourth CfgRd0 to the second host, and send a fourth CplD to the first host; receive, from the second host via the EP2, a fifth CfgRd0 comprising Register Number 0x0B, refrain from sending the fifth CfgRd0 to the first host, and send a fifth CplD to the second host; and receive, from the first host via the EP1, a sixth CfgRd0 comprising Register Number 0x0B, refrain from sending the sixth CfgRd0 to the second host, and send a sixth CplD to the first host. After sending the sixth CplD, the computer is further configured to: receive, from the second host via the EP2, a third CXL message; translate the third CXL message to a fourth CXL message; and send, via the EP1, the fourth CXL message to the first host.

In one embodiment, an apparatus includes a first switch port coupled to a consumer; a second switch port coupled to a provider; and a computer configured to: receive, from the provider via the second switch port, a Type 0 Configuration Read Request (CfgRd0) comprising Register Number 0x00, refrain from sending the CfgRd0 to the consumer, and send Completion with Data(CplD) to the provider. The computer is further configured to receive, from the consumer via the first switch port, a second CfgRd0 comprising Register Number 0x00, refrain from sending the second CfgRd0 to the provider, and send a second CplD to the consumer. After sending the CplD and the second CplD, the computer is further configured to: receive, from the consumer via the first switch port, a first CXL message comprising: a *Rd* opcode and a first physical address (PA) from an HPA space of the consumer; translate the first CXL message to a second CXL message comprising a second PA from an HPA space of the provider; and send, via the second switch port, the second CXL message to the provider.

In some embodiments, the apparatus further includes a third switch port coupled to a security-hardened provider, wherein the computer is further configured to: perform proprietary configuration cycles with the security-hardened provider, wherein the proprietary configuration cycles do not include at least one of receiving from the security-hardened provider a third CfgRd0 comprising Register Number 0x00, or refraining from sending the third CfgRd0 to the consumer. After the proprietary configuration cycles, the computer is further configured to: receive from the consumer via the first switch port a third CXL message comprising: a *Rd* opcode and a third PA from the HPA space of the consumer; translate the third CXL message to a fourth CXL message comprising a fourth PA from an HPA space of the security-hardened provider; and send the fourth CXL message to the security-hardened provider via the second switch port. The switch apparatus may support specialized handling for security-hardened providers through proprietary configuration cycles that bypass standard CfgRd0 exchanges while maintaining translation capabilities between consumer and security-hardened provider address spaces.

Optionally, before receiving the first CXL message, the computer is further configured to: receive, from the provider via the second switch port, a third CfgRd0 comprising Register Number 0x02, refrain from sending the third CfgRd0 to the consumer, and send a third CplD to the provider; receive, from the consumer via the first switch port, a fourth CfgRd0 comprising Register Number 0x02, refrain from sending the fourth CfgRd0 to the provider, and send a fourth CplD to the consumer; receive, from the provider via the second switch port, a fifth CfgRd0 comprising Register Number 0x0B, refrain from sending the fifth CfgRd0 to the consumer, and send a fifth CplD to the provider; receive, from the consumer via the first switch port, a sixth CfgRd0 comprising Register Number 0x0B, refrain from sending the sixth CfgRd0 to the provider, and send a sixth CplD to the consumer. After sending the sixth CplD, the computer is further configured to: receive, from the provider via the second switch port, a third CXL message; translate the third CXL message to a fourth CXL message; and send, via the first switch port, the fourth CXL message to the consumer. The switch apparatus may implement comprehensive configuration space handling across multiple register addresses while supporting bidirectional CXL message translation. This enables proper device initialization through configuration space reads at various register byte offsets and maintains isolation between Endpoints while supporting full bidirectional communication after initialization.

A Protocol Data Unit (PDU) generally refers to a single unit of information transmitted among peer entities of a computer network. A PDU may include protocol-specific control information and user data. In the layered architectures of communication protocol stacks, each layer may implement protocols tailored to the specific type or mode of data exchange. Depending on the associated protocol, a PDU may refer to a message or a packet.

Translating a first PDU to a second PDU may be implemented with or without protocol termination. For example, in the case of TLP PDUs, minimal translation may include replacing the physical addresses and the transaction ID(such as the Requester ID and Tag fields). For example, the RPU may perform address and transaction ID translation while concurrently forwarding other portions of the TLP. In embodiments without protocol termination, the RPU may directly translate the address and transaction ID without fully decoding or re-encoding the protocol-specific information, potentially reducing latency. Embodiments that do not explicitly involve protocol termination may alternatively implement other non-terminating processing techniques, such as partial decoding or field-specific handling, to facilitate address and transaction ID translation. Alternatively, in configurations involving protocol termination, the PDU may be fully decoded to extract protocol-specific details before translating and re-encoding the fields of interest for the destination protocol.

In another embodiment, instead of implementing full protocol termination, the RPU may parse the packets or messages traversing it, identify the locations of the Tags and Namespace fields, and make the required changes on the fly, possibly in addition to changing the physical addresses. Namespace labels, in the context of the CXL Specification Revision 3.1, describe partitions of persistent memory that are exposed as volumes to software. The RPU may modify one or more of the following Namespace Label fields: 'Type', which contains a UUID that identifies the namespace label; 'UUID', a unique identifier for the namespace; 'Flags', boolean attributes of the region used to coordinate updates across multiple CXL devices; 'NRange', the number of discontinuous ranges a device contributes to the namespace; 'Position', the position of the device in the range set; 'DPA', the Device Physical Address where the namespace begins on the device; 'RawSize', the capacity the range contributes to the namespace; 'Slot', the slot index of the label in the LSA; 'Alignment', the desired region alignment; 'RegionUUID', the UUID of the region that contains this namespace; 'AddressAbstractionUUID', the address abstraction used by the namespace; 'LBASize', the logical block size of the namespace; or 'Checksum', a checksum of all fields in the Namespace Label.

Figure 12:
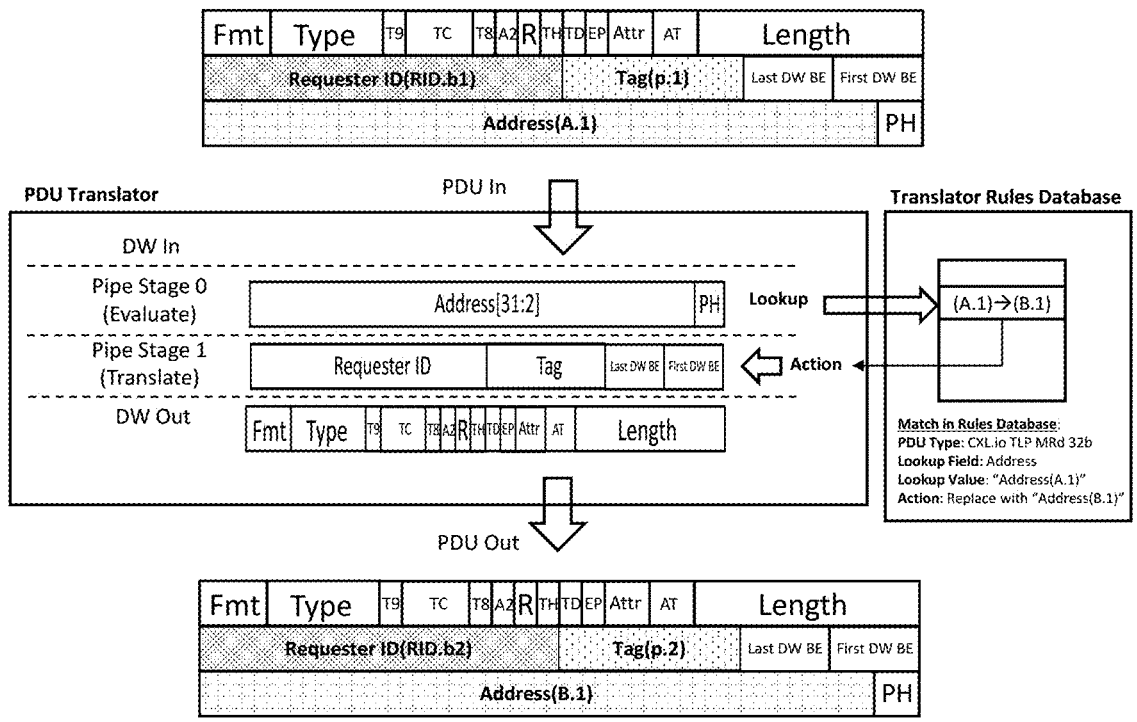
FIG. 12 illustrates one embodiment of a Protocol Data Unit (PDU) Translator in which a first PDU is translated into a second PDU.

FIG. 12 illustrates one embodiment of a PDU Translator in which a first PDU is translated into a second PDU. The PDU Translator may be implemented in an RPU. The first PDU may be a CXL TLP Memory Request (MRd/MWr), and the PDU Translator may be implemented with a latency of three clock cycles (i.e., three sampling stages), as illustrated in the figure. For example, for a typical logic design running at a 1 GHz clock rate, the latency of this embodiment may be 3 ns, reflecting the latency overhead involved with translating the first PDU to the second PDU.

The illustrated process begins with a first PDU (PDU In) entering the PDU Translator. The first PDU may include a format field (Fmt), a type field (Type), a requester identification field (Requester ID(RID.b1)), a tag field (Tag(p.1)), an address field (Address (A.1)), a last double word byte enable field (Last DW BE), a first double word byte enable field (First DW BE), and a length field (Length). The first PDU may include other fields, such as T9, TC, T8, A2, R, TH, TD, EP, Attr, and AT. Within the PDU Translator, the first PDU is processed in a series of stages, such as "Pipe Stage 0 (Evaluate)" and "Pipe Stage 1 (Translate)". In Pipe Stage 0 (Evaluate), the address field (Address [31:2]) may be extracted and used in a lookup operation involving querying a Translator Rules Database to find a corresponding action (Action). The Translator Rules Database may contain mappings between addresses in a first domain and addresses in a second domain, for example, (A.1)→(B.1). In the illustrated example, the lookup process matches Address (A.1) and retrieves a corresponding rule from the Translator Rules Database that determines the action to modify Address (A.1) to Address (B.1). The database indicates that the rule match criteria includes a PDU Type of CXL.io TLP MRd 32b, a Lookup Field of Address, and a Lookup Value of Address (A.1). The action specified is to replace the address with Address (A.2). Action may encompass various additional operations, such as modifying the Requester ID and Tag within the first PDU. In Pipe Stage 1 (Translate), Action is executed on the first PDU. For example, if Action specifies a modification to the Address field, this modification is made, resulting in a new Address field. The Requester ID and Tag fields may also be processed during this stage. This translation process results in a second PDU (PDU Out) that includes the modified fields based on Action, such as a new address field Address (B.1), a modified requester identification field (Requester ID(RID.b2)), and a modified tag field (Tag(p.2)). Other fields within the second PDU may remain unchanged or may be modified according to other actions determined during the lookup process, such as the length field Length. The Action retrieved from the Translator Rules Database may be executed on the first PDU in Pipe Stage 1 (Translate) in the next clock cycle when implemented as a pipeline. For simplicity, the figure illustrates the translation flow for the PDU Address field only, and additional rule matches may modify other fields in the PDU. In alternative embodiments, a larger rule database may require several more clock cycles to conclude the lookup and generate an action.

Figure 13:
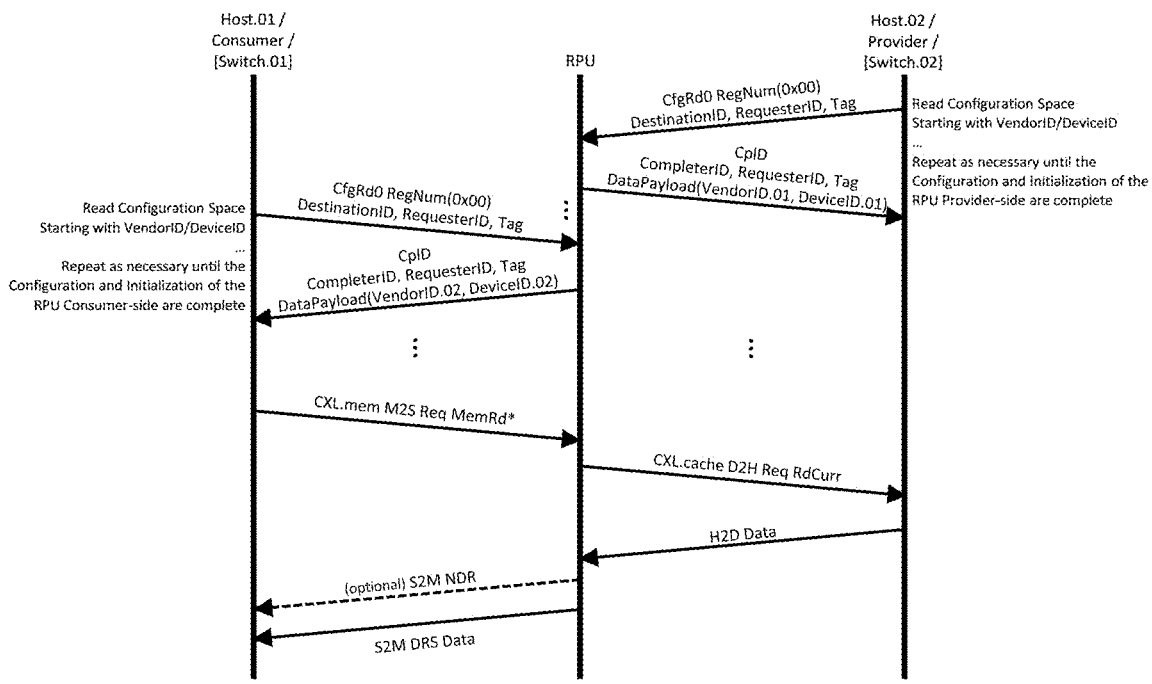
FIG. 13 illustrates one embodiment of a TFD depicting configuration and initialization followed by translation of CXL.mem MemRd* to CXL.cache RdCurr messages.

FIG. 13 illustrates one embodiment of a transaction flow diagram (TFD) depicting configuration and initialization followed by the translation of CXL.mem MemRd* to CXL-.cache RdCurr messages. The diagram shows the interactions between Host.01 (which may also be referred to as Consumer or a host coupled via Switch.01), the RPU, and Host.02 (which may also be referred to as Provider or a host coupled via Switch.02). The Configuration and Initialization phases, which may begin with reading the Vendor ID and Device ID, are repeated as necessary until the provider-side and consumer-side of the RPU are configured. Then Host.01 sends a M2S Req containing a MemRd* opcode to the RPU over the CXL.mem interface. The RPU then translates the CXL.mem M2S Req MemRd* to a CXL.cache D2H Req containing a RdCurr opcode, and sends it to Host.02. Upon receipt of the D2H Req RdCurr, Host.02 responds with a CXL.cache H2D Data containing the requested cacheline Data. The RPU subsequently translates the CXL.cache H2D Data to S2 M DRS Data, and optionally also to S2 M NDR, which are then sent to Host.01 over the CXL.mem interface.

VendorID identifies the manufacturer of the Device, whereas DeviceID identifies a device type within the range of device manufacturer. The RPU may expose different VendorID and/or DeviceID towards (Host.01) and (Host.02). For example, in certain scenarios, the (VendorID.01) exposed to the Provider may be the VendorID of the OEM vendor that designed the RPU in the Memory Pool Appliance, whereas the (VendorID.02) exposed to the Consumer may be the VendorID of the Cloud Service Provider (CSP) providing a Memory-Pool-as-a-Service to Application Server Platforms rented by tenants. Similarly, different DeviceID values may reflect the different functionalities exposed by the RPU towards the Consumer, such as (DeviceID.02) where the RPU may expose a CXL Memory Device utilizing CXL.mem, and towards the Provider, such as (DeviceID.01) where the RPU may expose a CXL Accelerator utilizing CXL.cache. Optionally, the Consumer-side VendorID and DeviceID are configurable, which enables different CSPs to program their own VendorID/DeviceID personalities.

Optionally, during the configuration and initialization phase of the Provider-side of the RPU, the Consumer-side Host CPU (which is illustrated on the left side of the figure) may be turned off, or configured to ignore all messages, or ignore only PCIe/(CXL.io) configuration messages. And as a result, it may not be mandatory to terminate the PCIe/(CXL.io) messages at the RPU. Additionally or alternatively, during the configuration and initialization phase of the Consumer-side of the RPU, the Provider-side host CPU (which is illustrated on the right side of the figure) may be configured to ignore configuration messages after it has already been configured. Further additionally or alternatively, due to implementation-specific artifacts such as vendor-dependent design choices and/or bugs, the Provider CPU may be pre-configured to ignore at least some of the received configuration messages, or execute these inappropriate configuration messages originated from the Consumer without meaningful side effects. And as a result, it may not be mandatory to terminate the PCIe/CXL.io packets.

Figure 14:
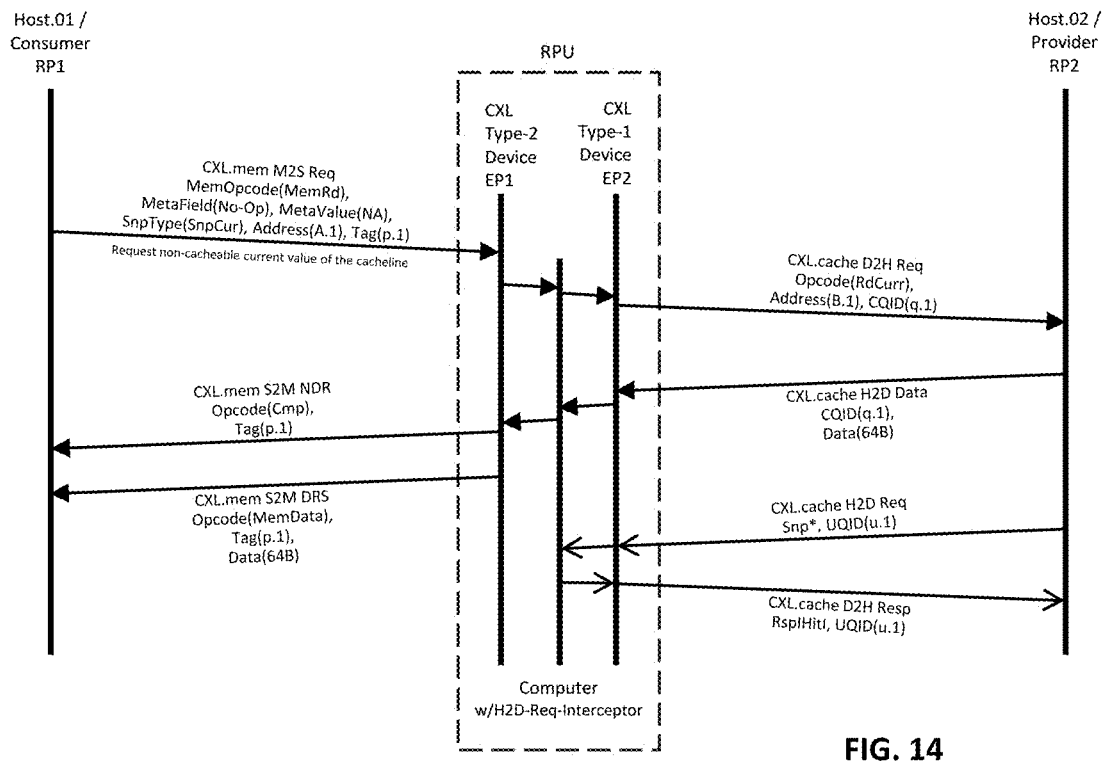
FIG. 14 illustrates one embodiment of a TFD representing a request for a non-cacheable current value of a cacheline according to CXL Specification Revision 2.0.

FIG. 14 illustrates one embodiment of a TFD representing a request for a non-cacheable current value of a cacheline, showing detailed message formats according to CXL Specification Revision 2.0. The RPU translates messages between a first Endpoint (EP1), which operates as a CXL Type-2 Device, and a second Endpoint (EP2), which operates as a CXL Type-1 Device, utilizing 64 Bytes transfer on the CXL.cache channel. The computer may operate without a cache, or may include a cache that is not utilized for the illustrated transactions. The message formats, fields, and opcodes shown in the figure correspond to various protocol tables defined in CXL Specification Revision 2.0, including but not limited to: Table 9. CXL.cache-D2H Request Fields (page 60), Table 14. CXL.cache H2D Response Fields (page 62), Table 17. CXL.cache-H2D Data Header Fields (page 63), Table 29. M2S Request Fields (page 94), Table 30. M2S Req Memory Opcodes (page 95), Table 31. Meta Data Field Definition (page 95), Table 32. Meta0-State Value Definition (Type 2 Devices) (page 96), Table 33. Snoop Type Definition (page 96), Table 34. M2S Req Usage (page 96), Table 38. S2 M NDR Fields (page 98), Table 39. S2 M NDR Opcodes (page 99), Table 40. DevLoad Definition (page 99), Table 41. S2 M DRS Fields (page 100), and Appendix B Protocol Tables for Memory (page 621). The transactions depicted may represent one possible implementation of message flows, with the specific field values and opcodes potentially varying based on system requirements and configurations.

Figure 15:
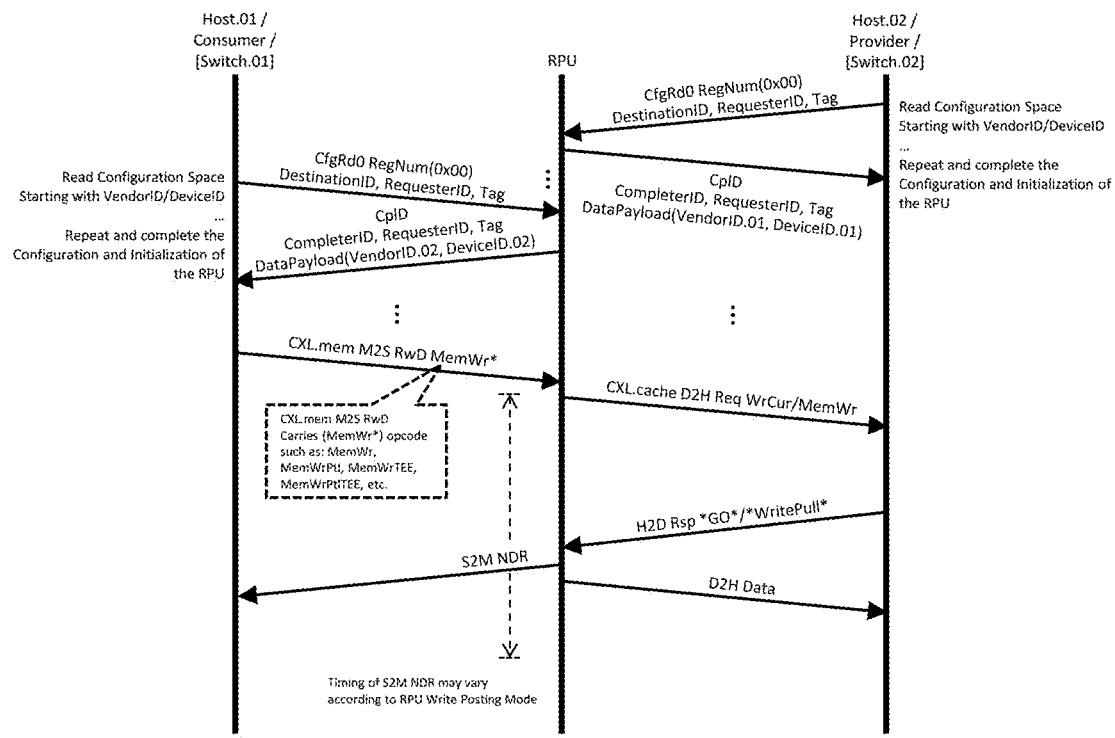
FIG. 15 illustrates one embodiment of a TFD depicting configuration and initialization followed by the translation of CXL.mem M2S RwD MemWr* to CXL.cache D2H Req WrCur or MemWr.

FIG. 15 illustrates one embodiment of a TFD depicting configuration and initialization followed by the translation of CXL.mem M2S RwD MemWr* to CXL.cache D2H Req WrCur or MemWr. The diagram shows interactions between Host.01 (which may also be referred to as Consumer or a host coupled via Switch.01), an RPU, and Host.02 (which may also be referred to as Provider or a host coupled via Switch.02). The configuration and initialization phases may begin with reading the Vendor ID utilizing CfgRd0 carrying RegNum (0x00), DestinationID, RequesterID, and Tag, followed by CplD carrying CompleterID, RequesterID, Tag, and DataPayload (VendorID, DeviceID). These operations are repeated as necessary until both the provider-side and consumer-side of the RPU are configured. Subsequently, Host.01 sends a CXL.mem M2S RwD MemWr* to the RPU. The RPU translates this CXL.mem M2S RwD MemWr* to a CXL.cache D2H Req WrCur or MemWr, which is then transmitted to Host.02. In response, Host.02 generates an H2D Rsp *GO*/*WritePull*, following which the RPU transmits D2H Data to Host.02. The RPU also sends a CXL.mem S2 M NDR to Host.01, wherein the timing of the S2 M NDR transmission may vary according to the RPU Write Posting Mode.

The wildcard CXL.cache H2D Rsp *GO*/*WritePull* in response to CXL.cache D2H Req may denote GO-I/WritePull when there is no error, or GO-Err-WritePull when an error occurs.

Furthermore, the CXL.cache command referred to as 'MemWr' in CXL Specification Revisions 1.1 and 2.0 was renamed to 'WrCur' in CXL 3.0 to avoid confusion, as 'MemWr' is also used in CXL.mem. Thus, the notation "D2H Req WrCur/MemWr" refers to MemWr opcode for CXL Specification Revisions 1.1 and 2.0 communications, or refers to WrCur opcode for CXL Specification Revisions 3.0, 3.1, and 3.2 communications.

Figure 16:
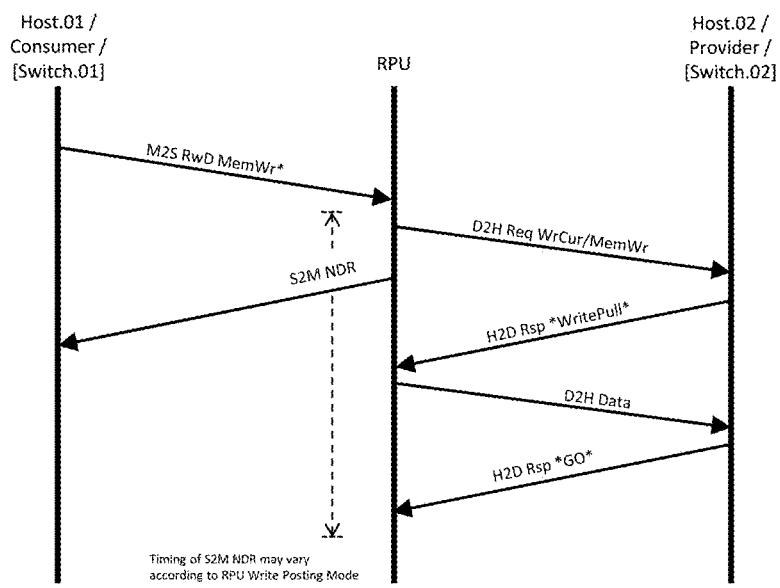
FIG. 16 illustrates one embodiment of a TFD depicting non-posted semantics using MemWr* to WrCur/MemWr.
Figure 17:
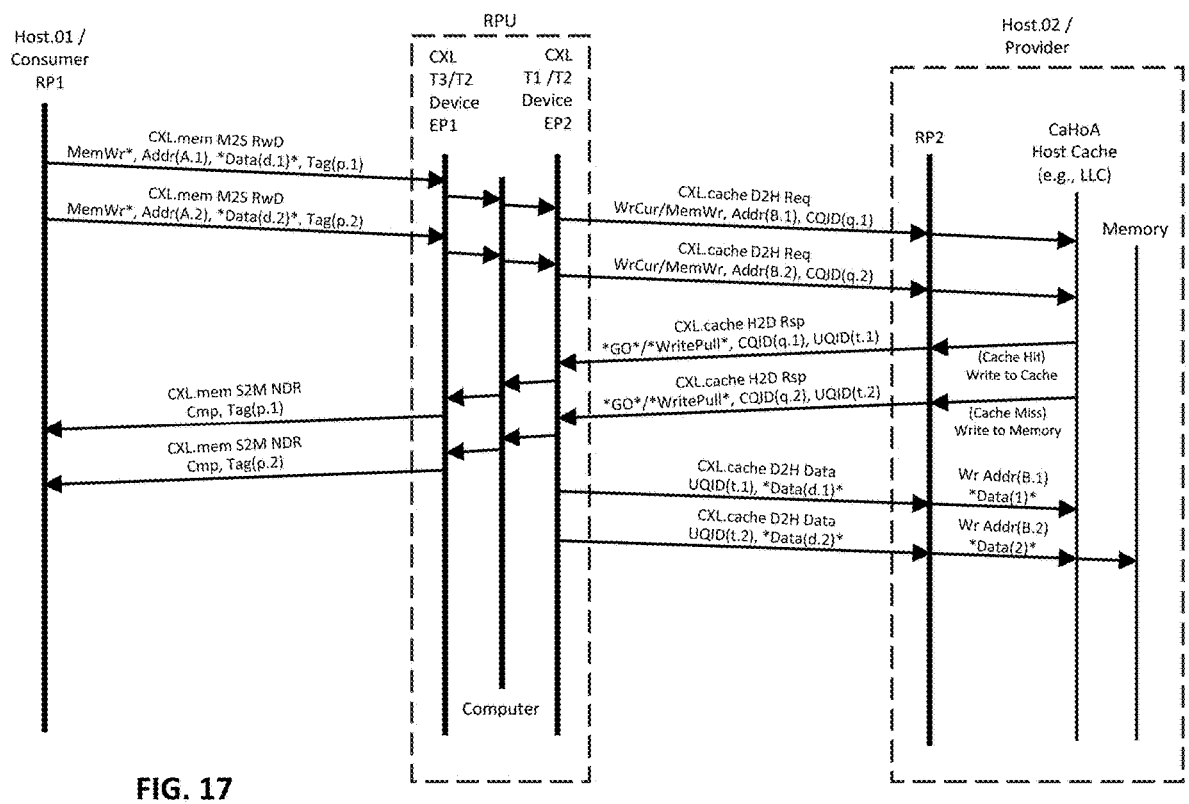
FIG. 17 illustrates one embodiment of translating memory write transactions.

FIG. 16 illustrates one embodiment of a TFD depicting non-posted semantics using MemWr* to WrCur/MemWr. FIG. 17 illustrates one embodiment of a TFD where Memory Write transactions (MemWr*) from a consumer, designated as Host.01, are directed towards either Write Current transactions (WrCur) or Memory Write transactions (MemWr*) at a provider, designated as Host.02. In this scenario, a cache hit may result in a write operation to the cache of Host.02, for example, to the last level cache (LLC), and a cache leads to a write operation to the memory of Host.02.

Caching Agent and Home Agent (CaHoA) refers to the combination of a Caching Agent (typically abbreviated as CA) and a Home Agent (typically abbreviated as HA). The CaHoA operates in conjunction with the cache that stores the cachelines. A modern CPU/GPU (xPU) may include multiple instances of CaHoA, in some implementations spread across tiles in a grid-like mesh architecture, where each CaHoA independently manages memory requests and cache coherence for a specific region of the mesh, enabling the xPU to scale to higher core counts while maintaining performance. The co-location of the Home Agent and the Caching Agent in the combined CaHoA may increase performance, mainly by reducing the number of mesh hops (latency) and overall communication traffic (bandwidth) required to coordinate memory accesses and cache coherence between the two agents.

A Home Agent is the agent on the host that is responsible for resolving system wide coherency for a given address. The Home Agent part of the CaHoA acts as the owner (Home) of its associated memory regions, so that for every cacheline address in the system there is only one owner Home Agent that is responsible for resolving memory access requests to that address. The Home Agent determines whether the requested data is stored in the xPU local cache, needs to be fetched from system memory, or requires other actions to maintain consistency (e.g., writing back modified data). In multi-socket systems, where more than one xPU socket is involved, the Home Agent coordinates memory requests between sockets and assists with routing the requests.

The Caching Agent part of the CaHoA manages cache coherency, snooping of peer caches for a requested cacheline address, and tracking the state of cachelines it is responsible for. It may optionally interact with a Snoop Filter in order to determine whether a cacheline is stored in peer caches in a state that requires snooping, enabling the reduction of unnecessary snoop traffic in the system.

Figure 18:
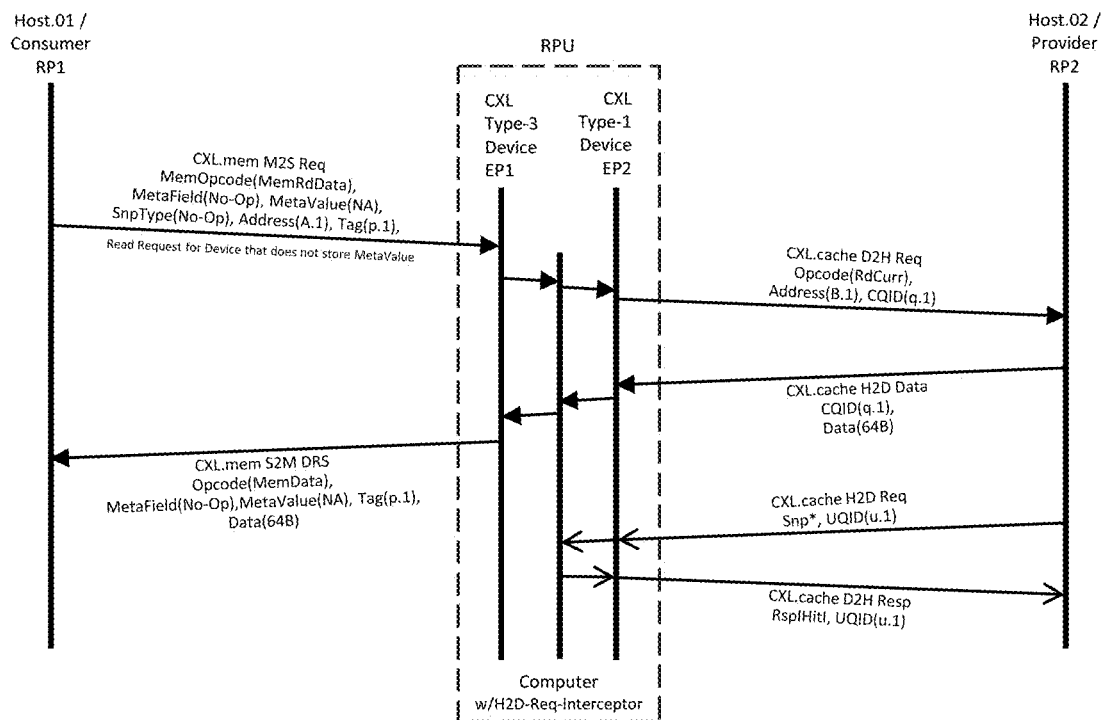
FIG. 18 illustrates one embodiment of a read request without storing MetaValue.

FIG. 18 illustrates one embodiment of a TFD representing a read Request for Device that does not store MetaValue, using MemRdData to RdCurr. The figure also shows detailed message formats according to CXL Specification Revision 2.0. The RPU translates messages between a first Endpoint (EP1), which operates as a CXL Type-3 Device, and a second Endpoint (EP2), which operates as a CXL Type-1 Device, utilizing 64 Bytes transfer on the CXL.cache channel. MemRdData does not strictly require the presence of a cache on the RPU, and the RPU may fulfill the MemRdData request from its memory. However, the presence of an RPU cache may improve performance, especially in scenarios with frequent accesses to the same data.

Figure 19:
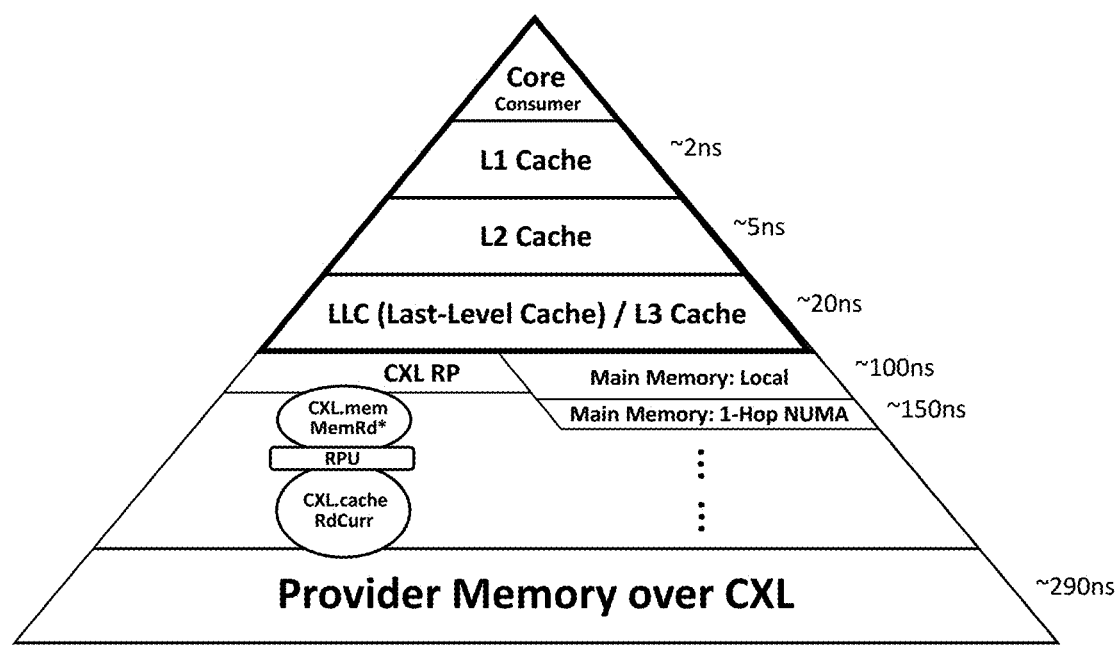
FIG. 19 illustrates a non-limiting example of load-to-use memory access latency, as seen from a Consumer's processing core coupled to a Provider's memory via an RPU that translates between CXL.mem MemRd* and CXL.cache RdCurr.

FIG. 19 illustrates a non-limiting example of load-to-use memory access latency, as seen from a Consumer's processing core coupled to a Provider's memory via an RPU that translates between CXL.mem MemRd* and CXL.cache RdCurr. CXL.cache RdCurr is the simplest read command available in CXL.cache, which enables a relatively simple implementation of an RPU with H2D-Req-Interceptor that is not cache-coherency-aware.

In one embodiment, a method for translating CXL MemRd* and MemWr* messages includes communicating with a first host according to CXL.mem; and communicating with a second host according to CXL.cache. The method further includes receiving, from the first host, a CXL.mem Master-to-Subordinate Request comprising: a MemRd* opcode, a first Tag, and a first physical address (PA) from an HPA space of the first host (M2S Req MemRd*); and translating the M2S Req MemRd* to a CXL.cache Device-to-Host Request comprising: a RdCurr opcode, a first CQID, and a second PA from an HPA space of the second host (D2H Req RdCurr). The method further includes sending the D2H Req RdCurr to the second host; receiving, from the first host, a CXL.mem M2S Request with Data comprising: MemWr* opcode, *Data*, a second Tag, and a third PA (M2S RwD MemWr*); translating the M2S RwD MemWr* to a CXL.cache D2H Request comprising: a WrCur or a Mem Wr opcode, a second CQID, and a fourth PA (D2H Req WrCur/MemWr); and sending the D2H Req WrCur/MemWr to the second host.

In some embodiments, the method may further include: receiving, from the first host, CXL.io or PCIe Configuration Request TLPs; terminating the Configuration Request TLPs; and processing the Configuration Request TLPs in a manner that does not necessitate translating and sending the translated Configuration Request TLPs to the second host. Processing the Configuration Request TLPs in a manner that does not necessitate translating and sending the translated Configuration Request TLPs to the second host enables configuring the second host to disregard some or all of the translated Configuration Request TLPs if they are sent to it instead of being blocked by the RPU.

Optionally, the method may further include receiving, from the first host, a CXL.io memory transaction, and utilizing non-transparent bridging (NTB) to enable the first host to read data, from the second host, based on mapping a physical address space window of the second host to a physical address space window of the first host via a Base Address Register (BAR). Optionally, the method may further include: receiving, from the first host, CXL.io or PCIe transaction layer packets (TLPs); terminating the TLPs; sending, to the second host, translations of at least one of the following terminated TLP types: Memory Read (MRd), Memory Write (MWr), and Completion with Data (CplD); and blocking the following terminated TLP types: Configuration Read (CfgRd0, CfgRd1) requests, Configuration Write (CfgWr0, CfgWr1) requests, and Completion for Locked Memory Read (CplDLk). Additionally or alternatively, the method may further include receiving, from the first host, CXL.io or PCIe Memory TLPs, and further comprising sending, to the second host, data indicative of at least one of the following from the memory TLPs: addresses, traffic class, or attributes. Additionally or alternatively, method may further include receiving, from the first host, CXL.io or PCIe Memory TLPs comprising physical addresses, and further comprising performing address translation from memory address space in CXL.io MRd TLP type of the first host to memory address space in CXL.io MRd TLP type of the second host. optionally, the method may further include receiving, from the first host, CXL.io or PCIe TLPs associated with memory transactions using Short Address Format of 32-bit address, the TLPs sent to the second host further comprise memory transactions using Long Address Format of 64-bit address, and further comprising performing format translation from the TLPs received from the first host to the TLPs sent to the second host.

In some embodiments of the method, the MemRd* opcode is selected from MemRd, MemRdData, MemRdTEE, or MemRdDataTEE, and the MemWr* opcode is selected from MemWr, Mem WrPtl, MemWrTEE, or MemWrPtlTEE. In certain embodiments or the method, the D2H Req WrCur/MemWr comprises the MemWr opcode for CXL Specification Revisions 1.1 and 2.0 communications, or comprises the WrCur opcode for CXL Specification Revisions 3.0, 3.1, and 3.2. The CXL.cache command referred to as 'MemWr' in CXL Specification Revisions 1.1 and 2.0 was renamed to 'WrCur' in CXL 3.0 to avoid confusion, as 'MemWr' is also used in CXL.mem. In some embodiments, the method may further include sending, to the second host, a CXL.cache Device-to-Host Response (D2H Resp) comprising RspIHitI opcode and a Unique Queue ID(UQID), responsive to receiving, from the second host, a CXL.cache Host-to-Device Request (H2D Req) comprising Snp* opcode and the UQID. In other embodiments, the communicating with the first host further utilizes CXL.cache, and further comprising, responsive to receiving, from the first host, a CXL.cache Host-to-Device Request (H2D Req) comprising Snp* opcode and a UQID, sending, to the first host, a CXL.cache Device-to-Host Response (D2H Resp) comprising a RspIHitI opcode and the UQID.

In certain embodiments, the method may further include receiving, from the second host, a CXL.cache Host-to-Device Data message (H2D Data) comprising: Data, and the first CQID; translating the H2D Data to a CXL.mem Subordinate-to-Master Data Response comprising: the first Tag, and the Data(S2 M DRS); and sending the S2 M DRS to the first host. Optionally, the method may further include receiving, from the second host, a CXL.cache Host-to-Device Response comprising a *WritePull* opcode, the second CQID, and a UQID(H2D Rsp *WritePull*), sending, to the second host, a CXL.cache D2H Data comprising the *Data* and the UQID, and sending, to the first host, a CXL.mem Subordinate-to-Master No Data Response (S2 M NDR) comprising the second Tag. Additionally or alternatively, the method may further include terminating the CXL.mem and CXL.cache protocols; and wherein data granularity of the CXL.mem M2S Req MemRd* is 64 bytes and data granularity of the CXL.cache D2H Req RdCurr is two times 32 bytes. The termination of the CXL.mem and CXL.cache protocols enables the use of different data granularities within the system by allowing the system to handle varying data sizes. For example, the CXL.mem M2S Req MemRd* operations may utilize a data granularity of 64 bytes, while the CXL.cache D2H Req RdCurr operations may operate with a data granularity equivalent to two segments of 32 bytes each. The termination of the respective protocols ensures that data can be reformatted and aligned appropriately, thereby enabling communication between the hosts using different granularities. In one embodiment, a non-transitory computer-readable medium includes instructions that, when executed by a processor, cause the processor to perform the method described above.

In one embodiment, an apparatus includes a first Endpoint (EP1) configured to communicate with a first host according to CXL.mem, wherein CXL denotes Compute Express Link (CXL); a second Endpoint (EP2) configured to communicate with a second host according to CXL.cache; and a computer. The computer is configured to: receive, via the EP1, a CXL.mem Master-to-Subordinate Request comprising: a MemRd* opcode, a first Tag, and a first physical address (PA) from an HPA space of the first host (M2S Req MemRd*); translate the M2S Req MemRd* to a CXL.cache Device-to-Host Request comprising: a RdCurr opcode, a first CQID, and a second PA from an HPA space of the second host (D2H Req RdCurr); send, via the EP2, the D2H Req RdCurr; receive, via the EP1, a CXL.mem M2S Request with Data comprising: MemWr* opcode, *Data*, a second Tag, and a third PA (M2S RwD MemWr*); translate the M2S RwD MemWr* to a CXL.cache D2H Request comprising: a WrCur or a MemWr opcode, a second CQID, and a fourth PA (D2H Req WrCur/MemWr); and send, via the EP2, the D2H Req WrCur/MemWr.

In some embodiments, the computer is further configured to: receive, via the EP1, CXL.io or PCIe Configuration Request TLPs; terminate the Configuration Request TLPs; and process the Configuration Request TLPs in a manner that does not necessitate translating and sending the translated Configuration Request TLPs to via the EP2. Optionally, the computer is further configured to: receive, via the EP1, a CXL.io memory transaction, and utilize non-transparent bridging (NTB) to enable the first host to read data, from the second host, based on mapping a physical address space window of the second host to a physical address space window of the first host via a Base Address Register (BAR). Optionally, the computer is further configured to: receive, via the EP1, CXL.io or PCIe TLPs; terminate the TLPs; send, via the EP2, translations of at least one of the following terminated TLP types: Memory Read (MRd), Memory Write (MWr), and Completion with Data(CplD); and block the following terminated TLP types: Configuration Read (CfgRd0, CfgRd1) requests, Configuration Write (CfgWr0, CfgWr1) requests, and Completion for Locked Memory Read (CplDLk). Additionally or alternatively, the computer is further configured to: receive, via the EP1, CXL.io or PCIe Memory TLPs, and send, via the EP2, data indicative of at least one of the following from the memory TLPs: addresses, traffic class, or attributes. In some embodiments, the MemRd* opcode is selected from MemRd, MemRdData, MemRdTEE, or MemRdDataTEE, and the MemWr* opcode is selected from MemWr, MemWrPt1, Mem WrTEE, or MemWrPtITEE.

In certain embodiments of the apparatus, the computer is further configured to: send, via the EP2, a CXL.cache Device-to-Host Response (D2H Resp) comprising RspIHitI opcode and a UQID, responsive to receiving, via the EP2, a CXL.cache Host-to-Device Request (H2D Req) comprising Snp* opcode and the UQID. Additionally or alternatively, the communicating with the first host further utilizes CXL-.cache, and wherein the computer is further configured to, responsive to receiving, via the EP1, a CXL.cache Host-to-Device Request (H2D Req) comprising Snp* opcode and a UQID, send via the EP1 a CXL.cache Device-to-Host Response (D2H Resp) comprising a RspIHitI opcode and the UQID. Optionally, the computer is further configured to: receive via the EP2 a CXL.cache Host-to-Device Data message comprising: Data, and the first CQID; translate the H2D Data to a CXL.mem Subordinate-to-Master Data Response comprising: the first Tag, and the Data(S2 M DRS); and send the S2 M DRS via the EP1. Optionally, the computer is further configured to: receive via the EP2 a CXL.cache Host-to-Device Response comprising a *WritePull* opcode, the second CQID, and a UQID(H2D Rsp *WritePull*), send via the EP2 a CXL.cache D2H Data comprising the *Data* and the UQID, and send via the EP1 a CXL.mem Subordinate-to-Master No Data Response (S2 M NDR) comprising the second Tag.

In one embodiment, a system includes a first host; a second host; and a Resource Provisioning Unit (RPU) configured to: communicate with the first host according to CXL.mem, and communicate with the second host according to CXL.cache and; wherein CXL denotes CXL. The RPU is further configured to: receive, from the first host, a CXL.mem Master-to-Subordinate Request comprising: a MemRd* opcode, a first Tag, and a first physical address (PA) from an HPA space of the first host (M2S Req MemRd*); translate the M2S Req MemRd* to a CXL.cache Device-to-Host Request comprising: a RdCurr opcode, a first CQID, and a second PA from an HPA space of the second host (D2H Req RdCurr); send, to the second host, the D2H Req RdCurr; receive, from the first host, a CXL.mem M2S Request with Data comprising: MemWr* opcode, *Data*, a second Tag, and a third PA (M2S RwD MemWr*); translate the M2S RwD MemWr* to a CXL.cache D2H Request comprising: a WrCur or a MemWr opcode, a second CQID, and a fourth PA (D2H Req WrCur/MemWr); and send, to the second host, the D2H Req WrCur/MemWr. Optionally, the RPU is further configured to: receive a CXL.io memory transaction from the first host, and utilize non-transparent bridging (NTB) to enable the first host to read data, from the second host, based on mapping a physical address space window of the second host to a physical address space window of the first host via a Base Address Register (BAR). Optionally, the RPU is further configured to: send, to the second host, a CXL.cache Device-to-Host Response (D2H Resp) comprising RspIHitI opcode and a UQID, responsive to receiving, from the second host, a CXL.cache Host-to-Device Request (H2D Req) comprising Snp* opcode and the UQID.

In one embodiment, an apparatus includes a first switch port configured to communicate with a first host according to CXL.mem, wherein CXL denotes CXL; a second switch port configured to communicate with a second host according to CXL.cache; and a computer. The computer is configured to: receive, via the first switch port, a CXL.mem Master-to-Subordinate Request comprising: a MemRd* opcode, a first Tag, and a first physical address (PA) from an HPA space of the first host (M2S Req MemRd*); translate the M2S Req MemRd* to a CXL.cache Device-to-Host Request comprising: a RdCurr opcode, a first CQID, and a second PA from an HPA space of the second host (D2H Req RdCurr); send, via the second switch port, the D2H Req RdCurr; receive, via the first switch port, a CXL.mem M2S Request with Data comprising: MemWr* opcode, *Data*, a second Tag, and a third PA (M2S RwD MemWr*); translate the M2S RwD MemWr* to a CXL.cache D2H Request comprising: a WrCur or a MemWr opcode, a second CQID, and a fourth PA (D2H Req WrCur/MemWr); and send, via the second switch port, the D2H Req WrCur/MemWr. Optionally, the computer is further configured to: send, via the second switch port, a CXL.cache Device-to-Host Response (D2H Resp) comprising RspIHitI opcode and a UQID, responsive to receiving, via the second switch port, a CXL.cache Host-to-Device Request (H2D Req) comprising Snp* opcode and the UQID.

In one embodiment, a method includes communicating with a first host, over a first CXL interface, according to CXL.mem protocol; communicating with a second host, over a second CXL interface, according to CXL.cache protocol; and terminating the CXL.mem and CXL.cache protocols. The method further includes receiving, from the first host, a CXL.mem Master-to-Subordinate Request (M2S Req); translating the M2S Req to a CXL.cache Device-to-Host Request (D2H Req) to be sent to the second host; receiving, from the second host, a CXL.cache Host-to-Device Request comprising a Snp* opcode (H2D Req Snp*); and responding with a CXL.cache D2H Resp comprising a RspIHitI opcode (D2H Resp RspIHitI).

Figure 20:
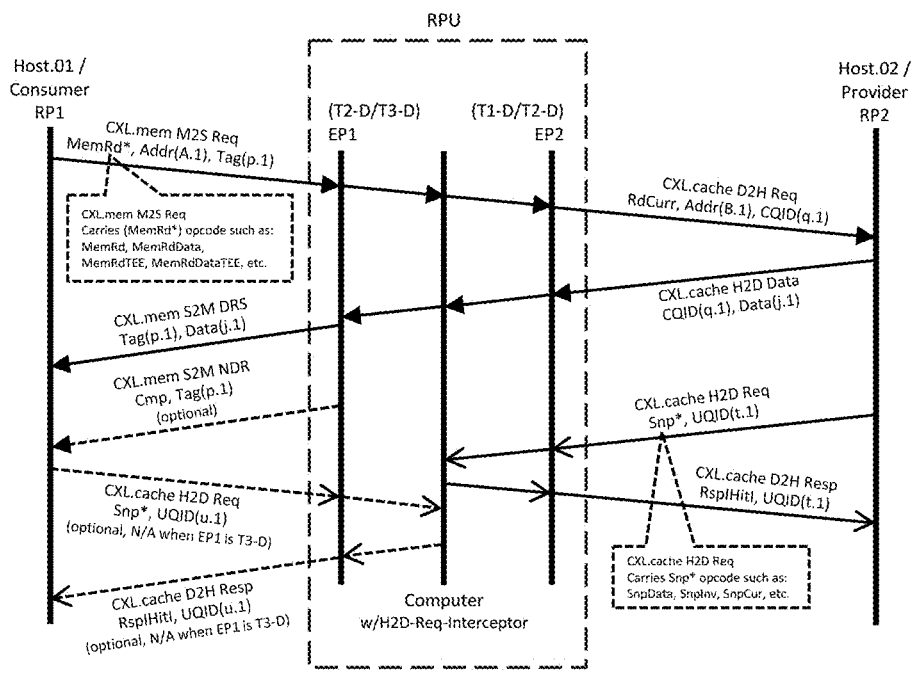
FIG. 20 illustrates one embodiment of a MemRd* to RdCurr TFD with snoop intercept.

FIG. 20 illustrates one embodiment of a MemRd* to RdCurr TFD with snoop intercept. The TED illustrates two distinct transaction domains: CXL.mem Transactions on the left side, and CXL.cache Transactions on the right side. The RPU, positioned in the center, includes two Endpoints: EP1, which may be either a Type 2 or Type 3 CXL device (T2-D/T3-D), and EP2, which may be either a Type 1 or Type 2 CXL device (T1-D/T2-D). The CXL.mem protocol operates over a CXL link established between the consumer and the RPU, where the RPU is exposed to the consumer as either a CXL Type-2 Device or a CXL Type-3 Device. Correspondingly, the CXL.cache protocol operates over a CXL link established between the provider and the RPU, where the RPU is exposed to the provider as either a CXL Type-1 Device or a CXL Type-2 Device. The diagram begins with first CXL Root Port (RP1) of Host.01 sending a CXL.mem M2S Req containing a MemRd* opcode, physical address(A.1), and Tag(p.1) to the first Endpoint of the RPU (EP1). The RPU translates the M2S Req MemRd* to a CXL.cache D2H Req containing a RdCurr opcode, physical address(B.1), and CQID(q.1), and forward it to the second Root Port (RP2) of Host.02. Host.02 responds to the RPU with a CXL.cache H2D Data message containing the requested Data(J.1) and the CQID(q.1). The RPU translates the CXL.cache H2D Data to a CXL.mem S2 M DRS containing the original Tag(p.1) and retrieved Data(J.1), and sends it to Host.01. Optionally, the RPU may also send a CXL.mem S2 M NDR to Host.01 before, concurrently, or after the S2 M DRS.

It is noted that in the case of an M2S Req MemRd* transaction, an S2 M NDR may typically indicate completion of the read operation on the device side before data is transmitted to the requester. Therefore, for a MemRd* transaction, the S2 M NDR may typically precede the S2 M DRS. However, because the S2 M DRS and S2 M NDR utilize independent channels within the CXL.mem, strict ordering between messages conveyed over these distinct channels is not necessarily guaranteed, and thus the S2 M DRS may arrive at the consumer prior to the S2 M NDR.

The figure further illustrates the snoop transactions that may occur on the provider and/or consumer sides. On the provider side (Host.02), Host.02 may issue a CXL.cache H2D Req containing a Snp* opcode with UQID(t.1) to the RPU's EP2, and the RPU may respond with a CXL.cache D2H Resp containing a RspIHitI opcode and the same UQID(t.1). CXL.cache RdCurr is the simplest read command available in CXL.cache, which enables a relatively simple implementation of an RPU with H2D-Req-Interceptor that is not cache-coherency-aware.

On the consumer side (Host.01), when EP1 is configured as a T2-D, Host.01 may issue a CXL.cache H2D Req containing a Snp* opcode with UQID(u.1) to EP1, and the RPU may respond with a CXL.cache D2H Resp containing a RspIHitI opcode and the same UQID(u.1). The snoop transactions on the consumer side are marked as optional because they occur when EP1 is configured as a Type 2 device, and do not occur when EP1 is configured as a Type 3 device. The presence of these snoop transactions on both sides demonstrates the RPU's possible capability to handle cache coherency protocols independently on both interfaces, maintaining proper coherency state tracking for both the consumer and provider domains.

Although the first and second CXL interfaces also utilize CXL.io protocols for communication with the first and second hosts, the CXL.io protocols are not illustrated in the TED of some embodiments for clarity and simplicity. It is noted that the computer in an apparatus comprising CXL interfaces/ports may be implemented as part of one or more of the CXL interfaces/ports or as a separate component in addition to the CXL interfaces/ports. In various embodiments, the term "computer" may encompass any computing elements that may be integrated within one or more CXL interfaces/ports or implemented as one or more separate components in addition to the CXL interfaces/ports. Whether the computer functionality is integrated into one or more of the CXL interfaces/ports or implemented externally as one or more distinct components, it is understood that relevant operations attributed to the computer may also be performed by one or more of the CXL interfaces/ports, and conversely, relevant operations attributed to one or more of the CXL interfaces/ports may be performed by the computer. This includes relevant processing operations described in this specification in relation to the computer or the CXL interfaces/ports. Accordingly, the description does not limit the scope of the embodiments to any specific configuration of the computer relative to the CXL interfaces/ports, and implementations may utilize any combination of integrated or separate computing functionalities.

In certain embodiments of the method, the Snp* opcode is selected from SnpData, SnpInv, or SnpCur; the H2D Req further comprises a UQID; the D2H Resp RspIHitI further comprises the UQID; and the H2D Req Snp* is not translated to a corresponding CXL.mem message. Note that CQID is used by devices to track their outstanding requests to the host, while UQID is used by the host to track its outstanding requests (like snoops) to devices. Optionally, the M2S Req comprises: a MemRd* opcode, and a Tag (M2S Req MemRd*); the D2H Req comprises: a RdCurr opcode, and a first CQID(D2H Req RdCurr); and further comprising: receiving, from the second host, a H2D Data message comprising: Data, and the first CQID; and sending, to the first host, a CXL.mem Subordinate-to-Master Data Response (S2 M DRS) comprising: the Data, and the Tag. Optionally, each of the H2D Req Snp* and the D2H Resp RspIHitI further comprises a UQID; the MemRd* opcode is selected from MemRd, MemRdData, MemRdTEE, or MemRdDataTEE; and further comprising sending an S2 M NDR *Cmp* before, concurrently, or after sending the S2 M DRS. Optionally, the M2S Req MemRd* further comprises a first address belonging to HPA of the first host, and the D2H Req RdCurr further comprises a second address belonging to HPA of the second host.

In certain embodiments, the method may further include communicating with the first host over the first CXL interface according to CXL.cache; and responsive to receiving, from the first host, a second CXL.cache H2D Req comprising a Snp* opcode, sending, to the first host, a second CXL.cache D2H Resp comprising a RspIHitI opcode. When the second CXL interface is a CXL type 2 device, the first host may issue over the CXL.cache channel the second H2D Req Snp*, and then the RPU would response with the second D2H Resp RspIHitI to the first host. In one embodiment, a non-transitory computer-readable medium includes instructions that, when executed by a processor, cause the processor to perform the method described above.

In one embodiment, an apparatus includes a first CXL interface configured to communicate with a first host according to CXL.mem protocol; a second CXL interface configured to communicate with a second host according to CXL.cache; and a computer configured to: terminate the CXL.mem and CXL.cache protocols, and translate a received CXL.mem Master-to-Subordinate Request (M2S Req) to a CXL.cache Device-to-Host Request (D2H Req). The apparatus is further configured to: receive, from the second host, a CXL.cache Host-to-Device Request comprising a Snp* opcode (H2D Req Snp*), and respond with a CXL.cache D2H Resp comprising a RspIHitI opcode (D2H Resp RspIHitI). Communicating with the first and/or second hosts may be achieved by coupling the hosts to the CXL interfaces directly or indirectly via one or more switches and/or retimers.

In some embodiments of the apparatus, the Snp* opcode is selected from SnpData, SnpInv, or SnpCur; and wherein the H2D Req further comprises a UQID, and the D2H Resp RspIHitI further comprises the UQID. Optionally, the M2S Req comprises a MemRd* opcode and a Tag (M2S Req MemRd*), and the D2H Req comprises a RdCurr opcode and a first CQID(D2H Req RdCurr). The apparatus is further configured to: receive, from the second host, a H2D Data message comprising Data and the first CQID, and send, to the first host, a corresponding CXL.mem Subordinate-to-Master Data Response (S2 M DRS) comprising the Tag and the Data. Optionally, the MemRd* opcode is selected from MemRd, MemRdData, MemRdTEE, or MemRdDataTEE. Optionally, the computer is further configured to generate a Subordinate-to-Master No Data Response *Cmp*, and the first CXL interface is further configured to send the S2 M NDR *Cmp* to the first host before, concurrently, or after sending the S2 M DRS; and wherein the D2H Resp RspIHitI further comprise a UQID. Optionally, the M2S Req MemRd* further comprises a first address belonging to HPA of the first host, the D2H Req RdCurr further comprises a second address belonging to HPA of the second host, and the apparatus enables the first host to communicate with the second host according to CXL.mem and/or CXL.cache.

In some embodiments of the apparatus, the second interface exposes at least one address region mapped as Host-only Coherent Host-managed Device Memory (HDM-H). In other embodiments, the second interface exposes at least one address region mapped as: other than a device coherent host-managed device memory (HDM-D), or other than a device coherent using back-invalidate host-managed device memory (HDM-DB). Optionally, the first CXL interface is further configured to communicate with the first host according to CXL.cache protocol, and the first interface exposes at least one address region mapped as Host-only Coherent Host-managed Device Memory (HDM-H).

In one embodiment, a switch includes a first switch port configured to communicate with a first host according to CXL.mem protocol, wherein CXL denotes Compute Express Link; a second switch port configured to communicate with a second host according to CXL.cache; and a computer configured to: terminate the CXL.mem and CXL.cache protocols, and translate a received CXL.mem Master-to-Subordinate Request (M2S Req) to a CXL.cache Device-to-Host Request (D2H Req). The switch is further configured to: receive, from the second host, a CXL.cache Host-to-Device Request comprising a Snp* opcode (H2D Req Snp*), and respond with a CXL.cache D2H Resp comprising a RspIHitI opcode (D2H Resp RspIHitI).

In some embodiments, the Snp* opcode is selected from SnpData, SnpInv, or SnpCur; wherein the M2S Req comprises a MemRd* opcode and a Tag (M2S Req MemRd*), and the D2H Req comprises a RdCurr opcode and a first CQID(D2H Req RdCurr). The switch is further configured to: receive, from the second host, a H2D Data message comprising Data and the first CQID, and send, to the first host, a corresponding CXL.mem Subordinate-to-Master Data Response (S2 M DRS) comprising the Tag and the Data. Optionally, the computer is further configured to generate a Subordinate-to-Master No Data Response *Cmp*, and the first switch port is further configured to send the S2 M NDR *Cmp* to the first host before, concurrently, or after sending the S2 M DRS; and wherein the D2H Resp RspIHitI further comprise a UQID.

In some embodiments of the switch, each of the first and second switch ports belong to one of: a Hierarchy Based Routing (HBR) switch port, a Port Based Routing (PBR) switch port, a Virtual CXL Switch (VCS) that comprise a single Upstream Switch Port (USP) and one or more Downstream Switch Ports (DSPs), a Switch Interface Port, or a Switch Physical Port. As written above, examples of PBR switch ports may include: PBR Upstream Switch Port (PBR USP) connecting towards a host or root complex, PBR Downstream Switch Port (PBR DSP) connecting towards CXL devices or other switches in the downstream direction, PBR Fabric Port (PBR FPort) connecting to other PBR switches in the fabric, PBR Edge Switch Port at the edge of the PBR fabric to interface between the PBR fabric and non-PBR components, and PBR Inter-Switch Link Port connecting PBR switches to each other within the fabric. Examples of HBR switch ports may include: HBR Upstream Switch Port (HBR USP) connecting towards a host or root complex, and HBR Downstream Switch Port (HBR DSP) connecting towards CXL devices or other switches in the downstream direction.

In certain embodiments of the switch, the first switch port couples the first host to a first VCS, the second switch port couples the second host to a second VCS, and the first and second VCSs are coupled via the computer. Optionally, the first switch port is a USP and the second switch port is a USP, or the first switch port is a USP and the second switch port is a Downstream Switch Port (DSP).

Figure 21:
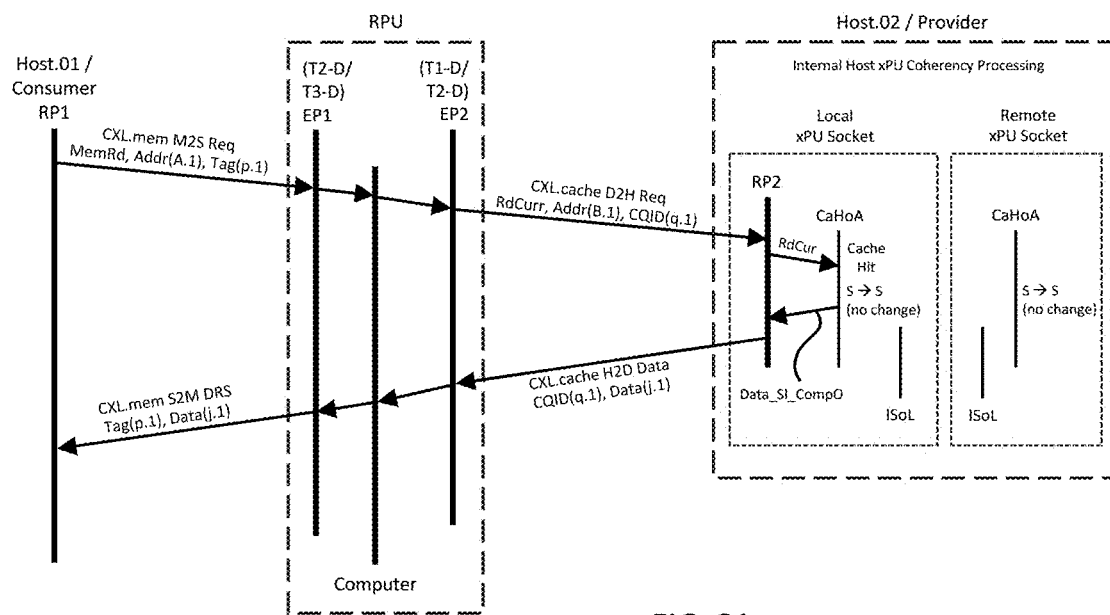
FIG. 21 illustrates one embodiment of an RPU that translates between CXL.mem M2S Req MemRd and CXL.cache D2H Req RdCurr when coupled to a multi-xPU provider.

FIG. 21 illustrates one embodiment of an RPU that translates between CXL.mem M2S Req MemRd and CXL.cache D2H Req RdCurr when coupled to a multi-xPU provider (Host.02). The details of the internal processing inside Host.02 use a generic Ring/Mesh model with IDI-like opcodes, where IDI refers to Intel's In-Die Interconnect as an example for communication within a die. The diagram commences with Host.01 RP1 sending a CXL.mem M2S Req containing MemRd opcode, Addr(A.1), and Tag(p.1) to the RPU that translates it to a corresponding CXL.cache D2H Req containing RdCurr opcode, Addr(B.1), and CQID (q.1), which is subsequently sent to Host.02 RP2. In Host.02, the message may be processed by the Internal Host xPU Coherency Processing, which in one example includes local and remote xPU sockets, their respective Caching Agent and Home Agent (CaHoA), and the Inter-Socket Link (ISOL) between them.

The illustrated internal coherency processing begins with RP2 translating the CXL.cache D2H Req containing the RdCurr opcode to an IDI-like RdCur (Read Current) request sent to the CaHoA of the local xPU socket. RdCur may be used to obtain a coherent snapshot of the requested cacheline without changing the existing state of any cache in the system. The CaHoA may process this request locally if the data is present in the local cache. In this case, the CaHoA may respond with a Cache Hit, indicating that the requested data is available in the local cache. The state of the cacheline (S→S) remains unchanged, as indicated in the figure.

Typically, with the CXL.cache RdCurr operation, there may be less or no intra-xPU and inter-xPU cache coherency traffic required between the Cache Agent and other Cache Agents in the system. This reduction in coherency traffic may occur because the RdCurr operation does not change existing cache states. Intra-xPU cache coherency traffic refers to cache coherency traffic within the same xPU socket, for example, to and from other Caching Agents via the Ring/Mesh. Inter-xPU cache coherency traffic refers to cache coherency traffic to and from other xPU sockets in the platform, which may occur via the ISoL.

In the remote xPU socket, the cacheline state also remains unchanged (S→S), indicating that the RdCurr operation does not affect the cache state in other sockets. This behavior may contribute to the reduced coherency traffic associated with the RdCurr operation. Following the local cache hit, the CaHoA may send a Data_SI_Comp0 message to RP2, which may contain the requested cacheline data along with any necessary coherency information. RP2 then formulates a CXL.cache H2D Data response containing CQID(q.1) and Data(j.1), which is sent to the RPU's EP2. The computer may then translate the CXL.cache H2D Data message to a CXL.mem S2M DRS containing the Tag(p.1) and Data(j.1), which is sent by EP1 back to the original requester, Host.01, completing the read operation. It is noted that while this description employs terminology that may be reminiscent of specific interconnect technologies, the underlying principles may be applicable to various Ring/Mesh architectures in multi-CPU systems. The implementation details may exhibit variations across different CPU designs and generations, but the coherency mechanisms described herein may represent an approach to maintaining cache coherency in multi-socket computing environments.

Figure 22:
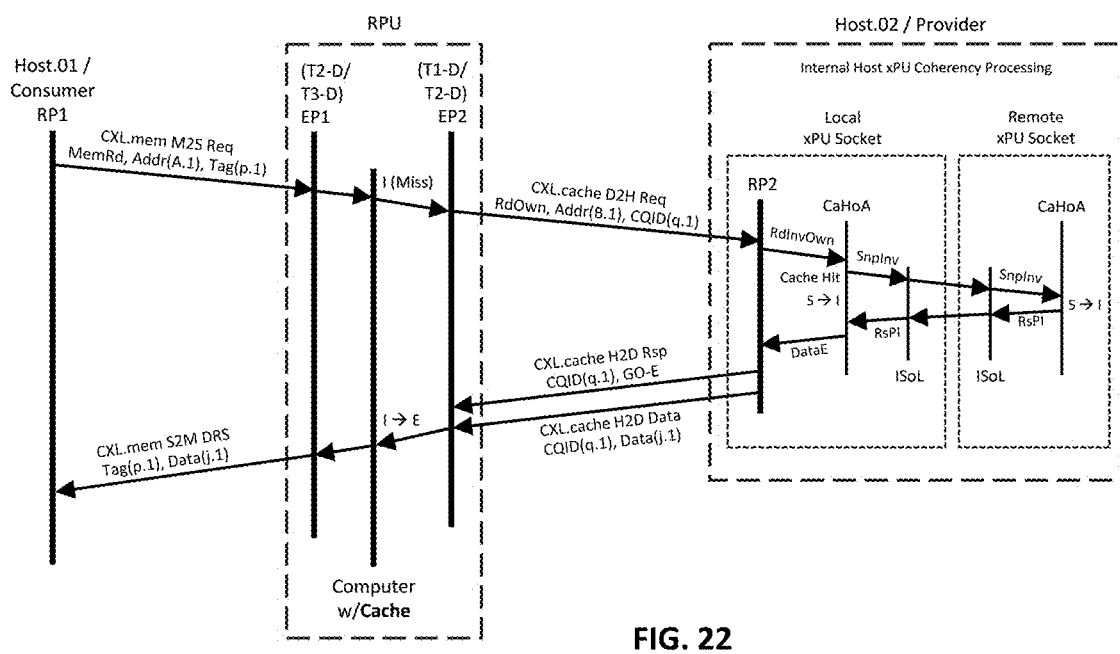
FIG. 22 illustrates one embodiment of an RPU that translates between CXL.mem M2S Req MemRd and CXL.cache D2H Req RdOwn when coupled to a multi-xPU provider.

FIG. 22 illustrates one embodiment of an RPU that translates between CXL.mem M2S Req MemRd and CXL.cache D2H Req RdOwn when coupled to a multi-xPU provider (Host.02). Here also, the details of the internal processing inside Host.02 use a generic Ring/Mesh model with IDI-like opcodes. The diagram commences with Host.01 RP1 sending a CXL.mem M2S Req with MemRd opcode, Addr(A.1), and Tag(p.1) to the RPU. The RPU maintains a cache in this mode of operation, and when having a cache miss at the RPU it translates the CXL.mem M2S Req to a corresponding CXL.cache D2H Req with RdOwn opcode, Addr(B.1), and CQID(q.1), which is subsequently sent to Host.02 RP2. In Host.02, the message may be processed by the Internal Host xPU Coherency Processing, which in one example includes local and remote xPU sockets, their respective CaHoA, and the ISOL between the local and remote xPU sockets.

The illustrated internal coherency processing begins with RP2 translating the CXL.cache D2H Req with RdOwn opcode to IDI-like RdInvOwn (Read Invalidate Own) request sent to the CaHoA of the local xPU socket. RdInvOwn is used to request a cacheline in Modified M or Exclusive E state; if a peer Caching Agent holds a Modified copy, the requester receives the cacheline in M state, otherwise the requester receives the cacheline in E state. The CaHoA may generate a SnpInv (Snoop Invalidate) message to address potential cache data in other sockets within the multi-CPU system. Although the figure illustrates for simplicity two sockets, the system may have 4, 8, 16, or another number of sockets. The SnpInv message may be sent across the Inter-Socket Link (IsoL) that may be implemented in various technologies, such as Ultra Path Interconnect (UPI) that serves as one possible example. When the SnpInv message arrives at the Remote xPU Socket it may be directed to the CaHoA of the Remote xPU Socket that processes the SnpInv request, potentially performing a local cache check and possibly propagating secondary snoop requests to other caching agents within its domain. The outcome of this remote coherency operation may be encapsulated in a RspI (Response Invalid) message that indicates that the status of the cacheline in the remote xPU socket is in Invalid state. If a modified copy of the cacheline is found in the Remote xPU Socket during this process, the data may be included with Data_M message or with RspIWb message (depending on requester role and implementation), which allows the requesting entity to receive the current version of the cacheline. The RspI message, potentially accompanied by cache data, may then be transmitted back across the IsoL to the Local xPU Socket. Upon receiving this response, the local CaHoA may complete its coherency operation, send a DataE (Cacheline Data in Exclusive State) message to RP2, and change the local xPU socket cache to I (invalid). As noted above, while this description employs terminology that may be reminiscent of specific interconnect technologies, the underlying principles may be applicable to various architectures and systems. The RP2 of local xPU socket then sends to the RPU's EP2 a CXL.cache H2D Rsp with CQID(q.1) and GO-E followed by a CXL.cache H2D Data with CQID(q.1) and Data(j.1) Message. The computer translates the CXL.cache H2D Data message to a CXL.mem S2 M DRS with the Tag(p.1) and Data(j.1), which is sent by EP1 back to the original requester, Host.01.

Caching Agent and Home Agent (CaHoA) refers to the combination of a Caching Agent (typically abbreviated as CA) and a Home Agent (typically abbreviated as HA). The CaHoA operates in conjunction with the cache that stores the cachelines. A modern xPU may include multiple instances of CaHoA, in some implementations spread across tiles in a grid-like mesh architecture, where each CaHoA independently manages memory requests and cache coherence for a specific region of the mesh, enabling the xPU to scale to higher core counts while maintaining performance. The co-location of the Home Agent and the Caching Agent in the combined CaHoA may increase performance, mainly by reducing the number of mesh hops (latency) and overall communication traffic (bandwidth) required to coordinate memory accesses and cache coherence between the two agents.

A Home Agent is the agent on the host that is responsible for resolving system wide coherency for a given address. The Home Agent part of the CaHoA acts as the owner (Home) of its associated memory regions, so that for every cacheline address in the system there is only one owner Home Agent that is responsible for resolving memory access requests to that address. The Home Agent determines whether the requested data is stored in the xPU local cache, needs to be fetched from system memory, or requires other actions to maintain consistency (e.g., writing back modified data). In multi-socket systems, where more than one xPU socket is involved, the Home Agent coordinates memory requests between sockets and assists with routing the requests.

The Caching Agent part of the CaHoA manages cache coherency, snooping of peer caches for a requested cacheline address, and tracking the state of cachelines it is responsible for. It may optionally interact with a Snoop Filter in order to determine whether a cacheline is stored in peer caches in a state that requires snooping, enabling the reduction of unnecessary snoop traffic in the system.

In some scenarios, such as when the RPU serves as the sole coherency consumer of Host.02, it may possess the capability to measure its load on the coherency manager of Host.02. Based on this measurement, the RPU may selectively downgrade certain CXL.cache transactions that involve caching (such as RdOwn, RdShared, or RdAny) to RdCurr transactions that do not involve caching. By doing so, the RPU effectively reduces the load on the coherency manager of Host.02, potentially leading to improved overall system performance. The load exerted on the coherency manager of Host.02 by the RPU may be estimated through various methods, including the use of counters and/or the application of telemetry techniques, as elaborated further in the following examples.

In one example, the RPU employs counters to keep track of the number of CXL.cache transactions that include caching, such as RdOwn, RdShared, or RdAny. Using these counter values, the RPU can estimate the load on the coherency manager based on a predetermined conversion table, predetermined logic, a machine learning-based model, and/or other suitable methods. The conversion table or predetermined logic may define thresholds or ranges that map counter values to estimated load levels, while the machine learning-based model can learn to predict load levels based on historical counter data and/or other relevant system metrics.

In another example, the RPU implements telemetry to measure the delays associated with Host.02. In the context of this example, telemetry refers to the automated process of collecting data by the RPU to measure delays and workload impacts on Host.02's coherency manager, which allows the RPU to assess real-time performance metrics, such as the time delays associated with processing CXL.cache transactions. By analyzing the telemetry data, the RPU can identify when the load on the coherency manager exceeds a predetermined threshold. Upon detecting such a condition, the RPU may proactively downgrade some of the CXL.cache transactions that include caching to RdCurr transactions, thereby alleviating the burden on the coherency manager and potentially improving system performance. The combination of counter-based estimation and telemetry-driven load detection may provide the RPU with an adaptive approach to managing the load on the coherency manager of Host.02, which may improve system performance in real-time based on the current load conditions of the coherency manager.

In the context of this embodiment, a percentage range refers to a span of percentages which may be defined by a lower bound and an upper bound, within which the system may operate when translating CXL.mem MemRd messages to other message types. This percentage range can also be understood as a defined span with a central value or midpoint. For example, a first percentage range for translating CXL.mem MemRd messages to CXL.cache messages that involve caching might be 60% to 80%, which could also be expressed as 70%±10%, centering around 70%. This means that at any given time, the system may translate between 60% and 80% of the received CXL.mem MemRd messages to CXL.cache messages involving caching, with the exact percentage potentially varying dynamically within this range based on system conditions, with the option to typically cluster around the 70% midpoint. Similarly, a second percentage range might be 30% to 50% (or 40%±10%), indicating that when the load on the coherency manager exceeds a predetermined threshold, the system adjusts its operation to translate between 30% and 50% of the CXL.mem MemRd messages to CXL.cache messages involving caching, optionally with 40% as the central tendency. Concurrently, the percentage range for translating CXL.mem MemRd messages to CXL.cache RdCurr messages that do not involve caching may increase from a range of 20% to 40% (30%±10%) to a range of 50% to 70% (60%±10%).

Comparisons between percentage ranges may be interpreted in multiple ways, depending on the context and the specific implementation. For instance, stating that the first percentage range is greater than the second percentage range may be interpreted as: (1) the highest value in the first percentage range is greater than the highest value in the second percentage range (e.g., 80%>50% in the previous example); (2) the midpoint or central value of the first percentage range is greater than the midpoint of the second percentage range (e.g., 70%>40% in the previous example); or (3) the mean of the values within the first percentage range is greater than the mean of the values within the second percentage range.

In some embodiments, a D2H Req comprising the RdShared opcode is issued, which allows the RPU to request a shared copy of the cacheline. This request may facilitate the caching of read data by the Provider, such as Host.02. RdShared typically allows the data to be cached, but the decision to cache remains under the control of the Provider. In one example, the provider (e.g., Host.02) may function primarily as a Memory Pool, in which case there is a potential benefit to leveraging the Provider's caches, such as the relatively large Last Level Cache (LLC) typically associated with CPU hosts, for caching read requests from the memory pool. In this case, issuing the D2H Req comprising RdShared may allow the Provider's caches to act as an extension of the Consumer's caching hierarchy, thereby improving memory access performance for the Consumer.

Figure 23:
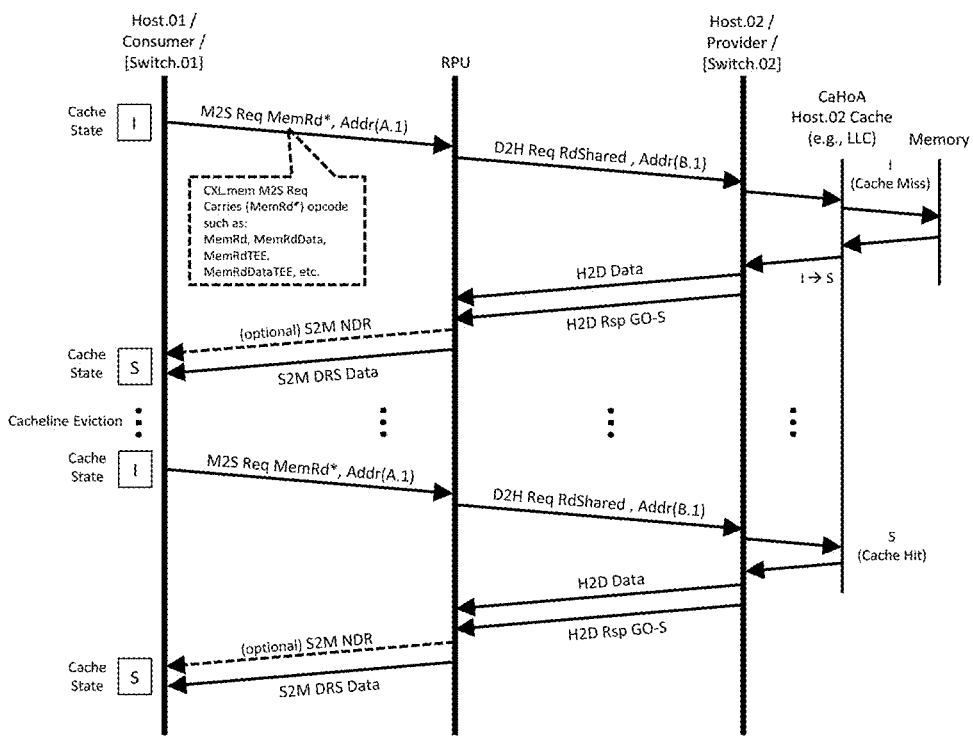
FIG. 23 and FIG. 24 illustrate examples of TFDs for translating between MemRd* and RdShared.
Figure 24:
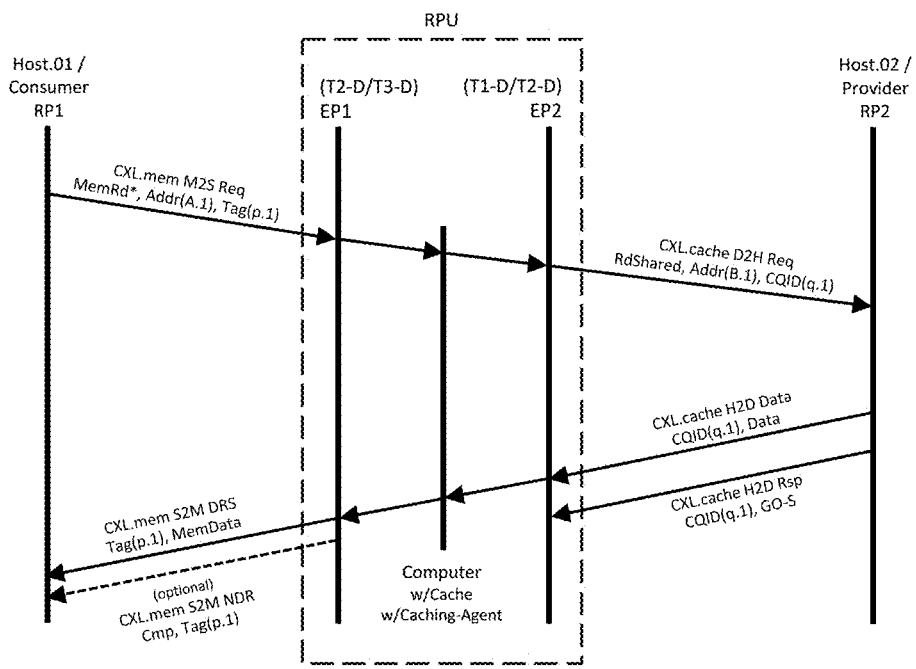
Figure 25:
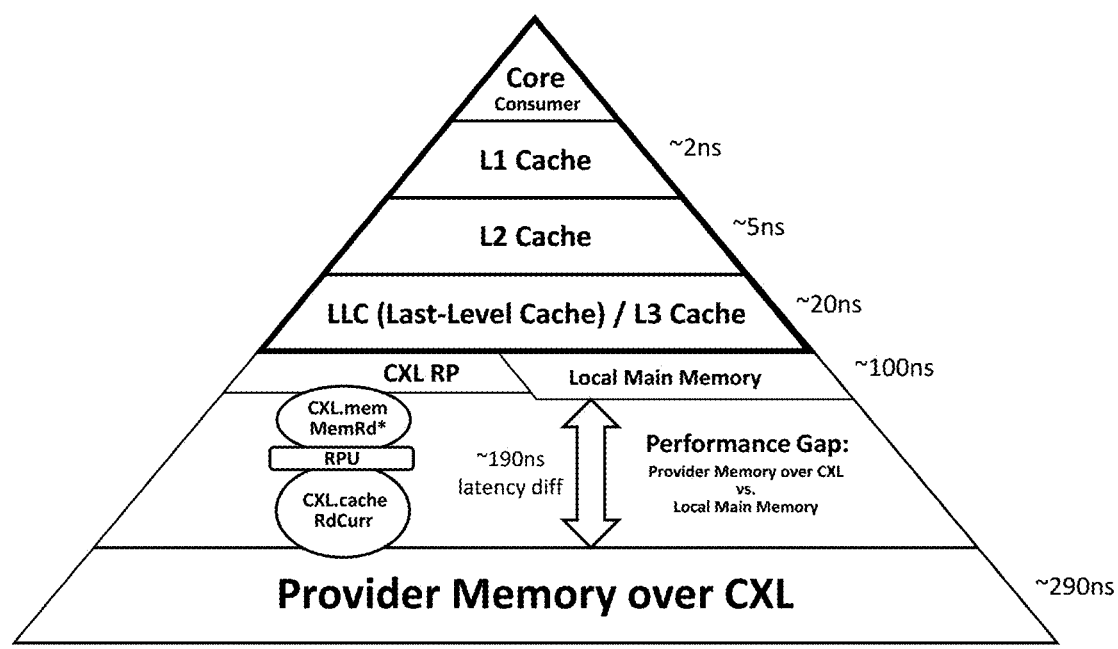
FIG. 25 and FIG. 26 illustrate non-limiting examples of memory hierarchy representations depicting load-to-use memory access latencies from a Consumer's processing core perspective.
Figure 26:
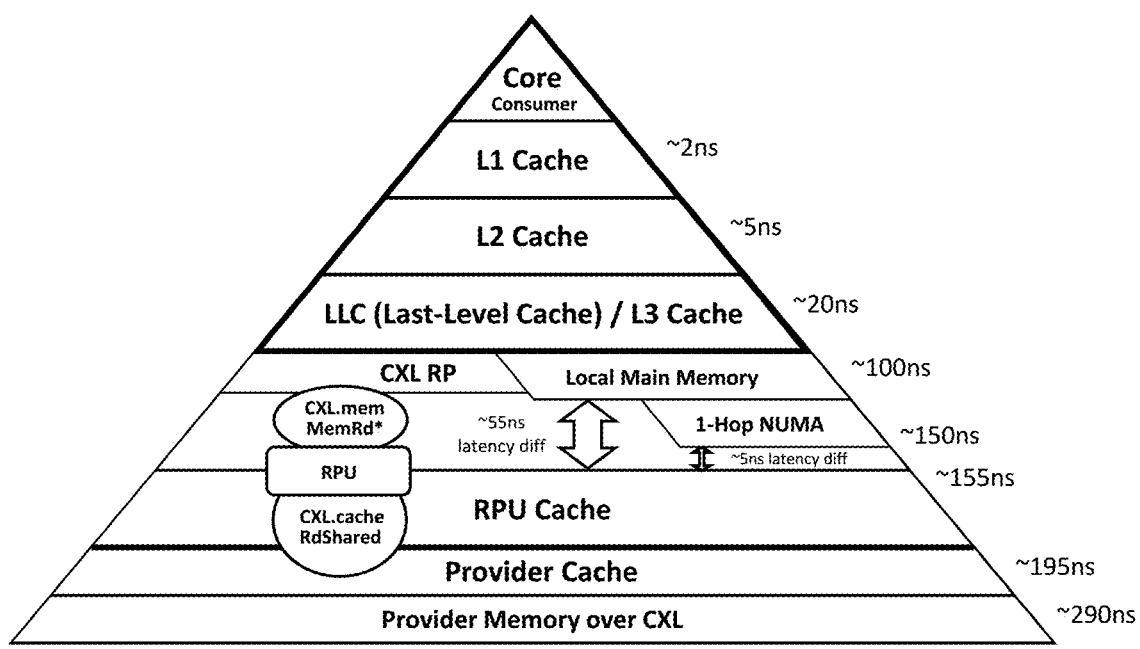

FIG. 23 and FIG. 24 illustrate examples of TFDs for translating between MemRd* and RdShared. FIG. 25 and FIG. 26 illustrate non-limiting examples of memory hierarchy representations depicting load-to-use memory access latencies from a Consumer's processing core perspective. The hierarchies show various memory access paths and their associated latencies, including local memory access and Provider memory access over CXL, where an RPU facilitates protocol translation between CXL.mem MemRd* and CXL.cache messages. FIG. 25 illustrates a memory hierarchy where the RPU performs translation between CXL.mem MemRd* and CXL.cache RdCurr. The figure illustrates a performance comparison between Provider Memory over CXL and Local Main Memory, with an exemplary latency differential of approximately 190 ns between these access paths.

FIG. 26 presents another memory hierarchy configuration where the RPU translates between CXL.mem MemRd* and CXL.cache RdShared. This configuration introduces additional cache levels in the memory hierarchy, including RPU Cache and Provider Cache. The figure shows comparative latencies between Local Main Memory, 1-Hop NUMA memory access, and Provider Memory over CXL access paths, with exemplary latency differentials of ~55 ns between the RPU cache and the local main memory, and ~5 ns between the RPU cache and the 1-Hop NUMA. The presence of an RPU cache, potentially employed in this configuration, reduces the latency when accessing the Provider's memory over CXL.

Both figures demonstrate memory access patterns commonly encountered in various computing environments, including but not limited to multi-socket configurations. The hierarchical arrangements shown may serve as reference points for evaluating memory access performance across different system configurations and implementations. The illustrated latency values are exemplary and may vary based on specific implementations, system configurations, and operating conditions. The caching structures depicted in these memory hierarchies, which represent examples of possible approaches to memory hierarchy organization in systems utilizing CXL-based memory expansion or pooling architectures, may contribute to optimizing memory access patterns and potentially reducing effective access latencies in various usage scenarios. For example, a system may employ various RPU based caching strategies and memory access optimizations to bring the Provider Memory over CXL latencies closer to Local Main Memory latencies or 1-Hop NUMA latencies, such as through strategic placement of frequently accessed data in the RPU cache, intelligent RPU prefetching mechanisms, or optimized RPU cache coherency protocols. These approaches may be particularly beneficial in scenarios where applications require rapid access to expanded memory resources while maintaining performance characteristics similar to local or near-local memory access patterns.

Figure 27:
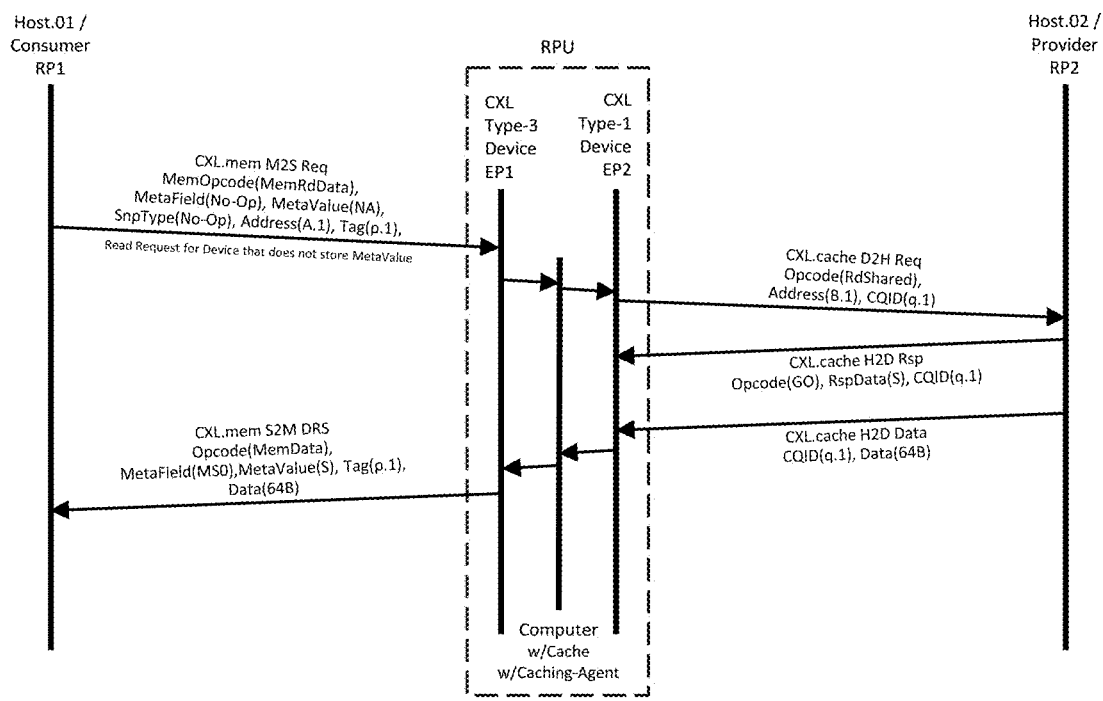
FIG. 27 illustrates one embodiment of an RPU that translates between CXL.mem MemRdData and CXL.cache RdShared.
Figure 28:
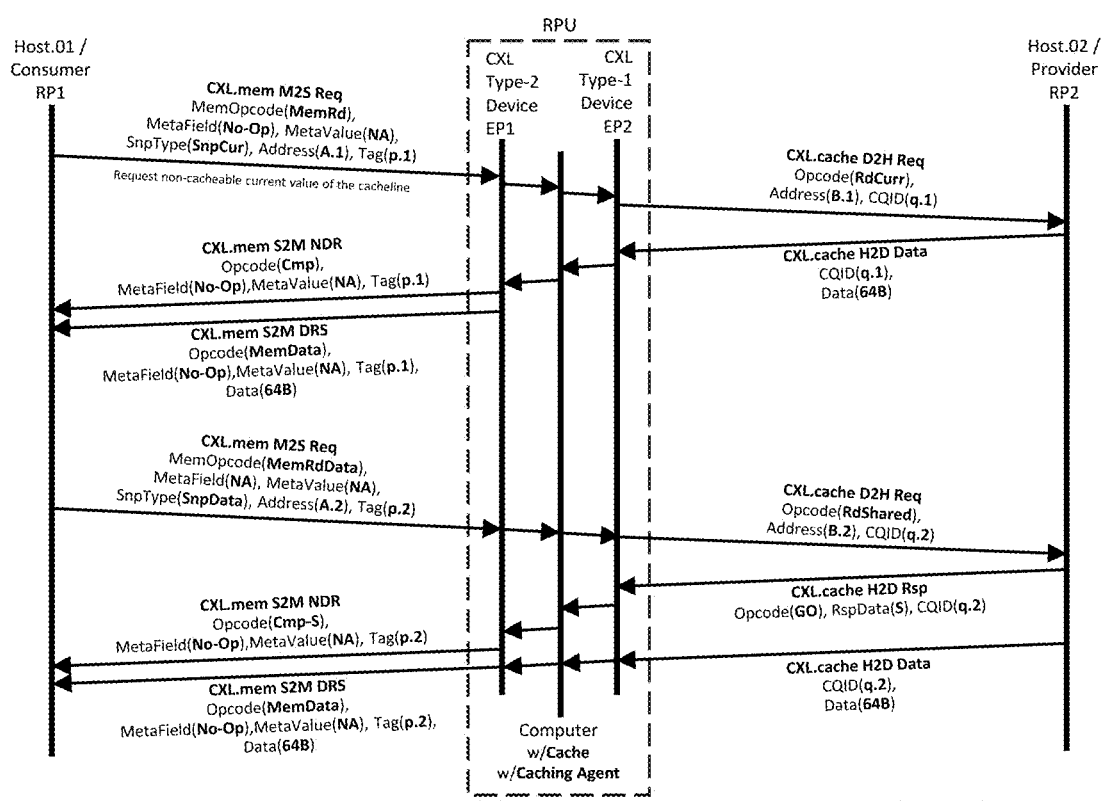
FIG. 28 illustrates one embodiment of an RPU that translates between CXL.mem and CXL.cache according to CXL Specification Revision 2.0 message format.

FIG. 27 illustrates one embodiment of an RPU that translates between CXL.mem MemRdData and CXL.cache RdShared. FIG. 28 illustrates one embodiment of an RPU that translates between CXL.mem communicated via CXL Type-2 Device and CXL.cache communicated via CXL Type-2 Device, according to CXL Specification Revision 2.0 message format.

In one embodiment, an apparatus includes a CXL Type 2 or Type 3 device (EP1) configured to receive a CXL.mem Master-to-Subordinate Request with Data(M2S RwD) comprising a Tag; a computer configured to translate the M2S RwD to a CXL.cache Device-to-Host Request (D2H Req) comprising a CQID; and a CXL Type 1 or Type 2 device (EP2) configured to send the D2H Req, and thereafter to receive a CXL.cache Host-to-Device Response (H2D Rsp) comprising the CQID and a UQID. The EP1 is further configured to send a CXL.mem Subordinate-to-Master No Data Response (S2 M NDR) comprising the Tag; and the EP2 is further configured to send a CXL.cache Device-to-Host Data(D2H Data) message comprising the UQID.

In some embodiments, the apparatus is further configured to receive, via EP1, CXL.io or Peripheral Component Interconnect Express (PCIe) TLPs comprising Configuration Request TLPs, and to terminate the Configuration Request TLPs. The M2S RwD further comprises: a *Wr* opcode, a first physical address, and *Data*; the D2H Req further comprises: a *Wr* opcode, and a second physical address; the H2D Rsp further comprises a *WritePull* and *GO* messages, or a combined message; the S2 M NDR further comprises a *Cmp*; and the D2H Data message further comprises the *Data*. Optionally, the apparatus terminates Configuration Request TLPs, received via both EP1 and EP2, without forwarding to the entity on the other side the Configuration Request TLPs or translations of the Configuration Request TLPs.

Optionally, the *Wr* opcode of the M2S RwD is selected from MemWr, MemWrPtl, MemWrTEE, or MemWrPtlTEE, the *Wr* opcode of the D2H Req is selected from ItoMWr or WrCur, the CXL.cache transaction requires posted semantics with a combined *GO*/*WritePull* message, and the EP1 is configured to send the S2 M NDR after the *GO*/*WritePull* message is received at the EP2. For example, the *GO*/*WritePull* message may refer to GO-I/WritePull or GO_WritePull. Optionally, CXL.cache transaction requires posted semantics with a combined *GO*/*WritePull* message, and the EP1 is configured to send the S2 M NDR before the *GO*/*WritePull* message is received at the EP2. In some embodiments, the *Wr* opcode of the M2S RwD is selected from MemWr, MemWrPtl, MemWrTEE, or MemWrPtlTEE, the *Wr* opcode of the D2H Req is selected from ItoMWr or WrCur, the CXL.cache transaction requires non-posted semantics with a *WritePull* message followed by a *GO* message, and the EP1 is configured to send the S2 M NDR after the *GO* message is received at the EP2. Optionally, the CXL.cache transaction requires non-posted semantics with a *WritePull* message followed by a *GO* message, and the EP1 is configured to send the S2 M NDR before the *WritePull* message is received at the EP2. Optionally, the CXL.cache transaction requires non-posted semantics with a *WritePull* message followed by a *GO* message, and the EP1 is configured to send the S2 M NDR between the receptions of the *WritePull* and the *GO* messages at the EP2. In certain embodiments, the apparatus further includes memory configured to store the Tag received in the M2S RwD, and wherein the computer is further configured to utilize the stored Tag to generate the S2 M NDR. Additionally, the first physical address may belong to HPA of a first host configured to send the M2S RwD, and the second physical address belongs to HPA of a second host configured to receive the D2H Req. Optionally, the apparatus enables the first host to communicate with the second host utilizing CXL.mem and/or CXL.cache, and without an intermediate standard CXL switch.

In some embodiments, the apparatus is further configured to block at least some of the following configuration Read/Write Requests it receives: CfgRd0, CfgWr0, CfgRd1, or CfgWr1. In certain embodiments, the apparatus may be implemented as: (i) a card comprising at least one of the following connectors: Mini Cool Edge IO (MCIO), Quad Small Form-Factor Pluggable Double Density (QSFP-DD), CD (400 Gb/s) Form Factor Pluggable (CDFP), Octal Small Form Factor Pluggable Module (OSFP), or Octal Small Form Factor eXtra Dense Pluggable Module (OSFP-XD); (ii) a card mounted in a CXL slot of a motherboard of a consumer; (iii) a card mounted in a CXL slot of a motherboard of a provider; or (iv) a semiconductor device comprising of at least two transceivers each capable of operating in at least one of Non-Return-to-Zero (NRZ) or 4-level Pulse Amplitude Modulation (PAM4) signaling.

In one embodiment, a method for translating between CXL protocols includes receiving a CXL.mem Master-to-Subordinate Request with Data(M2S RwD) comprising a Tag; translating the M2S RwD to a CXL.cache Device-to-Host Request (D2H Req) comprising a CQID; sending the D2H Req; receiving a CXL.cache Host-to-Device Response (H2D Rsp) comprising the CQID and a UQID; sending a CXL.mem Subordinate-to-Master No Data Response (S2 M NDR) comprising the Tag; and sending a CXL.cache Device-to-Host Data(D2H Data) message comprising the UQID.

In some embodiments, the method may further include receiving CXL.io or Peripheral Component Interconnect Express (PCIe) TLPs comprising Configuration Request TLPs; terminating the Configuration Request TLPs; wherein the M2S RwD further comprises: a *Wr* opcode, a first physical address, and *Data*; wherein the D2H Req further comprises: a *Wr* opcode, and a second physical address; wherein the H2D Rsp further comprises a *WritePull* and *GO* messages, or a combined message; wherein the S2 M NDR further comprises a *Cmp*; and wherein the D2H Data message further comprises the *Data*. Optionally, the *Wr* opcode of the M2S RwD is selected from MemWr, MemWrPt1, MemWrTEE, or MemWrPtITEE; the *Wr* opcode of the D2H Req is selected from ItoMWr or WrCur; the CXL.cache transaction requires posted semantics with a combined *GO*/*WritePull* message; and further comprising sending the S2 M NDR after receiving the *GO*/*WritePull* message. Optionally, the CXL.cache transaction requires posted semantics with a combined *GO*/*WritePull* message; and further comprising sending the S2 M NDR before receiving the *GO*/*WritePull* message. Optionally, the *Wr* opcode of the M2S RwD is selected from MemWr, MemWrPt1, MemWrTEE, or MemWrPtITEE; the *Wr* opcode of the D2H Req is selected from ItoMWr or WrCur; the CXL.cache transaction requires non-posted semantics with a *WritePull* message followed by a *GO* message; and further comprising sending the S2 M NDR after receiving the *GO* message. Optionally, the CXL.cache transaction requires non-posted semantics with a *WritePull* message followed by a *GO* message; and further comprising sending the S2 M NDR before receiving the *WritePull* message. Optionally, the CXL.cache transaction requires non-posted semantics with a *WritePull* message followed by a *GO* message; and sending the S2 M NDR after receiving the *WritePull* message and before receiving the *GO* message.

In certain embodiments, the method may further include maintaining a mapping table that associates the Tag with the CQID, and utilizing the mapping table for matching incoming CXL.cache H2D Rsp messages with pending CXL.mem M2S RwD messages. Optionally, the method may further include regulating rate of CXL.mem to CXL.cache translations based on capacity of destination CXL.cache device.

In some embodiments, the method further includes encapsulating at least one of (i) the M2S RwD and S2 M NDR, or (ii) the D2H Req, H2D Rsp, and D2H Data, for transmission over a non-CXL network protocol stack. Optionally, the method further includes dynamically selecting the non-CXL network protocol stack based on at least one of: available bandwidth, latency requirements, or network congestion. Additionally or alternatively, the method further includes encapsulating at least one of (i) the M2S RwD and S2 M NDR, or (ii) the D2H Req, H2D Rsp, and D2H Data, for transmission using one of: CXL over UET, CXL over Ethernet, or CXL over RDMA over InfiniBand. In one embodiment, a non-transitory computer-readable medium includes instructions that, when executed by a processor, cause the processor to perform the method described above.

In one embodiment, a system includes a first host; a second host; and an RPU coupled between the first host and the second host. The RPU is configured to: receive, from the first host, a CXL.mem Master-to-Subordinate Request with Data(M2S RwD) comprising a Tag; translate the M2S RwD to a CXL.cache Device-to-Host Request (D2H Req) comprising a CQID; send, to the second host, the D2H Req; receive, from the second host, a CXL.cache Host-to-Device Response (H2D Rsp) comprising the CQID and a UQID; send, to the first host, a CXL.mem Subordinate-to-Master No Data Response (S2 M NDR) comprising the Tag; and send, to the second host, a CXL.cache Device-to-Host Data(D2H Data) message comprising the UQID. Optionally, the RPU includes a CXL Type 2 or Type 3 device (EP1) coupled to the first host, a CXL Type 1 or Type 2 device (EP2) coupled to the second host, and a computer. The RPU is further configured to: receive, from the first host, CXL.io or Peripheral Component Interconnect Express (PCIe) TLPs comprising Configuration Request TLPs, and terminate the Configuration Request TLPs without sending the Configuration Request TLPs to the second host.

In one embodiment, an apparatus includes a first switch port configured to receive a CXL.mem Master-to-Subordinate Request with Data(M2S RwD) comprising a Tag; a computer configured to translate the CXL.mem M2S RwD to a CXL.cache Device-to-Host Request (D2H Req) comprising a CQID; and a second switch port configured to send the CXL.cache D2H Req, and thereafter to receive a CXL.cache Host-to-Device Response (H2D Rsp) comprising the CQID and a UQID. The first switch port is further configured to send a CXL.mem Subordinate-to-Master No Data Response (S2 M NDR) comprising the Tag; and the second switch port is further configured to send a CXL.cache Device-to-Host Data(D2H Data) message comprising the UQID. In some embodiments, the apparatus functions as a switch, and each of the first and second switch ports belong to one of: a Hierarchy Based Routing (HBR) switch port, a Port Based Routing (PBR) switch port, a VCS that comprises a single USP and one or more Downstream Switch Ports (DSPs), a Switch Interface Port, or a Switch Physical Port. Optionally, the first switch port couples the first host to a first VCS, the second switch port couples the second host to a second VCS, and the first and second VCSs are coupled via the computer.

Figure 29:
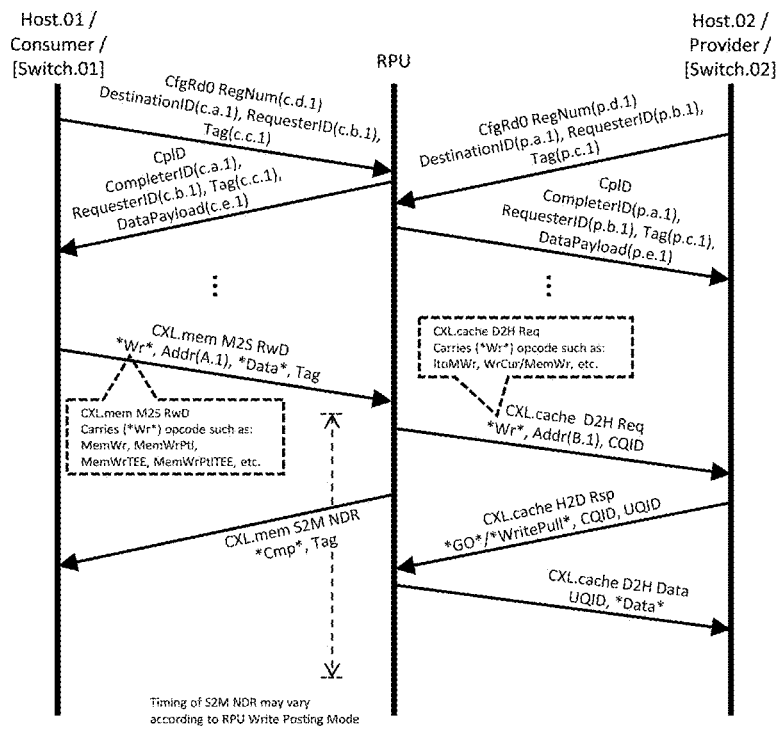
FIG. 29 illustrates one embodiment of a TFD representing possible superset combinations of write opcodes, and PCIe/CXL.io Configuration Request TLPs terminations, in a system including one or more RPUs.

FIG. 29 illustrates one embodiment of a transaction flow diagram (TFD) representing possible superset combinations of write opcodes, and PCIe/CXL.io Configuration Request TLPs terminations, in a system including one or more RPUs. The diagram illustrates the interactions between Host.01 (also referred to as Consumer or a host coupled via Switch.01), the RPU, and Host.02 (also referred to as Provider or a host coupled via Switch.02). The TED begins with terminating and blocking device configurations. For simplicity and illustrative purposes, the figure depicts a single Configuration Space access (CfgRd0 request and CplD response) to the RPU from the Consumer (in its role as Host/Root Complex) and a single Configuration Space access to the RPU from the Provider (also in its role as Host/Root Complex). However, it should be understood that typically many configuration space access cycles may occur during the enumeration, discovery, and initialization phases, and the figures are not intended to limit the number or sequencing of such accesses.

After successful initialization and configuration, Host.01 sends to the RPU, over the CXL.mem interface, an M2S RwD request message comprising *Wr* opcode, associated Addr(A.1), *Data*, and a Tag. The asterisks in *Wr* indicate that this could represent any suitable superset combination of write opcodes supported by the CXL.mem protocol, such as MemWr, MemWrTEE, MemWrTEE, Mem WrPtITEE, etc. The RPU then translates the CXL.mem M2S RwD request to a CXL.cache D2H*Wr* request, which is sent to Host.02 and includes the *Wr* opcode, Addr(Y), and CQID. The asterisks in CXL.cache D2H*Wr* indicate that this could represent any suitable superset combination of write opcodes supported by the CXL.cache protocol, such as ItoMWr, WrCur (that was called Mem Wr in CXL 1.x and CXL 2.0), etc.

Upon receipt of the D2H*Wr* request, Host.02 responds with a CXL.cache H2D Rsp message containing *GO*/*WritePull* and CQID. The asterisks in *GO*/*WritePull* indicate that this response may vary depending on the specific write operation being performed. Following this, a CXL.cache D2H Data message is sent from the RPU to Host.02, containing the CQID and *Data*. The RPU also translates the CXL.cache H2D Rsp message back to the CXL.mem protocol, sending a CXL.mem S2 M NDR *Cmp* message to Host.01. The S2 M NDR message includes the Tag and completes the write transaction flow. It is noted that the CXL.cache D2H Data message may be sent before, concurrently, or after the CXL.mem S2 M NDR message, depending on the specific implementation and system requirements.

At least some of the embodiments described herein may utilize standard CXL transactions as outlined in the relevant CXL Specification Revisions. The following non-comprehensive list of references to CXL Specification Revision 3.1 provides details of at least some of the CXL.mem transactions applicable to the embodiments, including those related to FIG. 29. These references include, for example, Section 3.3 "CXL.mem", Section 3.3.2 "CXL.mem Protocol Description", Section 3.3.6 "M2S Request with Data(RwD)", and Section 3.3.9 "S2 M No Data Response (NDR)". In embodiments where the RPU functions as a CXL Type-3 Device, relevant descriptions may be found in Section 3.6 "Flows to HDM-H in a Type 3 Device", and FIG. 3-43 "Write from Host to All HDM Regions". Alternatively, in embodiments where the RPU functions as a Type-2 Device, relevant descriptions may be found in Section 3.5.2 "Flows for Type 1 Devices and Type 2 Devices", Section 3.5.2.2 "Requests from Host", FIG. 3-32 "Example Weakly Ordered Write from Host", FIG. 3-33 "Example Write from Host with Invalid Host Caches", FIG. 3-34 "Example Write from Host with Valid Host Caches", and FIG. 3-31 "Example Flush from Host".

Furthermore, the following non-comprehensive list of references to CXL Specification Revision 3.1 describes at least some of the CXL.cache transactions that may be relevant to some of the embodiments, including but not limited to those associated with FIG. 29. These references include, for example, Section 3.2 "CXL.cache", Section 3.2.3 "CXL.cache Wire Description", Section 3.2.3.1 "D2H Request", Section 3.2.3.5 "H2D Response", Section 3.2.3.3 "D2H Data", and FIG. 3-10 "CXL.cache Channels". Additional details regarding CXL.cache transactions may be found in Section 3.2.4 "CXL.cache Transaction Description", FIG. 3-13 "CXL.cache Device to Host Write Behavior", FIG. 3-14 "CXL.cache WrInv Transaction", and Section 3.5.2 "Flows for Type 1 Devices and Type 2 Devices". It is further noted that GO and WritePull opcodes may be combined to one message or may be carried in separate messages, as defined in Section 3.2.4.2.4 "CXL.cache Write" of CXL Specification Revision 3.1. For example, if the transaction requires posted semantics, a combined *GO*/*WritePull* message (such as GO-I/WritePull) may be used. And if the transaction requires non-posted semantics, *WritePull* (such as WritePull) is issued first, followed by *GO* (such as GO-I) when the non-posted write is globally observed.

Figure 30:
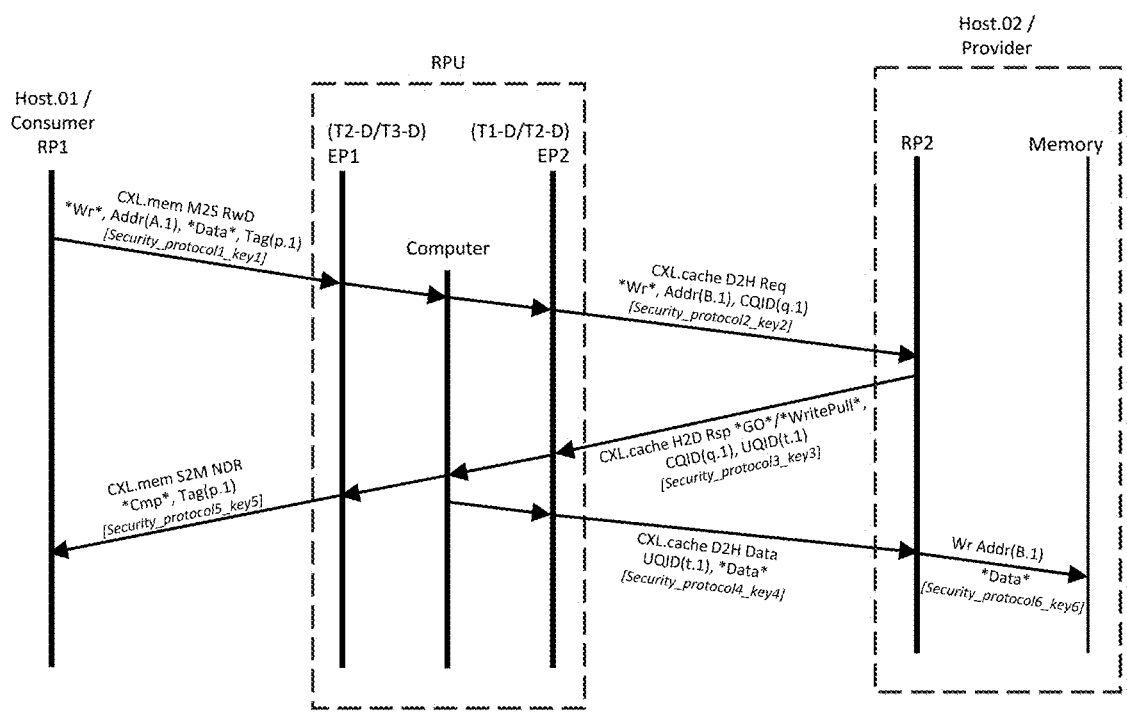
FIG. 30 illustrates an RPU that includes first and second Endpoints coupled to a consumer and a provider, respectively.

FIG. 30 illustrates an RPU that includes first and second Endpoints (EP1, EP2) coupled to a consumer and a provider, respectively. The figure also illustrates memory transactions within Host.02, and different *Data* representations using different encryption keys. Optionally, the RPU may function as a Caching-Agent, such as a modified Device Coherency agent (DCOH), in scenarios where it participates in caching coordination with the Consumer and/or the Provider.

Figure 31:
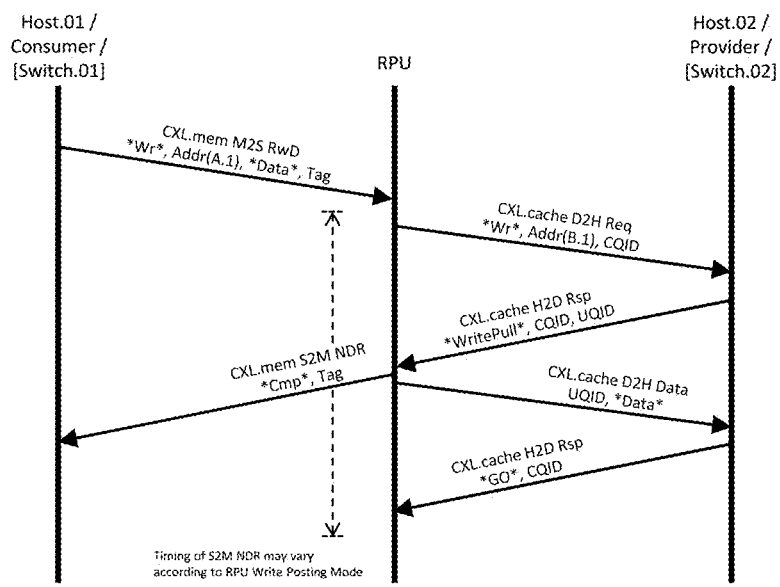
FIG. 31 illustrates one embodiment of a TFD representing possible superset combinations of write opcodes in a system comprising one or more RPUs, focusing on CXL.cache non-posted semantics.

FIG. 31 illustrates another embodiment of a TFD representing possible superset combinations of write opcodes in a system comprising one or more RPUs, focusing on CXL.cache non-posted semantics. The initial part of the transaction remains similar to FIG. 29, with Host.01 sending a CXL.mem M2S RwD request to the RPU, which then translates it to a CXL.cache D2H*Wr* request, which includes a CQID, and sends it to Host.02. Then, in this non-posted semantics scenario, upon receipt of the D2H*Wr* request, Host.02 responds with two separate CXL.cache H2D Rsp messages. The first response contains *WritePull*, the CQID, and an UQID, indicating the readiness to receive data. Following this, the RPU sends a CXL.cache D2H Data message to Host.02, containing the UQID and *Data*. In response, Host.02 sends a second CXL.cache H2D Rsp containing *GO* and the CQID to acknowledge that the write operation has been completed on the Host.02 side. The diagram illustrates the RPU sending the CXL.mem S2 M NDR *Cmp* message to Host.01 before receiving the H2D Rsp *GO* message, however it may also send the CXL.mem S2 M NDR *Cmp* message after receiving the H2D Rsp *GO* message.

The CXL Specification supports many command-opcode combinations, including those explicitly described in the specification itself, such as Table 3-22 in CXL Specification Revision 3.1, titled "CXL.cache-Device to Host Requests", which lists CXL.cache opcodes available for device-to-host requests and categorizes each opcode by its semantic as Read, Read0, Read0-Write, or Write, and Table 3-23 in CXL Specification Revision 3.1, titled "D2H Request (Targeting Non Device-attached Memory) Supported H2D Responses", which specifies the H2D response opcodes that may be associated with a given D2H request opcode when targeting non-device-attached memory. The selection of specific combinations usually depends on system requirements and is addressed in various embodiments described herein, which illustrate how specific opcodes and values may be combined to achieve particular design objectives.

Figure 32:
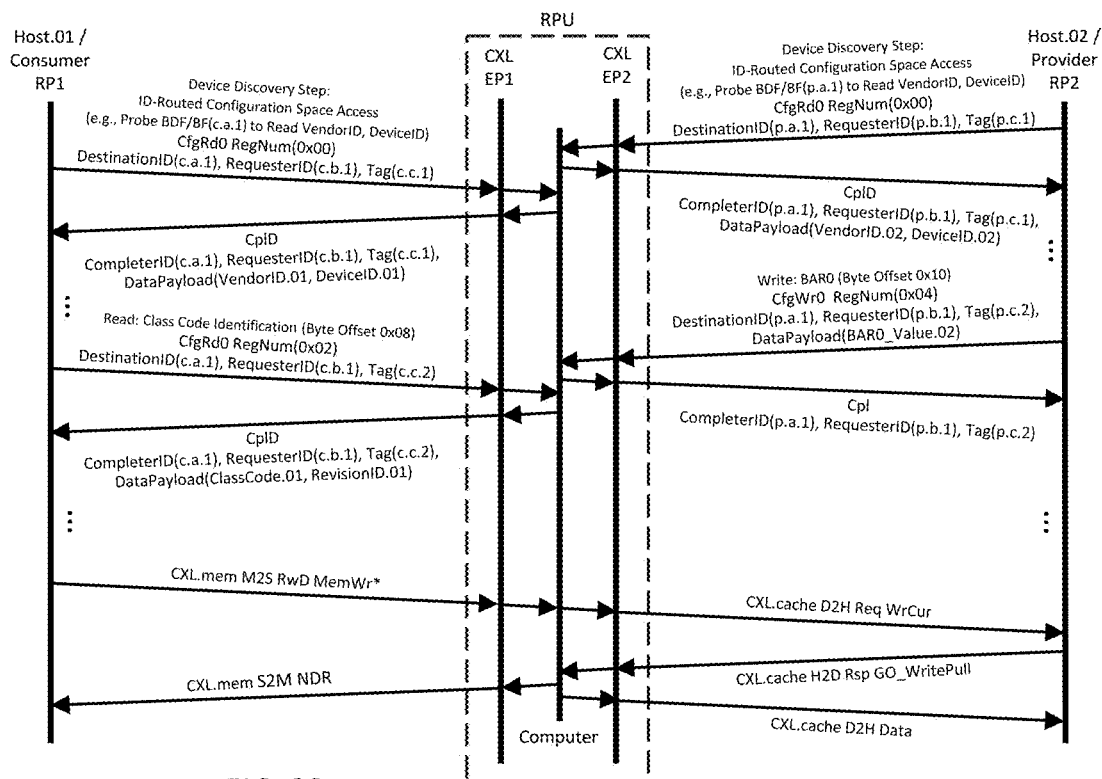
FIG. 32 illustrates one embodiment of an RPU configured to terminate Configuration Request TLPs and translate between CXL.mem and CXL.cache messages.
Figure 33:
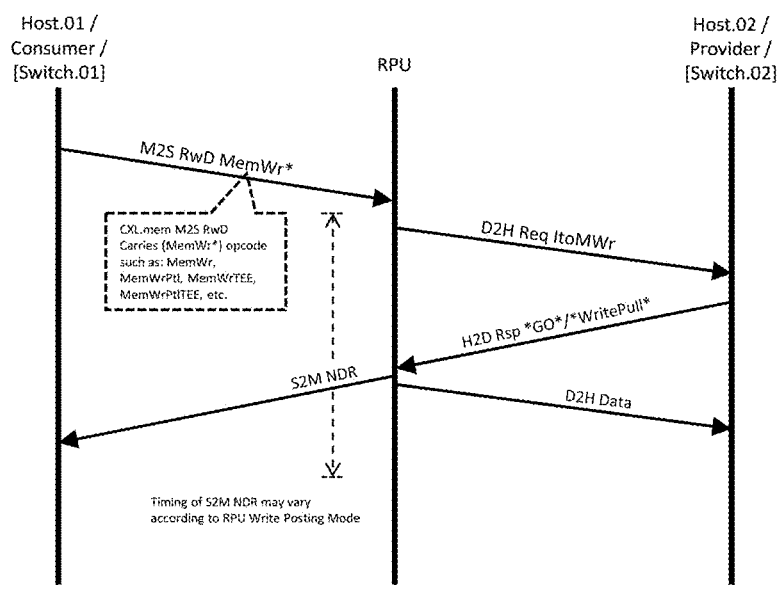
FIG. 33, FIG. 34, FIG. 35, and FIG. 36 illustrate embodiments of RPUs that translate between CXL.mem MemWr and CXL.cache ItoMWr messages.
Figure 34:
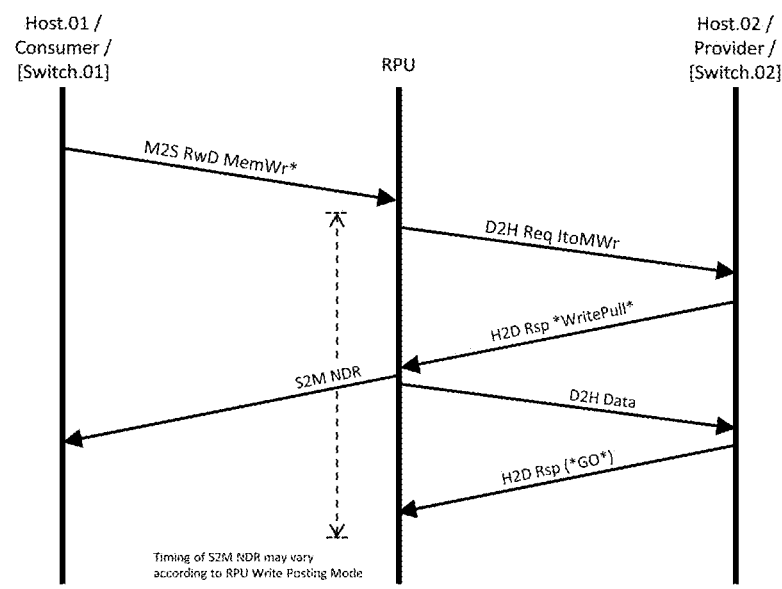
Figure 35:
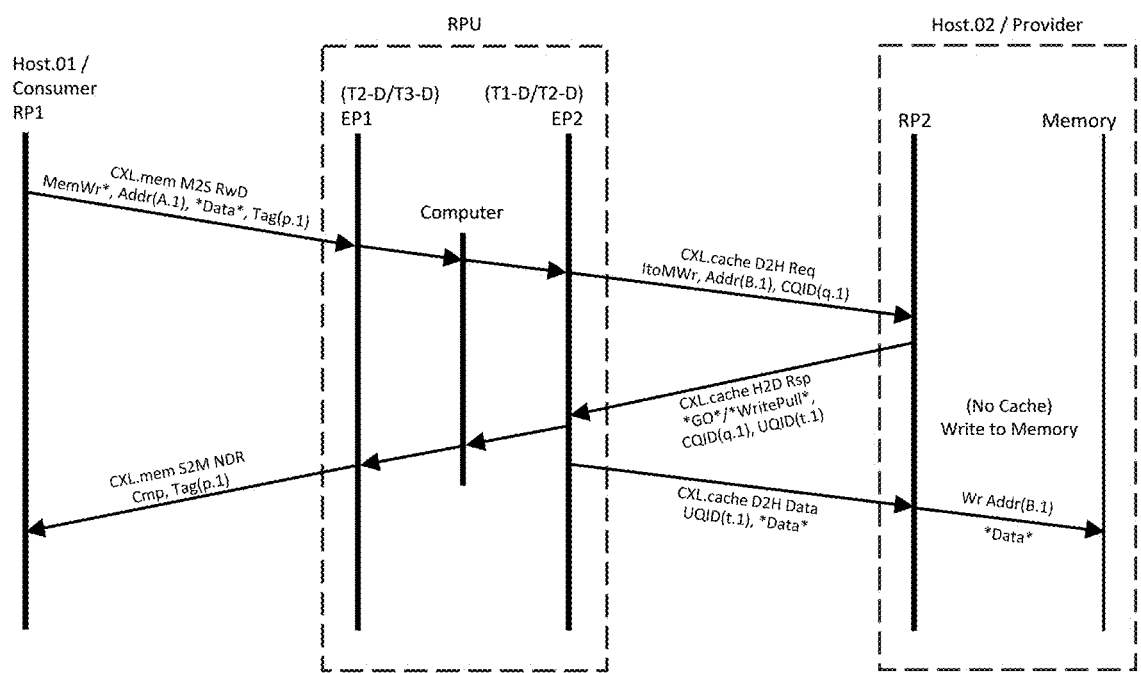
Figure 36:
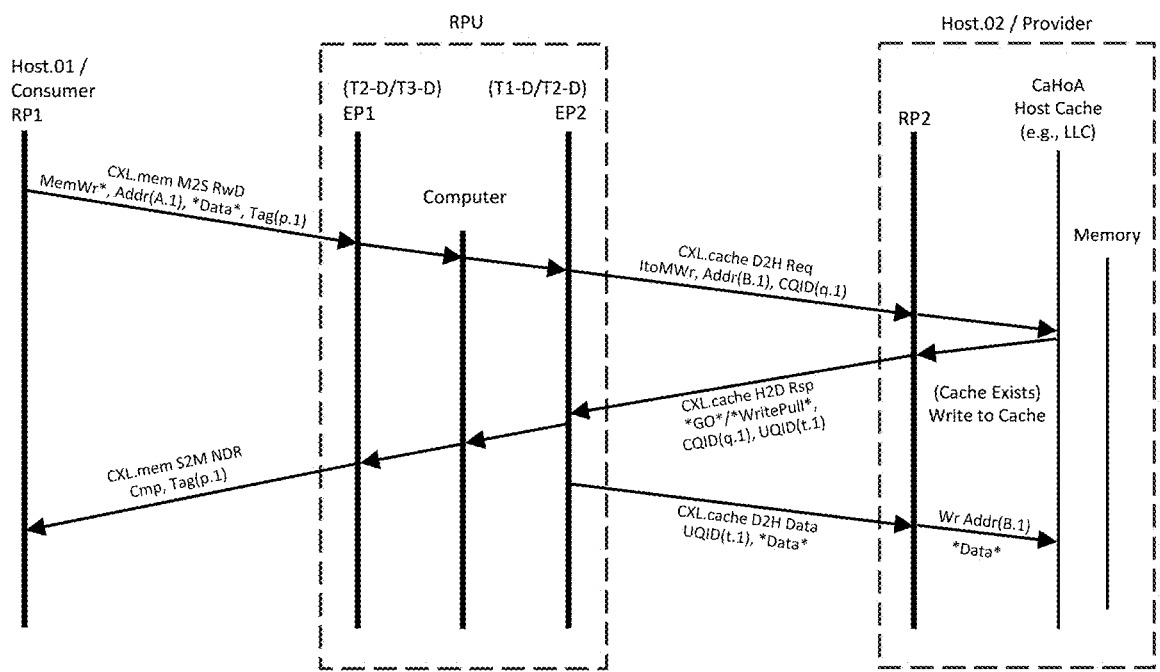

FIG. 32 illustrates one embodiment of an RPU configured to (i) terminate Configuration Request Transaction Layer Packet (TLP), and (ii) translate between CXL.mem and CXL.cache messages. As illustrated, responsive to the Provider's device discovery step, which utilizes Type 0 Configuration Read Request (CfgRd0) with Register Number 0x00, to probe Bus Device Function to Read VendorID and DeviceID, which utilizes CfgRd0 comprising Register Number 0x00, DestinationID(p.a.1), RequesterID(p.b.1), and Tag (p.c.1), the RPU responses to the Provider with CplD comprising CompleterID(p.a.1), RequesterID(p.b.1), Tag (p.c.1), and DataPayload (VendorID.02, DeviceID.02), without necessarily forwarding the CfgRd0 to the Consumer. In a similar way, responsive to the Consumer's device discovery step utilizing Configuration Space access Probe BDF/BF (c.a.1) to Read VendorID and DeviceID utilizing CfgRd0 comprising Register Number 0x00, DestinationID(c.a.1), RequesterID(c.b.1), and Tag (c.c.1), the RPU responses to the Consumer with CplD comprising CompleterID(c.a.1), RequesterID(c.b.1), Tag (c.c.1), and DataPayload (VendorID.01, DeviceID.01), without necessarily forwarding the CfgRd0 to the Provider. The Consumer further performs a Read operation of Class Code Identification (Byte Offset 0x08) utilizing CfgRd0 comprising Register Number 0x02, DestinationID(c.a.1), RequesterID (c.b.1), and Tag (c.c.2), whereupon the RPU responses with CplD comprising CompleterID(c.a.1), RequesterID(c.b.1), Tag (c.c.2), and DataPayload (ClassCode.01, RevisionID.01). The Provider performs a Write operation to BAR0 (Byte Offset 0x10) utilizing CfgWr0 comprising Register Number 0x04, DestinationID(p.a.1), RequesterID (p.b.1), Tag(p.c.2), and DataPayload (BAR0_Value.02), whereupon the RPU processes the Write operation without necessarily forwarding the CfgWr0 to the Consumer. As further illustrated, the RPU comprises a Computer coupling between CXL EP1 and CXL EP2, wherein the Computer translates the CXL.mem M2S RwD MemWr* message to the CXL.cache D2H Req WrCur message, as well as translates the received CXL.cache H2D Rsp GO_WritePull message to the CXL.mem S2 M NDR message, and replies with the CXL.cache D2H Data messages.

FIG. 33, FIG. 34, FIG. 35, and FIG. 36 illustrate embodiments of RPUs that translate between CXL.mem MemWr and CXL.cache ItoMWr messages. In implementations where Host.02 operates without a cache, the ItoMWr writes the Data to Memory. In implementations where Host.02 includes a cache, the ItoMWr should write the Data to the cache, wherein this writing to cache may occur regardless of whether the memory address targeted by the ItoMWr command corresponds to a cache hit or cache miss condition. The typical response to ItoMWr is GO_WritePull, which is sent once the request is granted ownership; and if an error occurs, then GO-Err-WritePull is sent instead.

In one embodiment, an apparatus configured to enable communication between first and second hosts includes a first CXL Endpoint configured to receive, from a first host, first messages conforming to a first CXL.io protocol and second messages conforming to a first non-CXL.io protocol. The apparatus also includes a second CXL Endpoint configured to receive, from a second host, third messages conforming to a second CXL.io protocol and fourth messages conforming to a second non-CXL.io protocol. The apparatus further includes a computer configured to terminate the first CXL.io protocol, process at least some of the first messages in a manner that does not necessitate translating and sending corresponding translated first messages to the second host, terminate the first non-CXL.io protocol, translate at least a quarter of the second messages (translated second messages), and make the translated second messages available to the second CXL Endpoint for communication with the second host.

In this embodiment and other relevant embodiments and examples, the computer may make messages available for communication via a port, Endpoint, or interface (collectively referred to as a "port") in a variety of ways, such as utilizing shared memory, buffers and queues, register-based communication, direct memory access, and/or message passing interfaces, as further discussed below. In one example, the computer and the port may share a region of memory, the computer writes the messages to the shared memory region, and the port retrieves the messages from this location. This shared memory may be implemented using various techniques such as memory-mapped regions, designated buffer areas in system RAM, or specialized hardware-based shared memory structures. Signaling mechanisms, such as interrupts or memory-mapped flags, may be employed to coordinate access and ensure data integrity. In another example, the computer may transfer the messages to the port through a buffer or queue that may be implemented in hardware, such as a FIFO buffer within a CXL interconnect, or in software, such as a circular buffer managed by an operating system or device drivers. Flow control mechanisms may be used to prevent buffer overflow and ensure reliable data transfer. In still another example, the computer may make the messages available by writing them to specific registers accessible by the port, which may reside within the port's control space or in a shared register file accessible by both the computer and the port. The act of writing to these registers may act as a signal to the port that new messages are ready for processing. Handshaking mechanisms or status bits may be used to ensure reliable communication. In yet another example, the computer may configure a direct memory access (DMA) engine to transfer the messages from the computer's memory space to a memory location accessible by the port. The computer may program the DMA controller with source and destination addresses, as well as the transfer size, and then initiates the transfer. And in still another example, standard or custom message passing interfaces (MPIs) specific to CXL or the system architecture may be used to provide a structured means of communication between the computer and the port.

Phrases such as "messages available for a port for communication with a host or device" indicate that the port is configured to utilize the messages to facilitate communication with the destination host or device. The term "communication" in this context is not limited to merely forwarding the messages in their raw form, but the port may perform various adaptations and processing steps before, or as part of, transmitting the messages to the destination. Such adaptations and processing steps may include, but are not limited to, encryption, physical modulation, packetization, header modification, data compression, and/or protocol conversion, as further discussed below. In one example, the port may encrypt the messages during transmission over a CXL link utilizing one or more known or proprietary encryption algorithms. In another example, the port may modulate the messages onto the physical layer of the CXL link for transmission. This modulation may involve converting digital data into electrical or optical signals suitable for transmission over the physical medium, where the specific modulation scheme employed may depend on the capabilities of the link and desired performance characteristics. In still another example, the port may packetize the messages according to the CXL protocol, optionally adding headers, trailers, and/or error correction codes to improve reliability. In yet another example, the port may also modify headers within the CXL messages, such as address translation or routing information, to enable proper delivery to the destination. In still another example, the port may compress the messages before transmission to improve bandwidth utilization. And in still another example, the port may act as a bridge or gateway, converting the CXL messages to conform to a different protocol suitable for communication with the destination host or device.

In some embodiments of the apparatus, the computer may be further configured to terminate the second CXL.io protocol, process at least some of the third messages in a manner that does not necessitate translating and sending corresponding translated third messages to the first host, terminate the second non-CXL.io protocol, and translate at least a quarter of the fourth messages (translated fourth messages). Additionally, in this configuration, the apparatus is further configured to send the translated fourth messages to the first host.

Figure 37:
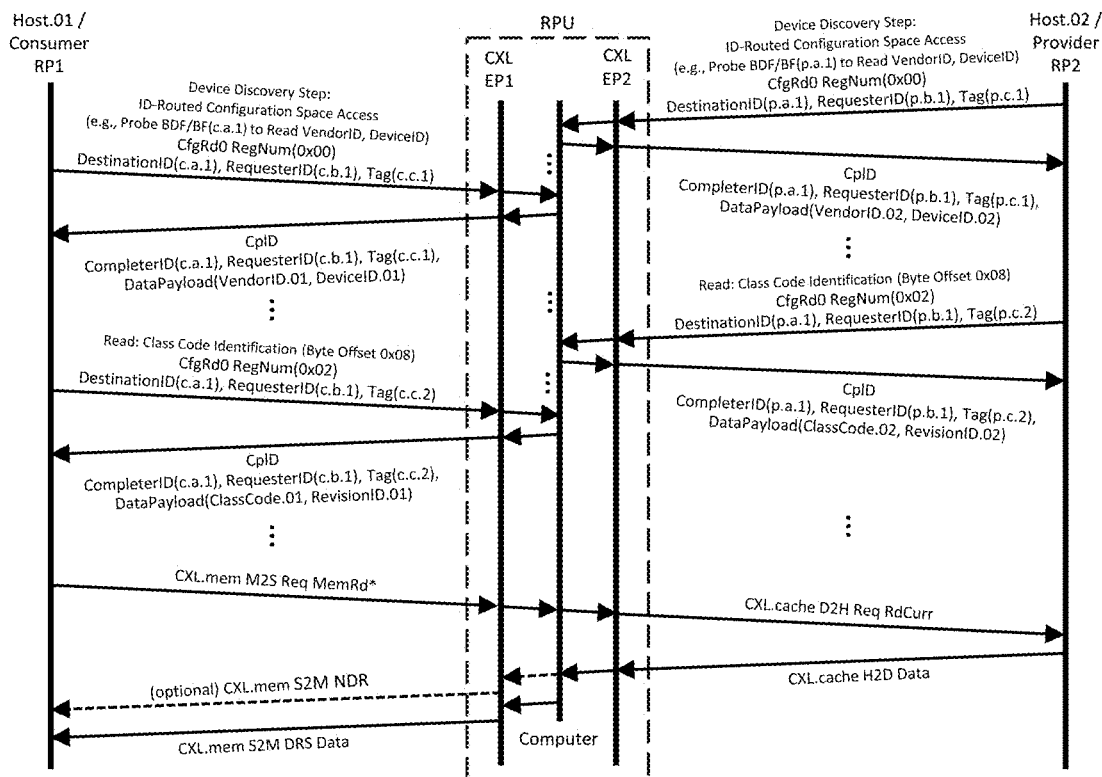
FIG. 37 and FIG. 38 illustrate examples of systems in which provider and consumer execute their initialization and configuration stages substantially independently, followed by protocol translations between CXL.mem and CXL.cache messages, and between first and second CXL.mem messages, respectively.

FIG. 37 illustrates one example of a system in which the provider and consumer execute their initialization and configuration stages substantially independently, followed by protocol translation between CXL.mem and CXL.cache messages. While the TED shows initialization steps occurring simultaneously for visual clarity, in typical implementations these stages may occur at different times, with the provider-side initialization often preceding the consumer-side initialization, though the reverse sequence also happens and possible. On the provider side, a CfgRd0 with RegNum (0x00) is sent from the provider, including DestinationID (p.a.1), RequesterID(p.b.1), and Tag(p.c.1). The RPU responds with a CplD including CompleterID(p.a.1), RequesterID(p.b.1), Tag(p.c.1), and DataPayload (VendorID.02, DeviceID.02). Then the provider proceeds with reading Class Code Identification at Byte Offset 0x08. The provider sends a CfgRd0 with RegNum (0x02), DestinationID(p.a.1), RequesterID(p.b.1), and Tag(p.c.2), receiving a CplD with CompleterID(p.a.1), RequesterID(p.b.1), Tag (p.c.2), and DataPayload (ClassCode.02, RevisionID.02). Similarly, on the consumer side, which may initialize at a different time, a CfgRd0 with RegNum (0x00) is sent from the consumer, including DestinationID(c.a.1), RequesterID (c.b.1), and Tag (c.c.1). The RPU responds with a CplD including CompleterID(c.a.1), RequesterID(c.b.1), Tag (c.c.1), and DataPayload (VendorID.01, DeviceID.01). Then the consumer similarly sends a CfgRd0 with RegNum (0x02), DestinationID(c.a.1), RequesterID(c.b.1), and Tag (c.c.2), receiving a CplD with CompleterID(c.a.1), RequesterID(c.b.1), Tag (c.c.2), and DataPayload (ClassCode.01, RevisionID.01). These initialization stages are just two examples of a larger set of initializations that may be performed by the provider and consumer. After completing these initialization stages, the RPU receives a CXL.mem M2S Req MemRd* from the consumer, and translates it to a CXL.cache D2H Req RdCurr that is sent to the provider. Upon receiving CXL.cache H2D Data from the provider, the RPU translates it to CXL.mem S2 M DRS Data that is sent to the consumer, with an optional CXL.mem S2 M NDR that may be sent before, concurrently, or after the S2 M DRS Data.

In some embodiments of the apparatus, the computer may be configured to process more than half of the first and third messages in a manner that does not necessitate the translating and sending of the corresponding translated first and third messages to the second and first hosts, respectively. Additionally, in this configuration, the computer is configured to terminate, translate, and send more than half of the second and fourth messages to the second and first hosts, respectively.

Optionally, each of the first and second non-CXL.io protocols is selected from at least one of CXL.mem protocol or CXL.cache protocol. Furthermore, in some embodiments, the process of the first messages in the manner that does not necessitate translating and sending the corresponding translated first messages to the second host enables configuring the second host to disregard some or all of the corresponding translated first messages.

The processing of the first messages in a manner that does not necessitate translating and sending the corresponding translated first messages to the second host enables various implementations and configurations of the system, wherein one such implementation may include configuring the second host to disregard some or all of the corresponding translated first messages, in case they are sent to the second host. For example, during the configuration and initialization phase of the first host-side of the RPU, the CPU of the second host-side may be configured to ignore configuration messages after it has already been configured. Additionally or alternatively, due to implementation-specific artifacts such as vendor-dependent design choices or bugs, the second host CPU may ignore configuration messages, or execute these configuration messages originated from the first host without meaningful side effects. This means that even if the first messages, or corresponding translations of the first messages, are sent to the second host, no effective harm is done to the system's operation, as the second host may be designed or configured to handle such messages in a way that maintains system stability and functionality, regardless of whether these messages are actually processed or simply disregarded by the second host's CPU. In another example, some implementations may include redundant configuration mechanisms where certain configuration messages become irrelevant after initial setup, or where the second host implements defensive programming practices that safely handle unexpected configuration requests. In other examples, the second host's operating system or device drivers may be designed with compatibility layers that automatically filter or appropriately handle configuration messages from various sources, ensuring that legacy or unexpected configuration attempts do not disrupt the system's operation. Furthermore, in multi-vendor environments, hosts may implement message handling routines that gracefully process or ignore configuration messages based on their source, timing, or content, thereby maintaining system robustness across different hardware configurations and software versions also when unnecessary messages are received.

In a similar manner, the third messages may be processed in a manner that does not necessitate translating and sending the corresponding translated third messages to the first host, wherein the first host may be configured to disregard some or all of the corresponding translated third messages if they are sent to the first host, and wherein the same principles of configuration, initialization, vendor-dependent design choices, and system robustness may apply to the processing of third messages and the first host's handling of such messages. Such techniques can maintain system stability regardless of how certain configuration messages are processed at either end of the communication path.

In some embodiments of the apparatus, the first non-CXL.io protocol is CXL.mem, and the first CXL Endpoint is further configured to communicate in parallel with the first host according to CXL.cache protocol. Optionally, the first non-CXL.io protocol comprises CXL.mem, the second non-CXL.io protocol comprises CXL.cache, the apparatus further comprises a cache, the second messages comprise CXL.mem Master-to-Subordinate Request comprising a MemRd* opcode (M2S Req MemRd*), and the translated second messages comprise CXL.cache Device-to-Host Request comprising a RdShared opcode (D2H Req RdShared).

Additionally or alternatively, the apparatus is further configured to encapsulate at least one of the first or third messages for transmission utilizing one of: CXL over UET, CXL over Ethernet, CXL over NVLink, CXL over UALink, CXL over ROCE, or CXL over RDMA over InfiniBand.

Optionally, the apparatus is further configured to encapsulate at least one of (i) the first and second messages, or (ii) the third and fourth messages for transmission utilizing one of: CXL over UET, CXL over Ethernet, CXL over NVLink, CXL over UALink, CXL over ROCE, or CXL over RDMA over InfiniBand. Encapsulation of CXL messages over non-CXL network protocol stack, combined with translation between CXL.mem and CXL.cache protocols, may extend and/or enhance CXL-based communication by overcoming physical limitations of native CXL links. This embodiment may expand the potential range and scope of CXL-based memory access, facilitating interoperability between diverse CXL devices, and potentially bridging gaps in existing system architectures. By leveraging established network protocols such as Ethernet, NVLink, UALink, or InfiniBand, the encapsulation may increase the effective range of CXL communication, enabling remote memory access and shared memory architectures across physically distributed systems. It may further enhance system flexibility, allowing for more versatile integration of different CXL-capable entities in computing environments. Depending on the chosen underlying transport protocol, there may also be opportunities to leverage higher bandwidth connections, potentially improving overall system performance and improving resource disaggregation in data centers by enabling more dynamic and efficient allocation of memory resources across different physical servers or racks, thereby optimizing resource utilization and potentially reducing hardware costs.

In some embodiments of the apparatus, the first messages comprise CXL.io or PCIe Configuration Request TLPs, and the computer is further configured to block the following configuration Read/Write Requests: CfgRd0, CfgWr0, CfgRd1, and CfgWr1. Optionally, the first messages further comprise memory TLPs, and the apparatus is further configured to send, to the second host, data indicative of at least one of the following from the memory TLPs: addresses, traffic class, or attributes. Memory Transactions are specific transaction types that involve reading from or writing to memory-mapped addresses; they can be Read Requests, Write Requests, or Atomic Operations (e.g., FetchAdd, Swap, or Compare and Swap), which are designed for direct interaction with memory space, either for transferring data or synchronization purposes. Each of these Memory Transactions is implemented using one or more TLPs. For example, a Memory Read transaction includes at least two TLPs: a Read Request TLP sent from the requester, and one or more Completion TLPs containing the requested data sent from the completer.

Memory TLPs in PCIe include fields for addresses, traffic class, and attributes. The addresses field determines the location in the memory space that the transaction will access, supporting both 32-bit and 64-bit address formats, depending on the packet type and system requirements. The Traffic Class is a 3-bit field within the TLP header that categorizes packets into one of eight possible traffic classes, which helps prioritize and manage traffic flow within the PCIe fabric, especially when multiple types of data need to be routed through the same hardware resources. The attributes field in the TLP header includes flags for relaxed ordering and no-snoop operations, which influence how the packet is handled concerning ordering rules and cache coherency.

In certain aspects of the apparatus, the computer is further configured to block more than 80% of the first and third messages after Link Layer Initialization. Optionally, the computer is configured to block essentially all terminated CXL.io packets after the Link Layer Initialization. Additionally or alternatively, the computer is configured to block all or essentially all the CXL.io packets also before completing the Link Layer Initialization.

Optionally, the first messages comprise CXL.io or PCIe Memory TLPs comprising physical addresses, and the apparatus is further configured to perform address translation from memory address space in CXL.io MRd TLP type of the first host to memory address space in CXL.io MRd TLP type of the second host. Optionally, the apparatus receives from the first host a CXL.io memory transaction, and utilizes non-transparent bridging (NTB) to enable the first host to read data, from the second host, based on mapping a physical address space window of the second host to a physical address space window of the first host via a Base Address Register (BAR). Optionally, the apparatus is further configured to: receive from the second host TLPs; terminate the TLPs; send to the first host translations of at least the following terminated TLP types: Memory Read (MRd), Memory Write (MWr), and Completion with Data (CplD); and block the following terminated TLP types: Configuration Read (CfgRd0, CfgRd1) requests, Configuration Write (CfgWr0, CfgWr1) requests, and Completion for Locked Memory Read (CplDLk).

In some embodiments, the apparatus is implemented as: (i) a card comprising at least one of the following connectors: Mini Cool Edge IO (MCIO), Quad Small Form-Factor Pluggable Double Density (QSFP-DD), CD (400 Gb/s) Form Factor Pluggable (CDFP), Octal Small Form Factor Pluggable Module (OSFP), or Octal Small Form Factor eXtra Dense Pluggable Module (OSFP-XD); (ii) a card mounted in a CXL slot of a motherboard of the first host; (iii) a card mounted in a CXL slot of a motherboard of the second host; or (iv) a semiconductor device comprising of at least two transceivers each capable of operating in at least one of Non-Return-to-Zero (NRZ) or 4-level Pulse Amplitude Modulation (PAM4) signaling.

In one embodiment, a method includes receiving, by a first CXL Endpoint from a first host, first messages conforming to a first CXL.io protocol and second messages conforming to a first non-CXL.io protocol; receiving, by a second CXL Endpoint from a second host, third messages conforming to a second CXL.io protocol and fourth messages conforming to a second non-CXL.io protocol; terminating the first CXL.io protocol; processing at least some of the first messages in a manner that does not necessitate translating and sending corresponding translated first messages to the second host; terminating the first non-CXL.io protocol; translating at least a quarter of the second messages (translated second messages); and sending the translated second messages to the second host.

In some embodiments of the method, the method further includes terminating the second CXL.io protocol; processing at least some of the third messages in a manner that does not necessitate translating and sending corresponding translated third messages to the first host; terminating the second non-CXL.io protocol; translating at least a quarter of the fourth messages (translated fourth messages); and sending the translated fourth messages to the first host. Optionally, method, each of the first and second non-CXL.io protocols is selected from at least one of CXL.mem protocol or CXL.cache protocol; wherein more than half of the first and third messages are processed in a manner that does not necessitate translating and sending corresponding translated first and third messages to the second and first hosts, respectively; and wherein more than half of the second and fourth messages are terminated, translated, and sent to the second and first hosts, respectively.

In some embodiments, the method further includes encapsulating at least one of the first or third messages for transmission utilizing one of: CXL over UET, CXL over Ethernet, CXL over NVLink, CXL over UALink, CXL over ROCE, or CXL over RDMA over InfiniBand. Alternatively, the method may include encapsulating at least one of (i) the first and second messages, or (ii) the third and fourth messages for transmission utilizing one of: CXL over UET, CXL over Ethernet, CXL over NVLink, CXL over UALink, CXL over ROCE, or CXL over RDMA over InfiniBand.

In certain embodiments of the method, the first messages include CXL.io or PCIe Configuration Request TLPs, and the method further includes blocking the following configuration Read/Write Requests: CfgRd0, CfgWr0, CfgRd1, and CfgWr1. Optionally, the first messages further include memory TLPs, and the method further includes sending, to the second host, data indicative of at least one of the following from the memory TLPs: addresses, traffic class, or attributes. Additionally or alternatively, method includes blocking more than 80% of the first and third messages after Link Layer Initialization. In some embodiments of the method, the first messages include CXL.io or PCIe Memory TLPs including physical addresses, and the method further includes performing address translation from memory address space in CXL.io MRd TLP type of the first host to memory address space in CXL.io MRd TLP type of the second host.

In some embodiments, the method further includes receiving, from the first host, a CXL.io memory transaction, and utilizing non-transparent bridging (NTB) to enable the first host to read data, from the second host, based on mapping a physical address space window of the second host to a physical address space window of the first host via a Base Address Register (BAR). In one embodiment, a non-transitory computer-readable medium includes instructions that, when executed by a processor, cause the processor to perform the method described above.

In one embodiment, an apparatus includes a first switch port configured to communicate with a first host utilizing first messages conforming to a first CXL.io protocol and second messages conforming to a first non-CXL.io protocol; wherein CXL denotes Compute Express Link; a second switch port configured to communicate with a second host utilizing third messages conforming to a second CXL.io protocol and fourth messages conforming to a second non-CXL.io protocol; and a computer configured to: terminate transactions routed to the computer and associated with the first CXL.io protocol; process at least some of the first messages in a manner that does not necessitate translating and sending corresponding translated first messages to the second host; terminate transactions routed to the computer and associated with the first non-CXL.io protocol; translate at least a quarter of the second messages (translated second messages); and make the translated second messages available to the second switch port for communication with the second host. As written above, sentences in the form of "a port/interface configured to communicate with a host/device" are to be interpreted as "a port/interface configured to support communication with a host/device", which refer to direct coupling between the port/interface and the host/device, or to indirect coupling between the port/interface and the host/device, such as via one or more switches, retimers, and/or redrivers.

In some embodiments of the apparatus, the apparatus functions as a switch, and each of the first and second switch ports belong to one of: a Hierarchy Based Routing (HBR) switch port, a Port Based Routing (PBR) switch port, a VCS that includes a single USP and one or more DSPs, a Switch Interface Port, or a Switch Physical Port. As written above, examples of HBR switch ports include: HBR Upstream Switch Port (HBR USP) connecting towards a host or root complex, and HBR Downstream Switch Port (HBR DSP) connecting towards CXL devices or other switches in the downstream direction. Examples of PBR switch ports include: PBR Upstream Switch Port (PBR USP) connecting towards a host or root complex, PBR Downstream Switch Port (PBR DSP) connecting towards CXL devices or other switches in the downstream direction, PBR Fabric Port (PBR FPort) connecting to other PBR switches in the fabric, PBR Edge Switch Port at the edge of the PBR fabric to interface between the PBR fabric and non-PBR components, and PBR Inter-Switch Link Port connecting PBR switches to each other within the fabric.

In some embodiments, the first switch port couples the first host to a first VCS, the second switch port couples the second host to a second VCS, and the first and second VCSs are coupled via the computer. In some embodiments of the apparatus, the first messages include CXL.io or PCIe Configuration Request TLPs, and the computer is further configured to block the following configuration Read/Write Requests: CfgRd0, CfgWr0, CfgRd1, and CfgWr1, or, alternatively, further configured to support Configuration Requests as a Completer for at least the following configuration Read/Write Requests: CfgRd0 and CfgWr0.

In one embodiment, an apparatus configured to enable communication between a host and a device includes a CXL Endpoint configured to receive, from a host, first messages conforming to a first CXL.io protocol and second messages conforming to a first non-CXL.io protocol. The apparatus further includes a CXL Root Port configured to receive, from a device, third messages conforming to a second CXL.io protocol and fourth messages conforming to a second non-CXL.io protocol. Additionally, the apparatus includes a computer configured to: terminate the first CXL.io protocol; process at least some of the first messages in a manner that does not necessitate translating and sending corresponding translated first messages to the device; terminate the first non-CXL.io protocol; translate at least a quarter of the second messages (translated second messages); and make the translated second messages available to the CXL Root Port for communication with the device.

In some embodiments of the apparatus, the computer is further configured to: terminate the second CXL.io protocol, process at least some of the third messages in a manner that does not necessitate translating and sending corresponding translated third messages to the host, terminate the second non-CXL.io protocol, translate at least a quarter of the fourth messages (translated fourth messages), and send the translated fourth messages to the host. Optionally, the computer is configured to process more than half of the first and third messages in a manner that does not necessitate translating and sending corresponding translated first and third messages to the device and host, respectively; and wherein the computer is configured to terminate, translate, and send more than half of the second and fourth messages to the device and host, respectively. Optionally, each of the first and second non-CXL.io protocols is selected from at least one of CXL.mem protocol or CXL.cache protocol. Optionally, the first non-CXL.io protocol is CXL.mem, and the CXL Endpoint is further configured to communicate in parallel with the first host according to CXL.cache protocol.

Figure 38:
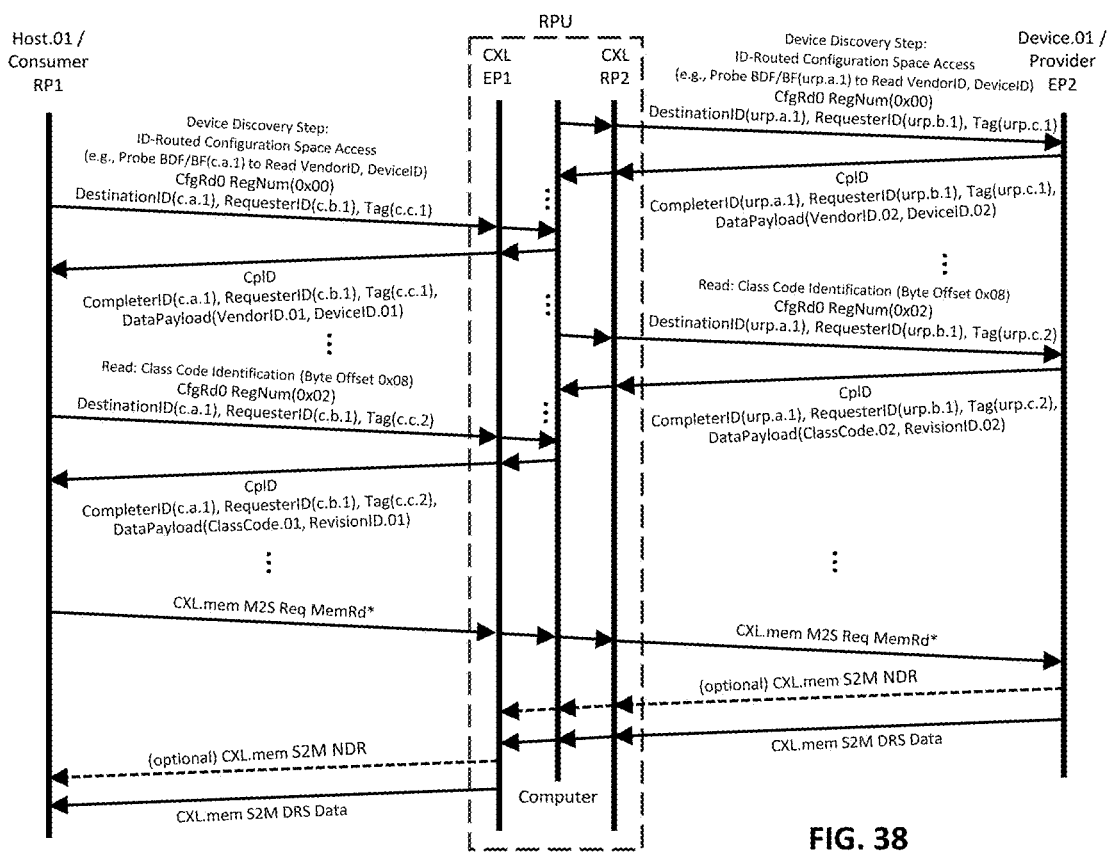

In some embodiments, the first and second non-CXL.io protocols are CXL.mem, and the computer is further configured to translate between respective host physical addresses and Tags utilized by messages conforming to the first and second CXL.mem protocols. FIG. 38 illustrates one example of a system in which the provider (Device.01) and consumer (Host.01) execute their initialization and configuration stages substantially independently, followed by protocol translation between CXL.mem messages. While the TED shows initialization steps occurring simultaneously for visual clarity, in typical implementations these stages may occur at different times, with the provider-side initialization often preceding the consumer-side initialization, though the reverse sequence also occurs. On the provider side, the RPU sends to the Device.01 a CfgRd0 including RegNum (0x00), DestinationID(urp.a.1), RequesterID(urp.b.1), and Tag (urp.c.1). The Device.01 responds with a CplD including CompleterID(urp.a.1), RequesterID(urp.b.1), Tag(urp.c.1), and DataPayload (VendorID.02, DeviceID.02). Then the RPU proceeds with reading Class Code Identification at Byte Offset 0x08. The RPU sends to the Device.01 a CfgRd0 including RegNum (0x02), DestinationID(urp.a.1), RequesterID(urp.b.1), and Tag (urp.c.2). The Device.01 responds with a CplD including CompleterID(urp.a.1), RequesterID (urp.b.1), Tag (urp.c.2), and DataPayload (ClassCode.02, RevisionID.02). Similarly, on the consumer side, which may initialize at a different time, a CfgRd0 including RegNum (0x00) is sent, from the consumer to the RPU's CXL EP1, including DestinationID(c.a.1), RequesterID(c.b.1), and Tag (c.c.1). The RPU responds with a CplD including CompleterID(c.a.1), RequesterID(c.b.1), Tag (c.c.1), and DataPayload (VendorID.01, DeviceID.01). Then the consumer similarly sends a CfgRd0 including RegNum (0x02), DestinationID(c.a.1), RequesterID(c.b.1), and Tag (c.c.2). The RPU responds with a CplD including CompleterID (c.a.1), RequesterID(c.b.1), Tag (c.c.2), and DataPayload (ClassCode.01, RevisionID.01). These initialization stages are just two examples of a larger set of initializations that may be performed by the provider and consumer. After completing these initialization stages, the RPU receives a CXL.mem M2S Req MemRd* from the consumer, and forwards it to the device. Upon receiving CXL.mem S2 M DRS Data from the device, the RPU forwards it to the consumer, with an optional CXL.mem S2 M NDR that may be sent before, concurrently, or after the S2 M DRS Data.

In some embodiments, the apparatus is further configured to encapsulate at least one of the first or third messages for transmission utilizing one of: CXL over UET, CXL over Ethernet, CXL over NVLink, CXL over UALink, CXL over ROCE, or CXL over RDMA over InfiniBand. Optionally, the apparatus is further configured to encapsulate at least one of (i) the first and second messages, or (ii) the third and fourth messages for transmission utilizing one of: CXL over UET, CXL over Ethernet, CXL over NVLink, CXL over UALink, CXL over ROCE, or CXL over RDMA over InfiniBand.

In some embodiments of the apparatus, the first messages include CXL.io or PCIe Configuration Request TLPs, and the computer is further configured to block the following configuration Read/Write Requests: CfgRd0, CfgWr0, CfgRd1, and CfgWr1. Optionally, the first messages further include memory TLPs, and the apparatus is further configured to send, to the device, data indicative of at least one of the following from the memory TLPs: addresses, traffic class, or attributes. Additionally or alternatively, the computer may be further configured to block more than 80% of the first and third messages after Link Layer Initialization. Optionally, the first messages include CXL.io or PCIe Memory TLPs including physical addresses, and the apparatus is further configured to perform address translation from memory address space in CXL.io MRd TLP type of the host to memory address space in CXL.io MRd TLP type of the device.

In some embodiments, the apparatus is further configured to receive, from the host, a CXL.io memory transaction, and to utilize non-transparent bridging (NTB) to enable the host to read data, from the device, based on mapping a physical address space window assigned to the device by the computer to a physical address space window of the host via a Base Address Register (BAR). In other embodiments, the apparatus is further configured to: receive from the device TLPs; terminate the TLPs; send to the host translations of at least the following terminated TLP types: Memory Read (MRd), Memory Write (MWr), and Completion with Data (CplD); and block the following terminated TLP types: Configuration Read (CfgRd0, CfgRd1) requests, Configuration Write (CfgWr0, CfgWr1) requests, and Completion for Locked Memory Read (CplDLk). And in some embodiments, the apparatus is implemented as: (i) a card including at least one of the following connectors: Mini Cool Edge IO (MCIO), Quad Small Form-Factor Pluggable Double Density (QSFP-DD), CD (400 Gb/s) Form Factor Pluggable (CDFP), Octal Small Form Factor Pluggable Module (OSFP), or Octal Small Form Factor eXtra Dense Pluggable Module (OSFP-XD); (ii) a card mounted in a CXL slot of a motherboard of the host; (iii) a card mounted in a CXL slot of a motherboard of the device; or (iv) a semiconductor device including of at least two transceivers each capable of operating in at least one of Non-Return-to-Zero (NRZ) or 4-level Pulse Amplitude Modulation (PAM4) signaling.

In one embodiment, a method includes receiving, by a CXL Endpoint from a host, first messages conforming to a first CXL.io protocol and second messages conforming to a first non-CXL.io protocol; receiving, by a CXL Root Port from a device, third messages conforming to a second CXL.io protocol and fourth messages conforming to a second non-CXL.io protocol; terminating the first CXL.io protocol; processing at least some of the first messages in a manner that does not necessitate translating and sending corresponding translated first messages to the device; terminating the first non-CXL.io protocol; translating at least a quarter of the second messages (translated second messages); and sending the translated second messages to the device.

In some embodiments of the method, the method further includes terminating the second CXL.io protocol; processing at least some of the third messages in a manner that does not necessitate translating and sending corresponding translated third messages to the host; terminating the second non-CXL.io protocol; translating at least a quarter of the fourth messages (translated fourth messages); and sending the translated fourth messages to the host. In certain aspects of the method, each of the first and second non-CXL.io protocols is selected from at least one of CXL.mem protocol or CXL.cache protocol; wherein more than half of the first and third messages are processed in a manner that does not necessitate translating and sending corresponding translated first and third messages to the device and host, respectively; and wherein more than half of the second and fourth messages are terminated, translated, and sent to the device and host, respectively.

In some embodiments, the method further includes encapsulating at least one of the first or third messages for transmission utilizing one of: CXL over UET, CXL over Ethernet, CXL over NVLink, CXL over UALink, CXL over ROCE, or CXL over RDMA over InfiniBand. Additionally or alternatively, the method may include encapsulating at least one of (i) the first and second messages, or (ii) the third and fourth messages for transmission utilizing one of: CXL over UET, CXL over Ethernet, CXL over NVLink, CXL over UALink, CXL over ROCE, or CXL over RDMA over InfiniBand.

In certain embodiments of the method, the first messages include CXL.io or PCIe Configuration Request TLPs, and the method further includes blocking the following configuration Read/Write Requests: CfgRd0, CfgWr0, CfgRd1, and CfgWr1. Optionally, the first messages further include Memory TLPs, and the method further includes sending, to the device, data indicative of at least one of the following from the memory TLPs: addresses, traffic class, or attributes. Optionally, the method further includes blocking more than 80% of the first and third messages after Link Layer Initialization. Optionally, the first messages include CXL.io or PCIe Memory TLPs including physical addresses, and the method further includes performing address translation from memory address space in CXL.io MRd TLP type of the host to memory address space in CXL.io MRd TLP type of the device.

In some embodiments, the method further includes receiving, from the host, a CXL.io memory transaction, and utilizing non-transparent bridging (NTB) to enable the host to read data, from the device, based on mapping a physical address space window assigned to the device by the computer to a physical address space window of the host via a Base Address Register (BAR). In other embodiments, a non-transitory computer-readable medium includes instructions that, when executed by a processor, cause the processor to perform the method described above.

In one embodiment, an apparatus includes a first switch port configured to communicate with a host utilizing first messages conforming to a first CXL.io protocol and second messages conforming to a first non-CXL.io protocol; wherein CXL denotes Compute Express Link; a second switch port configured to communicate with a device utilizing third messages conforming to a second CXL.io protocol and fourth messages conforming to a second non-CXL.io protocol; and a computer configured to: terminate transactions routed to the computer and associated with the first CXL.io protocol; process at least some of the first messages in a manner that does not necessitate translating and sending corresponding translated first messages to the device; terminate transactions routed to the computer and associated with the first non-CXL.io protocol; translate at least a quarter of the second messages (translated second messages); and make the translated second messages available to the second switch port for communication with the device.

In some embodiments of the apparatus, the apparatus functions as a switch, and each of the first and second switch ports belong to one of: a Hierarchy Based Routing (HBR) switch port, a Port Based Routing (PBR) switch port, a VCS that includes a single USP and one or more DSPs, a Switch Interface Port, or a Switch Physical Port. Optionally, the first switch port couples the host to a first VCS, the second switch port couples the device to a second VCS, and the first and second VCSs are coupled via the computer. Optionally, the first messages include CXL.io or PCIe Configuration Request TLPs, and the computer is further configured to block the following configuration Read/Write Requests: CfgRd0, CfgWr0, CfgRd1, and CfgWr1, or, alternatively, further configured to support Configuration Requests as a Completer for at least the following configuration Read/Write Requests: CfgRd0 and CfgWr0.

Figure 39:
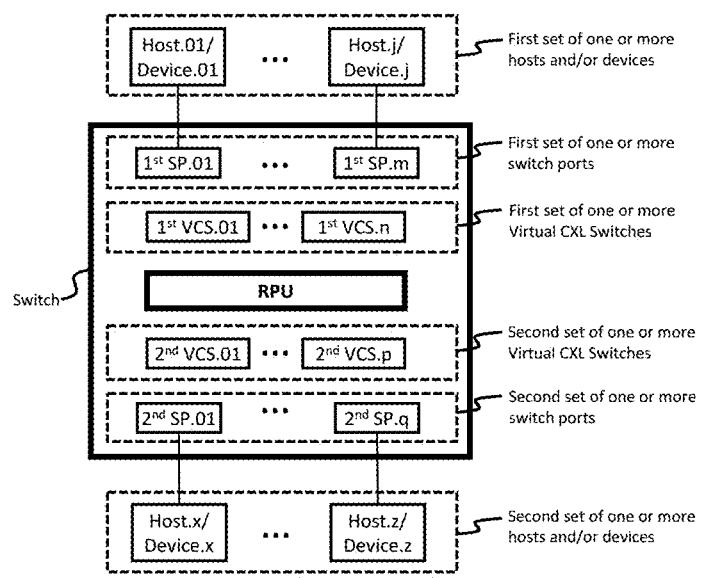
FIG. 39 illustrates one embodiment of a switch.

FIG. 39 illustrates one embodiment of a switch, including a first set of one or more switch ports (denoted as 1st SP.01 to 1st SP.m) configured to couple a first set of one or more hosts and/or devices (not included in the switch, denoted as Host.01/Device.01 to Host.j/Device.j) with a first set of one or more Virtual CXL Switches (denoted as 1st VCS.01 to 1st VCS.n). The switch further includes a second set of one or more switch ports (denoted as 2nd SP.01 to 2nd SP.q) configured to couple a second set of one or more hosts and/or devices (not included in the switch, denoted as Host.x/Device.x to Host.z/Device.z) with a second set of one or more Virtual CXL Switches (denoted as 2nd VCS.01 to 2nd VCS.p). The switch additionally includes an RPU configured to couple at least some of the first set of VCSs with at least some of the second set of VCSs, wherein the RPU facilitates CXL.mem and/or CXL.cache communications between at least one host and/or device from the first set of hosts and/or devices and at least one host and/or device from the second set of hosts and/or devices.

In one embodiment, a switch includes a first switch port configured to couple a first host to a first VCS; a second switch port configured to couple a second host to a second VCS; and an RPU configured to route CXL messages between the first and second VCSs. In some embodiments of the switch, the RPU is further configured to apply protocol termination to at least one of CXL.mem protocol or CXL.cache protocol associated with the CXL messages. Optionally, each of the first and second switch ports belongs to one of the following: a Hierarchy Based Routing (HBR) switch port, a Port Based Routing (PBR) switch port, a VCS that includes a single USP and one or more DSPs, a Switch Interface Port, or a Switch Physical Port. Optionally, responsive to receiving, from the second host, a CXL.cache Host-to-Device Req including a Snp* opcode (H2D Req Snp*), the switch is configured to send, to the second host, a CXL.cache Device-to-Host Resp including a RspIHitI opcode (D2H Resp RspIHitI).

In another embodiment, a switch includes first and second switch ports; a first VCS configured to route messages, conforming to a first CXL protocol, from the first switch port to an RPU; a second VCS configured to route messages, conforming to a second CXL protocol, from the RPU to the second switch port; and wherein the RPU is configured to: terminate the first and second CXL protocols, and translate at least some of the messages conforming to the first CXL protocol to at least some of the messages conforming to the second CXL protocol.

In some embodiments of the switch, each of the first and second VCSs includes entities belonging to a single Virtual Hierarchy, and the RPU is further configured to translate at least some of the messages conforming to the second CXL protocol to at least some of the messages conforming to the first CXL protocol.

In some embodiments of the switch, the first CXL protocol includes CXL.mem; the second CXL protocol includes CXL.cache; and the RPU is configured to: manage snoop and invalidation message flows required by the CXL.cache protocol, and maintain transaction order requirements specific to each protocol. Optionally, the RPU may be configured to handle protocol translation between CXL.mem in a first VCS and CXL.cache in a second VCS, wherein the RPU may receive memory access messages (such as reads and writes) from the first VCS that follow CXL.mem protocol rules and may transform these messages into corresponding cache coherent memory access messages that comply with CXL.cache protocol requirements for the second VCS. The RPU may further manage the additional message flows required by CXL.cache protocol, which may include generating appropriate snoop messages and handling invalidation flows that are not present in CXL.mem but are required for maintaining cache coherency in the second VCS. Additionally, the RPU may ensure that transaction ordering rules specific to each protocol are maintained, which may involve buffering or reordering messages as needed to satisfy both CXL.mem and CXL.cache ordering requirements.

Optionally, during enumeration and/or initialization, the RPU is configured to: present Host-Managed Device Memory (HDM) Decoder Capability Structures to hosts connected via the first VCS; present Cache Memory Capability Structures to hosts connected via the second VCS; and maintain separate sets of Configuration Spaces for each virtual PCIe-to-PCIe bridge (vPPB) it is coupled to in each VCS. Optionally, during system enumeration and/or initialization the RPU may manage different sets of capability reporting requirements for each VCS, wherein the RPU may present HDM Decoder Capability Structures to hosts that connect through the first VCS operating under CXL.mem protocol, while simultaneously presenting Cache Memory Capability Structures to hosts that connect through the second VCS operating under CXL.cache protocol. The RPU may maintain separate sets of Configuration Spaces for each vPPB it is coupled to in each VCS, which may allow the RPU to appear to its connected host as one or more native protocol Endpoints with appropriate capability structures, registers, and configuration options for that specific protocol, even though the RPU translates messages communicated between the VCSs.

In some embodiments of the switch, the RPU is configured to: manage completion flows for memory transactions between protocols; maintain protocol-specific message order requirements during translation; and ensure transaction completion status is properly conveyed between VCSs. Optionally, the RPU may be configured to manage transaction completion handling across different CXL protocols, wherein memory transactions initiated in one protocol context may need to be properly completed in another protocol context with different requirements. The RPU may maintain protocol-specific message ordering requirements during translation between CXL.mem and CXL.cache protocols, which may involve ensuring that transactions are processed in an order that satisfies both protocols' requirements simultaneously. Furthermore, the RPU may ensure that transaction completion status is properly conveyed between VCSs, which may include translating completion messages and status indicators from one protocol's format to another while maintaining all necessary information about transaction success or failure.

In some embodiments of the switch, the routed messages conforming to the first and second CXL protocols include different opcodes and different physical addresses. Optionally, the first switch port is a USP, and the second switch port is a downstream switch port (DSP); and wherein the switch is further configured to implement a first virtual to physical binding between the USP and the first VCS, and to implement a second virtual to physical binding between the RPU and the second VCS. Optionally, the computer is configured to implement a third virtual to physical binding between the second VCS and the DSP, the USP is coupled to a Root Port, and the DSP is coupled to an Endpoint.

In some embodiments, the first and second switch ports are first and second upstream switch ports (USPs), respectively; and wherein the switch is further configured to implement a first virtual to physical binding between the first USP and the first VCS, and to implement a second virtual to physical binding between the second USP and the second VCS. Optionally, the first and second USPs are coupled to first and second Root Ports, respectively, and the switch is further configured to implement a third virtual to physical binding between the RPU and the first VCS, and to implement a fourth virtual to physical binding between the RPU and the second VCS.

Additionally or alternatively, the first switch port is a USP, the second switch port is a DSP, the USP is coupled to the first VCS without a virtual to physical binding, and the DSP is coupled to the second VCS via a virtual to physical binding. Optionally, the first VCS is further configured to route messages, conforming to the first CXL protocol, from the RPU to the first switch port, the second VCS is further configured to route messages, conforming to the second CXL protocol, from the second switch port to the RPU, and the RPU is further configured to translate at least some of the messages conforming to the second CXL protocol to at least some of the messages conforming to the first CXL protocol. And optionally, each of the first and second VCSs includes an upstream virtual PCIe-to-PCIe bridge (vPPB) coupled to one or more downstream vPPBs, the first and second VCSs are Single VCSs configured to communicate with first and second hosts, respectively, and whereby the translation of the at least some of the messages enables communication between the first and second hosts.

In one embodiment, a method includes routing, by a first VCS from a first switch port to an RPU, messages conforming to a first CXL protocol; routing, by a second VCS from the RPU to a second switch port, messages conforming to a second CXL protocol; terminating the first and second CXL protocols; and translating at least some of the messages conforming to the first CXL protocol to at least some of the messages conforming to the second CXL protocol.

Optionally, the method further includes routing, by the first VCS from the RPU to the first switch port, messages conforming to the first CXL protocol; routing, by the second VCS from the second switch port to the RPU, messages conforming to the second CXL protocol; and translating at least some of the messages conforming to the second CXL protocol to at least some of the messages conforming to the first CXL protocol. Additionally or alternatively, the first and second switch ports are coupled to first and second hosts, respectively, and the method further includes presenting, by the RPU during enumeration and/or initialization, different Configuration Spaces to the first and second hosts.

In one embodiment, a system includes a first host coupled to a first switch port; a second host or a device coupled to a second switch port; a first VCS configured to route messages conforming to a first CXL protocol and communicated via the first switch port; a second VCS configured to route messages conforming to a second CXL protocol and communicated via the second switch port; and an RPU configured to: terminate the first and second CXL protocols, and translate at least some of the messages conforming to the first CXL protocol to at least some of the messages conforming to the second CXL protocol.

In some embodiments of the system, the first CXL protocol includes CXL.mem, the second CXL protocol includes CXL.cache, and the RPU is further configured to: manage snoop and invalidation message flows required by the CXL.cache protocol, and maintain transaction order requirements specific to each protocol. Optionally, during enumeration and/or initialization, the RPU is further configured to: present Host-Managed Device Memory (HDM) Decoder Capability Structures to the first host connected via the first VCS, present Cache Memory Capability Structures to hosts connected via the second VCS, and maintain separate sets of Configuration Spaces for each virtual PCIe-to-PCIe bridge (vPPB) it is coupled to in each VCS. Optionally, the RPU is configured to: manage completion flows for memory transactions between protocols, maintain protocol-specific message ordering requirements during translation, and ensure transaction completion status is properly conveyed between VCSs. Optionally, the routed messages conforming to the first and second CXL protocols include different opcodes and different physical addresses.

In some embodiments of the system, the second switch port is coupled to the device, the first switch port is a USP, and the second switch port is a DSP; and wherein the computer is further configured to implement a first virtual to physical binding between the USP and the first VCS, and implement a second virtual to physical binding between the RPU and the second VCS.

In some embodiments, the second switch port is coupled to the second host, and the first and second switch ports are first and second upstream switch ports (USPs), respectively; and wherein the computer is further configured to implement a first virtual to physical binding between the first USP and the first VCS, and implement a second virtual to physical binding between the second USP and the second VCS. Optionally, the first and second USPs are coupled to first and second Root Ports of the first and second hosts respectively, and the computer is further configured to implement a third virtual to physical binding between the RPU and the first VCS, and implement a fourth virtual to physical binding between the RPU and the second VCS.

In some embodiments, each of the first and second VCSs includes entities belonging to a single Virtual Hierarchy, and the RPU is further configured to translate at least some of the messages conforming to the second CXL protocol to at least some of the messages conforming to the first CXL protocol. In some embodiments of the system, the first switch port is a USP, the second switch port is a DSP, the USP is coupled to the first VCS without a virtual to physical binding, and the DSP is coupled to the second VCS via a virtual to physical binding.

Figure 40A:
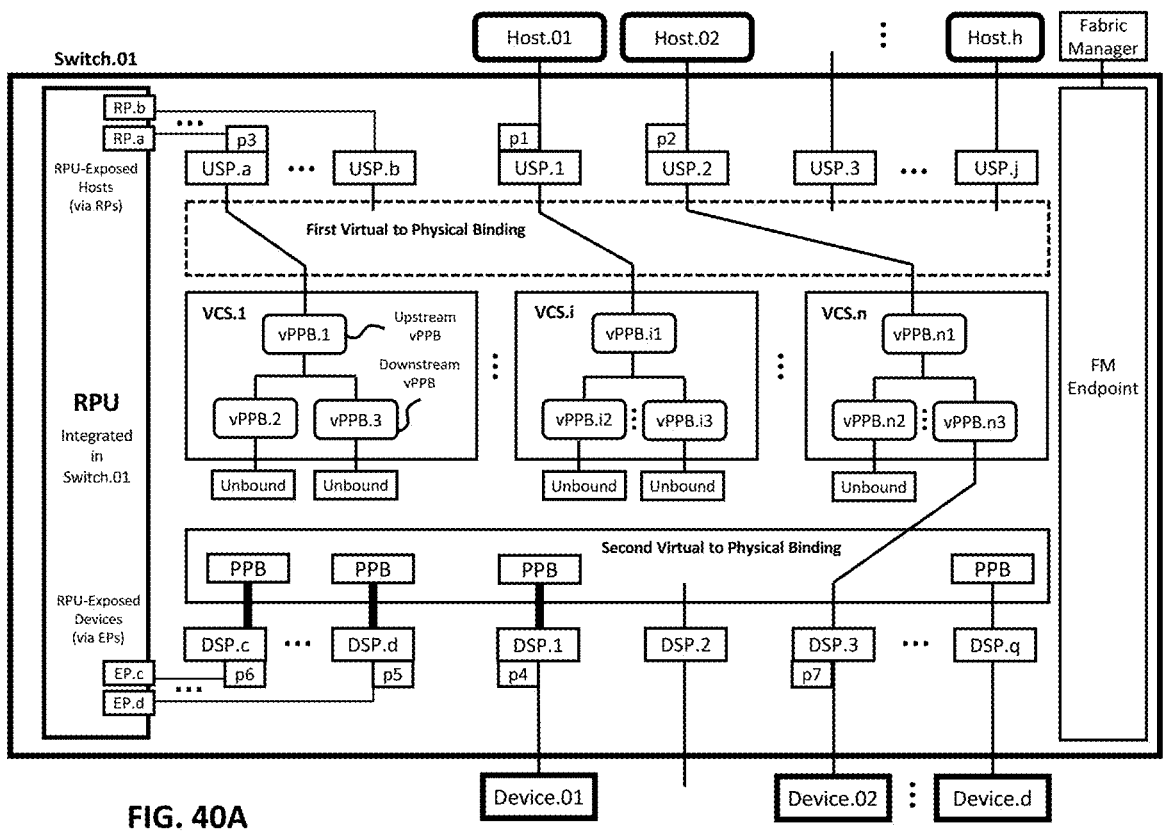
FIG. 40A illustrates an example of initial state for the process described in FIG. 40B through FIG. 40G.

FIG. 40A illustrates one example of an initial state for a process described in FIG. 40B through FIG. 40F, involving the binding of an RPU integrated within Switch.01. In this configuration, Host.01 through Host.h are coupled to Switch.01 physical ports identified as USP.1 through USP.j, Device.01 through Device.d are coupled to Switch.01 physical ports identified as DSP.1 through DSP.q, the RPU is coupled to the upstream vPPBs via RP.a and RP.b, and the RPU is coupled to the downstream vPPBs via EP.c and EP.d. The illustrated p1-p7 represent Port ID (sometime also referred to as Physical Port ID) that identify the physical ports, such as the port ID used for FM Bind command sent to a switch, or the port ID used with Get Physical Port State command (Opcode 5101h). Devices that are not bind to vPPB are coupled to PPB, where PPB refers to PCI-to-PCI Bridge inside a CXL switch that is FM-owned, and vPPB refers to Virtual PCI-to-PCI Bridge inside a CXL switch that is host-owned.

Figure 40B:
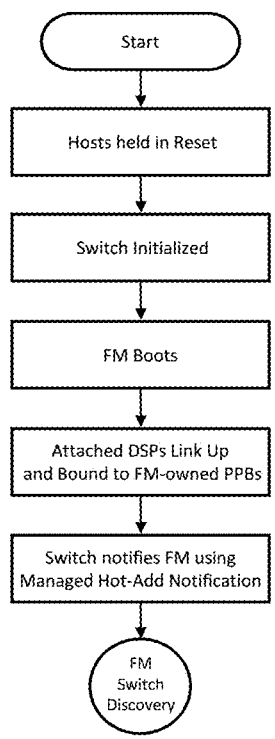
FIG. 40B, FIG. 40C, FIG. 40D, FIG. 40E, and FIG. 40F illustrate examples of processes for configuring a switch.

FIG. 40B illustrates one example of a process starting while Host.01 to Host.h are held in reset. The Switch.01 is initialized from a state, which corresponds to the state illustrated in FIG. 40A, wherein Host.01 is coupled to Switch Port (p1) configured as USP (USP.1, which is bound to (vPPB.i1) of (VCS.i). Host.02 is coupled to Switch Port (p2) configured as USP (USP.2), which is bound to (vPPB.n1) of (VCS.n). RPU Host (RP.a) is coupled to Switch Port (p3) configured as USP (USP.a), which is bound to (vPPB.1) of (VCS.1). Device.01 is coupled to Switch Port (p4) configured as DSP (DSP.1) that is unbound and thus has no associated VCS/vPPB. Device.02 is coupled to Switch Port (p7) configured as DSP (DSP.3), which is bound to (vPPB.n3) of (VCS.n). RPU Device (EP.d) is coupled to Switch Port (p5) configured as DSP (DSP.d) that is unbound (no VCS/vPPB associated). And RPU Device (EP.c) is coupled to Switch Port (p6) configured as DSP (DSP.c) that is unbound (no VCS/vPPB associated). Then the FM boots while Host.01 to Host.h are held in reset. Then, optionally, the attached DSPs link up and are bound to FM-owned PPBs. And then, optionally, the switch notifies the FM using a managed hot-add notification, which brings the process to the FM switch discovery.

Figure 40C:
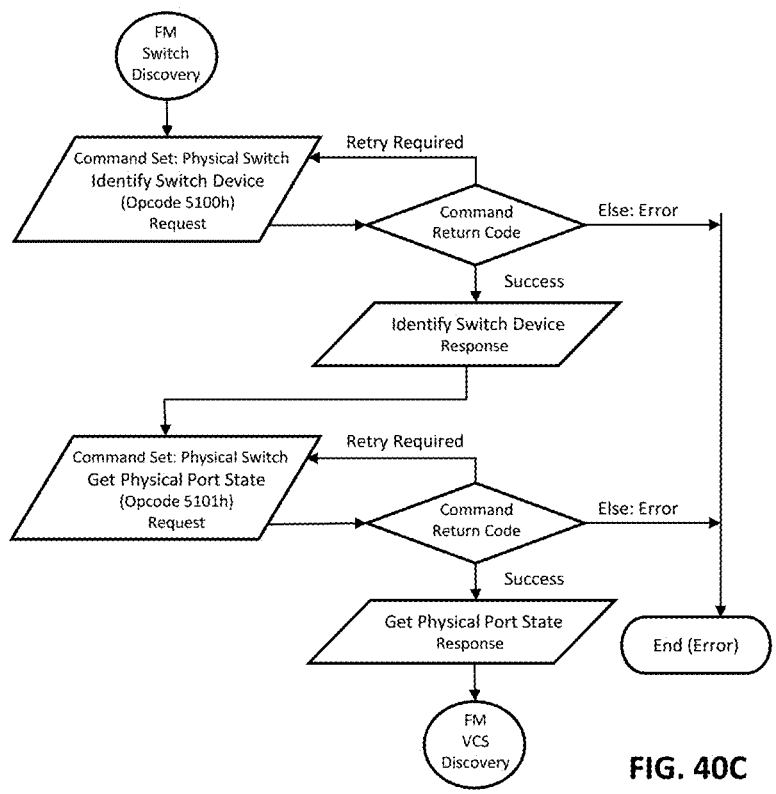

FIG. 40C illustrates one embodiment of a possible FM switch discovery process, which includes utilizing CXL FM API Identify Switch Device Command, Opcode 5100h, to retrieve information about the capabilities and configuration of the switch, including number of Physical Ports, number of VCSs, and total number of vPPBs. Then the process may continue with CXL FM API Command, Opcode 5101h, Get Physical Port State, for each enabled port to check whether it is USP or DSP. Still referring to the initial state illustrated in FIG. 40A, repeating the Get Physical Port State Command, Opcode 5101h, may result in the following not inclusive responses: Port ID(p1) Configuration State=USP (USP.2), Port ID(p2) Configuration State=USP (USP.1), Port ID(p3) Configuration State=USP (USP.a), Port ID(p4) Configuration State=DSP (DSP.1), Port ID(p5) Configuration State=DSP (DSP.d), Port ID(p6) Configuration State=DSP (DSP.c), and Port ID(p7) Configuration State=DSP (DSP.3).

Figure 40D:
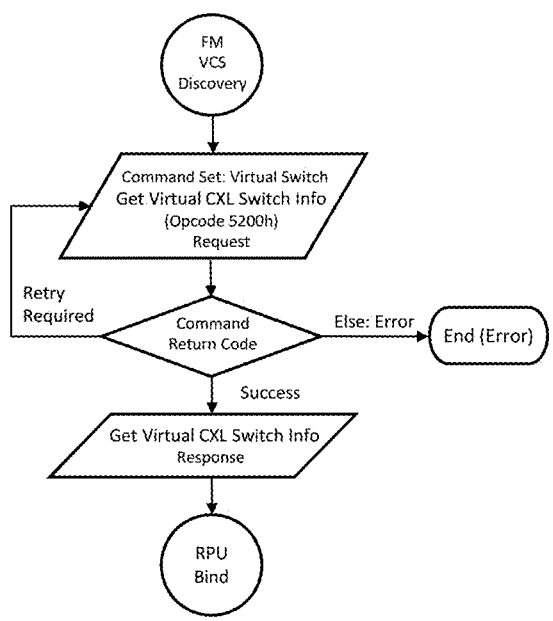

FIG. 40D illustrates one embodiment of FM VCS discovery process, where the API queries the state of Switch.01 to retrieve structured lists describing the switch topology, including VCS configurations, associations between physical ports, and binding status of ports. This discovery process may utilize CXL FM API Get Virtual CXL Switch Info command, Opcode 5200h, where a request payload for the command may include parameters such as: a Start vPPB=0, Number of VCS=3, and VCS ID List=(VCS.1, VCS.i, VCS.n). Upon execution, the response provides structured information for the three queried VCSs. For example, the response payload may include the following non-exhaustive values: Number of VCS=3. VCS Information List containing: (i) VCS ID=VCS.1, USP ID=USP.a, Number of vPPBs=3, with vPPB [0/vPPB.1] having a Binding Status=02h (Bound Physical Port), vPPB [1/vPPB.2] having a Binding Status=00h (Unbound), and vPPB [2/vPPB.3] having a Binding Status=00h (Unbound); (ii) VCS ID=VCS.i, USP ID=USP.1, Number of vPPBs=3, with vPPB [0/vPPB.i1] having a Binding Status=02h (Bound Physical Port), vPPB [1/vPPB.i2] having a Binding Status=00h (Unbound), and vPPB [2/vPPB.i3] having a Binding Status=00h (Unbound); and (iii) VCS ID=VCS.n, USP ID=USP.2, Number of vPPBs=3, with vPPB [0/vPPB.n1] having a Binding Status=02h (Bound Physical Port), vPPB [1/vPPB.n2] having a Binding Status=00h (Unbound), and vPPB [2/vPPB.n3] having a Binding Status=02h (Bound Physical Port). Following the receipt of the Get Virtual CXL Switch Info response, the RPU binding process via the FM API may be performed.

Figure 40E:
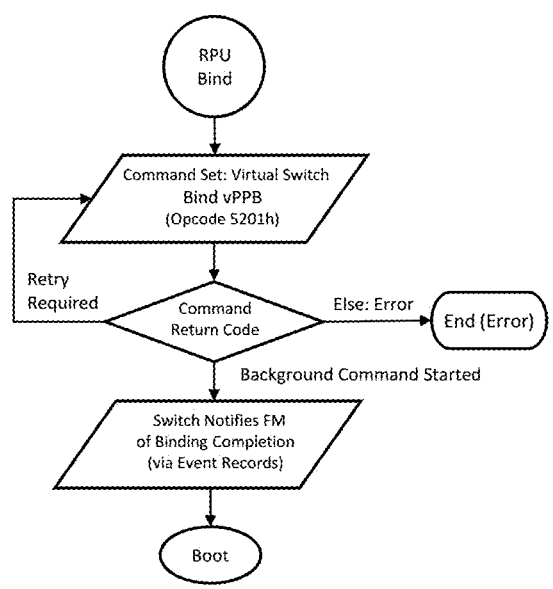

FIG. 40E illustrates one embodiment of RPU binding process utilizing CXL FM API Bind vPPB commands, Opcode 5201h. The process illustrated in this figure is repeated for each vPPB coupled to the RPU. Bind vPPB commands are executed as background commands, and the switch notifies the FM of binding completion through the generation of event records. Still referring to the example of FIG. 40A, the FM may issue multiple Bind vPPB requests, such as the following non-exhaustive list: Bind vPPB (VCS.i, vPPB.i2, p6/DSP.c), Bind vPPB (VCS.n, vPPB.n2, p5/DSP.d), and Bind vPPB (VCS.1, vPPB.3, p4/DSP.1).

Figure 40F:
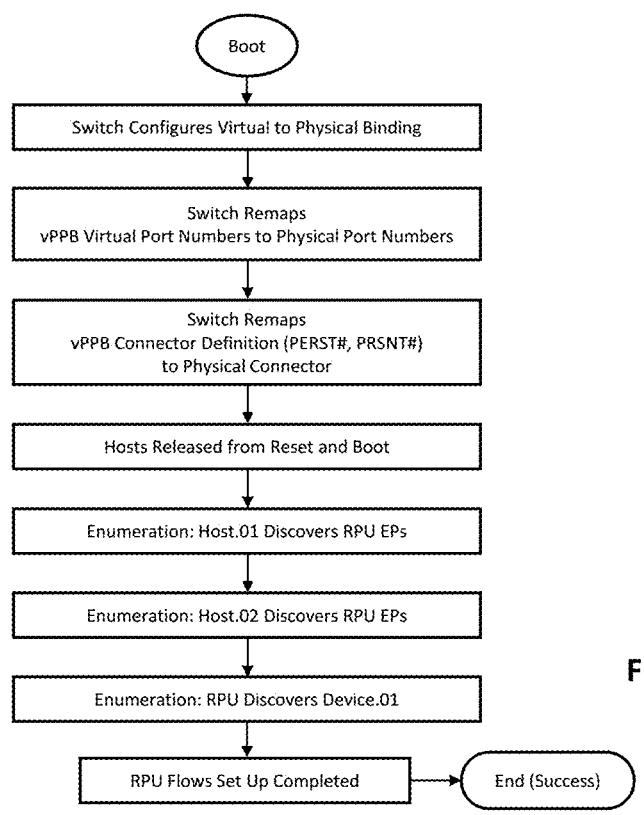

FIG. 40F illustrates one embodiment of the process for completing the Switch.01 booting and configuring the RPU flow setup, starting with the switch configuring virtual-to-physical binding and ending with the successful establishment of communication between the hosts and devices coupled to the switch as a result of the successful virtual-to-physical bindings. The illustrated process begins with the Switch Configures Virtual to Physical Binding, which establishes the association between virtual constructs (such as vPPBs) and physical ports. Next, the Switch Remaps vPPB Virtual Port Numbers to Physical Port Numbers. Afterward, the Switch Remaps vPPB Connector Definition (PERST #, PRSNT #) to Physical Connector. Then the Hosts are Released from Reset and Boot, allowing the hosts to proceed with their respective initialization sequences. The enumeration phase then begins, during which the hosts and devices identify and establish communication with the coupled entities. During this phase: Host.01 Discovers RPU EPs, Host.02 Discovers RPU EPs, and the RPU Discovers Device.01. The order in which these enumerations occur may vary, and in some cases, each of these steps may take place independently of the others. The process concludes with RPU Flows Set Up Completed, signifying that the necessary communication flows have been established, followed by the End (Success) state, which marks the successful completion of the overall booting and configuration process.

Figure 40G:
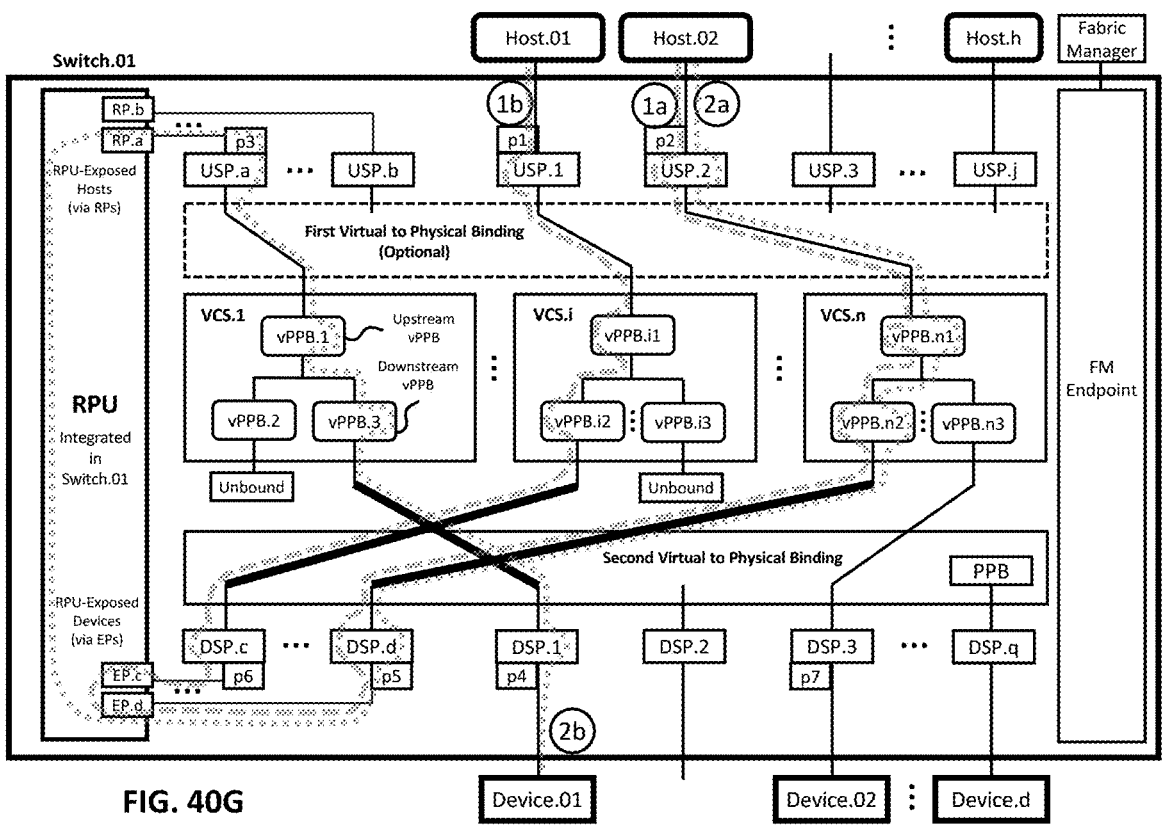
FIG. 40G illustrates the configurations resulting from the described processes.

FIG. 40G illustrates the configurations resulting from the described process. Since the USPs, DSPs, vUSPs, and vDSPs are constructs recognized by the FM API, the switch management scheme remains consistent, seamlessly integrating the RPU functionality within the existing switch framework. This integration provides a native approach to augmenting the switch with RPU capabilities without disrupting the established software management model. Alternative implementations may expose the RPU via proprietary mechanisms. In this embodiment, the RPU is exposed to the FM via USPs and DSPs Physical Ports. These ports, within this context, are FM constructs that may not correspond directly to physical switch ports. Optionally, at least some of the RPU-associated USPs and DSPs may be implemented as real physical USP/DSP switch ports instantiated within the CXL Switch hardware. Alternatively, they may be implemented as logical USP/DSP switch ports. Another possible embodiment involves using implementation-specific techniques to emulate USP and DSP constructs while maintaining the software management view of RPU-connected points. The switch management plane, whether an FM or other CXL switch management software, perceives the RPU as a native collection of USPs and DSPs, abstracted in a manner that enables compatibility with existing management operations, while allowing implementing the proprietary RPU.

CXL Specification Revision 3.1 uses the term "physical ports" when referring to switch ports (including USP and DSP), as evidenced for example in its FM API commands such as "Get Physical Port State" which operates on switch ports and returns port information including a Physical Port ID field, and "Physical Port Control" that is used by the FM to control unbound ports and MLD ports. The physical port terminology also appears in the CXL Specification in the context of Port Based Routing (PBR) where physical port numbers are used for port identification, and in fabric initialization processes where the FM discovers and configures ports.

In certain embodiments employing a Port Based Routing (PBR) fabric, the logical connectivity presented to the host may differ from the underlying physical topology. Consequently, some of the illustrated and/or claimed DSPs may be implemented as virtualized DSPs (vDSPs), and some of the illustrated and/or claimed USPs may be implemented as virtualized USP (vUSPs). As defined in the CXL Specification Revision 3.1, a vDSP is a Downstream vPPB in a Host Edge Switch (ES) that is bound to one vUSP within a specific Downstream ES. Correspondingly, a vUSP is defined as an Upstream vPPB in a Downstream ES that is bound to one vDSP within a specific Host ES. The vDSP/vUSP binding is established and managed by the FM using the bind and unbind commands of the FM API.

In one embodiment, a switch includes a first set of one or more switch ports configured to couple a first set of one or more hosts and/or devices with a first Virtual to Physical Binding; a second set of one or more switch ports configured to couple an RPU with the first virtual to physical binding; wherein the first virtual to physical binding is configured to bind at least some of the first and second sets of switch ports to a first set of Virtual CXL Switches (VCSs); a third set of one or more switch ports configured to couple the RPU with a second virtual to physical binding; a fourth set of one or more switch ports configured to couple a second set of one or more hosts and/or devices with the second virtual to physical binding; and wherein the second virtual to physical binding is configured to bind at least some of the third and fourth sets of switch ports to a second set of VCSs. Optionally, the first and second sets of VCSs overlap. Alternatively, the first and second sets of VCSs do not overlap.

Figure 41:
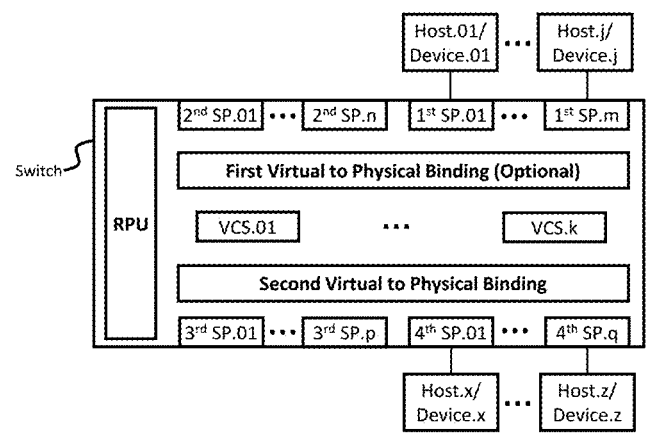
FIG. 41 illustrates one embodiment of a switch including first and second Virtual to Physical Bindings.

FIG. 41 illustrates one embodiment of a switch, including first, second, third, and fourth sets of one or more switch ports (SPs), a first Virtual to Physical Binding, a second virtual to physical binding, a set of Virtual CXL Switches, and an RPU. The first set of one or more switch ports (denoted as 1st SP.01 to 1st SP.m) couples a first set of one or more hosts and/or devices (not included in the switch, denoted as Host.01/Device.01 to Host.j/Device.j) with the first virtual to physical binding. The second set of one or more switch ports (denoted as 2nd SP.01 to 2nd SP.n) couples the RPU with the first virtual to physical binding. The first virtual to physical binding binds at least some of the first and second switch ports to at least some of the Virtual CXL Switches (denoted as VCS.01 to VCS.k). The third set of one or more switch ports (denoted as 3rd SP.01 to 3rd SP.p) couples the RPU with the second virtual to physical binding. The fourth set of one or more switch ports (denoted as 4th SP.01 to 4th SP.q) couples a second set of one or more hosts and/or devices (not included in the switch, denoted as Host.x/Device.x to Host.z/Device.z) with the second virtual to physical binding. The second virtual to physical binding binds at least some of the third and fourth switch ports to at least some of the Virtual CXL Switches, thereby enabling communication between various hosts and/or devices via the RPU.

In some embodiments of the switch, the RPU is configured to facilitate communication between at least some of the first and fourth switch ports, thereby enabling communication between at least some of the first set of hosts and/or devices and at least some of the second set of hosts and/or devices. Optionally, the first set of one or more hosts and/or devices includes first and second hosts coupled, via the first virtual to physical binding, to different VCSs; the RPU is configured to facilitate communications between the first and second hosts; and Data routed from the first host to the second host traverses the virtual to physical bindings more times than it traverses the VCSs. Optionally, the first set of one or more hosts and/or devices includes first and second hosts coupled, via the first virtual to physical binding, to different VCSs; the RPU is configured to facilitate communications between the first and second hosts; and Data routed from the first host to the second host traverses twice the first virtual to physical binding, traverses two of VCSs, and traverses twice the second virtual to physical binding.

In some embodiments of the switch, the first set of one or more switch ports are USPs, each VCS includes one upstream virtual PCI-to-PCI Bridge (vPPB) and one or more downstream vPPBs, the first virtual to physical binding binds USPs to upstream vPPBs, the fourth set of one or more switch ports are DSPs, and the second virtual to physical binding binds DSPs to downstream vPPBs. Optionally, the upstream vPPBs include at least one virtualized USP (vUSP), and/or the downstream vPPBs include at least one virtualized DSP (vDSP). Optionally, the USPs include at least one vUSP, and/or the DSPs include at least one vDSP.

In some embodiments, a USP selected from the first set of one or more switch ports is configured to communicate with a host selected from the first set of one or more hosts and/or devices according to a first CXL protocol, a DSP selected from the fourth set of one or more switch ports is configured to communicate with a device selected from the second set of one or more hosts and/or devices according to a second CXL protocol, and the RPU is configured to apply protocol termination to the first and second CXL protocols. Optionally, the RPU is configured to present a first Configuration Space to the host, and the device is configured to present a second Configuration Space, which is different from the first Configuration Space, to the RPU.

In some embodiments of the switch, a first USP selected from the first set of one or more switch ports is configured to communicate with a first host selected from the first set of one or more hosts and/or devices according to a CXL.mem protocol, a second USP selected from the first set of one or more switch ports is configured to communicate with a second host selected from the first set of one or more hosts and/or devices according to a CXL.cache protocol, and the RPU is configured to apply protocol termination to the CXL.mem and CXL.cache protocols. Optionally, the RPU is configured to present a first Configuration Space to the first host, and the RPU is configured to present a second Configuration Space, which is different from the first Configuration Space, to the second host.

In one embodiment, a switch includes a first set of USPs configured to couple hosts with a first Virtual to Physical Binding; a second set of USPs configured to couple an RPU with the first virtual to physical binding; wherein the first virtual to physical binding is configured to bind at least some of the first and second sets of USPs to a first set of Virtual CXL Switches (VCSs); a first set of DSPs configured to couple the RPU with a second virtual to physical binding; a second set of DSPs configured to couple devices with the second virtual to physical binding; and wherein the second virtual to physical binding is configured to bind at least some of the first and second sets of DSPs to a second set of VCSs.

In some embodiments of the switch, the RPU is configured to facilitate communication between at least some of the first set of USPs and at least some of the second set of DSPs, thereby enabling communication between at least some of the hosts and at least some of the devices. Optionally, the hosts include first and second hosts coupled, via the first virtual to physical binding, to different VCSs; the RPU is configured to facilitate communications between the first and second hosts; and Data routed from the first host to the second host traverses the virtual to physical bindings more times than it traverses the VCSs. Optionally, the hosts include first and second hosts coupled, via the first virtual to physical binding, to different VCSs; the RPU is configured to facilitate communications between the first and second hosts; and Data routed from the first host to the second host traverses twice the first virtual to physical binding, traverses two of VCSs, and traverses twice the second virtual to physical binding.

In some embodiments of the switch, each VCS includes one upstream virtual PCI-to-PCI Bridge (vPPB) and one or more downstream vPPBs, the first virtual to physical binding binds the first and second sets of USPs to upstream vPPBs, and the second virtual to physical binding binds the first and second sets of DSPs to downstream vPPBs. Optionally, at least one of the upstream vPPBs includes at least one vUSP, and/or at least one of the downstream vPPBs includes at least one vDSP. Optionally, at least one of the first and second sets of USPs includes at least one vUSP, and/or at least one of the first and second sets of DSPs includes at least one vDSP.

In some embodiments, a first USP selected from the first set of USPs is configured to communicate with a first host selected from the hosts according to a first CXL protocol, a first DSP selected from the second set of DSPs is configured to communicate with a first device selected from the devices according to a second CXL protocol, and the RPU is configured to apply protocol termination to the first and second CXL protocols. Optionally, the RPU is configured to present a first Configuration Space to the first host, and the first device is configured to present a second Configuration Space, which is different from the first Configuration Space, to the RPU. In some embodiments of the switch, a first USP selected from the first set of USPs is configured to communicate with a first host selected from the hosts according to a CXL.mem protocol, a second USP selected from the first set of USPs is configured to communicate with a second host selected from the hosts according to a CXL.cache protocol, and the RPU is configured to apply protocol termination to the CXL.mem and CXL.cache protocols. Optionally, the RPU is configured to present a first Configuration Space to the first host, and the RPU is configured to present a second Configuration Space, which is different from the first Configuration Space, to the second host.

In one embodiment, a method includes coupling, via a first set of one or more switch ports, a first set of one or more hosts and/or devices with a first Virtual to Physical Binding; coupling, via a second set of one or more switch ports, an RPU with the first virtual to physical binding; binding, via the first virtual to physical binding, at least some of the first and second sets of switch ports to a first set of Virtual CXL Switches (VCSs); coupling, via a third set of one or more switch ports, the RPU with a second virtual to physical binding; coupling, via a fourth set of one or more switch ports, a second set of one or more hosts and/or devices with the second virtual to physical binding; and binding, via the second virtual to physical binding, at least some of the third and fourth sets of switch ports to a second set of VCSs.

In some embodiments of the method, the first set of one or more hosts and/or devices includes first and second hosts coupled, via the first virtual to physical binding, to different VCSs of the first set of VCSs, and wherein the method further includes: facilitating, via the RPU, communications between the first and second hosts, wherein data routed from the first host to the second host traverses the virtual to physical bindings more times than it traverses the VCSs. In other embodiments, the first set of one or more hosts and/or devices includes first and second hosts coupled, via the first virtual to physical binding, to different VCSs of the first set of VCSs, and wherein the method further includes: facilitating, via the RPU, communications between the first and second hosts, wherein data routed from the first host to the second host traverses twice the first virtual to physical binding, traverses two of the VCSs, and traverses twice the second virtual to physical binding.

In still other embodiments, the method further includes communicating, via a USP selected from the first set of one or more switch ports, with a host selected from the first set of one or more hosts and/or devices according to a first CXL protocol; communicating, via a DSP selected from the fourth set of one or more switch ports, with a device selected from the second set of one or more hosts and/or devices according to a second CXL protocol; and applying, via the RPU, protocol termination to the first and second CXL protocols. Optionally, the method further includes presenting, via the RPU, a first Configuration Space to the host; and presenting, via the device, a second Configuration Space, which is different from the first Configuration Space, to the RPU.

In some embodiments, the method further includes communicating, via a first USP selected from the first set of one or more switch ports, with a first host selected from the first set of one or more hosts and/or devices according to a CXL.mem protocol; communicating, via a second USP selected from the first set of one or more switch ports, with a second host selected from the first set of one or more hosts and/or devices according to a CXL.cache protocol; and applying, via the RPU, protocol termination to the CXL.mem and CXL.cache protocols. Optionally, the method further includes presenting, via the RPU, a first Configuration Space to the first host; and presenting, via the RPU, a second Configuration Space, which is different from the first Configuration Space, to the second host.

In one embodiment, a switch includes Virtual CXL Switches (VCSs), each includes an upstream virtual PCIe-to-PCIe bridge (vPPB) coupled to one or more downstream vPPBs; USPs configured to communicate with hosts utilizing CXL; DSPs configured to communicate with devices according to CXL; a first Virtual to Physical Binding configured to bind and unbind at least some of the USPs to a subset of the upstream vPPB; and a second virtual to physical binding configured to bind and unbind at least some of the DSPs to a subset of the downstream vPPB.

In some embodiments of the switch, the switch further includes an RPU configured to terminate CXL protocols and translate at least some CXL messages conforming to the terminated protocols; and wherein the first Virtual to Physical Binding is further configured to bind the RPU to a second subset of the upstream vPPB, and the second virtual to physical binding is further configured to bind the RPU to a second subset of the downstream vPPB.

Figure 42A:
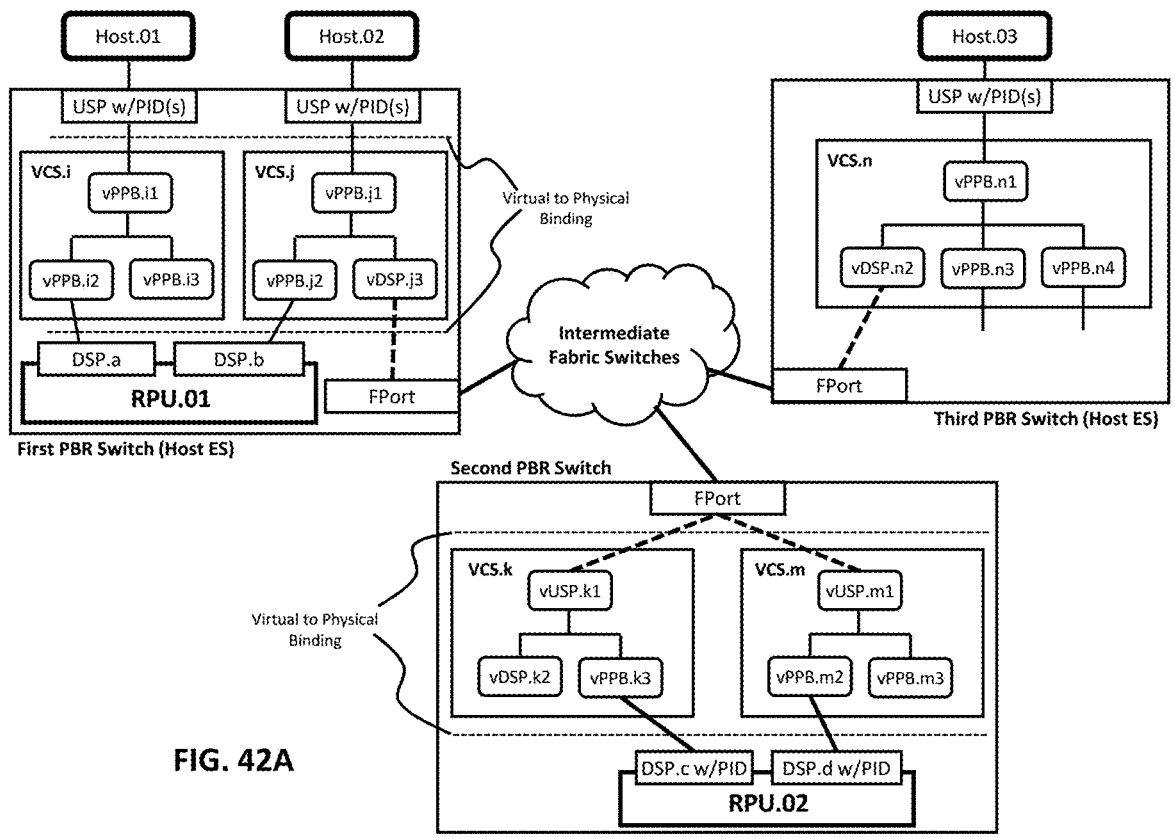
FIG. 42A illustrates one embodiment of a first PBR switch coupled to intermediate fabric switches that are coupled to second and third PBR switches.

FIG. 42A illustrates one embodiment of a first PBR switch coupled to intermediate fabric switches that are coupled to second and third PBR switches. Each of the first and second PBR switches includes an RPU and first and second virtual to physical binding, and the third PBR switch does not include an RPU and may or may not include the first and/or second virtual to physical binding, which means that the bindings of the third PBR switch may either be fixed or proprietary.

Figure 42B:
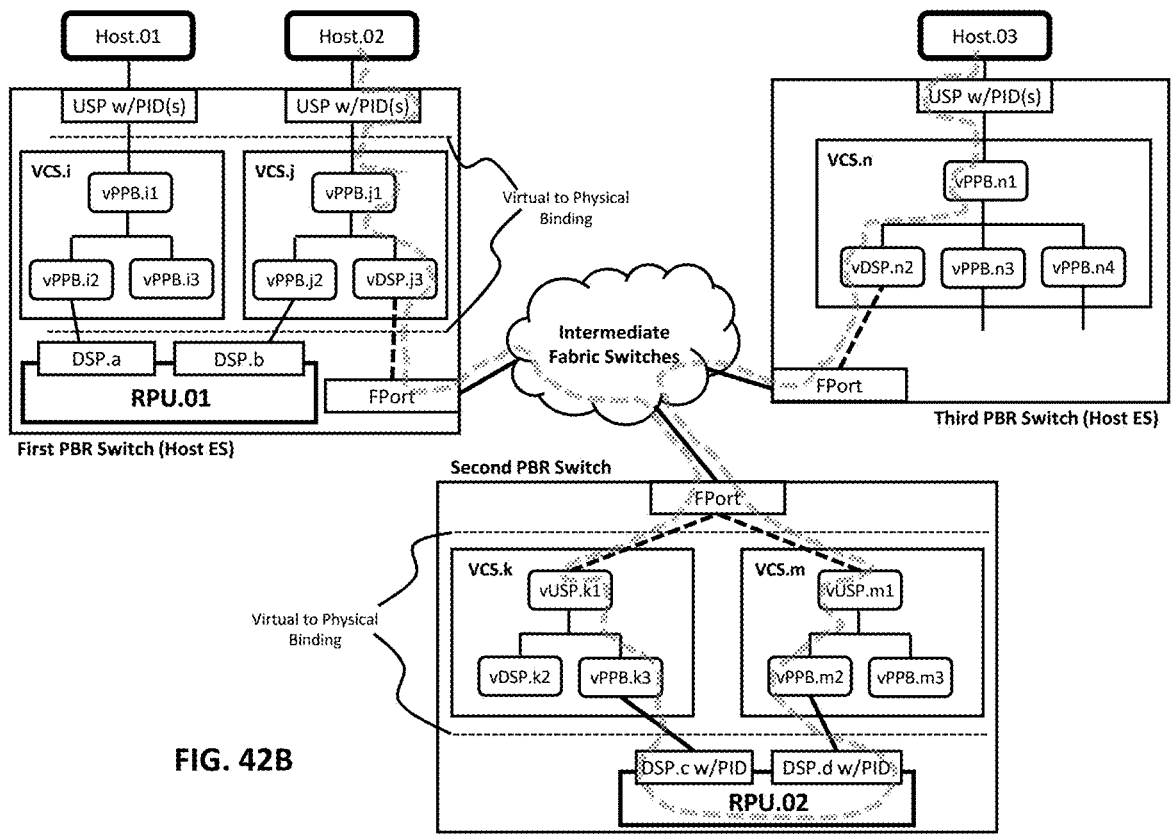
FIG. 42B illustrates one example of a possible route between Host.02 and Host.03.

FIG. 42B illustrates one example of a possible route between Host.02 and Host.03, wherein Host.02 is coupled to a USP of the first PBR switch that is coupled through vPPB.j1 and vDSP.j3 to an FPort of the first PBR switch that is coupled to the intermediate fabric switches that are coupled to the FPort of the second PBR switch that is coupled to vUSP.k1 and vUSP.m1 that are routed via RPU.02. The FPort of the second PBR switch is further coupled to the FPort of the third PBR switch via the intermediate fabric switches. The FPort of the third PBR switch is coupled to vDSP.n2 that is coupled to Host.03 via vPPB.n1.

Optionally, a first terminated protocol includes CXL.mem, a second terminated protocol includes CXL.cache, and the RPU is further configured to translate between certain CXL.mem and CXL.cache messages to enable communication between the first and second hosts. In some embodiments of the switch, the RPU includes at least one CXL Root Port and at least one CXL Endpoint; and further includes an Application Programming Interface (API) to configure at least one of: binding and unbinding of the at least one CXL Root Port to a second subset of the upstream vPPB via the first Virtual to Physical Binding, or binding and unbinding of the at least one CXL Endpoint to a second subset of the downstream vPPB via the second Virtual to Physical Binding. Additionally or alternatively, the RPU may include at least one of: a CXL Root Port connected to a USP, or a CXL Endpoint connected to a DSP. Still additionally or alternatively, the RPU may include at least one USP bound to the first Virtual to Physical Binding, and/or the RPU may include at least one DSP bound to the second Virtual to Physical Binding.

In some embodiments, the switch further includes at least one vUSP, and/or at least one virtualized DSP (vDSP). Optionally, the switch operates within a Port Based Routing (PBR) fabric, and further includes at least one vDSP implemented as a downstream vPPB in a Host Edge Switch (ES) and bound to a corresponding vUSP in a Downstream ES, and/or at least one vUSP implemented as an upstream vPPB in a Downstream ES and bound to a corresponding vDSP in a Host ES.

In some embodiments of the switch, the switch further includes an RPU configured to facilitate communications between at least some of the hosts and at least some of the devices; and wherein the first Virtual to Physical Binding is further configured to bind the RPU to a second subset of the upstream vPPB, and the second virtual to physical binding is further configured to bind the RPU to a second subset of the downstream vPPB. Optionally, the RPU includes at least one CXL Root Port and at least one CXL Endpoint; and further includes an Application Programming Interface (API) to configure at least one of: binding and unbinding of the at least one CXL Root Port to a second subset of the upstream vPPB via the first Virtual to Physical Binding, or binding and unbinding of the at least one CXL Endpoint to a second subset of the downstream vPPB via the second Virtual to Physical Binding. Optionally, the RPU includes at least one of: a CXL Root Port connected to a USP, or a CXL Endpoint connected to a DSP. Optionally, the RPU includes at least one USP bound to the first Virtual to Physical Binding, and/or the RPU includes at least one DSP bound to the second Virtual to Physical Binding.

In another embodiment, a switch includes a first set of USPs configured to couple hosts with a first Virtual to Physical Binding; a second set of USPs configured to couple an RPU with the first virtual to physical binding; wherein the first virtual to physical binding is configured to bind at least some of the first and second sets of USPs to a first set of Virtual CXL Switches (VCSs); a first set of DSPs configured to couple the RPU with a second virtual to physical binding; a second set of DSPs configured to couple devices with the second virtual to physical binding; and wherein the second virtual to physical binding is configured to bind at least some of the first and second sets of DSPs to a second set of VCSs.

In some embodiments of the switch, the RPU is configured to terminate CXL protocols and to translate at least some CXL messages conforming to the terminated protocols. Optionally, a first terminated protocol includes CXL.mem, a second terminated protocol includes CXL.cache, and the RPU is further configured to translate between certain CXL.mem and CXL.cache messages to enable communication between hosts coupled to the first set of USPs.

In some embodiments, the RPU includes at least one CXL Root Port and at least one CXL Endpoint; and further includes an Application Programming Interface (API) to configure at least one of: binding and unbinding of the at least one CXL Root Port to the second set of USPs, or binding and unbinding of the at least one CXL Endpoint to the first set of DSPs. In some embodiments, the RPU includes at least one CXL Root Port and at least one CXL Endpoint; and further includes an Application Programming Interface (API) to configure at least one of: binding and unbinding of the at least one CXL Root Port to the first set of VCSs via the first Virtual to Physical Binding, or binding and unbinding of the at least one CXL Endpoint to the second set of VCSs via the second Virtual to Physical Binding.

Figure 42C:
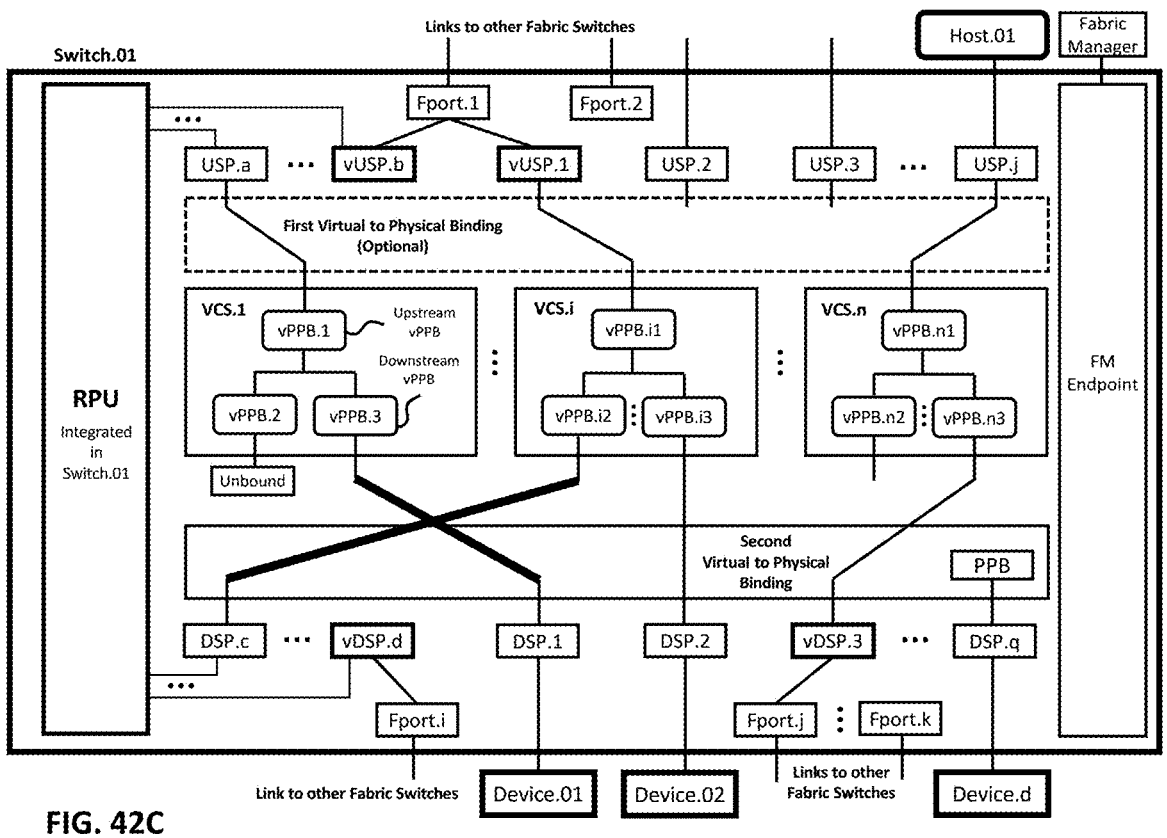
FIG. 42C illustrates one embodiment where vUSPs and vDSPs are implemented as independent entities not integrated into VCSs, preserving the native structure of VCSs and vPPBs.

In some embodiments of the switch, each VCS in the first and second sets of VCSs includes an upstream virtual PCIe-to-PCIe bridge (vPPB) coupled to one or more downstream vPPBs. Optionally, at least one of the upstream vPPBs includes at least one vUSP, and/or at least one of the downstream vPPBs includes at least one vDSP. In some embodiments, at least one of the first set of USPs or the second set of USPs includes at least one vUSP, and/or at least one of the first set of DSPs or the second set of DSPs includes at least one vDSP. FIG. 42C illustrates one embodiment where vUSPs and vDSPs are implemented as independent entities not integrated into VCSs, preserving the native structure of a VCS and vPPBs. And in some embodiments, the switch operates within a Port Based Routing (PBR) fabric, and at least one DSP from the second set of DSPs is a vDSP implemented as a downstream vPPB in a Host Edge Switch (ES) and bound to a corresponding vUSP in a Downstream ES, and/or at least one USP from the first set of USPs is a vUSP implemented as an upstream vPPB in a Downstream ES and bound to a corresponding vDSP in a Host ES.

In one embodiment, a system includes USPs; DSPs; a computer configured to couple the USPs and the DSPs, and is further configured to implement: a plurality of Virtual CXL Switches (VCSs), wherein each VCS includes an upstream virtual PCI-to-PCI Bridge (vPPB) and one or more downstream vPPBs; an RPU configured to: terminate at least some CXL transactions communicated via the USPs and DSPs, and translate between at least some of the terminated transactions; a first virtual to physical binding to bind the upstream vPPBs to the USPs; and a second virtual to physical binding to bind the downstream vPPBs to the DSPs.

In some embodiments of the system, at least some of the USPs are coupled to hosts, at least some of the DSPs are coupled to devices, a first host, selected from the hosts, is coupled to a first USP, selected from the USPs, that is bound via the first virtual to physical binding to a first VCS, selected from the VCSs, that is bound via the second virtual to physical binding to a first DSP, selected from the DSPs, that is coupled to the RPU that is coupled to a second DSP, selected from the DSPs, that is bound via the second virtual to physical binding to a second VCS, selected from the VCSs, that is bound via the first virtual to physical binding to a second USP, selected from the USPs, that is coupled to a second host. Optionally, the RPU is further configured to simultaneously support host-to-host transaction translations and host-to-device transaction translations.

In some embodiments of the system, at least some of the USPs are coupled to hosts, at least some of the DSPs are coupled to devices, a first host, selected from the hosts, is coupled to a first USP, selected from the USPs, that is bound via the first virtual to physical binding to a first VCS, selected from the VCSs, that is bound via the second virtual to physical binding to a first DSP, selected from the DSPs, that is coupled to the RPU that is coupled to a second USP, selected from the USPs, that is bound via the first virtual to physical binding to a second VCS, selected from the VCSs, that is bound via the second virtual to physical binding to a second DSP, selected from the DSPs, that is coupled to a second device. In other embodiments of the system, the RPU is further configured to: maintain binding states for the first virtual to physical binding, maintain binding states for the second virtual to physical binding, and coordinate the transaction translations based on active bindings.

In one embodiment, a switch includes a first switch port configured to communicate with a host according to a first CXL protocol; a second switch port configured to communicate with a host or device according to a second CXL protocol; and a computer configured to implement: a first Virtual to Physical Binding to bind a first virtual switch element with the first switch port; a second virtual to physical binding to bind a second virtual switch element with the second switch port; and an RPU to translate a first group of messages conforming to the first CXL protocol to a second group of messages conforming to the second CXL protocol, such that corresponding messages in the first and second groups of messages carry different CXL memory opcodes. In some embodiments of the switch, the Memory Opcodes are selected from CXL M2S Req Memory Opcodes. For example, Table 3-35 in CXL Specification Revision 3,1 lists the M2S Req Memory Opcodes. Optionally, the Memory Opcodes are selected from CXL M2S RwD Memory Opcodes. For example, Table 3-41 in CXL Specification Revision 3,1 lists the M2S RwD Memory Opcodes. Additionally or alternatively, the corresponding messages in the first and second groups of messages further carry different physical addresses.

In one embodiment, a switch includes a first USP configured to communicate with a first host according to a first CXL protocol; a second USP configured to communicate with a second host according to a second CXL protocol; a first DSP configured to communicate with a first CXL Single Logical Device (SLD) component according to a third CXL protocol; and an RPU configured to: terminate the first, second, and third CXL protocols; and expose second and third SLDs to the first and second hosts, respectively, wherein the second and third SLDs are virtualized SLDs that utilize resources of the first SLD component.

Figure 43:
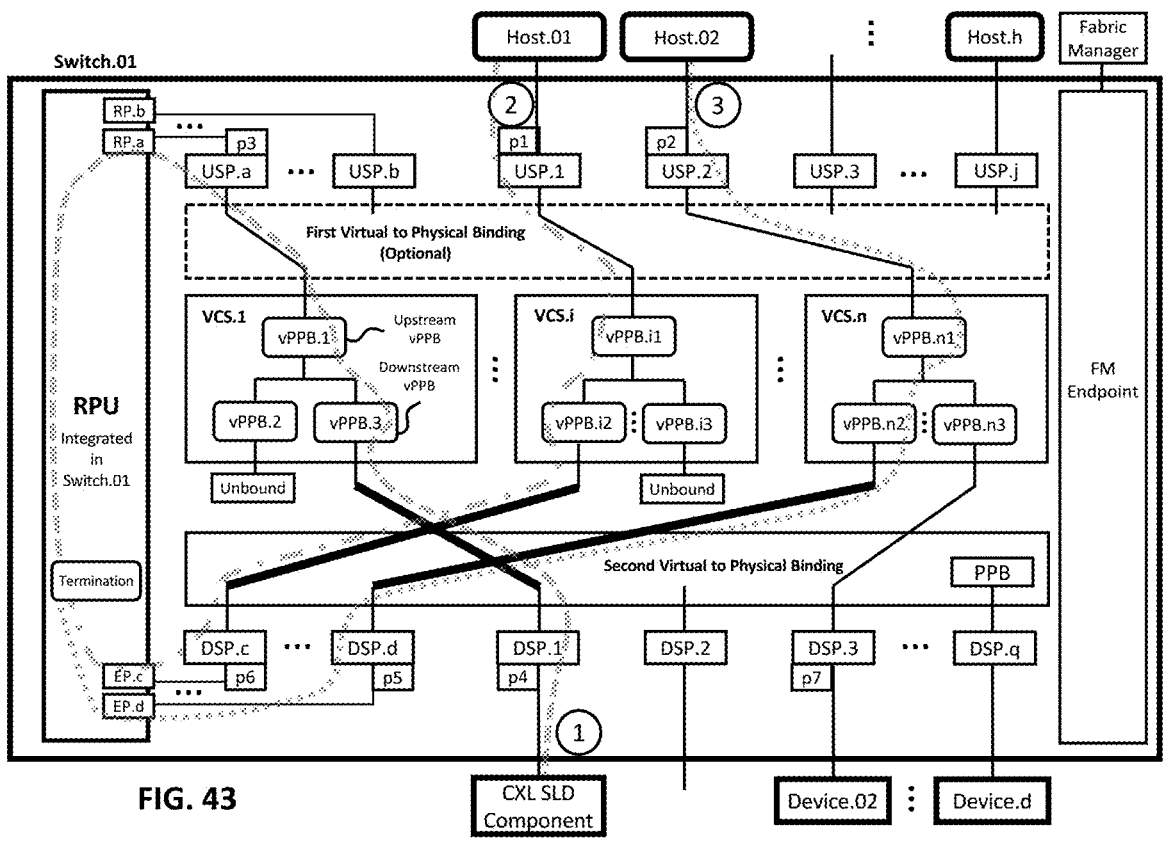
FIG. 43 illustrates one embodiment, which extends beyond the definitions in CXL Specification Revision 3.1, where a CXL SLD Component is coupled to multiple hosts.

FIG. 43 illustrates an embodiment that extends beyond the definitions in CXL Specification Revision 3.1, where an SLD port is defined as a port bound to only one VCS, and where such an SLD port may be linked up with a PCIe device or a CXL Type 1, Type 2, or Type 3 SLD component. The illustrated system enables multiple hosts, such as Host.01 and Host.02, to utilize resources of a CXL SLD component through Switch.01, which includes multiple VCSs such as VCS.1, VCS.i, and VCS.n. Each VCS may include an upstream vPPB coupled to one or more downstream vPPBs. The USPs of Switch.01 may couple to different hosts, while the DSPs may couple to devices, including the CXL SLD component. The RPU integrated in Switch.01 may translate between protocols and/or address spaces associated with different hosts accessing the CXL SLD component. This architecture may expose various SLD resources, such as memory resources, compute resources, and/or acceleration resources, to multiple hosts through the VCSs. While CXL Specification Revision 3.1 MLDs are architected only for Type 3 LDs, this embodiment may also transform a CXL Type 1 or Type 2 SLD component into multiple virtualized SLDs. In one example, Host.01 may access the CXL SLD component through VCS.i while Host.02 simultaneously accesses the same CXL SLD component through VCS.n, with the RPU managing protocol translations and resource access between the hosts and the SLD component. The system may implement different binding configurations between the VCSs and physical ports, potentially allowing dynamic reassignment of resources based on host requirements or system conditions.

In some embodiments of the switch, the RPU is coupled to the first USP via a second DSP that is bound to a first VCS that is bound to the first USP; the RPU is further coupled to the second USP via a third DSP that is bound to a second VCS that is bound to the second USP; and the RPU is further coupled to the first DSP via a third USP that is bound to a third VCS that is bound to the first DSP. Optionally, the RPU is further coupled to: the second DSP via a first Endpoint, the third DSP via a second Endpoint, and the third USP via a first Root Port.

In some embodiments of the switch, the first SLD component may be a CXL Type 3 device, and the second and third SLDs are exposed to the first and second hosts as CXL Type 3 devices. Alternatively, the first SLD component may be a CXL Type 3 device, and the second and third SLDs are exposed to the first and second hosts as CXL Type 1 or Type 2 devices. Alternatively, the first SLD component may be a CXL Type 1 or Type 2 device, and the second and third SLDs are exposed to the first and second hosts as CXL Type 3 devices. Optionally, the first SLD component may be implemented as either a CXL Type 1 or Type 2 device while the second and third SLDs are exposed to the first and second hosts as CXL Type 3 devices. When the first SLD component is implemented as a CXL Type 2 device, which includes CXL.mem functionality, the second and third SLDs can directly utilize the memory resources of the first SLD component. When the first SLD component is implemented as a CXL Type 1 device, which does not include CXL.mem functionality, the RPU may obtain memory resources from a source other than the first SLD component, and utilize the first SLD component as a cache for these external memory resources. Thus, while the second and third SLDs are exposed as Type 3 devices, they utilize the cache resources of the first SLD component (Type 1) while accessing memory resources provided from elsewhere through the RPU. Alternatively, the first SLD component may be a CXL Type 1 or Type 2 device, the second SLD may be exposed to the first host as CXL Type 3 device, and the third SLD may be by exposed to the second host as CXL Type 1 or Type 2 device.

In some embodiments of the switch, the first SLD component is identified at least by the following first Configuration Space values: a first Vendor ID, a first Device ID, and a first Class Code; the second SLD is identified at least by the following second Configuration Space values: a second Vendor ID, a second Device ID, and a second Class Code; and wherein the first and second Configuration Space values are not identical. In some embodiments, the first, second, and third CXL protocols are CXL.mem protocols. In some embodiments, it may be advantageous to utilize CXL.mem for all the communication interfaces, as it provides efficient memory access capabilities for both hosts and SLD components. In some embodiments of the switch, the third CXL protocol is CXL.mem protocol, and the first and second CXL protocols are CXL.cache protocols. In certain implementations, it may be beneficial to use CXL.mem for the SLD component interface and CXL.cache for the hosts' interfaces, which allows the hosts to benefit from caching capabilities while maintaining efficient memory access to the SLD components.

In some embodiments of the switch, the first SLD component includes at least 8 GB of DRAM, the RPU configures a first Configuration Space of the second SLD to identify the second SLD as a first memory device having a first memory capacity, the RPU configures a second Configuration Space of the third SLD to identify the third SLD as a second memory device having a second memory capacity, and wherein each of the second and third SLDs utilizes at least 4 GB of DRAM of the first SLD component. Optionally, the RPU partitions at least some of the DRAM of the first SLD component between the virtualized second and third SLDs. Each virtualized SLD has its own Configuration Space that reports a specific memory capacity, and the RPU manages memory access requests from the first and second hosts. Optionally, the RPU maintains memory isolation between the first and second hosts while allowing both hosts to utilize portions of the first SLD DRAM. Alternatively, the RPU maintains memory sharing between the first and second hosts by exposing parts of the first SLD component DRAM to both the first and second hosts via the second and third SLDs. Additionally or alternatively, the RPU is further configured to maintain memory isolation between the first and second hosts while allowing both hosts to utilize portions of the first SLD component DRAM. Additionally or alternatively, the RPU is further configured to maintain memory sharing between the first and second hosts by exposing parts of the first SLD component DRAM to both the first and second hosts via the second and third SLDs.

In some embodiments, the first memory capacity supports a first set of Reliability, Availability, and Serviceability (RAS) features, the second memory capacity supports a second set of RAS features, and wherein the first and second sets of RAS features are not identical. Optionally, the RPU configures different memory features for different virtualized SLDs. For example, when the first host requires data integrity for enterprise applications, the RPU may enable ECC in the RAS features for the first memory capacity, and may not enable ECC in the RAS features for the second memory capacity. Moreover, the RPU may implement different memory access policies, such as by applying separate refresh rates, prioritization schemes, and access patterns, optionally based on the memory configuration of each virtualized SLD. Additionally or alternatively, the system may apply different Patrol Scrub policies and parameters per each of the memory capacities; for example, the second SLD with the first memory capacities may not have Patrol Scrub, while the third SLD with the second memory capacities may have a Patrol Scrub cycling the memory capacity every 24 hours.

In some embodiments of the switch, the RPU configures a first Configuration Space of the second SLD to identify the second SLD as a CXL device, and the RPU further configures second Configuration Space of the third SLD to identify the third SLD as a Non-Volatile Memory Express (NVMe) device. Optionally, the RPU exposes the first SLD as different types of devices to different hosts, such as configuring the first Configuration Space to present a CXL device to the first host while configuring the second Configuration Space to present an NVMe device to the second host.

In some embodiments, the first SLD component includes at least 8 GB of DRAM, the RPU configures a first Configuration Space of the second SLD to identify the second SLD as a CXL Type-3 device having a DRAM capacity of at least 4 GB, and the RPU further configures second Configuration Space of the third SLD to identify the third SLD as an NVMe device having capacity of at least 4 GB. Optionally, the RPU exposes the first SLD DRAM as different types of memory devices to different hosts, such as configuring the first Configuration Space to present a CXL Type-3 device to the first host while configuring the second Configuration Space to present an NVMe controller to the second host.

In some embodiments of the switch, the first SLD component includes storage resources having a first namespace partitioning a first capacity, the RPU configures a first Configuration Space of the second SLD to identify the second SLD as a first NVMe device having a second namespace partitioning a second capacity, and the RPU configures a second Configuration Space of the third SLD to identify the third SLD as a second NVMe controller having a third namespace partitioning a third capacity. Optionally, the RPU virtualizes storage resources by presenting different NVMe devices to different hosts. Each virtualized NVMe device has its own namespace, allowing the RPU to manage storage allocations independently. The RPU may maintain separate command queues and completion queues for each namespace while utilizing the same physical storage resources. Additionally, the RPU may present different NVMe capabilities based on the connection type of each host. The RPU may configure queue depths and transport protocols independently for each namespace, and may implement separate QoS policies by managing command execution priorities and bandwidth allocation between the namespaces. For example, the Configuration Space and namespace of the second SLD may support NVMe over PCIe and has a queue depth of at least 64, the Configuration Space and namespace of the third SLD may support NVMe over Fabrics (NVMe-oF) and has a queue depth of at least 128, and the RPU may implement different QoS policies for these namespaces, wherein the third SLD utilizes resources of the first SLD as local storage cache resources to a remote NVMe-OF Storage Node.

In some embodiments of the switch, the first SLD component includes processor cores, the RPU configures a first Configuration Space of the second SLD to identify the second SLD as a first processor having a first set of capabilities, and the RPU configures a second Configuration Space of the third SLD to identify the third SLD as a second processor having a second set of capabilities. Optionally, the RPU may virtualize processor resources by presenting multiple processors to different hosts. The RPU may maintain separate execution contexts and processor states for each virtualized processor while sharing the physical processor cores, and managing processor scheduling and context switching between the virtualized processors. For example, as defined in "PCI Code and ID Assignment Specification" Revision 1.16, 19 Sep. 2023, the Class Code 0 Bh in the Configuration Space indicates Processor Class, which is further specified, by the subclass byte, for example, 40h: Co-processor.

Additionally, each of the first and second sets of capabilities may represent one or more of the following: number of processing cores, mix of processing core sizes, cache topologies, cache sizes, instruction set extensions, operating power budgets, or thermal throttling parameters. Optionally, the RPU may present different processor capabilities to each host, may manage thread execution capabilities and core counts separately for each virtualized processor, the different cache topologies may be L1, L2, or L3, and/or the power management policies may control voltage scaling and frequency selection for the processor cores allocated to each virtualized processor. As an example, the first set of capabilities may include at least six processor cores supporting simultaneous multithreading, the second set of capabilities may include at least two processor cores not supporting simultaneous multithreading, and the RPU implements different power management policies for the first and second numbers of processor cores.

In one embodiment, a switch includes a first USP configured to communicate with a first host according to a first CXL protocol; a second USP configured to communicate with a second host according to a second CXL protocol; a first DSP configured to communicate with a first CXL Single Logical Device (SLD) accelerator according to a third CXL protocol; and an RPU configured to: terminate the first, second, and third CXL protocols; and expose second and third SLDs to the first and second hosts, respectively, wherein the second and third SLDs are virtualized SLDs that utilize acceleration resources of the first SLD accelerator.

In some embodiments of the switch, the first SLD accelerator includes GPU resources, the RPU configures a first Configuration Space of the second SLD to identify the second SLD as a first GPU having first GPU capabilities, and the RPU configures a second Configuration Space of the third SLD to identify the third SLD as a second GPU having second GPU capabilities. Optionally, the RPU virtualizes GPU resources by presenting multiple GPU devices to different hosts and maintaining separate GPU contexts and memory spaces for each virtualized GPU while sharing the physical GPU resources. The RPU may manage GPU command scheduling and memory management independently for each virtualized GPU. Optionally, the RPU may present different GPU architectures and capabilities to each host, and emulate different graphics APIs and manages separate GPU memory pools for each virtualized GPU. Additionally, the first GPU capabilities may include support for tensor operations with at least 32-bit precision and unified memory architecture, the second GPU capabilities may include support for tensor operations with at least 16-bit precision and dedicated memory architecture, and the RPU may implement different GPU scheduling policies for the first and second GPU capabilities. Optionally, the RPU may present different GPU compute capabilities to each host based on workload requirements. For example, the RPU may configure the first GPU with high-precision tensor operations and unified memory access for training workloads, while configuring the second GPU with reduced precision and dedicated memory for inference workloads. The GPU scheduling policies may manage execution resources between the virtualized GPUs based on their computational requirements. The RPU may also manage memory access patterns differently, using unified memory for seamless data sharing in training workloads, while optimizing for throughput with dedicated memory in inference workloads.

In some embodiments of the switch, the first SLD accelerator includes artificial intelligence (AI) acceleration resources, the RPU configures a first Configuration Space of the second SLD to identify the second SLD as a first AI accelerator supporting a first set of AI operations, and the RPU configures a second Configuration Space of the third SLD to identify the third SLD as a second AI accelerator supporting a second set of AI operations. Optionally, the RPU virtualizes AI acceleration resources by presenting multiple AI accelerators to different hosts, and maintaining separate execution contexts and model storage for each virtualized AI accelerator. The RPU may manage resource allocation and scheduling between AI workloads from different hosts. Additionally, the first set of AI operations may include support for transformer model operations with at least 32-bit floating-point precision and sparsity acceleration, the second set of AI operations may include support for convolutional neural network operations with at least 8-bit precision, and the RPU may implement different model execution and memory access policies for the first and second sets of AI operations. Optionally, the RPU may present different AI acceleration capabilities optimized for different workload types. For example, the RPU may configure the first AI accelerator with high-precision operations and sparsity acceleration for large language models, while configuring the second AI accelerator for dense matrix operations common in computer vision applications. The model execution policies may manage computational resources and memory access patterns based on the specific requirements of each AI model type.

In some embodiments of the switch, the first SLD accelerator includes cryptographic acceleration resources, the RPU configures a first Configuration Space of the second SLD to identify the second SLD as a first cryptographic accelerator supporting a first set of cryptographic algorithms, and the RPU configures a second Configuration Space of the third SLD to identify the third SLD as a second cryptographic accelerator supporting a second set of cryptographic algorithms. Optionally, the RPU virtualizes cryptographic acceleration resources by presenting multiple cryptographic accelerators to different hosts, and maintaining separate key storage and execution contexts for each virtualized cryptographic accelerator while sharing the physical cryptographic resources. The RPU may manage cryptographic operation scheduling and key isolation between the virtualized accelerators. Additionally, the first set of cryptographic algorithms may include support for post-quantum cryptography and homomorphic encryption, the second set of cryptographic algorithms may include support for standard public key cryptography and symmetric encryption, and the RPU may implement different security domain isolation policies for the first and second sets of cryptographic algorithms. Optionally, the RPU may present different cryptographic acceleration capabilities based on security requirements. For example, the RPU may configure the first cryptographic accelerator with advanced cryptographic capabilities for quantum-safe security requirements, while configuring the second cryptographic accelerator for conventional encryption needs. The security domain isolation policies may ensure separation between different security levels and requirements while managing the shared cryptographic resources.

In some embodiments of the switch, the first SLD accelerator includes network acceleration resources, the RPU configures a first Configuration Space of the second SLD to identify the second SLD as a first network accelerator supporting a first set of network protocols, and the RPU configures a second Configuration Space of the third SLD to identify the third SLD as a second network accelerator supporting a second set of network protocols. Optionally, the RPU virtualizes network acceleration resources by presenting multiple network accelerators to different hosts, and maintaining separate network queues and protocol states for each virtualized network accelerator while sharing the physical network resources. The RPU may manage network traffic scheduling and protocol processing independently for each virtualized network accelerator. Additionally, the first set of network protocols may include support for data processing unit (DPU) operations with network virtualization and Remote Direct Memory Access (RDMA) storage acceleration, the second set of network protocols may include support for Network Function Virtualization (NFV) with packet processing acceleration, and the RPU may implement different workload isolation policies for the first and second sets of network protocols. Optionally, the RPU may present different network acceleration capabilities based on infrastructure requirements. For example, the RPU may configure the first network accelerator with DPU capabilities that combine networking, storage, and security acceleration, while configuring the second network accelerator for specialized network function processing. The workload isolation policies may manage resource allocation and quality of service between different types of network acceleration tasks.

In one embodiment, a method includes communicating, by a first USP according to a first CXL protocol, with a first host; communicating, by a second USP according to a second CXL protocol, with a second host; communicating, by a first DSP according to a third CXL protocol, with a first CXL Single Logical Device (SLD) component; terminating the first, second, and third CXL protocols; and exposing second and third SLDs to the first and second hosts, respectively, wherein the second and third SLDs are virtualized SLDs that utilize resources of the first SLD component. In one embodiment, a non-transitory computer-readable medium includes instructions that, when executed by a processor, cause the processor to perform the method described above.

In one embodiment, a switch configured to establish multiple types of communication routes includes a first USP configured to communicate with a first host according to a first CXL protocol; a second USP configured to communicate with a second host according to a second CXL protocol; a DSP configured to communicate with a device according to a third CXL protocol; wherein the first USP is coupled to the DSP via a first route that traverses a single VCS; and wherein the first USP is further coupled to the second USP via a second route that traverses two VCSs.

Figure 44A:
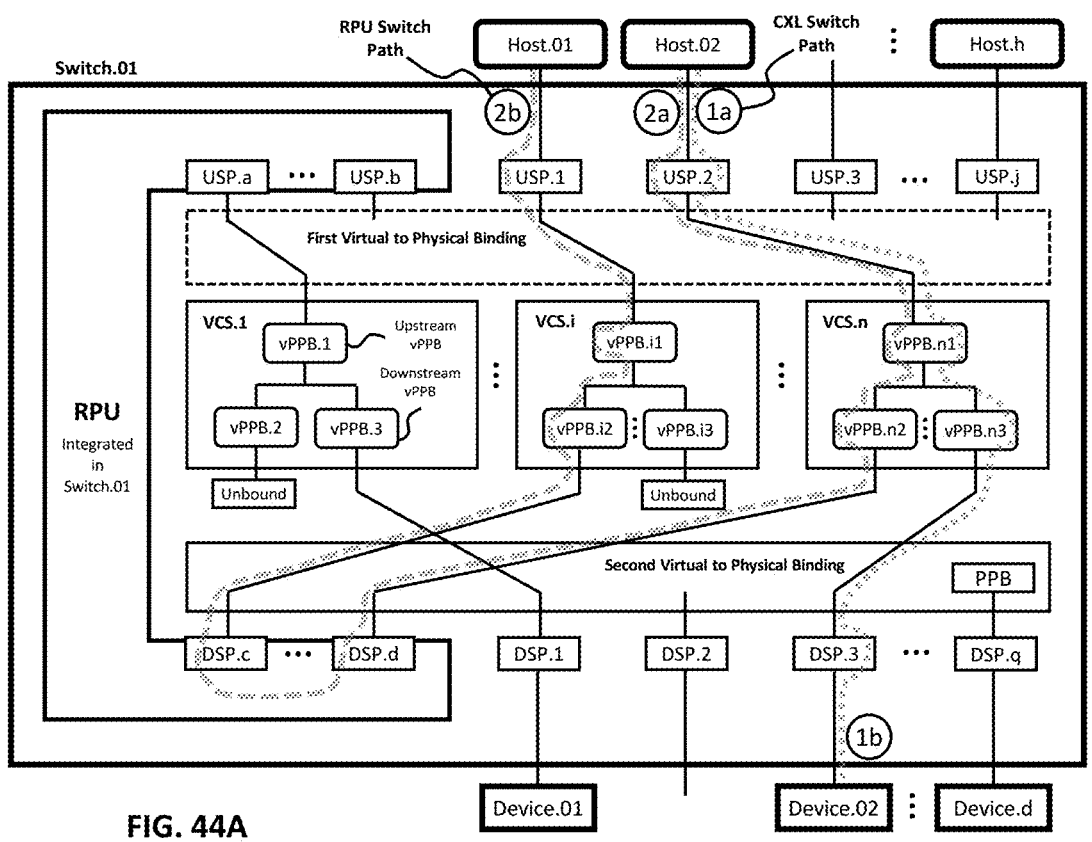
FIG. 44A, FIG. 44B, and FIG. 44C illustrate embodiments of a switch configured to establish at least two types of communication routes.
Figure 44B:
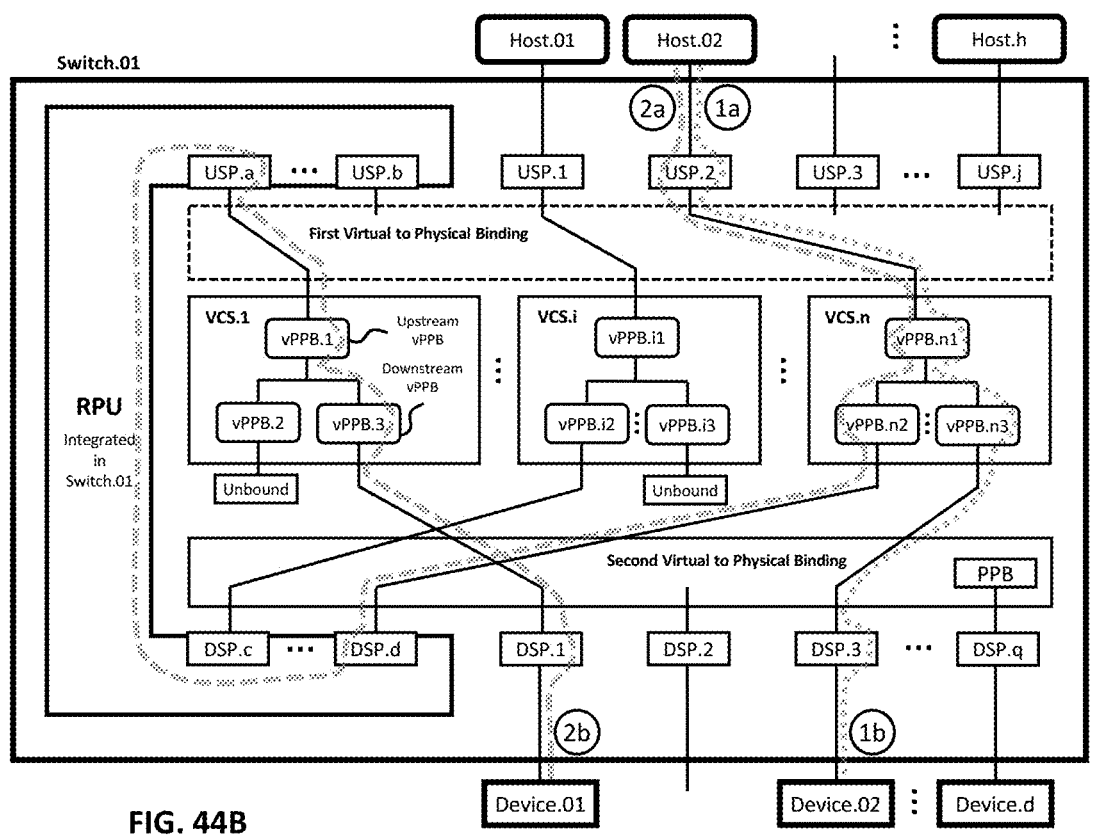
Figure 44C:
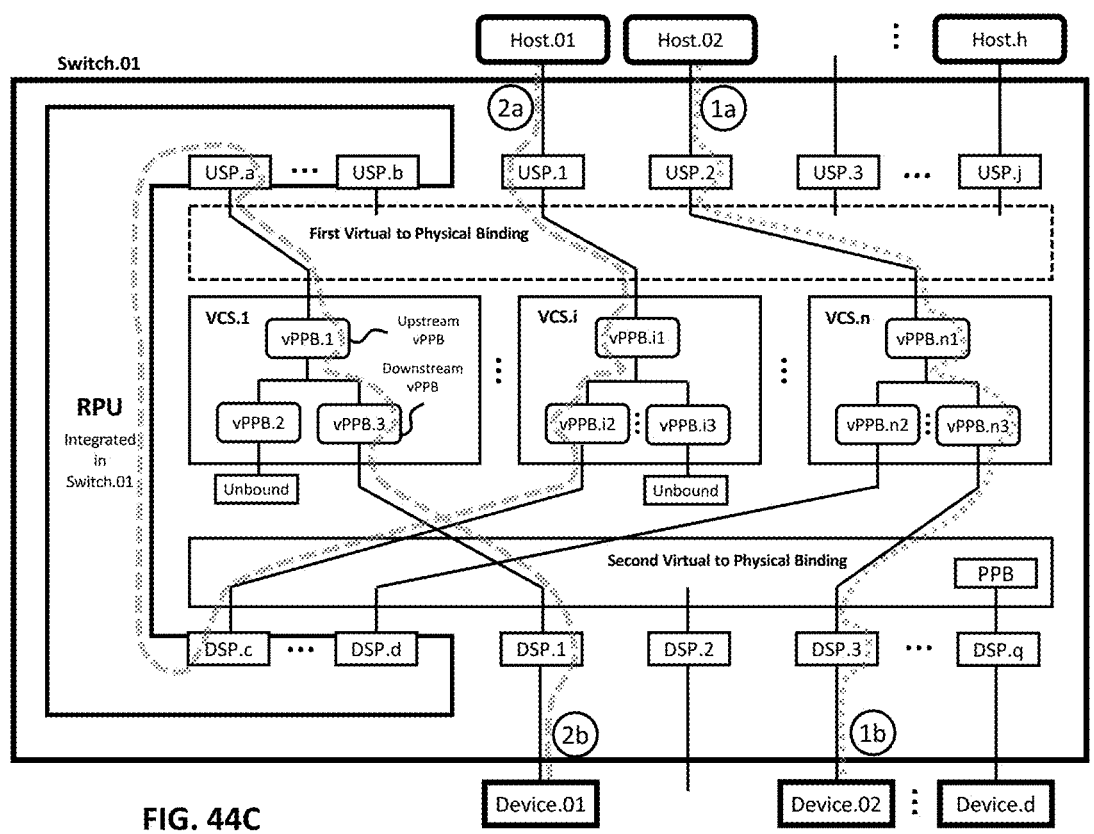

FIG. 44A, FIG. 44B, and FIG. 44C illustrate embodiments of a switch configured to establish at least two types of communication routes. FIG. 44A illustrates a first route between Host.02 (circle 1a) and Device.02 (circle 1b) that traverses a single VCS (VCS.n), while the second route between Host.02 (circle 2a) and Host.01 (circle 2b) traverses VCS.n, the RPU, and VCS.i. Although USP.a and USP.b are represented as Physical Ports in the Fabric Manager API, each of them may be implemented as a logical port that from one side is internal to the RPU and from its other side may be coupled to an upstream vPPB of a VCS. Similarly, DSP.c and DSP.d are represented as Physical Ports in the Fabric Manager API, and each of them may be implemented as a logical port that from one side is internal to the RPU and from its other side may be coupled to a downstream vPPB of a VCS. USP.1 and USP.2 are upstream switch ports that are represented as Physical Ports in the Fabric Manager API, each may couple from its first side to a host and from its second side an upstream vPPB of a VCS. And DSP.1 and DSP.3 are downstream switch ports that are represented as Physical Ports in the Fabric Manager API, each may couple from its first side to a device and from its second side a downstream vPPB of a VCS.

FIG. 44B illustrates a first route between Host.02 (circle 1a) and Device.02 (circle 1b) that traverses a single VCS (VCS.n), while the second route between Host.02 (circle 2a) and Device.01 (circle 2b) traverses VCS.n, the RPU, and VCS.1. FIG. 44C illustrates a first route between Host.02 (circle 1a) and Device.02 (circle 1b) that traverses a single VCS (VCS.n), while the second route between Host.01 (circle 2a) and Device.01 (circle 2b) traverses VCS.i, the RPU, and VCS.1. In some embodiments of the switch, the switch further includes an RPU configured to: couple the two VCSs of the second route, terminate the first and third CXL protocols, and translate between CXL messages conforming to the first CXL protocols and CXL messages conforming to the second CXL protocols.

In some embodiments, the first route traverses virtual to physical bindings twice, and the second route traverses virtual to physical bindings four times. When the switch includes first and second virtual to physical bindings, the first route traverses virtual to physical bindings twice, and the second route traverses virtual to physical bindings four times. Alternatively, the first route traverses virtual to physical binding once, and the second route traverses virtual to physical bindings twice. When the switch includes just the second virtual to physical binding, the first route traverses virtual to physical bindings once, and the second route traverses virtual to physical bindings twice. In other embodiments of the switch, each VCS includes an upstream virtual PCIe-to-PCIe bridge (vPPB) coupled to one or more downstream vPPBs, each of the first and second USPs is coupled to an upstream vPPB, and the DSP is coupled to a downstream vPPB.

In some embodiments, the first USP is of a first type of physical port configured to couple from its first side a host and from its second side an upstream virtual PCIe-to-PCIe bridge (vPPB) of a VCS, the DSP is of a second type of physical port configured to couple from its first side a device and from its second side a downstream vPPB of a VCS, and the first route does not traverse via an RPU. As explained above, CXL Specification Revision 3.1 refers to switch ports as physical ports. Referring to FIG. 44A as a non-limiting example, the physical ports may refer to one or more of: a USP (e.g., USP.1), a DSP (e.g., DSP.3), a logical port that from one side is internal to the RPU and from its other side may be coupled to an upstream vPPB of a VCS (e.g., USP.a), or a logical port that from one side is internal to the RPU and from its other side may be coupled to a downstream vPPB of a VCS (e.g., DSP.c). Optionally, the second route further traverses via an RPU and two DSPs of a third type; and wherein a DSP of the third type is configured to couple internally to the RPU from its first side and to couple to a downstream virtual PCIe-to-PCIe bridge (vPPB) of a VCS from its second side. Alternatively, the second route further traverses via an RPU and two DSPs of a third type; and wherein a DSP of the third type is configured to couple to a CXL Endpoint of the RPU from its first side and to couple to a downstream virtual PCIe-to-PCIe bridge (vPPB) of a VCS from its second side.

In some embodiments of the switch, the switch further includes a third USP configured to communicate with a third host according to a fourth CXL protocol, and a second DSP configured to communicate with a second device according to a fifth CXL protocol; and wherein the third USP is coupled to the second DSP via a third route that traverses an RPU. Optionally, the third USP is of a first type of physical port configured to couple from its first side a host and from its second side an upstream virtual PCIe-to-PCIe bridge (vPPB) of a VCS, and the second DSP is of a second type of physical port configured to couple from its first side a device and from its second side a downstream vPPB of a VCS; and wherein the third route further traversing via a third DSP of a third type and a fourth USP of a fourth type, wherein a DSP of the third type is configured to couple internally to the RPU from its first side and to couple to a downstream vPPB of a VCS from its second side, and a USP of the fourth type is configured to couple internally to the RPU from its first side and to couple to an upstream vPPB of a VCS from its second side. Optionally, the third USP is of a first type of physical port configured to couple from its first side a host and from its second side an upstream virtual PCIe-to-PCIe bridge (vPPB) of a VCS, and the second DSP is of a second type of physical port configured to couple from its first side a device and from its second side a downstream vPPB of a VCS; and wherein the third route further traversing via a third DSP of a third type and a fourth USP of a fourth type, wherein a DSP of the third type is configured to couple to a CXL Endpoint of the RPU from its first side and to couple to a downstream vPPB of a VCS from its second side, and a USP of the fourth type is configured to couple to a CXL Root Port of the RPU from its first side and to couple to an upstream vPPB of a VCS from its second side.

In another embodiment, a switch configured to establish multiple types of communication routes includes a first set of physical ports, each configured to couple from its first side a host or device and from its second side an upstream or downstream virtual PCIe-to-PCIe bridge (vPPB) of a VCS, respectively; a second set of physical ports, each configured to couple from its first side an RPU and from its second side a downstream or upstream vPPB of a VCS; wherein a first route between a first host and a first device traverses: a first physical port of the first set, a single VCS, and a second physical port of the first set; and wherein a second route between the first host and a second host traverses: the first physical port of the first set, a first VCS, a first physical port of the second set, the RPU, a second physical port of the second set, a second VCS, and a third physical port of the first set.

In some embodiments of the switch, the RPU is configured to terminate CXL transactions with the first and second hosts, and to translate between CXL messages associated with the terminated CXL transactions. In some embodiments, the first host utilizes CXL.mem for at least some messages routed via the RPU, the second host utilizes CXL.cache for at least some messages routed via the RPU, and the RPU is configured to translate between at least some of the CXL.mem and CXL.cache messages.

In some embodiments, the switch further includes a first virtual to physical binding configured to bind upstream physical ports of the first and second sets of physical ports with upstream vPPBs of the VCSs; and a second virtual to physical binding configured to bind downstream physical ports of the first and second sets of physical ports with downstream vPPBs of the VCSs. Optionally, the first route traverses virtual to physical bindings twice, and the second route traverses virtual to physical bindings four times. Optionally, the switch further includes a virtual to physical binding configured to bind downstream physical ports of the first and second sets of physical ports with downstream vPPBs of the VCSs; and wherein the first route traverses the virtual to physical binding once, and the second route traverses the virtual to physical binding twice.

Optionally, in some embodiments of the switch, the switch further includes a fourth physical port and a fifth physical port of the first set, a third physical port and a fourth physical port of the second set, and a third VCS and a fourth VCS; and wherein a third route between a third host and a fourth host traverses: the fourth physical port of the first set, the third VCS, the third physical port of the second set, the RPU, the fourth physical port of the second set, the fourth VCS, and the fifth physical port of the first set. Optionally, the switch further includes a sixth physical port of the first set; and wherein a fourth route between the third host and a second device traverses: the fourth physical port of the first set, the third VCS, and the sixth physical port of the first set.

In another embodiment, a switch configured to establish multiple types of communication routes includes a plurality of Virtual CXL Switches (VCSs), each includes an upstream virtual PCIe-to-PCIe bridge (vPPB) coupled to one or more downstream vPPB; a first set of physical switch ports interfacing between the VCSs and external hosts or devices; a second set of physical switch ports interfacing between the VCSs and an RPU; wherein a first physical port of the first set is bound to an upstream vPPB of a first VCS, and a second physical port of the first set is bound to a first downstream vPPB of the first VCS, establishing a first communication route; and wherein the first physical port is further bound to a second downstream vPPB of the first VCS that is bound to a first physical port of the second set that is bound to a second physical port of the second set that is bound to a third physical port of the first set via a second VCS, establishing a second communication route via the RPU.

In some embodiments of the switch, the first physical port of the first set is further coupled to a CXL host, the second physical port of the first set is further coupled to a first CXL device, and the third physical port of the first set is further coupled to a second CXL host. This configuration is illustrated in FIG. 44A. In other embodiments, the first physical port of the first set is further coupled to a CXL host, the second physical port of the first set is further coupled to a first CXL device, and the third physical port of the first set is further coupled to a second CXL device. This configuration is illustrated in FIG. 44B. In in still other embodiments of the switch, the switch further includes a fourth physical port of the first set coupled via third and fourth VCSs to a fifth physical port of the first set, establishing a third communication route via the RPU. The third communication route via the RPU may be a host to host route or a host to device route.

In one embodiment, a method for establishing multiple types of communication routes in a switch includes establishing a first route between a first host and a first device by: binding a first physical port of a first set of physical ports to a first upstream virtual PCIe-to-PCIe bridge (vPPB) of a first VCS, and binding a second physical port of the first set to a first downstream vPPB of the first VCS; and establishing a second route between the first host and a second host by: binding the first physical port to the first upstream vPPB of the first VCS, binding a first physical port of a second set of physical ports to a second downstream vPPB of the first VCS, routing through an RPU, binding a second physical port of the second set to a downstream vPPB of a second VCS, and binding a third physical port of the first set to an upstream vPPB of the second VCS that is coupled to the second host.

In some embodiments, the method further includes establishing a third route between a third host and a fourth host by: binding a fourth physical port of the first set to an upstream vPPB of a third VCS, binding a third physical port of the second set to a downstream vPPB of the third VCS, routing through the RPU, binding a fourth physical port of the second set to a downstream vPPB of a fourth VCS, and binding a fifth physical port of the first set to an upstream vPPB of the fourth VCS. Optionally, the method further includes translating, by the RPU, CXL.mem messages received from the first host to CXL.cache messages transmitted to the second host. In one embodiment, a non-transitory computer-readable medium includes instructions that, when executed by a processor, cause the processor to perform the method described above.

Figure 45:
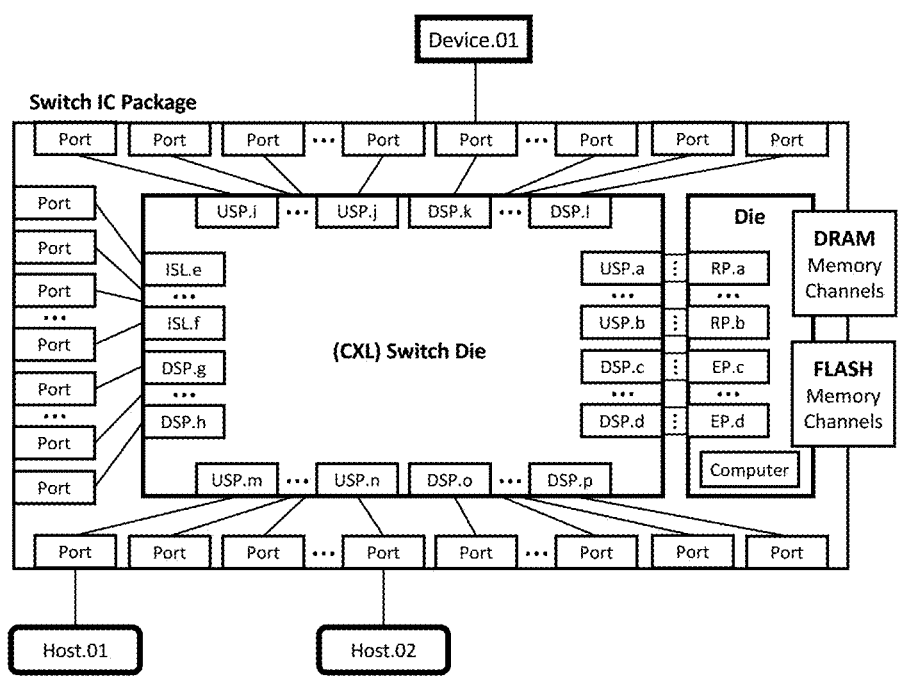
FIG. 45 illustrates one embodiment of a switch including at least two dies packaged within a Switch IC Package.

In one embodiment, a switch includes a first die including first and second sets of CXL USPs, first and second sets of CXL DSPs, and routing hardware configured to route data between the USPs and DSPs; a second die including CXL Root Ports (RPs) coupled to the second set of USPs, CXL Endpoints (EPs) coupled to the second set of DSPs, and DRAM memory channels configured to couple to DRAM memory modules; and a computer configured to: monitor data traffic through the USPs and DSPs, store frequently accessed data in the DRAM memory modules, and utilize the DRAM memory modules as a cache. The term "die" includes chiplets and other forms of semiconductor dies. Optionally, the first die is a switch die, such as a CXL switch die. The second die may be implemented as a chiplet, which may be designed to be integrated with additional chiplets. Optionally, the second die is an RPU die made according to one of the embodiments described herein. FIG. 45 illustrates one embodiment of a switch including at least two dies packaged within a Switch IC Package. The first die, labeled "(CXL) Switch Die", includes multiple USPs, multiple DSPs, and multiple inter-switch links (ISL) that may enable connectivity with other switches. These ports are interconnected through routing hardware within the switch die to facilitate data routing between various ports. The second die, labeled "Die", incorporates Root Ports (RP.a through RP.b) coupled to selected USPs, and Endpoints (EP.c through EP.d) coupled to selected DSPs. The second die also includes DRAM Memory Channels configured to couple with DRAM memory modules. The second die may further include optional FLASH Memory Channels configured to couple with flash memory modules. A Computer component within the second die monitors data traffic through the switch ports and manages the DRAM as a cache for frequently accessed data. The switch supports connectivity to multiple hosts and devices, as illustrated by Host.01 and Host.02 connections through the switch's external ports on the bottom of the package, and Device.01 connection through a port on the top of the package. The external ports of the Switch IC Package may couple to these hosts and devices either directly or through intermediate components.

In some embodiments of the switch, the computer is implemented in at least one of the first die, the second die, or a third die included in the switch; and wherein the DRAM memory modules include at least 4 GB of memory capacity. Optionally, the at least 4 GB of DRAM memory modules are soldered to printed circuit board (soldered DRAM) or in DIMMs form-factor. Optionally, the computer is further configured to: track access patterns of data flowing through the switch, identify data accessed above a predetermined frequency threshold, and store the identified data in the DRAM memory modules. Optionally, the computer is further configured to: allocate portions of the DRAM memory modules as data buffers, and temporarily store incoming data packets in the data buffers. Additionally or alternatively, the computer is further configured to: store routing tables in the DRAM memory modules, update the routing tables based on network topology changes, and access the routing tables to make routing decisions. Additionally or alternatively, the computer is further configured to: partition the DRAM memory modules into multiple zones, assign different zones to different ports or devices, and enforce memory access isolation between zones. Additionally or alternatively, the computer is further configured to: monitor performance metrics of data accesses, and adjust caching policies based on the performance metrics.

In some embodiments of the switch, the DRAM memory modules include at least 4 GB of memory capacity, the DRAM memory modules are organized in multiple channels enabling concurrent cache operations, and wherein the computer is further configured to: perform parallel cache lookups across channels to minimize access latency, and execute simultaneous cache fills and evictions using different channels. In some embodiments, the DRAM memory modules include at least 8 GB of memory capacity, and the computer is further configured to: implement parity checking for cached data to detect data corruption, and invalidate cached data upon detecting parity errors. To ensure data integrity within the cache, the computer may implement parity checking for cached data to detect data corruption within the DRAM cache. This parity-based error detection approach offers a balance between complexity and reliability, providing a simpler alternative to full ECC implementations while still ensuring sufficient data integrity for the caching function. Upon detection of a parity error, indicating potential data corruption, the computer invalidates the affected cached data, and may further reload the affected cache entries from their original source after the invalidation the corrupted entries. In some embodiments of the switch, the DRAM memory modules include at least 4 GB of memory capacity, and the computer is further configured to: monitor cache hit rates per channel, identify high-traffic cache regions, and redistribute frequently accessed cache entries across channels to maximize available cache bandwidth while minimizing access latency.

In one embodiment, a switch includes a first die including first and second sets of CXL USPs, first and second sets of CXL DSPs, and routing hardware configured to route data between the USPs and DSPs; a second die including CXL Root Ports (RPs) coupled to the second set of USPs, CXL Endpoints (EPs) coupled to the second set of DSPs, DRAM memory channels configured to couple to DRAM memory modules, and FLASH memory channels configured to couple to FLASH memory modules; and a computer configured to: monitor data traffic through the USPs and DSPs, store frequently accessed data in DRAM memory modules coupled to the DRAM memory channels, and store less frequently accessed data in FLASH memory modules coupled to the FLASH memory channels.

In some embodiments of the switch, the computer is further configured to maintain a unified resource management table including entries for at least portions from the DRAM and FLASH memory modules, track allocation and usage of the at least portions from the DRAM and FLASH memory modules using the unified resource management table, and make memory allocation decisions based on consolidated information from the unified resource management table. Additionally or alternatively, each entry in the unified resource management table includes a memory type identifier indicating whether the entry corresponds to DRAM or FLASH memory, an access frequency counter, a last access timestamp, and a migration priority value determined based on both the access frequency counter and the memory type identifier. Additionally or alternatively, the computer is further configured to: analyze cache access patterns between the DRAM and FLASH, predict which data should be cached in the DRAM versus the FLASH based on the access patterns, and preemptively migrate data between DRAM and FLASH cache tiers to optimize cache hit rates. Optionally, the access patterns include temporal locality, which in this context relates to same data accessed repeatedly, and the spatial locality, which in this context relates to nearby data accessed together. Additionally or alternatively, the unified resource management table includes target cache hit rate parameters for both DRAM and FLASH cache tiers, maximum acceptable latency thresholds for cache accesses, configurable thresholds for cache tier migration, and dynamic priorities for different traffic types accessing the cache tiers. Additionally or alternatively, the computer is configured to determine cache placement between DRAM and FLASH tiers based on a placement score calculated using: cache hit rate for the data, whether the data is mostly read or written, size of the data relative to available cache space, and current cache tier utilization levels, wherein the computer periodically recalculates placement scores to adapt to changing access patterns. In some embodiments, the computer is further configured to expose an interface for external management systems to access and modify the resource management table, enabling dynamic configuration and monitoring of memory resources, wherein the interface provides atomic operations for coordinated updates to both DRAM and FLASH memory configurations. Additionally or alternatively, the computer is further configured to maintain performance metrics in the resource management table for both DRAM and FLASH memory operations, and expose the performance metrics through an external interface utilizing telemetry. Additionally or alternatively, the computer is further configured to: implement a write-around policy for streaming writes that bypass FLASH cache, identify streaming write patterns using the unified resource management table, and maintain separate write buffers in DRAM for streaming versus random writes. Additionally or alternatively, the computer is further configured to: track read-only versus read-write access patterns in the unified resource management table, preferentially store read-only data in FLASH cache to minimize FLASH writes, and maintain frequently modified data in DRAM cache to extend FLASH lifetime.

In some embodiments of the switch, the computer is further configured to: move data between the DRAM memory modules and the FLASH memory modules based on access patterns, and utilize the DRAM and FLASH memory modules as a cache. Optionally, the computer is further configured to: allocate portions of the FLASH memory modules to different ports of the switch, manage access permissions to the allocated portions, and provide persistent storage services to devices connected to the switch. In some embodiments of the switch, the FLASH memory modules include multiple independent channels enabling parallel access operations, and wherein the computer is further configured to: perform concurrent read operations across multiple FLASH channels to reduce second-tier cache access latency, and execute background write operations for cache updates using available channel bandwidth. In some embodiments, the computer is further configured to: monitor access patterns to FLASH-cached data, and organize frequently accessed data in separate FLASH channels to enable parallel access. In some embodiments of the switch, the computer is further configured to: implement write buffering in DRAM before writing to FLASH cache, coalesce multiple writes to the same FLASH cache line to reduce write operations, and perform background write operations to FLASH when DRAM write buffers reach predetermined thresholds.

In another embodiment, a switch includes CXL USPs; CXL DSPs; DRAM memory channels coupled to at least 4 GB of DRAM memory modules; and a computer configured to: route CXL messages via the USPs and DSPs, and utilize the DRAM memory modules as a cache for data carried in the CXL messages by intercepting CXL messages routed via the USPs and the DSPs, and serving data from the DRAM memory modules if available. In some embodiments of the switch, the switch further includes a first die including the USPs and the DSPs, and a second die including: CXL Root Ports (RPs) coupled to a first set of the USPs, CXL Endpoints (EPs) coupled to a first set of the DSPs, and the DRAM memory channels. Optionally, the second die further includes FLASH memory channels configured to couple to FLASH memory modules; and wherein the computer is further configured to: store less frequently accessed data in FLASH memory modules coupled to the FLASH memory channels, and move data between the DRAM memory modules and the FLASH memory modules based on access patterns.

In modern computing systems, the use of high-speed interconnects and memory sharing technologies has become increasingly prevalent. Various standards, including CXL, utilize the concepts of HPA and Device Physical Address (DPA) to facilitate efficient communication between processors and devices, as well as resource sharing among the network/fabric/interconnect nodes. While both HPA and DPA are used to address memory, they serve different purposes and are non-equivalent concepts in CXL and other similar standards. In addition, the separation of address spaces, the flexibility in mapping between HPA and DPA, and the different memory types and logical entities introduced by CXL all contribute to the non-equivalence of HPA and DPA.

HPA represents the physical address space managed by a host processor, which is distinct from the device-specific address space. In contrast, DPA forms a device-scoped flat address space, meaning that each device has its own unique address space. According to the CXL 3.1 standard, a Logical Device Fabric-Attached Memory (LD-FAM) presents a distinct DPA space per Logical Device (LD); a Global FAM (G-FAM) device presents the same DPA space to all hosts; and the CXL Host-managed Device Memory (HDM) decoders or G-FAM device (GFD) decoders map HPA to DPA space. The mapping between HPA and DPA is not a one-to-one relationship, and multiple HPAs can be mapped to a single DPA.

The presence of DPA in CXL devices is directly related to their memory resources. CXL memory expanders, CXL memory buffers, and CXL memory controllers-all have DPA because they contain memory resources that require addressing within their respective device-specific address spaces. In contrast, a standard CXL switch does not have DPA because it does not contain memory resources of its own, as its primary function is to facilitate communication between CXL devices and hosts rather than to provide memory storage. Furthermore, none of the abovementioned CXL devices and CXL switch have HPA because they are not hosts. HPA is associated with host processors, which manage their own physical address spaces. Moreover, HPA is usually mapped to a virtual address space on the host, while DPA is not mapped to an equivalent virtual address space on a CXL device.

The following definitions, which are based on the CXL 3.1 standard, serve as representative non-limiting examples. It is noted that suitable explanations can be derived from other versions of the CXL standard. CXL 3.1 standard introduces several memory types, such as Host-managed Device Memory (HDM), Private Device memory (PDM), and Fabric-Attached Memory (FAM), each with its own characteristics and purposes. HDM is a device-attached memory that is mapped to system coherent address space and accessible to the Host using standard write-back semantics. Memory located on a CXL device can be mapped as either HDM or PDM. In contrast, PDM is a device-attached memory that is not mapped to system address space or directly accessible to Host as cacheable memory; memory located on PCIe devices is of this type. Memory located on a CXL device can be mapped as either PDM or HDM. FAM, on the other hand, is an HDM within a CXL Type 2 or Type 3 device that can be made accessible to multiple hosts concurrently. Each HDM region can either be pooled (dedicated to a single host) or shared (accessible concurrently by multiple hosts).

CXL 3.1 standard also defines logical entities like Logical Devices (LDs) and Multi-Logical Devices (MLDs). A Logical Device (LD) is an entity that represents a CXL Endpoint that is bound to a VCS. A Single Logical Device (SLD) contains one LD. An MLD contains multiple LDs. MLDs are further defined as a CXL component that contains multiple LDs, out of which one LD is reserved for configuration via the Fabric Manager (FM) API, and each remaining LD is suitable for assignment to a different host. In addition, CXL 3.1 standard introduces the concept of a Fabric Manager (FM), which is an entity separate from the switch or host firmware that controls aspects of the system related to binding and management of pooled ports and devices.

Figure 46:
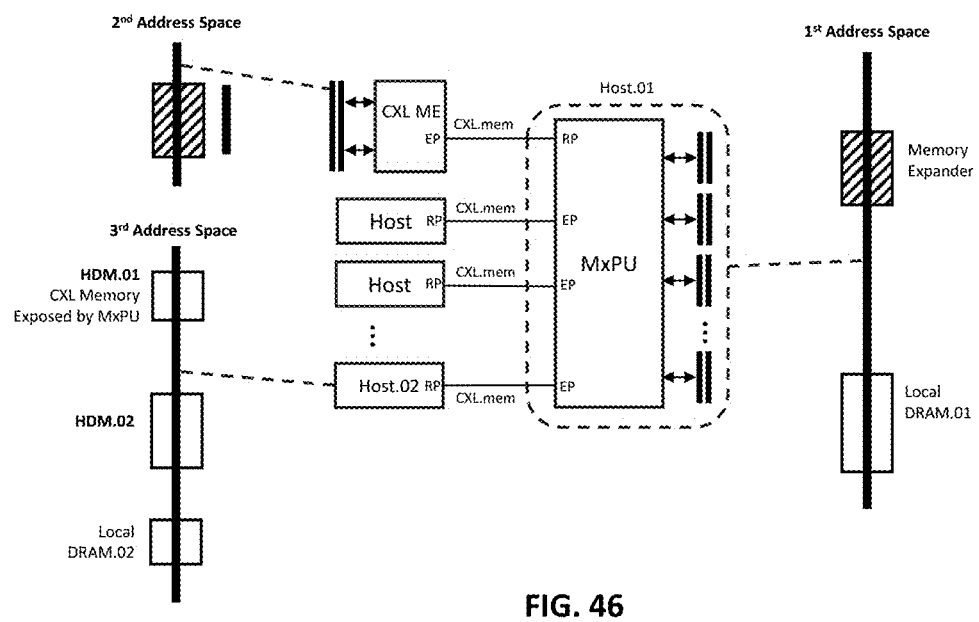
FIG. 46 illustrates a system that utilizes memory address mapping and exposes memory resources across multiple hosts and devices.

FIG. 46 illustrates a system that utilizes memory address mapping and exposing, also referred to as provisioning, of memory resources across multiple hosts and devices, for example according to one or more CXL protocols. FIG. 46 illustrates a first host (Host.01), which includes one embodiment of an MxPU connected to (Local DRAM.01). The MxPU in (Host.01) is coupled to a second host (Host.02) over a first CXL.mem link and to a CXL memory expander (ME) over a second CXL.mem link. Multiple hosts and devices may utilize their own address space, for example, (Host.01) utilizes a first Address Space, (Host.02) utilizes a third Address Space, and the CXL memory expander (ME) utilizes a second Address Space.

Figure 47:
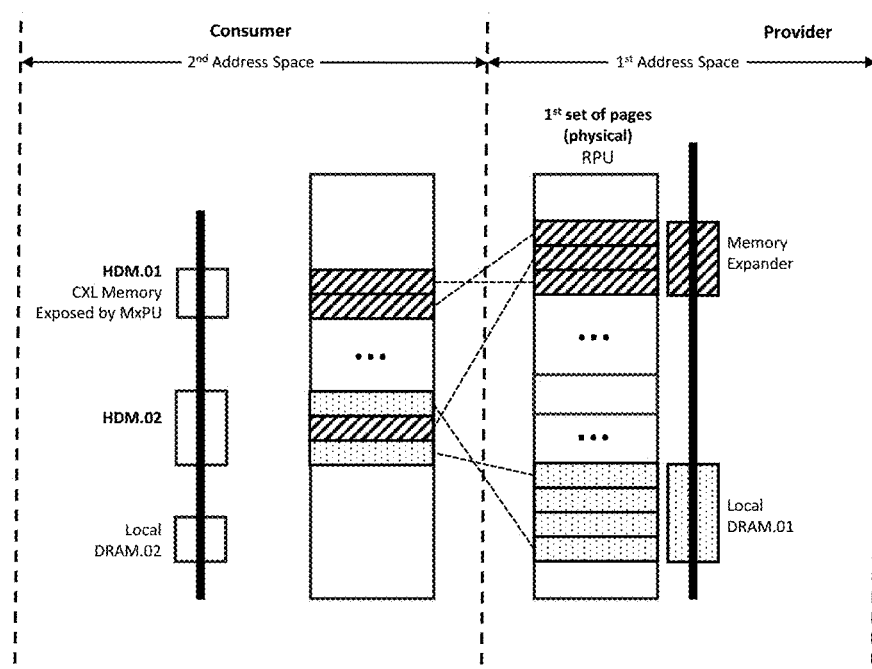
FIG. 47 illustrates a more detailed view of the address space mappings and the organization of memory resources within the system.

FIG. 47 illustrates a more detailed view of the address space mappings and the organization of memory resources within the system, for example highlighting the flexibility of memory provisioning to multiple consumers. The memory resources of (Host.01), which are illustrated in FIG. 46 and may be composed of one or more DRAM modules, such as (Local DRAM.01) and a (Memory Expander), are organized by the Provider as a first set of pages that may reside in a first Address Space. Each page within the first set of pages may represent a contiguous physical address range, for example, that may be represented as (Base_Address, Size) or (Address_Low, Address_High). The RPU, which may also be referred to as resource Composer (ResC), within the MxPU or the memory pool, may further organize the physical address ranges to a second set of physical memory pages, which serve as granularity units for memory provisioning performed by the RPU/MxPU. The second set of pages may possibly be of a larger size compared to pages within the first set of pages, and for example, the RPU may support exposing/provisioning memory in multiple page sizes. The RPU performs the address translation from the second set of pages residing in the first Address Space to a second Address Space utilized by one or more Consumers, for example (Host.02), which is illustrated in FIG. 46. These mapped pages are exposed to the one or more Consumers as one or more CXL Host-Managed Device Memories (HDM.01) and (HDM.02), using the CXL.mem protocol, and (HDM.01) may be referred to as CXL Memory exposed by the MxPU, as illustrated in FIG. 47.

Processor Physical Address Space (Processor PA Space) refers to the range of memory addresses that a host processor, such as a CPU, a GPU, an Integrated CPU-GPU, or an MxPU, can directly access and manipulate in a computing environment, including but not limited to local RAM (including DRAM as defined herein), ROM, application-managed cache memory, memory-mapped input/output (MMIO) regions, CXL-attached memory devices, and any other hardware resources that can be addressed by the host processor. The Processor PA Space is typically configured during system initialization and may be subject to hardware-specific limitations, such as maximum addressable memory size or reserved address ranges. The processor PA Space may extend beyond local memory, such as to include one or more of disaggregated or pooled memory resources accessible via CXL interfaces, xPUs interconnected with ISOL, and/or xPUs interconnected with node controller(s).

OS Physical Address Space (OS PA Space) refers to the representation and management of physical memory resources by the OS in a computing environment, which is a software abstraction that maps to the underlying Processor PA Space and may include additional metadata or structures used by the OS for memory management. The OS PA Space may include all or a subset of the available system memory, including both local and CXL-attached memory, as well as memory-mapped devices and regions reserved for system use. The OS PA space is utilized for allocating and managing memory resources for many types of software and hardware system components, including processes and drivers, and to facilitate communication between software and hardware, potentially employing specific mechanisms to handle CXL-attached memory differently from local memory. The exact implementation and characteristics of the OS PA Space may vary depending on the specific OS, hardware platform, and CXL implementation.

The Processor PA Space and the OS PA Space are closely related but not necessarily identical, with the latter typically being a subset of the former due to various factors such as hardware limitations, memory reservations for specific hardware functions or firmware use, OS design choices for compatibility or security reasons, virtualization scenarios where hypervisors present limited views of physical memory to guest operating systems, and complex memory architectures in CXL-enabled systems where the OS may manage memory resources with varying characteristics and access methods. The OS is responsible for mapping its PA Space to the Processor PA Space, ensuring correct translation of memory accesses by software to appropriate hardware addresses through the configuration of memory management units (MMUs) and maintenance of data structures like page tables, while also managing any discrepancies between its view of physical memory and the actual hardware capabilities, which may include handling the unique aspects of CXL-attached memory in terms of performance, coherence, and accessibility.

In some embodiments, the disclosed RPU translates CXL messages between provider PA space (which may also be referred to as provider HPA space) and consumer PA space (which may also be referred to as consumer HPA space), where depending on the context, each of the consumer and provider PA (or HPA) spaces may represent either the Processor PA Space or the OS PA Space. This flexibility in address space representation is due to the (optional) multi-layered nature of the RPU, which incorporates hardware components with firmware and software running on top. At the hardware level, the RPU may operate within the Processor PA Space, performing translations between consumer and provider Processor PA spaces, which allows for efficient, low-level address translation that can take full advantage of the processor's addressing capabilities.

However, there are scenarios where the RPU may operate within the constraints of the OS PA Space, which can occur when the RPU is configured from an OS that has a PA space size smaller than the PA space size of the processor it runs on. In such cases, the RPU PA Space may become limited because the software configuring it runs on top of a limited OS. As a result, the RPU may need to translate from a provider OS PA Space to a consumer Processor PA Space.

Furthermore, there can be embodiments where the PA translations may occur between OS PA Spaces. For example, if a limited OS (e.g., a 32-bit OS) configures the RPU on the provider side, and another limited OS configures the host-managed device memory (HDM) on the consumer side, the RPU would effectively translate from a first OS PA Space to a second OS PA Space. This scenario can arise when limited OS variants (e.g., 32-bit OSes) are running on both the provider and consumer sides, despite being hosted on capable processors with larger address spaces (e.g., 52-bit address space), and in such cases the RPU would operate within the constraints of these limited OS PA spaces.

The applicability of the RPU to work with different combinations of Processor PA Spaces and OS PA Spaces supports a wide range of system configurations and operating environments, accommodating various processor capabilities and OS limitations while maintaining the ability to facilitate CXL message communication between provider and consumer PA spaces. It is noted that, unless specifically indicated otherwise, the specific PA translations performed by the RPU in each embodiment are not limited to specific types of PA spaces or protocols and may occur between any PA spaces relevant to the particular embodiment, such as various implementations of processor PA spaces, OS PA spaces, CXL HPA spaces, or other relevant PA spaces utilized in computing systems. The RPU's flexibility allows it to operate across different PA space implementations, accommodating variations in system architectures, memory hierarchies, and interconnect technologies.

Figure 48:
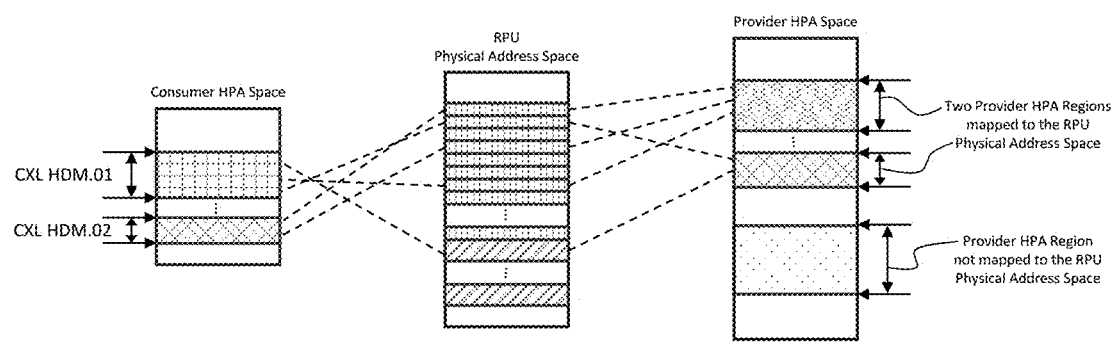
FIG. 48 illustrates an example of mapping between a Consumer HPA space, an RPU physical address space, and a Provider HPA space.

FIG. 48 illustrates an example of mapping between a Consumer HPA space, an RPU physical address space, and a Provider HPA space. The RPU may possibly map two Provider HPA regions within the Provider HPA space to the RPU physical address space, while one or more other Provider HPA regions may remain unmapped. The RPU may also perform address translation between the RPU physical address space and two Consumer HPA regions within the Consumer HPA space. These two Consumer HPA regions may correspond to two CXL Host-Managed Device Memories (CXL HDM.01) and (CXL HDM.02). The two Consumer HPA regions may be represented on the Consumer Host as a DAX Device, may be exposed as two additional memory-only NUMA nodes, or may be exposed utilizing other methods relevant to CXL systems.

For example, the Access Control List (ACL) in the CXL 2.0 specification is primarily used in the context of Base Address Register (BAR) Virtualization to ensure that only safe sections of a device's register space are accessible to Virtual Machines (VMs). This means that it affects access to memory-mapped resources within the device's BAR space, which in turn influences the physical addresses available for translation by the RPU. The ACL specifies which parts of the BAR can be safely assigned to VMs, indirectly influencing how memory resources are managed and accessed. For example, BIOS Integrated I/O (IIO) configuration may implement a CXL ACL-like behavior with two or more of the following modes: Fully Trusted, Partially Trusted, Untrusted, and Auto. The Fully Trusted mode may enable the RPU to access the entire Processor PA Space. The Partially Trusted mode may enable the RPU to access only its own device-attached memory when the cache biasing is in Host mode, requiring the device to snoop the Host first before accessing its own memory. The Untrusted mode may disable CXL.cache functionality for the RPU. And the Auto mode may allow the BIOS vendor or the Platform OEM Vendor to create a list of CXL device identities (e.g., (Vendor ID, Device ID) tuples) that the BIOS will automatically set to Fully Trusted, Partially Trusted, or Untrusted modes for the purpose of RPU translations.

Different computer servers employ varied processes for establishing the Processor PA Space and OS PA Space that map the processor and OS to actual hardware resources. These processes are intricate and dependent on the specific hardware architecture, firmware implementation, and OS in use. Methods for configuring these physical address spaces may vary between different processor families, motherboard designs, and system software implementations. The processes for configuring various HPA spaces are typically detailed in technical documents, such as reference manuals, which may be provided by manufacturers, that may include comprehensive details about the processor architecture and programming model; datasheets with specific information about hardware components and their electrical characteristics; release notes containing updates and specific implementation details; other manufacturer documentation available through resources such as Intel Developer Zone or NVIDIA Documentation Hub; and/or confidential documents provided by manufacturers to their partners under NDA, containing detailed information about specific initialization processes and memory mapping techniques, including those related to CXL and other advanced memory technologies.

For example, descriptions of processes for establishing processor and OS physical address spaces that map the processor and OS to actual hardware resources, for certain Intel processors, can be found in (i) "Intel® Xeon® Processor E5 v2 and E7 v2 Product Families Uncore Performance Monitoring Reference Manual". Intel. February 2014; (ii) "Intel® Xeon® Processor Scalable Memory Family Uncore Performance Monitoring". Intel. July 2017; (iii) Hillenbrand, Marius. "Physical Address Decoding in Intel Xeon v3/v4 CPUs: A Supplemental Datasheet." Karlsruhe Institute of Technology, Tech. Rep. (2017); and (iv) Costan, Victor, and Srinivas Devadas. "Intel SGX explained." Cryptology ePrint Archive (2016).

In one example, a possible method for establishing the physical address space in Intel's Xeon family utilizing the Haswell or Broadwell microarchitectures begins upon system power-on, with the processor executing code from a predetermined location in the firmware ROM or Flash Memory. This initial phase, often referred to as the Security (SEC) phase, involves the processor initializing and configuring basic hardware components, potentially utilizing the processor's caches as RAM, to facilitate early initialization tasks. Following the SEC phase, the system transitions to the Pre-Extensible Firmware Interface (Pre-EFI) Initialization phase, where the firmware takes on the task of initializing the DRAM subsystem, which involves discovering and initializing the DRAM chips connected to the motherboard, configuring the CPU's integrated memory controller (iMC), and setting up Memory Type Range Registers (MTRRs) to define memory attributes for different regions of the physical address space. Once DRAM is available and properly configured, the Pre-EFI Initialization phase code typically copies itself to DRAM, dismantles the temporary memory store, and the firmware also initializes other system components involved in defining the physical address space. The system then progresses to the Driver Execution Environment (DXE) phase, where various firmware drivers are loaded and executed. These drivers may further refine the configuration of the memory subsystem and other hardware components, potentially making adjustments to the physical address space mapping. Subsequently, the firmware loads a boot loader to memory, which may make additional modifications to the memory map before passing control to the OS kernel. The OS, upon gaining control, initializes its own memory management subsystems, which involves reading the memory map provided by the firmware and boot loader, setting up its own page tables for virtual memory management, and potentially making further adjustments to MTRRs or other memory-related hardware features. In CXL-enabled systems, the OS may need to employ further mechanisms to manage and integrate CXL-attached memory to its PA Space. Note that the process described in this example is specific to certain Intel processor models and is just one example of how the physical address space may be constructed during system initialization. Other processors, including those from different manufacturers or different generations within the same manufacturer's lineup, may employ different procedures for generating the processor and OS physical address spaces, involving different firmware stages, hardware initialization sequences, and/or memory mapping techniques, as described in the relevant reference manuals, datasheets, release notes, and/or manufacturer documentation.

Figure 49:
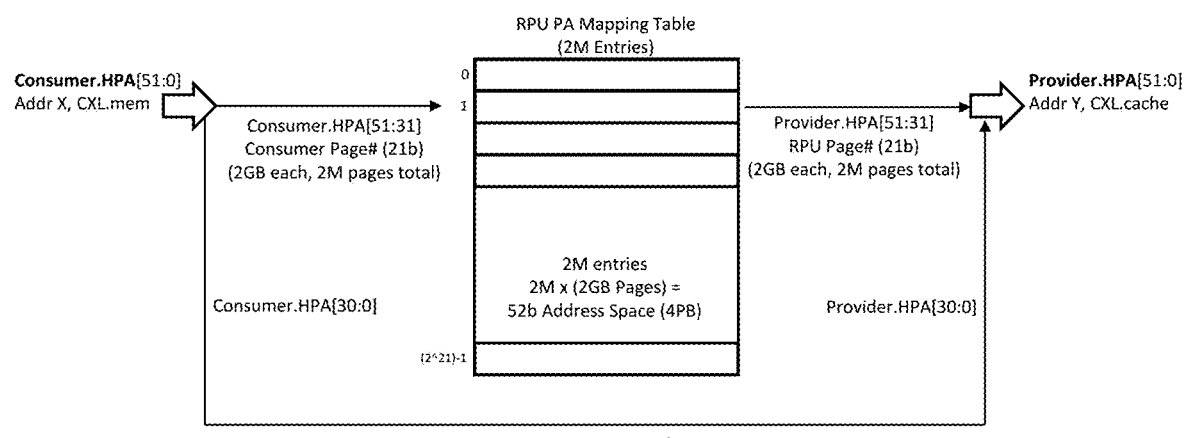
FIG. 49 and FIG. 50 illustrate possible embodiments of address translations performed by the RPU.

FIG. 49 illustrates one possible embodiment of address translation performed by the RPU, where the RPU Address Mapping Logic translates a Consumer Host Physical Address (Consumer.HPA) received over a CXL.mem interface to a Provider Host Physical Address (Provider.HPA) referenced over a CXL.cache interface. In this example, both the Consumer and Provider address spaces are divided into 2 GB-size pages. For example, a modern x86 CPU may provide up to a 52-bit physical address space, which may be divided into up to 2 M×2 GB pages. This embodiment demonstrates a straightforward exhaustive translation covering all 2 GB pages of the address spaces. The lower 31 bits of the (HPA) address may make the internal offset within a 2 GB page, whereas the upper 21 bits may make the 2 GB Page Number. The size of the RPU PA Mapping Table in this embodiment may be, for example, 2 M entries×21 bits=42 Mbits, and it may serve a single CXL.mem interface. The RPU PA Mapping Table may contain 2 M entries, and each entry may be 21 bits wide. As illustrated in FIG. 49, (Consumer.HPA [51:31]) may be translated to (Provider.HPA [51:31]) using the RPU PA Mapping Table, and (Consumer.HPA [30:0]) may pass through as (Provider.HPA [30:0]). Other embodiments may cover smaller parts of the whole 52-bit address space and may consider the sparse nature of such address mapping, by using diverse implementations such as Radix-Trees or Hash Tables. It is important to note that FIG. 49 illustrates just one possible embodiment, and other implementations are possible. For example, the RPU may utilize smaller page sizes, such as 1 MB pages, and reduce the scope of the memory mapped in the mapping table.

Figure 50:
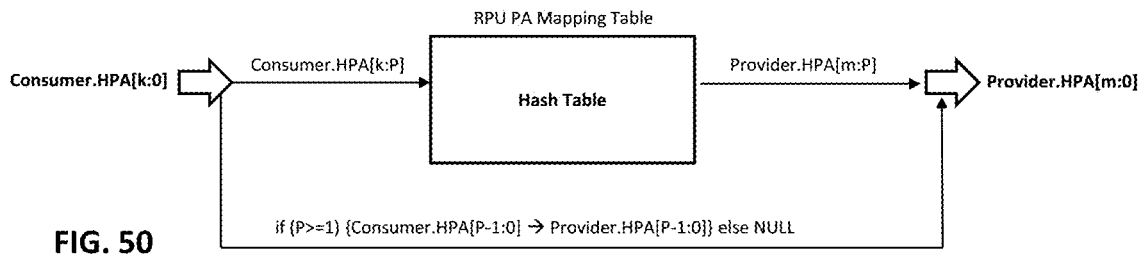

FIG. 50 illustrates one possible embodiment of RPU translation using a Hash Table. In this example, it is assumed that (P=<k) and (P=<m). The RPU may receive a (Consumer.HPA [k:0]) and may output a (Provider.HPA [m:0]). In some embodiments, P may represent a cacheline size in bits (e.g., P=6 represents a cacheline of 64 Bytes), where RPU translation is performed in cacheline granularity. If (P>=1), the RPU may translate (Consumer.HPA [P-1:0]) to (Provider.HPA [P-1:0]), otherwise the output may be a NULL.

In one embodiment, an apparatus includes a processor configured to utilize a first HPA space to utilize at least 8 GB of dynamic random-access memory (DRAM) connected to the apparatus by memory channels; a memory management unit (MMU) configured to map addresses between the first HPA space and a virtual address space utilized by an operating system of the apparatus; a CXL Endpoint (EP) configured to communicate with a second host according to a CXL.mem protocol; and a resource processing unit (RPU) configured to perform host-to-host physical address translations which enable the second host to utilize the DRAM utilizing the CXL.mem protocol.

In some embodiments of the apparatus, the second host utilizes a second HPA space, and the host-to-host physical address translations translate addresses from the second HPA space to the first HPA space. In some embodiments, the apparatus further includes a CXL Root Port configured to communicate with a CXL memory expander that utilizes a Device Physical Address (DPA) space; and wherein at least one of the operating system or system firmware is configured to map addresses between the DPA space and the first HPA space, which enables the second host to utilize the DRAM and/or memory mapped to the DPA space. Optionally, the apparatus further includes a second CXL EP configured to communicate with a third host utilizing a second CXL.mem protocol, whereby the third host utilizes a third HPA space; and wherein the RPU is further configured to translate physical addresses from the third HPA space to the first HPA space, which enables the third host to utilize memory mapped to the DPA space. In some embodiments of the apparatus, the apparatus further includes a second CXL EP configured to communicate with a third host utilizing a second CXL.mem protocol, whereby the third host utilizes a third HPA space, and the RPU is further configured to translate physical addresses from the third HPA space to the first HPA space, which enables the third host to utilize the DRAM. In some embodiments, the apparatus is a Modified CPU or GPU (MxPU), and the RPU enables the second host to utilize more than 120 GB of the DRAM.

In some embodiments of the apparatus, the processor includes multiple cores, from which at least one is hidden; and wherein the RPU is further configured to utilize at least one of the at least one hidden core for internal tasks, wherein the internal tasks include at least one of internal firmware processing, CXL Fabric Manager (FM) API processing, or housekeeping tasks. In some embodiments, the apparatus' RPU is configured to utilize at least one hidden core for internal tasks, which may include processing internal firmware, handling CXL Fabric Manager (FM) API processing, and/or performing housekeeping tasks. By dedicating hidden cores to these specific functions, the apparatus can improve its performance and enable efficient operation without overburdening the active cores. Additionally, utilizing the hidden core for the RPU tasks can allow the CPU vendor to differentiate the apparatus from standard CPUs while maintaining compatibility with existing/established designs. Optionally, the at least one hidden core is isolated from user access and visibility, providing user-infrastructure isolation. In some embodiments, the apparatus' hidden core(s) are isolated from user access and visibility, providing user-infrastructure isolation. This isolation ensures that the user cannot affect the execution of code on the hidden cores, enhancing the security and reliability of the apparatus. By separating the visible user-controlled cores from the hidden vendor-controlled cores, the apparatus can effectively protect critical infrastructure functions from potential interference or tampering by user code.

In some embodiments of the apparatus, the processor includes multiple cores, from which at least one is hidden and is utilized for memory telemetry for a memory pool. In some embodiments, at least one of the apparatus' hidden core(s) is utilized for memory telemetry for a memory pool. By running memory telemetry on the hidden core(s), the apparatus can effectively monitor and manage the memory pool without burdening the user-accessible cores, which allows for efficient resource utilization and prevents memory management tasks from interfering with user code execution.

In some embodiments, the processor includes multiple cores, from which at least one is hidden and is utilized for secure key storage and management for encrypting and decrypting data transmitted according to the CXL.mem protocol, leveraging user-infrastructure isolation provided by the at least one hidden core. In some embodiments, at least one of the apparatus' hidden core(s) is utilized for secure key storage and management, specifically for encrypting and decrypting data transmitted according to the CXL.mem protocol. By leveraging the user-infrastructure isolation provided by the hidden core(s), the apparatus prevents sensitive cryptographic keys used for securing data transmitted according to the CXL.mem protocol from being accessible to user code. This isolation enhances the security of the data transmitted between the apparatus and the second host, protecting it from potential compromise by malicious user code. The hidden core(s) may perform the cryptographic operations on the data themselves, improving confidentiality, integrity, and/or replay protection. Alternatively, the hidden core(s) may utilize hardware-accelerated cryptographic engine(s) on the apparatus for performing at least part of the cryptographic operations on the data, while the hidden cores remain responsible for the management of the secure keys and for controlling the processing flows of the data. In this approach, the cryptographic accelerator may handle the data processing while the CPU cores handle the control, following a Control/Data Plane separation. Furthermore, the infrastructure code running on the hidden cores may participate in enabling support for Confidential Computing over Memory exposed/provisioned by the RPU via the apparatus CXL EP.

In some embodiments of the apparatus, the processor includes multiple cores, from which at least one is hidden; and wherein the RPU is further configured to utilize at least one of the at least one hidden core for error handling and/or correction tasks within a memory pool including the apparatus and the DRAM, enhancing data integrity and reliability. In some embodiments, the processor includes multiple cores, from which at least one is hidden; and wherein the RPU is further configured to utilize at least one of the at least one hidden core for memory access scheduling within a memory pool including the apparatus and the DRAM, to improve memory utilization and throughput. In some embodiments, the processor includes multiple cores, from which at least one is hidden; and wherein the RPU is further configured to utilize at least one of the at least one hidden core for managing security protocols within a memory pool including the apparatus and the DRAM, including data encryption and/or access controls. In some embodiments, the processor includes multiple cores, from which at least one is hidden; and wherein the RPU is further configured to utilize at least one of the at least one hidden core for configuration management tasks within a memory pool including the apparatus and the DRAM, including the dynamic allocation and deallocation of memory resources. In further embodiments, one or more of the hidden cores of the apparatus may be utilized for advanced infrastructure management tasks within a memory pool based on the apparatus. These tasks may include one or more of: (i) error handling and correction, which enhances data integrity and reliability by promptly addressing memory errors, (ii) memory access scheduling, which improve the allocation and utilization of memory resources based on current demand and operational priorities, (iii) security management, which secures the memory pool by implementing robust encryption and access controls to safeguard data, and/or (iv) configuration management, which dynamically adjusts memory settings to adapt to varying workload requirements. Each of these tasks may be employed to maintain the overall efficiency, security, and/or performance of the apparatus, particularly in environments requiring high-speed, high-integrity memory operations, thereby enhancing the apparatus' capabilities and distinguishing it from conventional CPU/GPU architectures (where CPU/GPU refers to CPU and/or GPU).

In various embodiments, a system may be configured to provide both hidden and visible cores, wherein hidden cores are isolated from user access and visibility, while visible cores are made available for user utilization. This isolation may be achieved through a variety of techniques, including but not limited to, the utilization of Type 1 hypervisors, such as VMware ESXi or Microsoft Hyper-V, which run directly on the hardware and manage multiple virtual machines (VMs), allowing for the allocation of specific CPU cores to each VM, thereby designating certain cores as hidden and assigning them to VMs that are not accessible or visible to the user, while allocating other cores as visible to user-accessible VMs running general-purpose operating systems (GPOS); Type 2 hypervisors, such as VMware Workstation or Oracle VirtualBox, which run on a host operating system and support multiple guest operating systems, where the host operating system manages the visible cores accessible to the user and the Type 2 hypervisor creates additional VMs using hidden cores; hardware partitioning, also known as hardware-assisted virtualization, which divides the CPU cores into isolated partitions at the hardware level, with each partition operating independently and capable of running a different operating system; software partitioning, exemplified by the Jailhouse hypervisor, which creates isolated partitions with lower overhead compared to full virtualization; Asymmetric Multiprocessing (AMP), which enables different operating systems to run on different cores without a hypervisor, facilitating communication between the operating systems through shared memory or inter-process communication mechanisms; firmware configuration, achieved by accessing the Basic Input/Output System (BIOS) or the Unified Extensible Firmware Interface (UEFI) settings to disable certain CPU cores, rendering them invisible to the operating system; CPU microcode updates provided by the hardware vendor, which can include specific instructions to disable or hide cores at the microcode level; custom CPU architectures designed by hardware vendors, which often include technologies and mechanisms that enable core partitioning and management of core visibility, such as Intel's Resource Director Technology (RDT) or ARM's Big-.LITTLE architecture; and security extensions, such as Intel's Trusted Execution Technology (TXT) or ARM's TrustZone, which create secure execution environments that isolate specific cores for security-sensitive operations, ensuring that the hidden cores are only accessible within the secure environment. These techniques can be employed alone or in combination.

Figure 51:
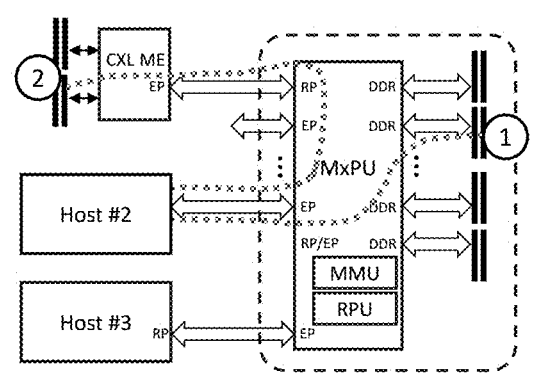
FIG. 51 illustrates one embodiment of a single-tier-DRAM memory pool coupled to hosts and a memory expander, based on an MxPU that includes an RPU.
Figure 52A:
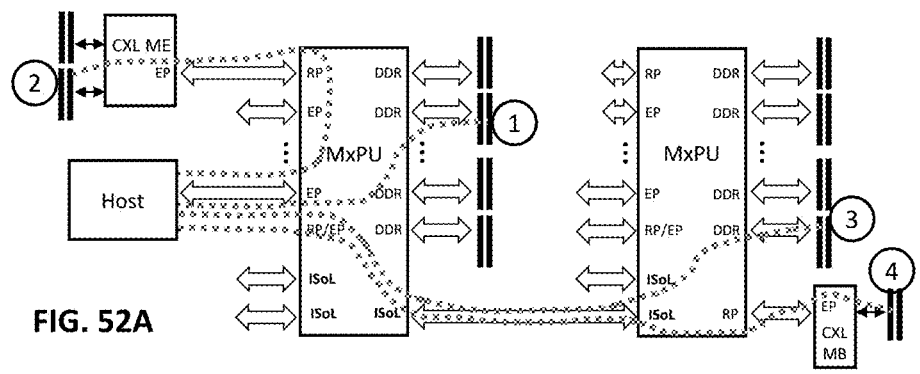
FIG. 52A, FIG. 52B, and FIG. 53 illustrate embodiments of mid-scale multi-tier memory pools.
Figure 52B:
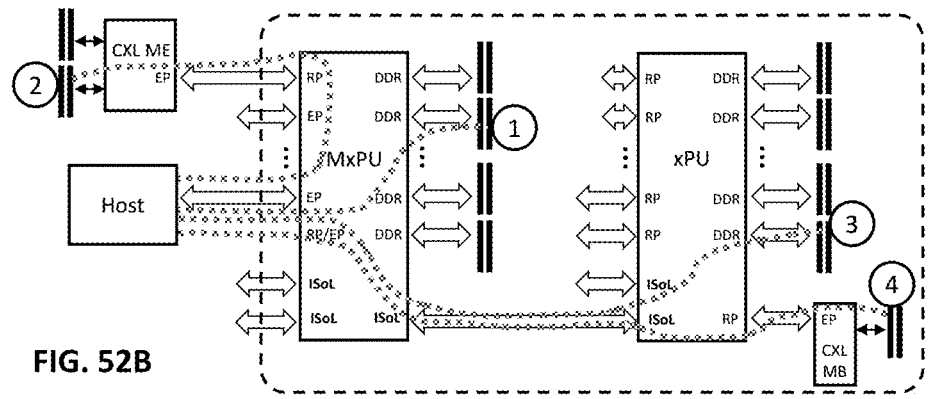

FIG. 51 illustrates one embodiment of a single-tier-DRAM memory pool coupled to hosts and a memory expander, based on an MxPU including an RPU. FIG. 52A illustrates one embodiment of mid-scale multi-tier memory pool including two or more MxPUs that may utilize chipset. And FIG. 52B illustrates one embodiment of mid-scale multi-tier memory pool including at least one MxPU and at least one xPU, which may utilize chipset.

In one embodiment, an apparatus includes processor cores integrated within the apparatus; a CXL port; wherein a first subset of the processor cores is configured to execute a first Operating System (OS) that supports execution of a first program for managing memory in a CXL fabric coupled to the CXL port; wherein a second subset of the processor cores is configured to execute a second OS configured to execute a second program to utilize a portion of the memory managed by the first program; and a partitioning controller configured to adjust a ratio between number of processor cores in the first subset compared to number of processor cores in the second subset based on a parameter related to the CXL fabric.

In another embodiment, an apparatus includes processor cores integrated within the apparatus; a CXL port; a partitioning controller configured to partition the processor cores to first and second subsets of the processor cores; wherein the first subset of the processor cores is configured to execute a Special-Purpose Operating System (SPOS) that supports execution of a first program for managing memory in a CXL fabric coupled to the CXL port; and wherein the second subset of the processor cores is configured to execute a General-Purpose Operating System (GPOS) configured to execute a second program to utilize a portion of the memory managed by the first program.

In some embodiments of the apparatus, the first program that manages the memory in the CXL fabric enables at least one of: memory pooling, memory sharing, dynamic capacity device, or software-managed coherency. Optionally, the partitioning controller is further configured to isolate the first subset of processor cores from the second subset of processor cores, the first program enables memory pooling, and the second program is a user-controlled program. Optionally, the partitioning controller includes a Type 1 hypervisor configured to allocate the first subset of processor cores to a first virtual machine (VM) running the SPOS, and further configured to allocate the second subset of processor cores to a second VM running the GPOS; and wherein the first program enables memory pooling, and the Type 1 hypervisor is further configured to utilize the memory pooling to provide memory resources for the second VM. Optionally, the partitioning controller includes a Type 2 hypervisor running on a host operating system, the Type 2 hypervisor configured to allocate the first subset of processor cores to a first VM running the SPOS, and further configured to allocate the second subset of processor cores to a second VM running the GPOS. Optionally, the first program enables memory pooling, and the partitioning controller includes a hardware partitioning unit enabling the SPOS to access the CXL port to provide the memory pooling, while preventing access to the CXL port by the second subset of processor cores.

In one embodiment, an apparatus includes processor cores, a CXL port, and a partitioning controller designed to dynamically allocate these processor cores into distinct subsets based on a variety of factors related to CXL operation, wherein the factors may include CXL configuration settings, bandwidth demands, workload requirements, or quality of service needs. This dynamic allocation is performed to potentially enhance system performance and efficiency, potentially leading to improved responsiveness, reduced latency, and optimized resource utilization, with the partitioning controller configured to consider parameters such as CXL configuration settings, bandwidth demands, workload requirements associated with CXL memory access, quality of service needs for CXL transactions, data protection policies, and even user-defined preferences for CXL operation. One subset of the processor cores may optionally be dedicated to executing a Special-Purpose Operating System (SPOS) that is responsible for managing memory within a CXL fabric coupled to the CXL port, while the other subset of processor cores may run a General-Purpose Operating System (GPOS) that utilizes a portion of the memory managed by the SPOS, enabling the execution of various applications. In at least one implementation, the partitioning controller's adaptability is further highlighted by its ability to adjust the allocation of processor cores between the subsets in response to real-time conditions monitored at the CXL port or CXL Root Port (RP). For instance, the partitioning controller can react to CXL latency constraints by monitoring transaction latencies and modifying the core allocation to ensure these latencies remain within predetermined thresholds, or it can similarly adjust the partition based on measured CXL latencies that, when exceeding a set threshold, trigger a reallocation of cores to improve responsiveness and reduce transaction latency. Moreover, in certain implementations, the partitioning controller can manage CXL bandwidth requirements, adjusting the core allocation and potentially activating additional memory channels when bandwidth demands surpass a defined threshold to maintain sufficient data transfer capacity and prevent bottlenecks. Similarly, the partitioning controller may address CXL throughput needs by reallocating cores when throughput measurements fall below a certain threshold, thereby enhancing data transfer efficiency and overall system performance. Furthermore, the partitioning controller may be equipped to handle CXL errors by dynamically adjusting the core partition to isolate the source of errors and maintain the integrity of CXL transactions, and it can similarly react to monitored CXL error rates that exceed a predetermined threshold. Power management can be another function of the partitioning controller, which can be configured to optimize power consumption by allocating cores based on CXL power states and adjusting the partition in response to monitored power consumption that surpasses established thresholds. Additionally, the partitioning controller may perform core allocation based on CXL topology discovery and device enumeration, optimizing the utilization of discovered CXL devices and their associated memory configurations. Finally, the described partitioning process may occur during system boot-up, during regular operation, or both. These subsets can be part of a modified CPU or GPU (MxPU) that includes memory channels, a memory management unit (MMU), and a resource processing unit (RPU) responsible for translating physical addresses between an external HPA space and a local HPA space used by the processor cores.

In one embodiment, a semiconductor device includes a processor core configured to execute instructions compatible with an x86 instruction set architecture; an MMU supporting first-level address translation; memory channels; a CXL Endpoint (EP) module supporting a CXL.mem protocol; and an on-chip interconnect coupling the processor core, the MMU, the memory channels, and the CXL EP. Optionally, the CXL EP module is further configured to translate physical addresses from an external HPA space, utilized by an external host coupled to the CXL EP, to a local HPA space utilized by the processor core. Optionally, the semiconductor device further includes a CXL Root Port (RP) module coupled to the on-chip interconnect; wherein the CXL RP module is coupled to a CXL device, and the translate of the physical addresses enables the CXL device to communicate with the external host utilizing at least one of CXL.mem or CXL.cache protocols.

In one embodiment, a memory pool includes a first semiconductor device including first memory channels, a first CXL Endpoint (EP), a first resource processing unit (RPU), and a first inter-socket link (ISOL) port; a second semiconductor device including a second CXL EP, a second RPU, and a second ISOL port; at least 8 GB of DRAM connected to the first memory channels; wherein the first ISOL port is coupled to the second ISOL port, and the first and second semiconductor devices utilize a first HPA space; wherein the first RPU is configured to perform first host-tohost physical address translations (HHPAT) to enable a third host, coupled to the first CXL EP via a first CXL.mem interface, to utilize a first portion of the DRAM; and wherein the second RPU is configured to perform second HHPAT to enable a fourth host, coupled to the second CXL EP via a second CXL.mem interface, to utilize a second portion of the DRAM. In some embodiments of the memory pool, the third and fourth hosts utilize second and third HPA spaces, respectively; and wherein the first and second semiconductor devices are first and second Modified CPUs/GPUs (MxPUs), the first HHPAT translate addresses from the second HPA space to the first HPA space, and the second HHPAT translate addresses from the third HPA space to the first HPA space. Optionally, the second MxPU further includes second memory channels, the second memory channels are connected to at least 8 GB of second DRAM; and the second and third address translations enable the third and fourth hosts, respectively, to utilize the second DRAM. Optionally, the memory pool further includes third and fourth MxPUs coupled to the first and second MxPUs over additional ISoLs; the third and fourth MxPUs include third and fourth CXL EPs and third and fourth RPUs, respectively; the third and fourth CXL EPs are configured to be coupled to fifth and sixth hosts via third and fourth CXL.mem interfaces; and whereby the fifth and sixth hosts can utilize the DRAM.

Figure 53:
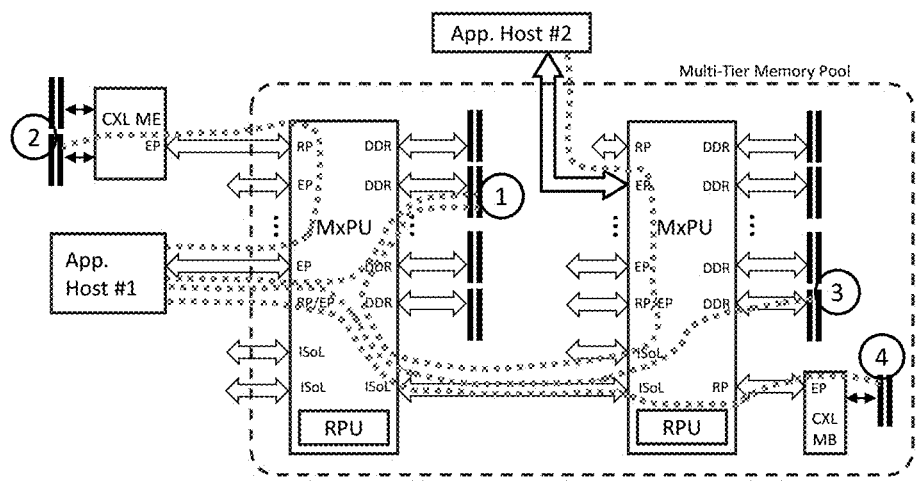
Figure 54:
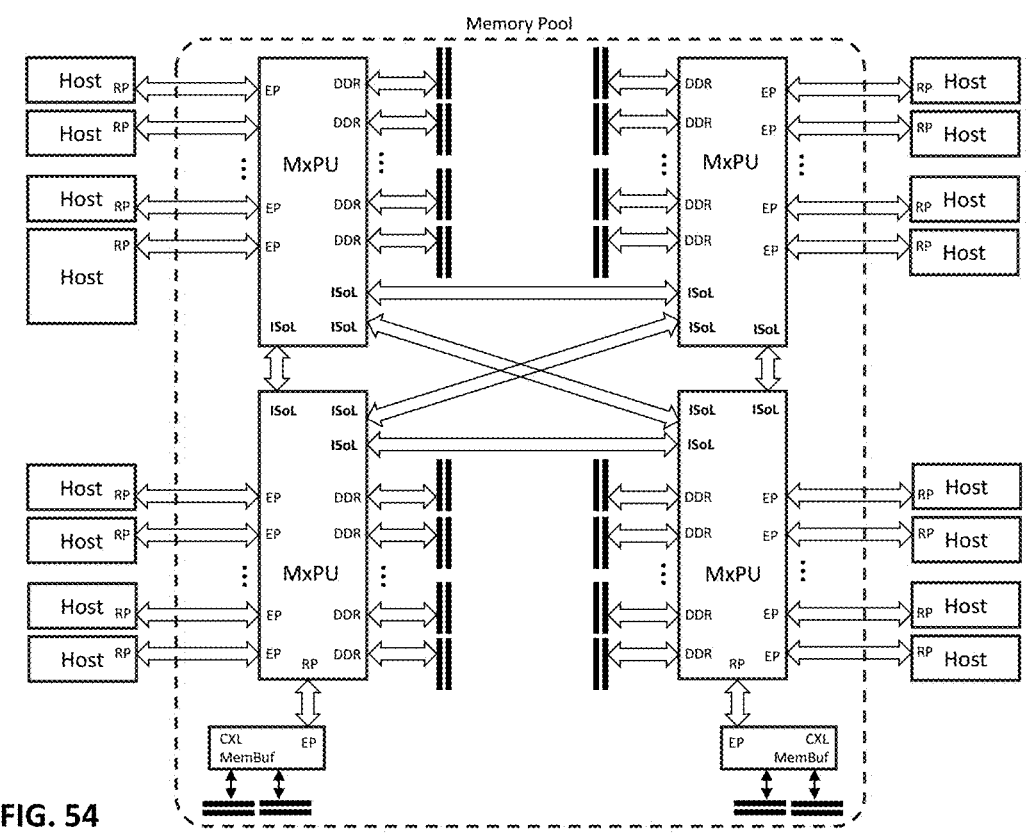
FIG. 54 illustrates one embodiment of a high-fanout large-scale multi-tier memory pool.
Figure 55:
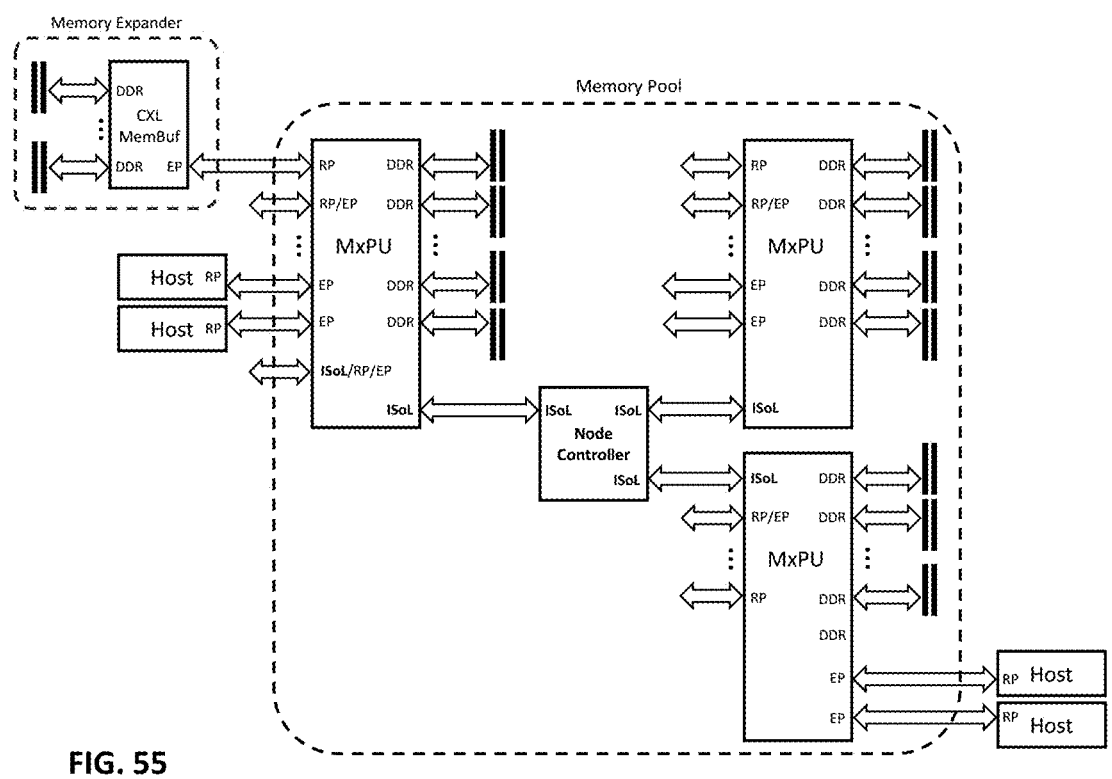
FIG. 55 illustrates one embodiment of connecting at least some of the xPUs and/or MxPUs in a memory pool utilizing a node controller.

FIG. 53 illustrates one embodiment of a multi-tier memory pool, which may utilize chipset. FIG. 54 illustrates one embodiment of a high-fanout large-scale multi-tier memory pool, which may utilize chipset. FIG. 55 illustrates one embodiment of connecting at least some of the xPUs and/or MxPUs in the memory pool utilizing a node controller. Utilizing one or more node controllers enable scaling a single server to larger topologies than what is possible with just meshing processors directly to each other. When using a node controller, the xPUs are not necessarily connected directly to each other.

Figure 56:
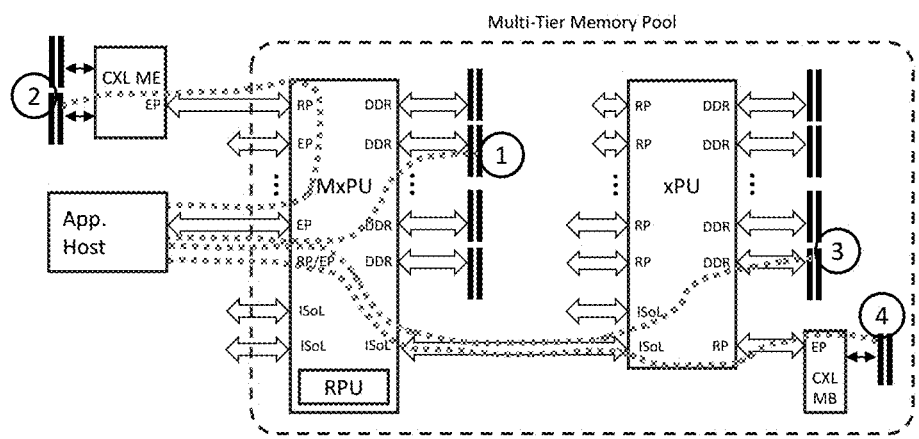
FIG. 56 illustrates one embodiment of a multi-tier memory pool.

In one embodiment, a memory pool includes a CPU or GPU (xPU) including a processor, a first ISOL port, and first memory channels; wherein the first memory channels are connected to at least 8 GB of a first DRAM; a semiconductor device including a CXL Endpoint (EP), a resource processing unit (RPU), a second ISOL port, and second memory channels; wherein the second memory channels are connected to at least 8 GB of a second DRAM, the first ISOL port is coupled to the second ISOL port, and the semiconductor device and the xPU utilize a first HPA space; and wherein the RPU is configured to perform host-to-host physical address translations (HHPAT) to enable an application host, communicating with the CXL EP according to a CXL.mem protocol, to utilize the first and second DRAMs. FIG. 56 illustrates one embodiment of a multi-tier memory pool, optionally using Chipset.

In some embodiments of the memory pool, the application host utilizes a second HPA space, and the HHPAT translate addresses from the second HPA space to the first HPA space. Optionally, the memory pool further includes second and third xPUs coupled to the semiconductor device and the xPU over additional inter-socket links; the second and third xPUs include memory channels connected to at least 8 GB of third and fourth DRAMs, respectively; and whereby the HHPAT further enables the application host to utilize the third and fourth DRAMs. Optionally, the semiconductor device further includes a CXL RP configured to be coupled to a CXL memory expander utilizing another CXL.mem interface; and wherein the HHPAT further enables the application host to utilize memory of the memory expander. Optionally, the xPU further includes a CXL Root Port (RP), and further including a CXL memory expander coupled to the CXL RP of the xPU; and wherein the HHPAT enable the application host to utilize memory of the memory expander while communicating according to the CXL.mem protocol and via the first and second ISoLs. Optionally, each of the semiconductor device and the xPU further includes an MMU configured to translate addresses from a virtual address space, utilized by an operating system of the xPU, to the first HPA space. Optionally, the semiconductor device is a Modified CPU or GPU (MxPU).

In some embodiments, the broader market for conventional CPUs, compared to that of Modified CPUs or GPUs (MxPUs), may lead to a greater variety of CPU configurations, potentially encompassing differences in cache sizes, core counts, port types and quantities, clock speeds, and support for specialized instructions or integrated accelerators like GPUs or FPGAs; this diversity allows for pairing essentially the same MxPU with various CPU types, optimizing for use cases such as High-Performance Computing (HPC), virtualized environments, and data management in large data centers, or distributed training, inference serving, and model optimization in AI applications, with the MxPU's address translation and resource management capabilities enhancing system efficiency. The MxPU can optionally provision CXL memory to other hosts via CXL Endpoints (EPs), a feature not found in standard CPUs, and while the number of MxPUs in a system may be determined by the required host connections, scenarios necessitating high-fanout, multi-tier memory pools may incorporate multiple MxPUs to increase CXL EPs, thus expanding memory pool connectivity and sharing; examples of such combinations in large data centers include one MxPU with seven CPUs for HPC tasks, one MxPU with three CPUs for virtualized environments, and one MxPU with one CPU for data indexing and retrieval. For AI, combinations may involve one MxPU with seven CPUs for distributed training, one MxPU with three CPUs for inference serving, or one MxPU with one CPU for model optimization, each leveraging the MxPU's capabilities to enhance performance.

In one embodiment, an apparatus includes processor cores configured to execute instructions; memory channels supporting connections to at least 32 GB of DRAM; a CXL Root Port (RP); an on-chip interconnect coupling the processor cores with the memory channels and the CXL RP; and an RPU coupled to the CXL RP via a die-to-die interconnect; wherein the RPU is configured to translate from CXL.mem messages, received from an entity coupled to the apparatus, to CXL.cache messages sent to the CXL RP. In some embodiments of the apparatus, the RPU is further configured to translate from CXL.cache messages received from the CXL RP to CXL.mem messages sent to the entity. It is noted that references to CXL.mem messages and CXL.cache messages may also encompass CXL.mem transactions and CXL.cache transactions, and vice versa, because CXL transactions utilize messages. Examples of entity that may be coupled to the apparatus include a host and a switch coupled to a host. In some embodiments, the RPU is further configured to translate a CXL.mem message, selected from the CXL.mem messages, to multiple CXL.cache messages sent to the CXL RP. For example, the system may implement mirroring based on translating a single CXL.mem message to multiple corresponding CXL.cache messages. In another example, the RPU implements retransmission based on translating a single CXL.mem message to multiple corresponding CXL.cache messages. Optionally, the RPU may be implements in a chiplet; the chiplet, the processor cores, the memory channels, and the RP are assembled into an integrated circuit (IC) package; and the RPU is further configured to translate between CXL.io packets communicated with the CXL RP and CXL.io packets communicated with the entity. Optionally, the apparatus may further include a second RPU coupled via a second die-to-die interconnect to a second CXL RP coupled to the on-chip interconnect; and wherein the second RPU is configured to translate between (i) CXL.cache messages communicated with a second entity coupled to the apparatus via a CXL type 1 device (T1-D), and (ii) CXL-.cache messages communicated with the second CXL RP via a CXL type 1 device (T1-D). Optionally, the apparatus may further include a second RPU coupled via a second die-to-die interconnect to a second CXL RP coupled to the on-chip interconnect; and wherein the second RPU is configured to translate from (i) CXL.mem messages and CXL.cache messages received from a second entity coupled to the apparatus via a CXL type 2 device (T2-D), to (ii) CXL.cache messages sent to the second CXL RP via a CXL type 1 device (T1-D). Optionally, the entity is a host, and the RPU is further configured to perform host-to-host physical address translations from HPA space of the host to a local HPA space utilized by at least one of the processor cores.

In one embodiment, an apparatus includes processor cores configured to execute instructions; memory channels supporting connections to at least 32 GB of DRAM; a CXL Root Port (RP); an on-chip interconnect coupling the processor cores with the memory channels and the CXL RP; and an RPU coupled to the CXL RP via a die-to-die interconnect; wherein the RPU is configured to translate between first CXL.cache messages, communicated with an entity coupled to the apparatus, and second CXL.cache messages sent to the CXL RP. In some embodiments of the apparatus, the RPU is implements in a chiplet; the chiplet, the processor cores, the memory channels, and the RP are assembled into an IC package; and the RPU is further configured to translate between CXL.io packets communicated with the CXL RP and CXL.io packets communicated with the entity. In some embodiments, the apparatus further includes a second RPU coupled via a second die-to-die interconnect to a second CXL RP coupled to the on-chip interconnect; wherein the second RPU is configured to translate from (i) CXL.mem messages received from a second entity coupled to the apparatus via a CXL type 3 device (T3-D) to (ii) third CXL.cache messages sent to the second CXL RP via a CXL type 1 device or a CXL type 2 device. In some embodiments, the apparatus further includes a second RPU coupled via a second die-to-die interconnect to a second CXL RP coupled to the on-chip interconnect; wherein the second RPU is configured to translate between (i) CXL.mem messages and third CXL.cache messages communicated with a second entity coupled to the apparatus via a CXL type 2 device (T2-D) and (ii) fourth CXL.cache messages communicated with the second CXL RP via a CXL type 1 device (T1-D). In some embodiments of the apparatus, the entity is a host, and the RPU is further configured to perform host-to-host physical address translations from HPA space of the host to a local HPA space utilized by at least one of the processor cores. In some embodiments, the apparatus utilizes different CQID trackers for the first and second CXL.cache messages.

In another embodiment, an apparatus includes processor cores configured to execute instructions; memory channels supporting connections to DRAM; a CXL Root Port (RP); an on-chip interconnect coupling the processor cores with the memory channels and the CXL RP; and an RPU implemented in a chiplet coupled to the CXL RP via a die-to-die interconnect; wherein the RPU is configured to terminate at least some CXL transactions received via the CXL RP from an entity external to the apparatus.

Figure 57:
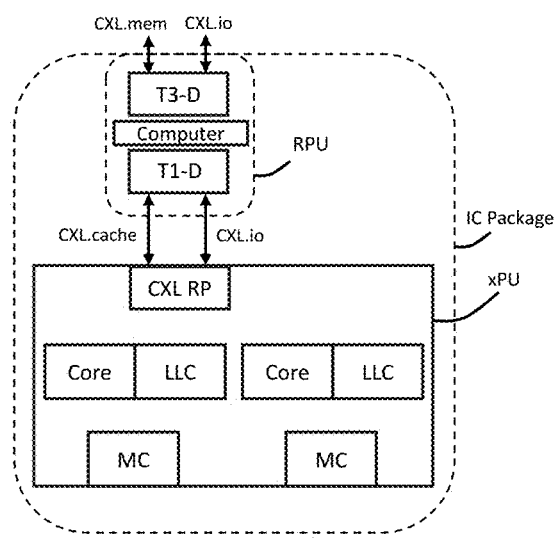
FIG. 57 and FIG. 58 illustrate embodiments of RPUs.
Figure 58:
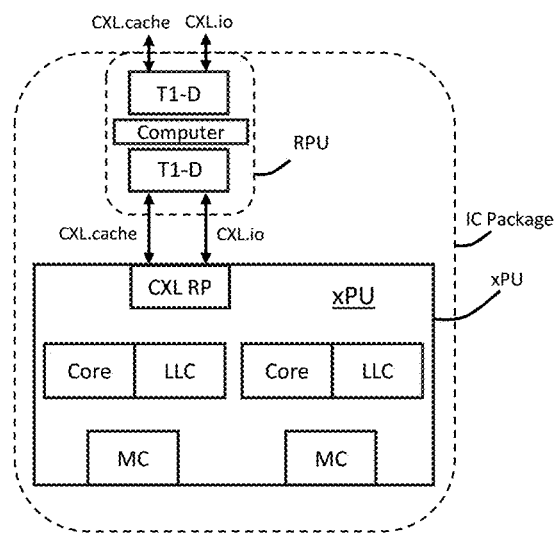
Figure 60:
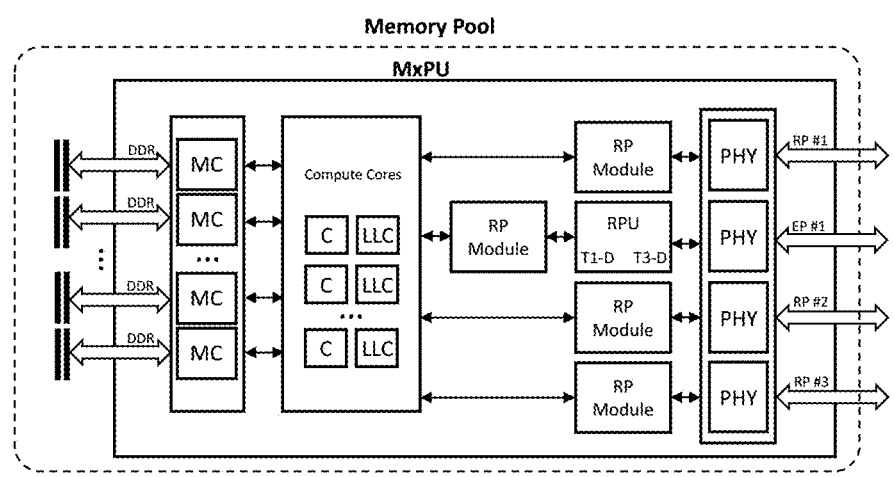
FIG. 60 illustrates one embodiment of embedding an RPU in an MxPU's silicon die.

FIG. 57 and FIG. 60 illustrate two approaches for transforming a standard xPU design to a CXL memory device, which may enable it to serve as a building block for a Memory Expander or Memory Pool. In FIG. 57, an RPU is integrated as a separate chiplet within the same IC package as the xPU, potentially allowing for a modular design approach that may provide flexibility in manufacturing and integration. The RPU may be coupled to the xPU's CXL Root Port (RP) via die-to-die interconnect, which may enable high-bandwidth and low-latency communication between the components. In one example, the RPU may include three main components, which are (i) A Type 3 Device (T3-D) interface, supporting CXL.mem and CXL.io protocols, (ii) A computer, handling protocol translation, and (iii) A Type 1 Device (T1-D) interface, supporting CXL-.cache and CXL.io protocols. In another example, current modern CPUs, such as Intel Sapphire Rapids (SPR), include one or more CXL RPs, but do not include a CXL EP as the CPU acts as the host in a CXL system. The RPU illustrated in FIG. 57 is coupled to the CPU's CXL RP and translates between CXL.mem (via type 3 device) and CXL.cache (via type 1 device), potentially allowing the CPU to function as a building block for a Memory Expander or a Memory Pool. FIG. 58 illustrates an alternative embodiment where the RPU translates between first and second Type 1 Device interfaces.

FIG. 60 illustrates another approach where the RPU is embedded in the MxPU's silicon die, which may offer potential benefits in terms of reduced latency and improved performance through tighter coupling with the MxPU's internal components. In one example, this configuration includes: (i) Multiple Memory Controllers (MC) coupled to DDR interfaces coupled to DRAM, (ii) Compute Cores with associated caches and Last Level Caches (LLC), (iii) Multiple RP Core Logic blocks, (iv) An integrated RPU with T1-D and T3-D interfaces for translating between CXL-.cache and CXL.mem protocols, And (v) Physical layer interfaces (PHY) coupled, in the illustrated example, to three Root Ports and one T3-D Endpoint.

Both approaches may leverage the xPU's/MxPU's large LLC to enhance memory read performance from a Multi-Headed Device (MHD), which may offer two potential advantages of (i) Improved read performance, where the relatively large LLC may provide better performance for memory reads from the MHD compared to typical CXL memory controllers, which often have smaller caches, and (ii) Flexible resource allocation, where an LLC provisioning policy may be implemented to allocate specific LLC resources for CXL memory flows, potentially allowing for optimized cache utilization based on the needs of different CXL ports or workloads, and/or allocating to certain CXL ports more cache resources than others. The remaining portion of the LLC may continue to be used by the processor cores and PCIe devices, maintaining compatibility with standard xPU configurations and potentially allowing for features such as Intel's Data Direct I/O (DDIO). These approaches may enable the transformation of standard xPUs designs, which typically include CXL Root Ports but no CXL Endpoints, to versatile CXL memory device designs.

Still referring to FIG. 60, some CPU vendors, such as Intel, provide CPUs with Root Ports (RPs) that implement all three protocols (e.g., CXL.io, CXL.cache, CXL.mem), and thus can connect to Type-1, Type-2, or Type-3 CXL Devices. Other CPU vendors, such as certain AMD CPUs, may support only CXL.io and CXL.mem on the CPU RP, thus it can connect only to Type 3 CXL Devices. As a result, the top RP Module may support all the three protocols, or a subset of the protocols (e.g., CXL.io and CXL.cache, or CXL.io and CXL.mem). The second RP module is coupled internally (which means a permanent connection) to an RPU that translates between Type-1 CXL Device (T1-D) and Type-3 CXL Device (T3-D). Therefore, the Second RP Module, which is connected to the T1-D of the RPU, should support at least CXL.io and CXL.cache, and may support all three protocols. Optionally, all the RP Modules may be instantiations of the same design module supporting all three protocols. Alternatively, different RP Modules may be instantiations of different design modules supporting only a subset of the protocols.

Figure 61:
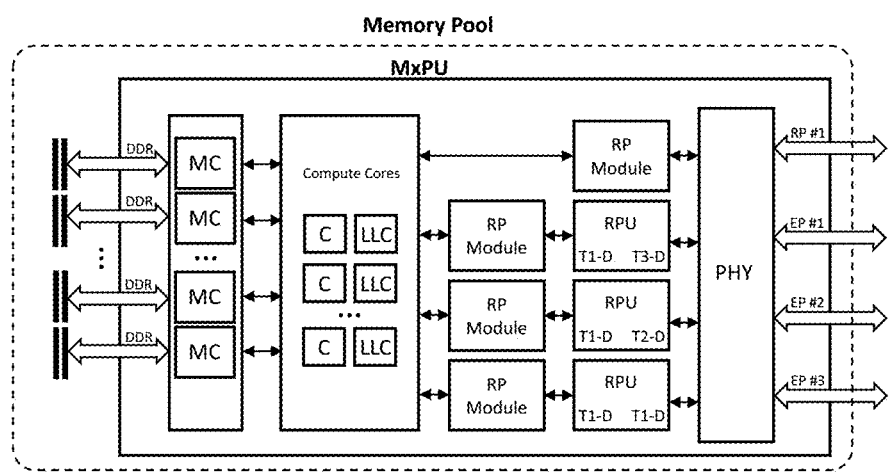
FIG. 61 illustrates one embodiment of an MxPU including multiple RPUs coupled to RP modules.

FIG. 61 illustrate one embodiment of an MxPU including multiple RPUs coupled to RP modules, where different RPUs translate between different combinations of device types, such as T1-D to T3-D, T1-D to T2-D, or T1-D to T1-D, providing flexibility in protocol translation capabilities. The PHY module may include one PHY block or multiple PHY blocks based on design requirements. FIG. 61 illustrates an implementation with a single PHY block coupled to the RP module and the RPUs, while FIG. 60 illustrates an implementation with a separate PHY block coupled to each RP module and the RPU.

Figure 59:
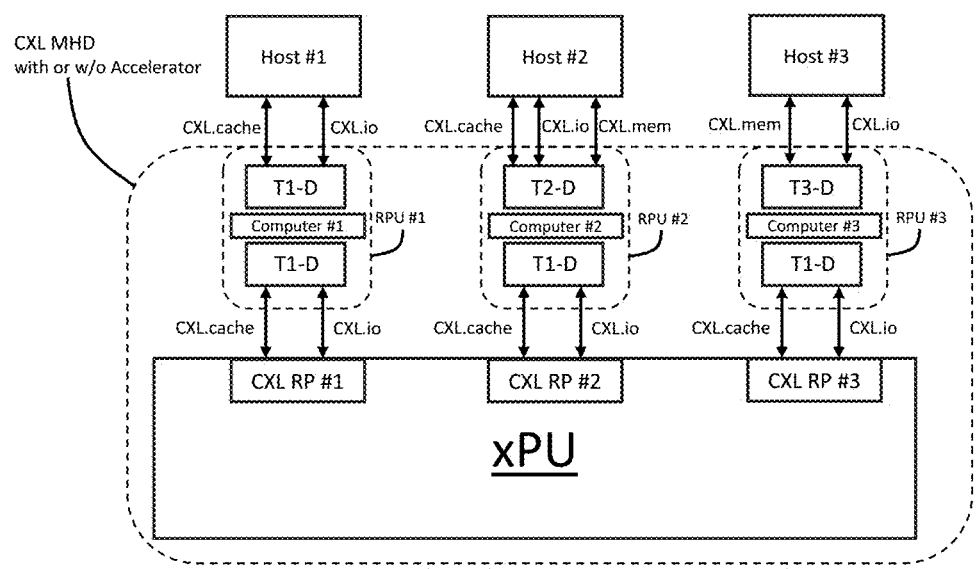
FIG. 59 illustrates one embodiment of building a CXL MHD Memory Pool from a standard xPU.

FIG. 59 illustrates one embodiment of building a CXL Multi-Headed Device (MHD) Memory Pool from a standard xPU (CPU and/or GPU) that includes three CXL RPs (#1 to #3) coupled to three RPUs (#1 to #3) via the symmetric CXL.cache and CXL.io interfaces. The diagram in FIG. 59 illustrates three hosts coupled to a system operating similar to a CXL MHD, which can be either with or without an accelerator. Each host includes a CXL RP that can be coupled to the different CXL device types exposed by the RPUs. Host #1 is coupled to CXL MHD via CXL type 1 port through RPU #1 that translates between (i) CXL.cache message and CXL.io packets with Host #1 and (ii) CXL.cache messages and CXL.io packets with CXL RP #1 of the xPU. It is noted that because transactions include messages, then it is also possible to describe the functionality of RPU #1 as translating between (i) CXL.cache and CXL.io transactions with Host #1 and (ii) CXL.cache and CXL.io transactions with CXL RP #1 of the xPU.

Host #2 is coupled to CXL MHD via CXL type 2 port through RPU #2 that translates between (i) CXL.cache messages, CXL.mem messages, and CXL.io packets with Host #2 and (ii) CXL.cache messages, CXL.mem messages, and CXL.io packets with CXL RP #2 of the xPU. And Host #3 is coupled to CXL MHD via CXL type 3 port through RPU #3 that translates between (i) CXL.mem messages and CXL.io packets with Host #3 and (ii) CXL.cache messages and CXL.io packets with CXL RP #3 of the xPU.

The CXL MHD may also include a CXL.mem interface, which is coupled to the device's internal memory (not shown in FIG. 59). In the case where the CXL MHD includes an accelerator, the processor within the device can serve as the accelerator. The internal cache of the processor, particularly the Last Level Cache (LLC), can function as the cache for the accelerator in CXL.cache flows, maintaining coherency with the coupled hosts. The xPU in the diagram represents the processing unit that manages the overall operation of the CXL MHD, coordinating the communication between the coupled hosts, the RPUs, and the internal memory. In summary, FIG. 59 presents an architecture for building a CXL MHD Memory Pool using one or more standard xPUs with CXL RPs and no CXL EPs. The design incorporates RPUs to enable the coupling of (T3-D), (T2-D), and/or (T1-D) ports between the hosts and xPU in the CXL MHD. When an accelerator is included in the CXL MHD, the processor's internal cache, especially the LLC, may serve as the cache for the accelerator, maintaining coherency with the coupled hosts.

Figure 62A:
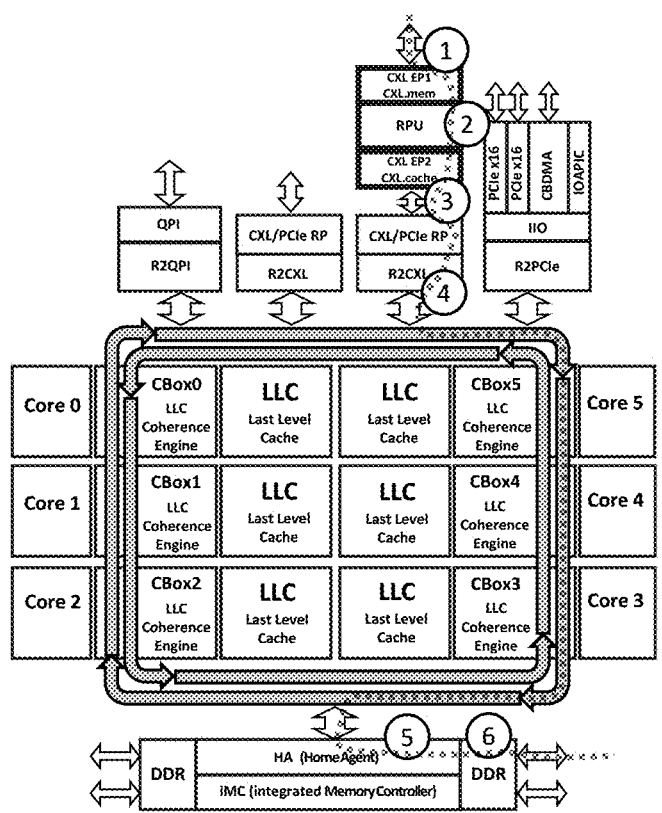
FIG. 62A illustrates one embodiment of a system architecture featuring an RPU integrated in front of a CPU's CXL/PCIe RP.

FIG. 62A illustrates one embodiment of a system architecture featuring an RPU integrated in front of a CXL/PCIe RP of a CPU architecture with an internal Ring interconnect. The RPU in this example translates between CXL.mem and CXL.cache protocols. The RPU is shown as a separate block but could be implemented as a separate chiplet or integrated into the same silicon die with the CXL/PCIe RP. The RPU's CXL EP1 may communicate with an Application Host (not shown) utilizing CXL.mem protocol as T3-D or T2-D, and the RPU's CXL EP2 communicates with the CPU utilizing CXL.cache protocol as T1-D or T2-D. The illustrated CPU architecture includes six cores, Core 0 through Core 5, arranged around a Ring interconnect structure. Each core is associated with a CBox, CBox0 through CBox5, that includes LLC Coherence Engine functionality. The architecture further incorporates six Last Level Cache (LLC) segments distributed around the Ring along with the cores. At the bottom of the architecture, a Home Agent (HA) is coupled to two DDR interfaces through an integrated Memory Controller (iMC). The system may include various interface components, such as QPI with an R2QPI interface, and CXL/PCIe RP with an R2CXL interface. Additionally, there may be PCIe x16 interfaces, CBDMA, and IOAPIC.

Figure 62B:
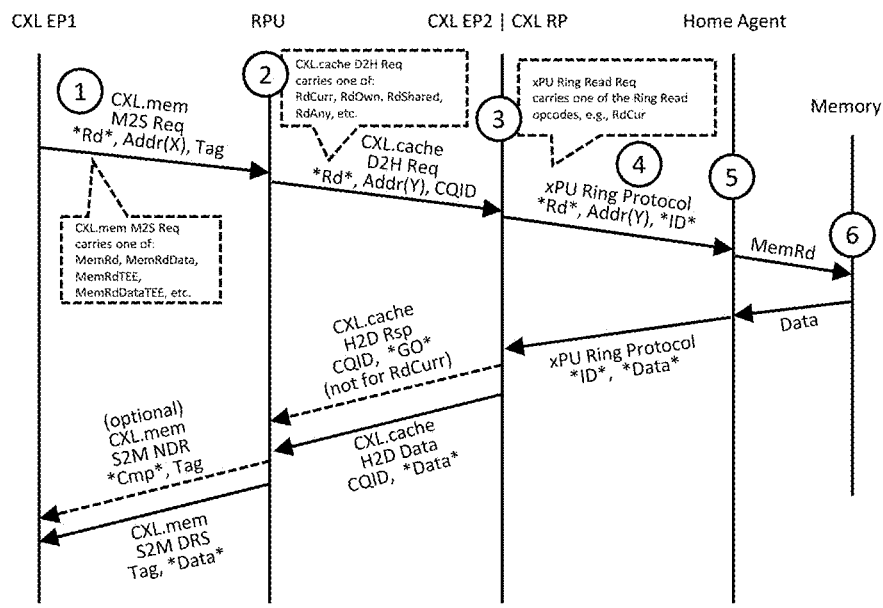
FIG. 62B is a TFD illustrating one embodiment of the translations between CXL.mem and CXL.cache occurring in the system of FIG. 62A.

FIG. 62B is a TFD illustrating one embodiment of the translations between CXL.mem and CXL.cache occurring in the system of FIG. 62A. The flow begins with the RPU's CXL EP1 receiving a CXL.mem M2S Req containing a *Rd* opcode, Addr(X), and a Tag (marked as step 1 in both figures). The RPU translates this to a CXL.cache D2H Req carrying an opcode such as RdCurr, RdOwn, RdShared, RdAny, etc., along with Addr(Y) and CQID(step 2 in both figures). The CXL.cache D2H Req is sent by the RPU's CXL EP2 to the CXL RP (step 3 in both figures), which converts it to an xPU Ring Read Request with appropriate Ring Read opcodes (step 4 in both figures). The xPU Ring Read Request is then received and processed by the Home Agent (step 5 in both figures) to access the Memory utilizing MemRd (step 6 in both figures). The response path may include multiple messages flowing back through the system, including Data from the Memory to the Home Agent, an xPU Ring Protocol message with *ID* and *Data* sent through the ring back to the CXL RP, which is then converted to CXL.cache H2D Data that is translated to a CXL.mem S2 M DRS by the RPU.

In one embodiment, a system supporting hot-swapping of memory-compute sleds includes a memory pool including first and second memory-compute sleds; the first and second memory-compute sleds include first and second respective Resource Provisioning Units (RPUs) coupled over first and second respective CXL.cache interfaces to first and second host CPUs connected to first and second respective dynamic random-access memories (DRAMs) of at least 32 GB each; wherein CXL denotes Compute Express Link; the first and second RPUs are further coupled to a CXL switch via first and second respective CXL.mem interfaces; the CXL switch is coupled over first and second CXL.mem interfaces to first and second respective application hosts; wherein the first and second application hosts include first and second respective CPUs or GPUs coupled to first and second respective DRAMs of at least 16 GB each, and are configured to utilize memory of the first and second memory-compute sleds; and wherein the first and second host CPUs are configured to run first and second operating systems, there is no direct memory access between the first and second memory-compute sleds, and the system supports hot-swapping of at least one of the first or second memory-compute sleds.

In some embodiments of the system, each RPU is configured to: receive CXL.mem messages from the respective application host via the CXL switch, translate the CXL.mem messages to CXL.cache messages, and send the CXL.cache messages to the respective host CPU. The RPU translates between the CXL.mem and CXL.cache protocols. When an application host initiates a memory operation, it may send a CXL.mem message (that is part of a CXL.mem transaction) to the CXL switch, the switch routes the message to the appropriate RPU based on the memory address, and upon receiving the CXL.mem message, the RPU may perform several steps, such as (i) interpreting the CXL.mem message, extracting information such as the operation type (e.g., read or write), memory address, and data (for write operations), (ii) mapping the CXL.mem memory address to the corresponding address in the host CPU's memory space, optionally utilizing address translation tables maintained by the RPU, (iii) based on the operation type and mapped address, the RPU may construct a corresponding CXL.cache message, and send the CXL.cache message to the host CPU over the CXL.cache interface. In some embodiments, each RPU is further configured translate physical addresses from an HPA space utilized by its respective application host to an HPA space utilized by its respective host CPU; and wherein the hot-swapping allows removal and replacement during system operation.

In some embodiments, the system implements a modular memory pool architecture that supports hot-swapping of memory-compute sleds, which may allow for flexible and dynamic resource management in data center environments. The memory pool may comprise multiple memory-compute sleds, each containing at least an RPU, a host CPU, and DRAM. The RPUs may be connected to a CXL switch via CXL.mem interfaces, while also being coupled to their respective host CPUs via CXL.cache interfaces. The system's design, with no direct memory access between sleds and independent operating systems on each host CPU, provides isolation and flexibility allowing for independent management of each sled.

Moreover, the independent operating systems (OSs) on the host CPUs facilitate hot-swapping by providing isolation and independence between the memory-compute sleds. Each host CPU runs its own OS, which allows the operations and memory management of one host to continue operating while the other host is removed. Thus this isolation supports the removal or replacement of one memory-compute sled without disrupting the functioning of the other sled or its associated host system. Additionally, running separate OSs on the host CPUs helps in containing any faults or issues within that specific sled and its host system, allowing the other OS and its memory-compute sled to continue functioning, thereby contributing to the overall stability of the system during hot-swapping operations.

The system utilizes dedicated CXL.cache and CXL.mem interfaces for each memory-compute sled. The first and second RPUs are coupled to their respective host CPUs via dedicated CXL.cache interfaces and to the CXL switch via dedicated CXL.mem interfaces. This dedicated connectivity enables the independent operation of each sled and its host system, allowing data traffic and memory access operations to be managed efficiently within their respective domains. This embodiment allows each application host to utilize the memory from the first and second memory-compute sleds independently, which supports hot-swapping. The system can dynamically reassign or redistribute memory resources without needing to halt or significantly modify the operations of the other host systems, facilitating a smooth transition during sled replacement.

Additionally, having no direct memory access between the first and second memory-compute sleds makes it possible for the memory operations of one sled to proceed without relying on or interfering with the other sleds. When a sled is swapped out, its memory resources and operations can be safely removed or replaced without impacting the other sled, which allows for the seamless integration of new or replacement sleds into the system, supporting continuous operational functionality.

The system is designed to support hot-swapping, allowing for the dynamic removal and replacement of memory-compute sleds while the system is running. The independent OSs, along with the isolated memory channels and lack of direct memory access between sleds, support this smooth transition. The system can maintain its operations with minimal disruption, as each OS independently manages its own memory resources. The dedicated CXL interfaces and isolated memory access contribute to maintaining clear boundaries and efficient memory utilization across the system, facilitating the dynamic reallocation of resources and continuous system operation during hot-swapping events.

In a system designed for hot-swapping of memory-compute sleds, a memory pool may be constructed using multiple memory-compute sleds, each equipped with an RPU that connects to a host CPU and dedicated DRAM via a CXL.cache interface, as well as to a central CXL switch via a CXL.mem interface. This architecture allows for several enhancements to facilitate the hot-swap capability. Notably, the host CPUs on each sled may operate independently, potentially running their own operating systems, which isolates processes and memory management between the sleds. This independence enables the removal and replacement of one sled without interrupting the operation of others, significantly enhancing the system's overall availability and reliability. Moreover, this isolation allows the system to dynamically reallocate memory resources during the hot-swapping process, preventing potential conflicts and ensuring continuous memory access for application hosts by redirecting memory requests to available resources on the remaining sled(s). The use of dedicated CXL.cache and CXL.mem interfaces for each sled further facilitates independent memory access management, allowing each sled to handle memory operations within its own domain and minimizing interference between sleds. Consequently, the operating systems may manage their respective memory resources dynamically, reallocating and optimizing memory as needed during hot-swapping to maintain optimal system performance.

Furthermore, the system may be configured to dynamically redistribute workloads between the sleds during a hot-swap operation to ensure continuous operation. The lack of direct memory access between the sleds prevents memory conflicts, which bolsters system stability during these transitions. Optionally, a management module may be integrated to oversee a controlled hot-removal process. This module may coordinate the migration of data from one sled to another before signaling that a sled is safe to remove, thus preserving data integrity for uninterrupted operation. Additionally, the system may be designed to automatically detect the insertion of a new memory-compute sled, initialize it, and seamlessly integrate its available memory into the shared memory pool. This capability not only improves the system's flexibility but also its scalability. The system may also support heterogeneous memory-compute sleds, meaning sleds with different hardware specifications, such as varying DRAM capacities, different types of memory technologies, CPUs with different characteristics (e.g., clock speed, core count, cache size), or even the presence of specialized hardware accelerators. This heterogeneity provides flexibility in resource allocation, allowing the system to be tailored to specific workload requirements. The RPUs, along with a management module, may abstract these hardware differences, presenting a unified memory pool to application hosts while optimizing resource allocation based on the specific capabilities of each sled.

The physical implementation of the RPUs may vary, with options including CEM specification cards, OCP cards, mezzanine cards, or even direct chip-on-motherboard integration. Each of these form factors offers different trade-offs in terms of modularity, serviceability, cost, and performance. The system may be designed to support multiple form factors, providing additional flexibility in system configuration. Each memory-compute sled may be engineered for field serviceability, meaning they are designed for easy maintenance or replacement without requiring the entire system to be powered down. This capability relies on features such as hot-swappable power connections, blind-mate data connectors, toolless or minimal-tool designs for easy handling, thermal management systems that maintain proper cooling even when a sled is removed, fault isolation mechanisms, visual status indicators, and automatic detection of sled removal or insertion. In scenarios where a host CPU has two sockets, but the RPU is connected to only one via CXL.cache, the system may employ several advanced techniques to optimize performance. It may monitor CXL.cache transaction queue depths and processing latencies for both sockets, track cache hit rates and coherency traffic between them, and dynamically adjust CXL.cache transaction routing between the sockets. This may involve an adaptive transaction distribution algorithm that intelligently routes transactions based on current socket performance and interconnect utilization.

To further enhance efficiency, the system may route CXL.cache snoop requests and responses primarily to the socket directly connected to the RPU, while distributing cache invalidation interrupts to both sockets to maintain cache coherency. It may also prioritize the handling of CXL.cache data transfer completion interrupts on the socket connected to the RPU and implement an adaptive interrupt coalescing scheme for CXL.cache events, potentially using different coalescing thresholds for each socket based on their CXL connectivity. Memory allocation may be further refined by prioritizing local memory access for CXL operations while ensuring balanced resource availability across the NUMA topology. This may be achieved through a CXL-aware page migration policy that identifies frequently accessed pages via CXL.cache transactions and migrates them to the DRAM connected to the socket that's directly linked to the RPU, provided there's available capacity. The system may also adjust CXL.cache coherency directory sizes for each socket based on their respective memory allocation and access patterns. To optimize for different application needs, the system may implement different cache coherency policies for CXL.cache transactions originating from different application hosts. It could also employ a more aggressive prefetching policy for the socket directly connected to the RPU to enhance data availability for CXL.cache transactions, and utilize a cache partitioning scheme that reserves a portion of that socket's cache specifically for CXL.cache transaction data while allowing the other socket to use its entire cache more flexibly. Finally, for a streamlined design, the CXL switch itself could be integrated within a modular chassis that houses the memory-compute sleds.

Figure 63:
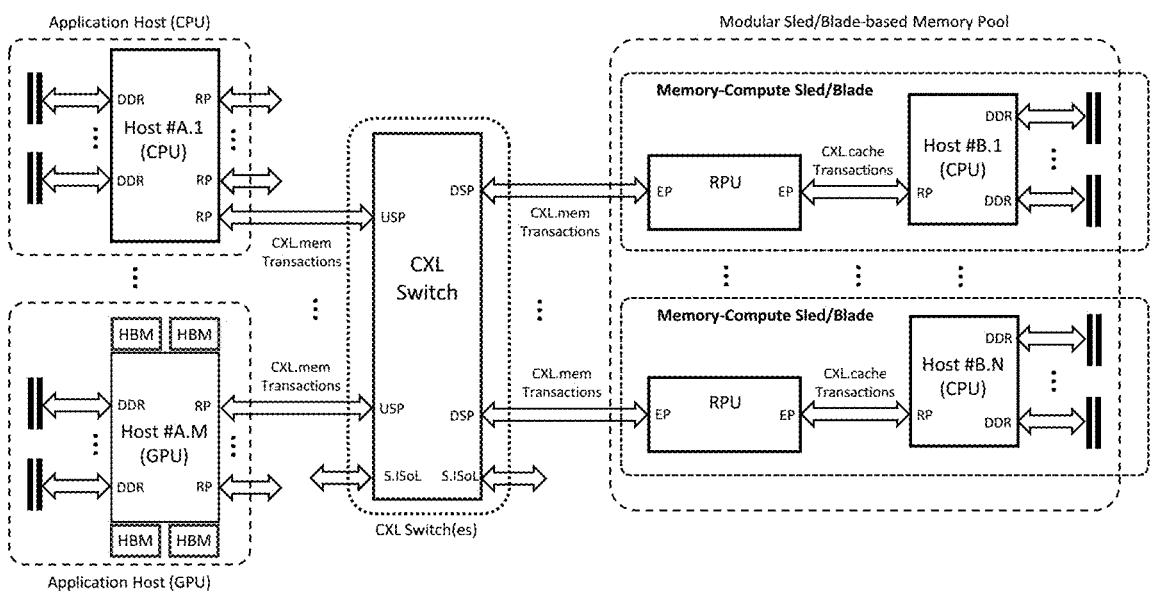
FIG. 63 illustrates one embodiment of a CXL switch coupled to a modular chassis comprising memory-compute sleds.
Figure 64:
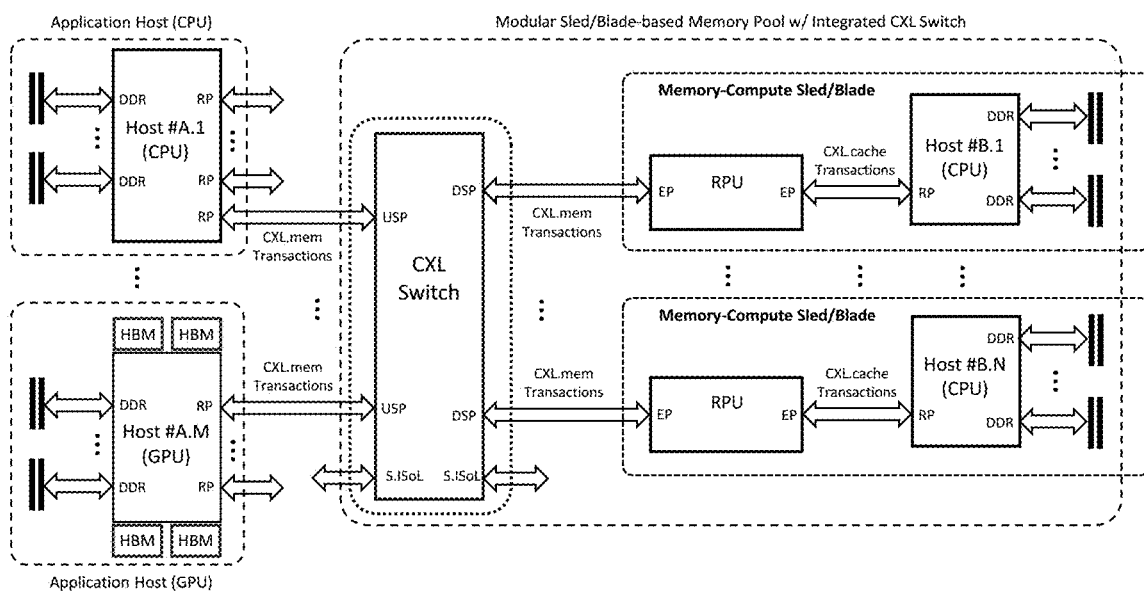
FIG. 64 illustrates one embodiment of integrating a CXL switch within a modular chassis comprising memory-compute sleds.

FIG. 63 illustrates one embodiment of a CXL switch coupled to the modular chassis comprising the memory-compute sleds. FIG. 64 illustrates one embodiment of integrating a CXL switch within the modular chassis comprising the memory-compute sleds. In certain scenarios, integrating the CXL switch within the modular chassis may provide various technical advantages, such as one or more of simplified cabling, reduced footprint, improved scalability, and/or reduced latency, as further discussed below. (i) The integration of the CXL switch within the chassis may reduce external cabling, which may lead to improved system reliability and easier maintenance procedures. Indirectly, it may support the hot-swapping capability by reducing the complexity of physical interventions during sled replacement or upgrades. (ii) Integrating the CXL switch into the chassis may lead to a more compact overall system design, which is beneficial when deploying large memory pools, allowing for higher memory density per rack unit in a data center environment and potentially more efficient use of data center space. (iii) The integration of the CXL switch within the modular chassis may enable easier scaling of the memory pool by allowing the addition or removal of memory-compute sleds without requiring changes to external switching infrastructure, which supports the hot-swapping capability of the system, facilitating dynamic scaling of memory resources to meet varying computational demands. (iv) Positioning the CXL switch inside the chassis may shorten the communication path between the application hosts and the memory-compute sleds, which may reduce latency for CXL.mem transactions between the application hosts and the RPUs. And (v) The integrated CXL switch may manage the hot-swapping process more efficiently due to maintaining lower-latency connections to the sleds within the chassis, and/or being able to manage the power and signal integrity aspects of hot-swapping more efficiently within the controlled environment of the chassis.

In one embodiment, a system includes a plurality of memory-compute sleds, each sled including a host CPU connected to at least 32 GB of DRAM, and an RPU coupled to the host CPU via a CXL.cache interface; wherein CXL denotes Compute Express Link; a CXL switch configured to be coupled to each RPU via a respective CXL.mem interface; a plurality of application hosts, each including a CPU or GPU coupled to at least 16 GB of DRAM, wherein each application host is coupled to the CXL switch via a respective CXL.mem interface; and wherein the system is configured to allow hot-swapping of individual memory-compute sleds without interrupting operation of other sleds or application hosts.

In one embodiment, a system supporting hot-swapping of memory-compute sleds includes a memory pool including first and second memory-compute sleds; the first memory-compute sled includes a first RPU coupled over first and second CXL.cache interfaces to first and second xPUs, respectively, connected to first and second dynamic random-access memories (DRAMs) of at least 32 GB each, respectively; wherein CXL denotes Compute Express Link; wherein the first xPU is coupled to the second xPU over an inter-socket link (ISOL), the first xPU is configured to run a first operating system, and the first RPU is configured to steer CXL.cache messages intended for the first DRAM to the first xPU and to steer CXL.cache messages intended for the second DRAM to the second xPU; the first and second memory-compute sleds are coupled to a CXL switch over first and second respective CXL.mem interfaces; the CXL switch is coupled to application hosts configured to utilize memory of the first and second memory-compute sleds; and wherein the system supports hot-swapping of the first memory-compute sleds. The RPU's connection to each xPU creates a balanced NUMA topology, as it can directly communicate with both xPUs, optimizing memory access based on the destination DRAM. In some embodiments of the system, the second memory-compute sled includes a second RPU coupled over third and fourth CXL.cache interfaces to third and fourth xPUs, respectively, connected to third and fourth DRAMs of at least 32 GB each, respectively; wherein the first and second CXL.mem interfaces are coupled to the first and second RPUs, respectively, each of the first and second RPUs is configured to translate between CXL.mem and CXL.cache messages, and the system supports hot-swapping of the second memory-compute sled. Optionally, the first and second application hosts include first and second respective CPUs or GPUs coupled to fifth and sixth respective DRAMs of at least 16 GB each.

In one embodiment, a system supporting hot-swapping of memory-compute sleds includes a memory pool including first and second memory-compute sleds; the first memory-compute sled includes a first RPU coupled over first and second CXL.cache interfaces to first and second xPUs, respectively, connected to first and second dynamic random-access memories (DRAMs) of at least 32 GB each, respectively; wherein CXL denotes Compute Express Link; wherein the first and second xPUs maintain separate HPA spaces, each xPU is configured to run an independent operating system, and the first RPU is configured to steer CXL.cache messages intended for the first DRAM to the first xPU and steer CXL.cache messages intended for the second DRAM to the second xPU; the first and second memory-compute sleds are coupled to a CXL switch over first and second respective CXL.mem interfaces; the CXL switch is coupled to application hosts configured to utilize memory of the first and second memory-compute sleds; and wherein the system supports hot-swapping of the first memory-compute sled. In another embodiment, the first and second xPUs are not coupled via an ISOL, which causes several key differences, such as (i) Without ISOL, each xPU maintains its own HPA space, which requires the RPU to manage address translation between two separate address domains. (ii) Each xPU runs its own OS, which may allow for more diverse workload management and potentially better isolation between the xPUs. (iii) Without the ISOL there's potentially better hardware-level isolation, which could be beneficial for security or multi-tenancy scenarios. And (iv) it may be easier to mix different types or generations of xPUs in this configuration, as the xPUs don't need to directly communicate or share a common address space. In some embodiments of the system, the second memory-compute sled includes a second RPU coupled over third and fourth CXL.cache interfaces to third and fourth xPUs, respectively, connected to third and fourth DRAMs of at least 32 GB each, respectively; wherein the first and second CXL.mem interfaces are coupled to the first and second RPUs, respectively, and each of the first and second RPUs is configured to translate between CXL.mem and CXL.cache messages; and wherein the system supports hot-swapping of the second memory-compute sled.

Figure 65:
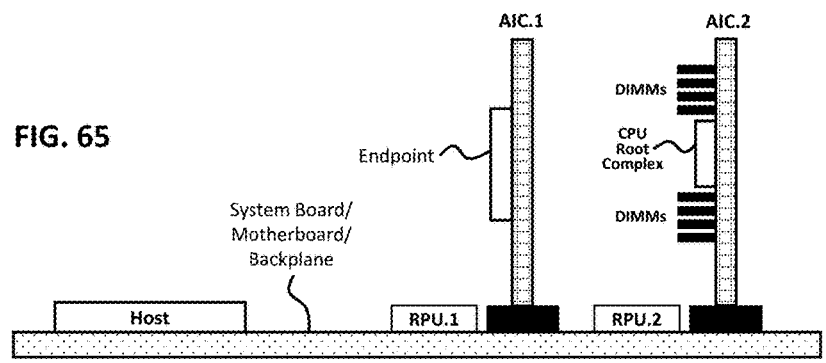
FIG. 65 illustrates one embodiment of a platform configuration comprising Add-in Cards (AICs) and RPUs placed on system board.
Figure 66:
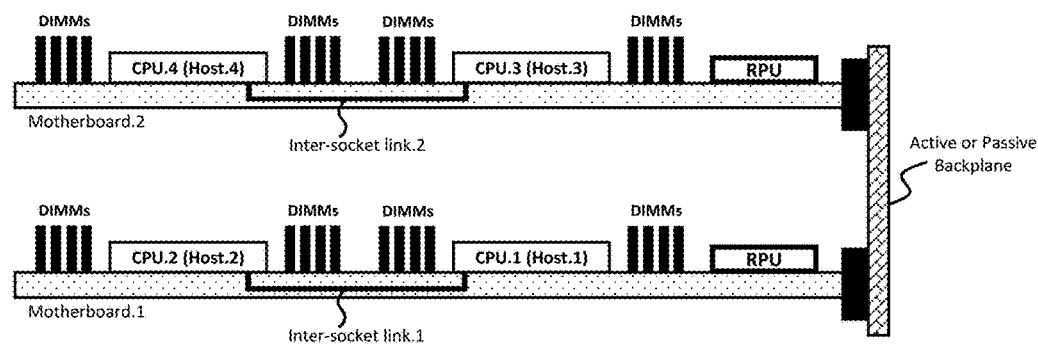
FIG. 66 illustrates one embodiment of coupling Motherboards with RPUs.

FIG. 65 illustrates one embodiment of a platform configuration comprising Add-in Cards (AICs) and RPUs placed on system board. FIG. 66 illustrates one embodiment of coupling Motherboards with RPUs. The RPUs may be used instead of retimers, and may or may not by in a Retimer form factor. An RPU in this embodiment may connect as x16 to one of the two sockets, or, in another embodiment may bifurcate and have x8 to each of the sockets, where the sockets are connected using inter-socket links (ISOL).

In one embodiment, a system includes a system board; a first host mounted on the system board; an Add-in Card (AIC) mounted on the system board, the AIC includes a second host; and an RPU mounted on the system board, the RPU includes an IC package compatible with a ball grid array layout defined by the PCIe*5.0 or 6.0 Retimer Supplemental Features and Standard BGA Footprint Specification; a first CXL interface configured to communicate with a first CXL Root Port according to a first CXL protocol; a second CXL interface configured to communicate with a second CXL Root Port according to a second CXL protocol; and a computer configured to perform host-to-host physical address translations. Optionally, the first CXL protocol includes CXL.mem, the first CXL interface supports CXL type 2 or type 3 device, the second CXL protocol includes CXL.cache, the second CXL interface supports CXL type 1 or type 2 device, and the host-to-host physical address translations translate between messages communicated via the first CXL interface and the second CXL interface. Optionally, the system further includes a second RPU mounted on the system board, and a second AIC mounted on the system board, wherein the second AIC includes a CXL device configured to communicate with the first host via the second RPU. Optionally, each of the first and second hosts includes a central processing unit (CPU) connected to Dual Inline Memory Modules (DIMMs) via memory channels; and wherein the system board is selected from a group including at least one of a motherboard, a backplane, or a hybrid board combining features of both a motherboard and a backplane.

In one embodiment, a system includes a system board; a host mounted on the system board; a riser card mounted on the system board; and an RPU mounted on the riser card, the RPU includes an IC package compatible with a ball grid array layout defined by the PCIe*5.0 or 6.0 Retimer Supplemental Features and Standard BGA Footprint Specification; a first CXL interface configured to communicate with a first CXL Root Port according to a first CXL protocol; a second CXL interface configured to communicate with a second CXL Root Port according to a second CXL protocol; and a computer configured to perform host-to-host physical address translations. In some embodiments of the system, the riser card is mounted on the system board utilizing one of the following: an expansion slot, a board-to-board connector, or a high-speed mezzanine connector; and further including an Add-in Card (AIC) mounted on the riser card, wherein the AIC includes a second host, and the host-to-host physical address translations enable communication between the host and the second host. In some embodiments, RPU is mounted on the system board alongside a host and an Add-in Card (AIC).

In some embodiments, the system further includes a first connector mounted on the riser card, a cable coupled to the first connector, a second connector coupled to the cable, and a second host coupled to the second connector; wherein the host-to-host physical address translations enable communication between the first host and the second host. Optionally, the first connector is selected from a Mini Cool Edge IO (MCIO) connector or a Quad Small Form-Factor Pluggable Double Density (QSFP-DD) connector, and the second connector is selected from a CD (400 Gb/s) Form Factor Pluggable (CDFP) connector, an Octal Small Form Factor Pluggable Module (OSFP) connector, or an Octal Small Form Factor eXtra Dense Pluggable Module (OSFP-XD) connector.

Figure 67:
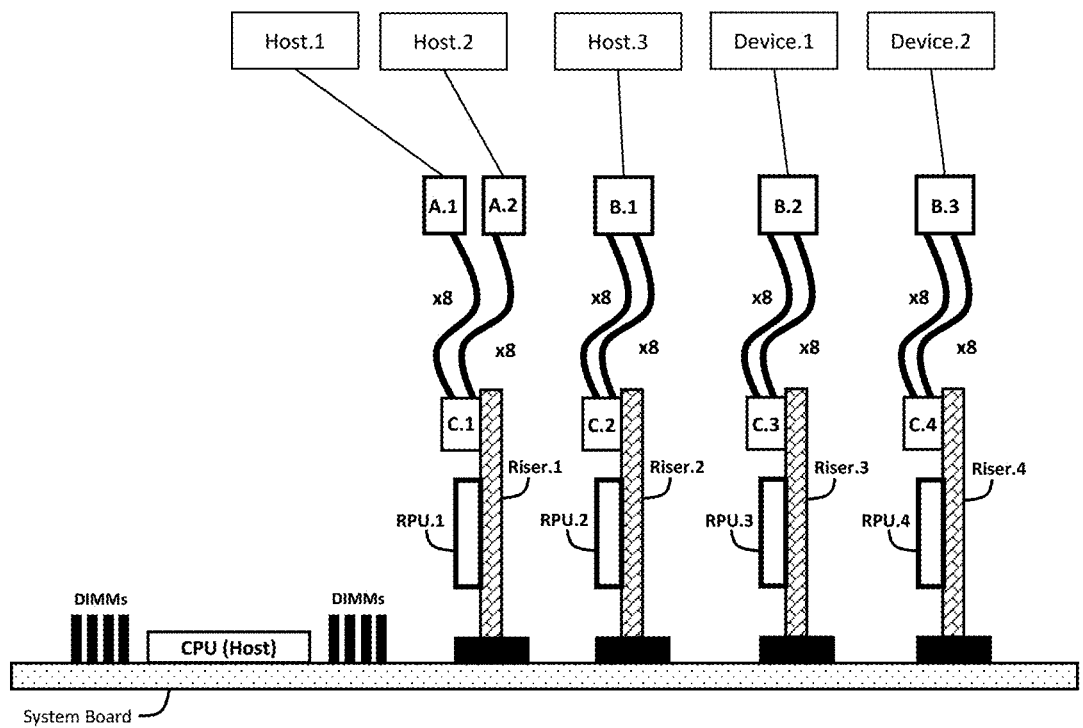
FIG. 67 illustrates one embodiment of a platform configuration including RPUs located on risers.

FIG. 67 illustrates one embodiment of a platform configuration including a plurality of risers extending from a system board and cables, wherein RPUs are located on the risers. The exemplary system board includes a CPU and DIMMs. Connectors designated as "C.n" may function as internal connectors within a platform, whereas connectors designated as "A.n" and "B.n" may function as external connectors that communicatively couple the platform to external systems, wherein the connectors "A.n" include eight lanes per connector and connectors "B.n" include sixteen lanes per connector. Connectors "C.n" may be configured to be of a uniform connector type within the platform, wherein said connector type is controlled by the platform manufacturer since these connectors are internal to the platform, whereas connectors "A.n" and "B.n" may be configured to accommodate different connector types that are typically selected based on requirements of the systems to which the platform is to be coupled. The decoupling between internal connectors and external connectors may provide advantages, such as: (1) flexibility with selecting the types of external connectors "A.n" and "B.n," and (2) reduction of manufacturing costs and inventory complexities, wherein manufacturing additional PCB models for additional connector types may be more expensive than using fewer PCB models that fit a uniform internal connector. In addition, inventory management may be simplified by maintaining fewer PCB model types. In one example, the x8 cables may be implemented as Twinaxial cables, and RPU.4 may be configured to function as a retimer when connector B.3 is coupled to a CXL device.

In one embodiment, a system includes a system board; a first host mounted on the system board; an Add-in Card (AIC) mounted on the system board, the AIC includes a second host; and an RPU mounted on the system board, the RPU includes an IC package compatible with a ball grid array layout defined by the PCIe*5.0 or 6.0 Retimer Supplemental Features and Standard BGA Footprint Specification; N CXL interfaces configured to facilitate communication with N CXL Root Ports; M CXL interfaces configured to facilitate communication with M CXL Root Ports, wherein 1≤N<M; and a computer configured to respond to a first CXL transaction on one of the N or M CXL interfaces, and to initiate a corresponding second CXL transaction on one of the M or N CXL interfaces, respectively. In some embodiments of the system, the system further includes a second RPU mounted on the system board and configured to handle CXL transactions communicated with a second AIC mounted on the system board; and wherein M is two times N, and number of lanes coupled to one of the 'N' CXL Root Ports is two times number of lanes coupled to one of the 'M' CXL Root Ports. In some embodiments, the system further includes a second RPU mounted on the system board and configured to handle CXL transactions communicated with a second AIC mounted on the system board; and wherein the N CXL interfaces communicate with the N CXL Root Ports associated with application hosts according to CXL.mem protocols, the M CXL interfaces communicate with the M CXL Root Ports associated with a memory pool according to CXL.cache protocols, the CXL.mem protocols utilize messages including physical addresses (PAs) from at least one HPA space of the application hosts, and the CXL.cache protocols utilize messages including PAs from at least one HPA space of the memory pool. In some embodiments, the system further includes a second RPU mounted on the system board and configured to handle CXL transactions communicated with a second AIC mounted on the system board; and wherein the N CXL interfaces communicate with the N CXL Root Ports associated with a memory pool according to CXL.cache protocols, the M CXL interfaces communicate with the M CXL Root Ports associated with application hosts according to CXL.mem protocols, the CXL.mem protocols utilize messages including physical addresses (PAs) from at least one HPA space of the memory pool, and the CXL.cache protocols utilize messages including PAs from at least one HPA space of the application hosts.

In one embodiment, a system includes a system board; a host mounted on the system board; a riser card mounted on the system board; and an RPU mounted on the riser card, the RPU includes an IC package compatible with a ball grid array layout defined by the PCIe*5.0 or 6.0 Retimer Supplemental Features and Standard BGA Footprint Specification; N CXL interfaces configured to facilitate communication with N CXL Root Ports; M CXL interfaces configured to facilitate communication with M CXL Root Ports, wherein 1≤N<M; and a computer configured to respond to a first CXL transaction on one of the N or M CXL interfaces, and to initiate a corresponding second CXL transaction on one of the M or N CXL interfaces, respectively. Optionally, the system further includes a second riser card mounted on the system board and a second RPU mounted on the second riser card, first and second connectors respectively mounted on the riser card and the second riser card, first and second cables respectively coupled to the first and second connectors, third and fourth connectors respectively coupled to the first and second cables, and first and second CXL entities respectively coupled to the third and fourth connectors, wherein each of the first and second CXL entities is selected from a CXL host or a CXL device.

In one embodiment, a system includes a system board; a first host mounted on the system board; an Add-in Card (AIC) mounted on the system board, the AIC includes a second host; and an RPU mounted on the system board, the RPU includes an IC package compatible with a ball grid array layout defined by the PCIe*5.0 or 6.0 Retimer Supplemental Features and Standard BGA Footprint Specification; a first CXL interface configured to communicate with the first host according to a first CXL protocol; a second CXL interface configured to communicate with the second host according to a second CXL protocol; and a computer configured to operate in a protocol termination mode that terminates the first and second CXL protocols. Optionally, the computer is further configured to operate in a pass-through mode that forwards CXL transactions between the first and second CXL interfaces without terminating the first and second CXL protocols. Optionally, the system further includes a second AIC mounted on the system board, wherein the second AIC includes a CXL device; and further including a second RPU mounted on the system board, wherein the second RPU is configured to interconnect between the first host and the CXL device.

In some embodiments, the RPU may be located inside a pluggable module, also known as a pluggable interface, transceiver module, or simply as a module, transceiver, or connector. Examples of suitable pluggable modules include, but are not limited to: (i) the Octal Small Form Factor Pluggable Multi-Source Agreement (OSFP MSA) including its relevant variants and revisions, such as OSFP-XD Octal Small Form Factor eXtra Dense Pluggable Module MSA, which are incorporated herein by reference; (ii) the Quad Small Form Factor Pluggable Multi-Source Agreement (QSFP MSA) including its relevant variants and revisions, such as QSFP-DD Double Density MSA, which are incorporated herein by reference; or (iii) other relevant known or future pluggable module specifications.

Figure 68A:
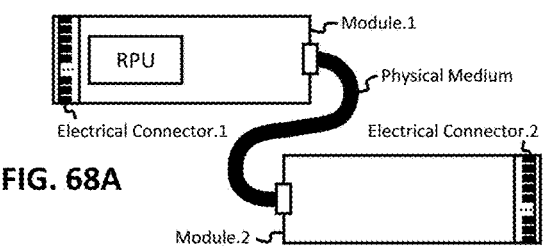
FIG. 68A, FIG. 68B, FIG. 68C, FIG. 68D, FIG. 68E, and FIG. 68F illustrate embodiments of active cables comprising first and second pluggable modules, comprising one RPU, coupled by a physical medium.

FIG. 68A illustrates one embodiment of an active cable comprising first and second pluggable modules (Module.1, Module.2) coupled by a physical medium. The first pluggable module includes a first electrical connector coupled to an RPU that is coupled to the physical medium. The second pluggable module includes a second electrical connector coupled to the physical medium. The RPU may implement any of the relevant translations, terminations, or other activities described herein.

Figure 68D:
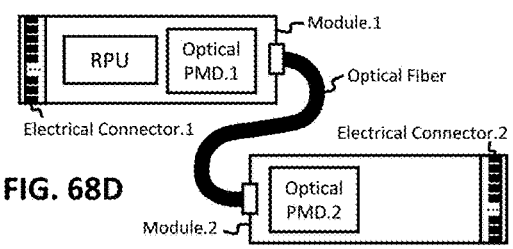
Figure 68B:
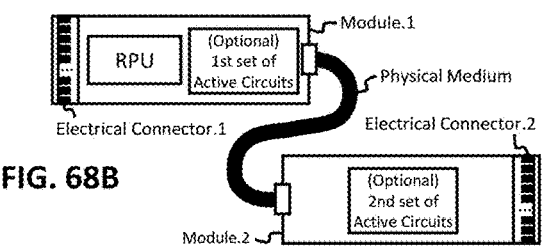

FIG. 68B illustrates one embodiment of an active cable comprising first and second pluggable modules (Module.1, Module.2) coupled by a physical medium. The first pluggable module includes a first electrical connector coupled to an RPU that is coupled to a first set of optional active circuits that is coupled to the physical medium. The second pluggable module includes a second electrical connector coupled to a second set of optional active circuits that is coupled to the physical medium. Possible examples of the active circuits include a Retimer, a Redriver, a Repeater, an Optical PMD, a Gearbox ASIC, or any combination of active circuits suitable for providing data communication though a physical medium.

Figure 68E:
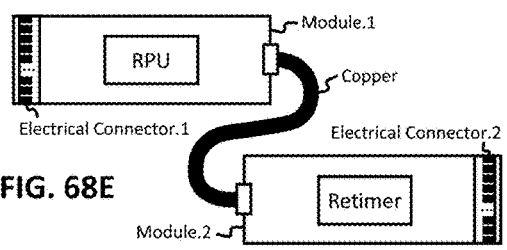
Figure 68C:
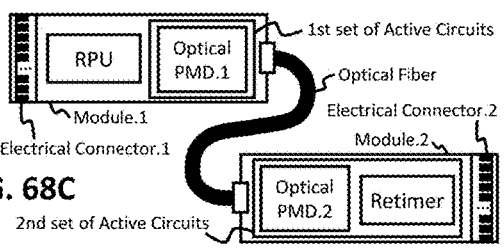

FIG. 68C illustrates one embodiment of an active cable comprising first and second pluggable modules (Module.1, Module.2) coupled by an optical fiber. The first pluggable module includes a first electrical connector coupled to an RPU that is coupled to a first optical Physical Medium Dependent sublayer (PMD.1) that is coupled to the optical fiber. The second pluggable module includes a second electrical connector coupled to a second optical PMD (PMD.2) that is coupled to a retimer that is coupled to the optical fiber.

FIG. 68D illustrates one embodiment of an active cable comprising first and second pluggable modules (Module.1, Module.2) coupled by an optical fiber. The first pluggable module includes a first electrical connector coupled to an RPU that is coupled to a first optical Physical Medium Dependent sublayer (PMD.1) that is coupled to the optical fiber. The second pluggable module includes a second electrical connector coupled to a second optical PMD (PMD.2) that is coupled to the optical fiber.

FIG. 68E illustrates one embodiment of an active cable comprising first and second pluggable modules (Module.1, Module.2) coupled by a copper cable. The first pluggable module includes a first electrical connector coupled to an RPU that is coupled to the cooper cable. The second pluggable module includes a second electrical connector coupled to a retimer that is coupled to the copper cable.

Figure 68F:
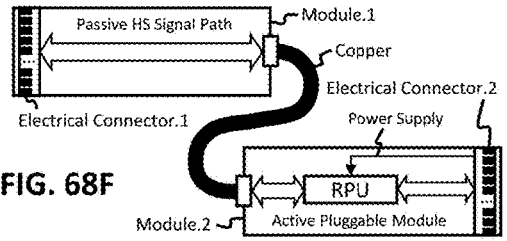

FIG. 68F illustrates one embodiment of an active cable comprising first and second pluggable modules (Module.1, Module.2) coupled by a copper cable. The first pluggable module includes a first electrical connector coupled to the copper cable, such that the High Speed (HS) signal path is passive. The second pluggable module is an active pluggable module, that includes a second electrical connector coupled to an RPU that is coupled to the copper cable. At least some of the power supply to the RPU is provided via the second electrical connector.

Figure 69A:
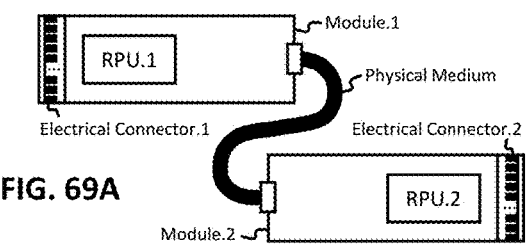
FIG. 69A, FIG. 69B, FIG. 69C, FIG. 69D, FIG. 69E, and FIG. 69F illustrate embodiments of active cables comprising first and second pluggable modules, comprising two RPUs, coupled by a physical medium.

FIG. 69A illustrates one embodiment of an active cable comprising first and second pluggable modules (Module.1, Module.2) coupled by a physical medium. The first pluggable module includes a first electrical connector coupled to a first RPU (RPU.1) that is coupled to the physical medium. The second pluggable module includes a second electrical connector coupled to a second RPU (RPU.2) that is coupled to the physical medium. The physical medium may be a copper cable, an optical fiber, or any other suitable physical medium technology.

Figure 69B:
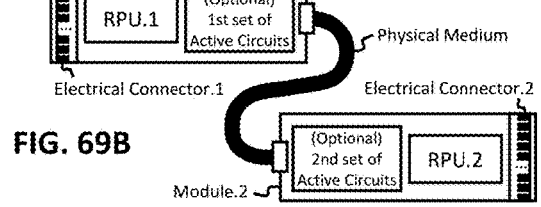

FIG. 69B illustrates one embodiment of an active cable comprising first and second pluggable modules (Module.1, Module.2) coupled by a physical medium. The first pluggable module includes a first electrical connector coupled to a first RPU (RPU.1) that is coupled to a first set of optional active circuits that is coupled to the physical medium. The second pluggable module includes a second electrical connector coupled to a second RPU (RPU.2) that is coupled to a second set of optional active circuits that is coupled to the physical medium.

Figure 69C:
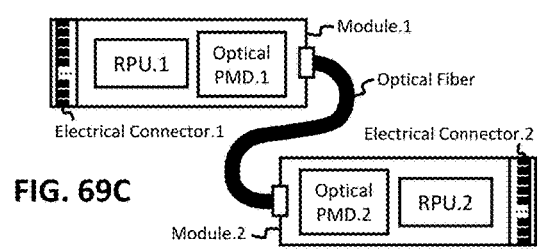

FIG. 69C illustrates one embodiment of an active cable comprising first and second pluggable modules (Module.1, Module.2) coupled by an optical fiber. The first pluggable module includes a first electrical connector coupled to a first RPU (RPU.1) that is coupled to a first optical PMD (PMD.1) that is coupled to the optical fiber. The second pluggable module includes a second electrical connector coupled to a second RPU (RPU.2) that is coupled to a second optical PMD (PMD.2) that is coupled to the optical fiber.

Figure 69D:
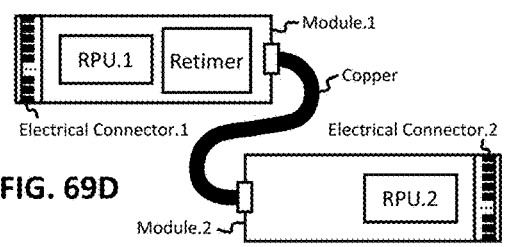

FIG. 69D illustrates one embodiment of an active cable comprising first and second pluggable modules (Module.1, Module.2) coupled by a copper cable. The first pluggable module includes a first electrical connector coupled to a first RPU (RPU.1) that is coupled to a retimer that is coupled to the copper cable. The second pluggable module includes a second electrical connector coupled to a second RPU (RPU.2) that is coupled to the copper cable.

Figure 69E:
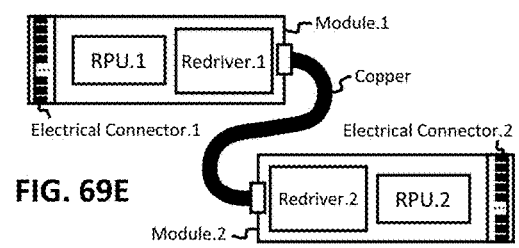

FIG. 69E illustrates one embodiment of an active cable comprising first and second pluggable modules (Module.1, Module.2) coupled by a copper cable. The first pluggable module includes a first electrical connector coupled to a first RPU (RPU.1) that is coupled to a first redriver (Redriver.1) that is coupled to the copper cable. The second pluggable module includes a second electrical connector coupled to a second RPU (RPU.2) that is coupled to a second redriver (Redriver.2) that is coupled to the copper cable.

Figure 69F:
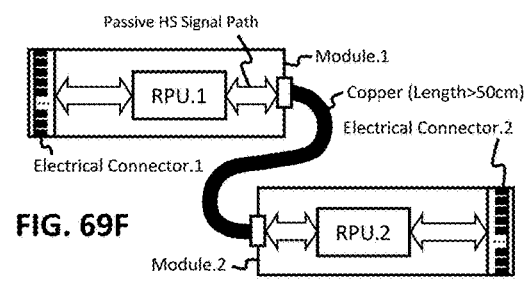

FIG. 69F illustrates one embodiment of an active cable comprising first and second pluggable modules (Module.1, Module.2) coupled by a copper cable. The first pluggable module includes a first electrical connector coupled to a first RPU (RPU.1) that is coupled to the copper cable, such that the High Speed (HS) signal paths from the first RPU to the copper cable are passive and the copper cable is longer than 50 cm, longer than 100 cm, or longer than 150 cm. The second pluggable module includes a second electrical connector coupled to a second RPU (RPU.2) that is coupled to the copper cable.

Figure 70A:
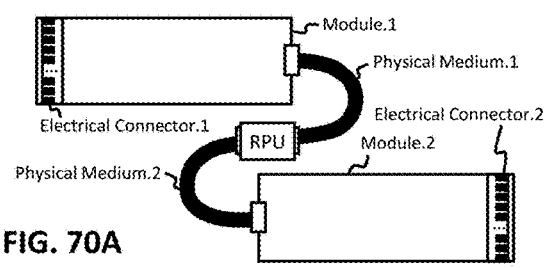
FIG. 70A, FIG. 70B, FIG. 70C, FIG. 70D, FIG. 70E, and FIG. 70F illustrate embodiments of active cables comprising first and second pluggable modules coupled by a first physical medium, an RPU, and a second physical medium.

FIG. 70A illustrates one embodiment of an active cable comprising first and second pluggable modules (Module.1, Module.2) coupled by a first physical medium (Medium.1), an RPU, and a second physical medium (Medium.2), such that the RPU is located between the two physical media, external to the first pluggable module and to the second pluggable module.

Figure 70D:
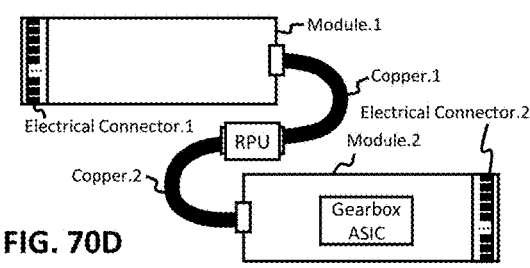
Figure 70B:
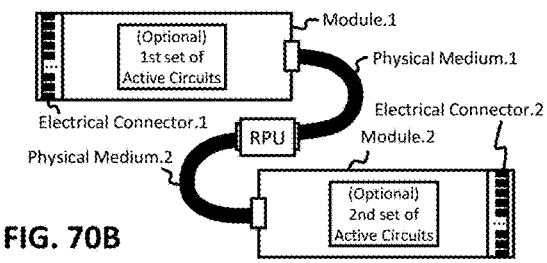

FIG. 70B illustrates one embodiment of an active cable comprising first and second pluggable modules (Module.1, Module.2) coupled by a first physical medium (Medium.1), an RPU, and a second physical medium (Medium.2), such that the RPU is located between the two physical media, external to the first pluggable module and to the second pluggable module. The first pluggable module includes a first electrical connector coupled to a first set of optional active circuits that is coupled to the first physical medium. The second pluggable module includes a second electrical connector coupled to a second set of optional active circuits that is coupled to the second physical medium.

Figure 70E:
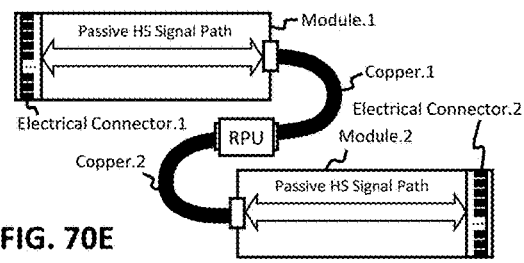
Figure 70C:
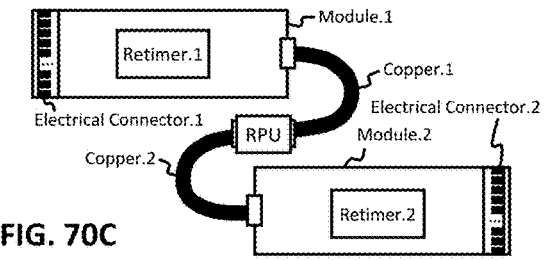

FIG. 70C illustrates one embodiment of an active cable comprising first and second pluggable modules (Module.1, Module.2) coupled by a first copper cable (Copper.1), an RPU, and a second copper cable (Copper.2), such that the RPU is located between the two copper cables, external to the first pluggable module and to the second pluggable module. The first pluggable module includes a first electrical connector coupled to a first retimer (Retimer.1) that is coupled to the first copper cable. The second pluggable module includes a second electrical connector coupled to a second retimer (Retimer.2) that is coupled to the second copper cable.

FIG. 70D illustrates one embodiment of an active cable comprising first and second pluggable modules (Module.1, Module.2) coupled by a first copper cable (Copper.1), an RPU, and a second copper cable (Copper.2), such that the RPU is located between the two copper cables, external to the first pluggable module and to the second pluggable module. The first pluggable module includes a first electrical connector coupled to the first copper cable. The second pluggable module includes a second electrical connector coupled to a Gearbox ASIC that is coupled to the second copper cable.

FIG. 70E illustrates one embodiment of an active cable comprising first and second pluggable modules (Module.1, Module.2) coupled by a first copper cable (Copper.1), an RPU, and a second copper cable (Copper.2), such that the RPU is located between the two copper cables, external to the first pluggable module and to the second pluggable module. Each of the first and second pluggable modules comprises a passive High Speed (HS) signal path providing direct signal transmission without active circuits or active components.

Figure 70F:
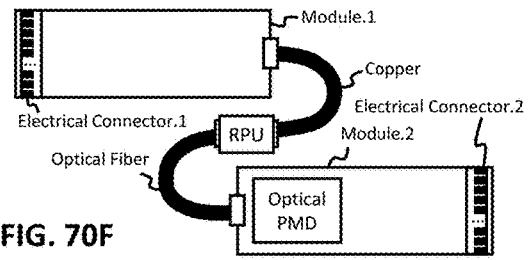

FIG. 70F illustrates one embodiment of an active cable comprising first and second pluggable modules (Module.1, Module.2) coupled by a copper cable, an RPU, and an optical fiber, such that the RPU is located between the copper cable and the optical fiber, external to the first pluggable module and to the second pluggable module. At least some of the power supply to the RPU is provided via the first electrical connector. Optionally, the first module (Module.1) comprises a passive High Speed (HS) signal path providing direct signal transmission without active circuits or active components.

Figure 71:
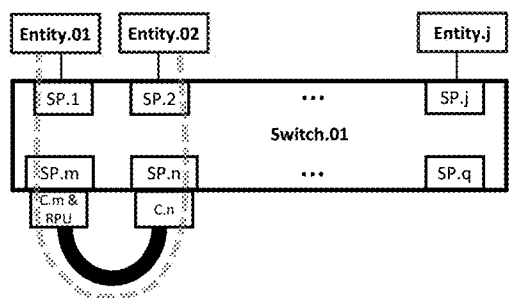
FIG. 71 illustrates one embodiment of an active cable coupling switch ports.

FIG. 71 illustrates one embodiment of an active cable to couple switch port SP.m to switch port SP.n of Switch.01. The active cable includes pluggable module C.m that includes an RPU, and pluggable module C.n without an RPU, similar to FIG. 68A. Entity.01 and Entity.02 are coupled to switch ports SP.1 and SP.2, respectively, and the active cable enables Entity.01 to communicate with Entity.02 according to protocols or features that may extend beyond those defined in CXL Specification Revision 3.1.

Figure 72:
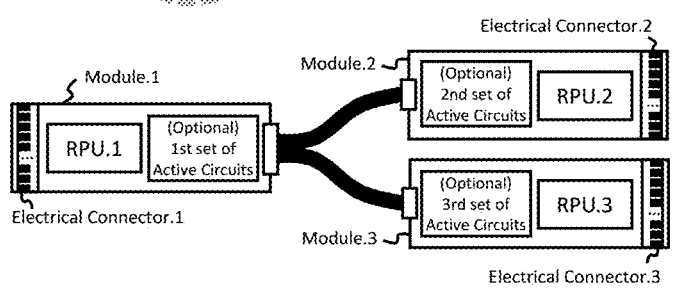
FIG. 72 illustrates one embodiment of a breakout active cable that splits a single connection into multiple connections.

FIG. 72 illustrates one embodiment of a breakout active cable that splits a single connection into multiple connections. The cable includes a first pluggable module containing electrical connectors coupled to RPU.1 coupled to an optional first set of active circuits, such as an optical Physical Medium Dependent (PMD), coupled over physical media to two or more second pluggable modules, each containing optional second and third sets of active circuits, coupled to respective RPU.2 and RPU.3 that are coupled to respective electrical connectors. This configuration may support mirroring capabilities for enhanced reliability, availability, and serviceability (RAS).

Figure 73:
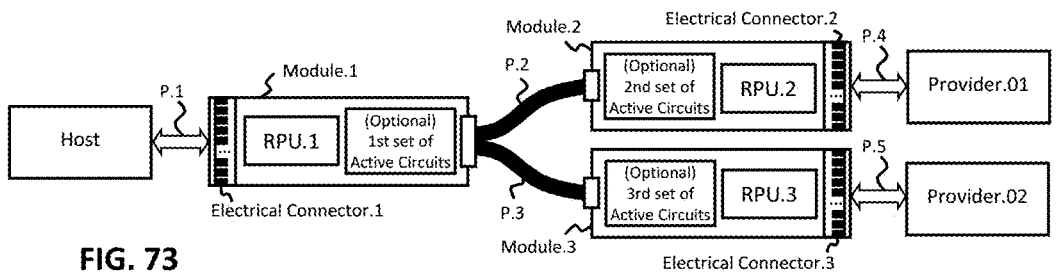
FIG. 73 illustrates one embodiment of a breakout active cable implementation between a host and multiple providers.

FIG. 73 illustrates one embodiment of a breakout active cable implementation between a host and multiple providers. The configuration includes: a first pluggable module, containing electrical connectors coupled to RPU.1 that is coupled to an optional first set of active circuits, which translate between protocol P.1 and protocols P.2 and P.3. A second pluggable module, containing RPU.2 coupled to an optional second set active circuits, which translates between protocols P.2 and P.4; and a third pluggable module, containing RPU.3 coupled to an optional third set of active circuits, which translates between protocols P.3 and P.5. The RPUs at the entry and exit points of the breakout cable enable protocol flexibility, where protocols P.2 and P.3 may be implemented as proprietary intermediate protocols supporting both UALink and CXL, optionally including additional features beyond the base standard.

It is noted that all drawings presented herein, including but not limited to transaction flow diagrams (TFDs), flowcharts, block diagrams, circuit schematics, timing diagrams, state machine diagrams, and logic diagrams, are schematic representations. This means that the number, order, timings, dimensions, connections, and other properties of the elements illustrated in the drawings are non-limiting examples. Depending on the context, each element (such as lines, arrows, boxes, blocks, symbols, or labels) illustrated in the drawings may represent one or more actual elements. For example, a single box in a block diagram may represent multiple hardware components or software modules, a single arrow in a flowchart may represent multiple process steps or data transfers, and a single line in a circuit diagram may represent multiple electrical connections.

Every modification, variation, or alternative allowed by current or future relevant specifications, standards, or common practices in the field is intended to be included within the scope of said drawings. Furthermore, the scope of the drawings extends to encompass implementations that may deviate from strict specifications due to factors such as hardware bugs, relaxed designs, implementation-specific optimizations, or practical constraints; this includes, but is not limited to, cases where the actual behavior of compliant or compatible devices, components, systems, or software differs from the specification in ways that do not fundamentally alter the underlying principles of the embodiment. For instance, in the context of CXL technology, which serves as a non-limiting example, (i) Data transfers may vary in size and timing, such as 1×(64B) or 2×(32B) messages in CXL.cache H2D Data, (ii) The order of response messages (e.g., NDR and DRS in CXL.mem) may vary for certain operations, (iii) The presence and positioning of metadata in responses may differ based on device capabilities and configurations, (iv) Timing and presence of credit return messages may vary based on implementation-specific flow control mechanisms, (v) The use and positioning of Vendor Defined Messages may differ across implementations, and (vi) An "Enhanced Retimer", "Smart Retimer", or even a slightly modified spec-based Retimer, may to some extent alter the behavior of messages on the link. These examples are not exhaustive and similar principles apply to other technologies and protocols illustrated in the drawings.

Additionally, depending on the context, various nuances, modifications, flexibilities, and/or alternatives permitted by relevant specifications, standards, or common practices may be applied to certain relevant elements of the drawings herein. This includes, but is not limited to, variations in formats, optional features, and implementation-specific optimizations allowed within the bounds of the relevant specifications or reasonable practical extensions beyond them.

As technology evolves, new features, message types, components, or modifications may be introduced in future revisions of relevant specifications, or implemented in hardware or software before being formally specified. The scope of the drawings herein is intended to encompass such future developments and practical implementations to the extent that they are logical extensions or modifications of the illustrated concepts and do not fundamentally alter the underlying principles of the embodiments, even if they deviate from the strict letter of the current specifications in non-essential ways. Moreover, the claimed methods and systems are also intended to cover implementations that may deviate from the current specifications due to practical considerations such as bugs, relaxed design choices, or other deviations that do not fundamentally alter the principles of the embodiments.

A computer program (also referred to as software, application, script, program code, firmware, etc.) may encompass any form of instructions or expressions executable by or interpretable on a computing device, including but not limited to compiled, interpreted, declarative, procedural, functional, object-oriented, and/or markup languages. It may be deployed in various formats, such as a standalone application, library, module, component, subroutine, function, object, service, container, or other units suitable for any computing environment. A computer program may be represented as one or more files or parts of files within a file system, possibly coexisting with other computer programs or data, and/or distributed across multiple files, directories, and/or storage locations allocated for the program. It may include source code, object code, bytecode, machine code, intermediate code, or any other form of code representation. Furthermore, a computer program may be stored locally on a device, in a network, and/or in the cloud, and may be designed to be executed on one or more computers located at single or multiple locations, optionally coupled via one or more communication networks. The computer program may be static or dynamic, may include self-modifying code, and may be designed to run continuously, on-demand, or at scheduled intervals. It may interact with other programs, services, or systems, and may be updated, patched, or modified during its lifecycle.

As used herein, the term "non-transitory computer-readable medium" refers to any medium capable of storing, encoding, or carrying instructions, computer program code, and/or data for access or processing by a computing device, and that does not include transitory signals per se. A non-transitory computer-readable medium may be a single medium or may include multiple media (e.g., a centralized or distributed database, and/or associated caches and servers). It may take many forms, including but not limited to, non-volatile media and volatile media. Non-volatile media may include optical disks, magnetic disks, solid-state drives, and flash drives. Volatile media may include dynamic memory, such as main memory. The non-transitory computer-readable medium may be a machine-readable storage device, a machine-readable storage substrate, a memory device, or a combination of one or more of them, and may be non-removable or removable. It may store one or more sets of instructions, computer program code, data structures, program modules, and/or portions of a computer program, regardless of whether these are currently being executed or are intended for future execution. The stored content may be updated on the non-transitory computer-readable medium and/or downloaded to it via a communication network, such as the Internet. The stored content may be obtained from various sources, including but not limited to, a central repository (e.g., an application store) or an open source and/or community run repository (e.g., GitHub). A computer program product may include a non-transitory computer-readable medium containing such stored content, which, when accessed and executed by one or more processing units, may perform one or more of the methods or operations disclosed herein. The term "non-transitory computer-readable medium" encompasses any manner of storing the relevant content, whether used immediately, stored for future use, distributed for installation, or archived.

At least some of the methods described herein are "computer-implemented methods", which are executed on one or more computing devices, involving performing specific operations by running program instructions on one or more processors within these devices. A computer-implemented method typically requires the interaction of software and hardware components, where the software component is composed of a series of instructions designed to perform a set of tasks or functions. These instructions, when executed by the processor(s), enable the computing device to carry out the method's operations. The execution environment for these methods can vary, encompassing standalone computers, networked systems, cloud-based platforms, edge computing devices, mobile devices, embedded systems, virtualized environments, containerized environments, or any combination thereof. Additionally, at least some of these instructions may be stored on a non-transitory computer-readable medium.

References to "one embodiment", along with its variations like "aspect" or "case", indicate that the described features may be present in one or more embodiments. Additionally, distinct references to embodiments, including terms like "one embodiment", "another embodiment", or "some embodiments", do not necessarily denote separate embodiments. They may describe the same embodiment from different perspectives, highlight various aspects of a single embodiment, or pertain to distinct embodiments. Moreover, all references to terms such as 'example' and 'instance' are to be understood as non-limiting examples and non-limiting instances. Furthermore, in this disclosure, all uses of "herein" in the context of term definitions shall be understood to mean throughout this disclosure, including all embodiments and examples described herein.

Sentences in the form of "X is indicative of Y" mean that X includes information correlated with Y and/or describing Y, up to the case where X equals Y. Sentences in the form of "provide/receive an indication (of whether X happened)" may refer to any indication method. The word "most" of something is defined as above 51% of the something (including 100% of the something). The words "portion", "subset", "region", and "area" of something refer to a value between a non-zero fraction of the something and 100% of the something, inclusive; they indicate an open-ended claim language, thus, for example, sentences in the form of "a portion of the memory" or "a subset of the memory" encompass anything from just a small part of the memory to the entire memory, optionally together with additional memory region(s). "Coupled" indicates direct or indirect cooperation and/or interaction, such as direct or indirect physical contact, electrical connection, and/or software and/or hardware interface. The use of "a" or "an" refers to one or more things. The phrase "based on" indicates an open-ended claim language, and is to be interpreted as "based, at least in part, on". Additionally, stating that a value is calculated "based on X" and following that, in a certain embodiment, that the value is calculated "also based on Y", means that in the certain embodiment, the value is calculated based on X and Y. Variations of the terms "utilize" and "use" indicate an open-ended claim language, such that sentences in the form of "detecting X utilizing Y" are intended to mean "detecting X utilizing at least Y", and sentences in the form of "use X to calculate Y" are intended to mean "calculate Y based on X".

The terms "first", "second" and so forth are to be interpreted merely as ordinal designations, and shall not be limited in themselves. A predetermined, predefined, or preselected value is a fixed value and/or a value determined any time before performing a calculation that utilizes the predetermined value. When appropriate, the word "value" may indicate a "predetermined value". The word "threshold" indicates a "predetermined threshold", which means that the value of the threshold, and/or the logic used to determine whether the threshold is reached, is known before start performing computations to determine whether the threshold is reached.

Herein, the terms "send", "sending", "receive", "receiving", "communicate", "communication", "communicating", "exchange", and "exchanging", when used to describe elements (e.g., port, interface, computer, RPU, MxPU) involved in data, message, packet, or other information exchanges, may refer to any direct or indirect operation(s) that facilitate information transfer to/from/between elements. The sending element is not required to directly transmit the information, nor is the receiving element required to directly obtain the information; instead, they may initiate, cause, control, direct, participate in, or otherwise facilitate the transfer. Such information transfer may occur directly or indirectly through one or more intermediary components, and may include routing, forwarding, or other data transfer mechanisms over any suitable communication path and/or connection.

The embodiments of an invention may include any variety of combinations and/or integrations of the features of the embodiments described herein. Although some embodiments may describe serial operations, the embodiments may perform certain operations in parallel and/or in different orders from those described. Moreover, the use of repeated reference numerals and/or letters in the text and/or drawings is for the purpose of simplicity and clarity and does not in itself dictate a relationship between the various embodiments and/or configurations discussed. Components and/or modules referred to by different reference numerals may or may not perform the same (or similar) functionality, and the fact they are referred to by different reference numerals and/or letters does not mean that they may not have same or similar functionalities.

Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments.

The drawings depict some, but not necessarily all, the couplings between elements. The depiction of elements as separate entities may be done to emphasize different functionalities of elements that may be implemented by the same software and/or hardware. Programs and/or elements illustrated and/or described as being single may be implemented via multiple programs and/or involve multiple hardware elements possibly in different locations. The embodiments are not limited in their applications to the details of order, or sequence of method steps, or to details of implementation of the devices, set in the description, drawings, or examples. Individual blocks illustrated in the drawings may be functional in nature and therefore may not necessarily correspond to discrete hardware elements. Moreover, the organization of this disclosure into sections, potentially titled, aims to enhance readability without constraining the scope, allowing for the integration of elements, features, components, and steps across various sections.

Accordingly, this disclosure is intended to embrace all such alternatives, modifications, and variations that fall within the spirit and scope of the appended claims and their equivalents.

We claim:

1. An apparatus configured to enable communication between a host and a device, comprising:
    a Compute Express Link (CXL) Endpoint configured to receive, from a host, first messages conforming to a first CXL.io protocol and second messages conforming to a first non-CXL.io protocol;
    a CXL Root Port configured to receive, from a device, third messages conforming to a second CXL.io protocol and fourth messages conforming to a second non-CXL.io protocol; and
    a computer configured to:
        terminate the first CXL.io protocol;
        process at least some of the first messages in a manner that does not necessitate translating and sending corresponding translated first messages to the device;
        terminate the first non-CXL.io protocol;
        translate at least a quarter of the second messages (translated second messages); and
        make the translated second messages available to the CXL Root Port for communication with the device.

2. The apparatus of claim 1, wherein the computer is further configured to: terminate the second CXL.io protocol, process at least some of the third messages in a manner that does not necessitate translating and sending corresponding translated third messages to the host, terminate the second non-CXL.io protocol, translate at least a quarter of the fourth messages (translated fourth messages), and send the translated fourth messages to the host.

3. The apparatus of claim 2, wherein the computer is configured to process more than half of the first and third messages in a manner that does not necessitate translating and sending corresponding translated first and third messages to the device and host, respectively; and
    wherein the computer is configured to terminate, translate, and send more than half of the second and fourth messages to the device and host, respectively.

4. The apparatus of claim 2, wherein each of the first and second non-CXL.io protocols is selected from at least one of CXL.mem protocol or CXL.cache protocol.

5. The apparatus of claim 2, wherein the first non-CXL.io protocol is CXL.mem, and the CXL Endpoint is further configured to communicate in parallel with the first host according to CXL.cache protocol.

6. The apparatus of claim 2, wherein the first and second non-CXL.io protocols are CXL.mem, and the computer is further configured to translate between respective host physical addresses and Tags utilized by messages conforming to the first and second CXL.mem protocols.

7. The apparatus of claim 1, wherein the apparatus is further configured to encapsulate at least one of the first or third messages for transmission utilizing one of: CXL over Ultra Ethernet Transport (UET), CXL over Ethernet, CXL over NVLink, CXL over Ultra Accelerator Link (UALink), CXL over RDMA over Ethernet (RoCE), or CXL over RDMA over InfiniBand.

8. The apparatus of claim 1, wherein the apparatus is further configured to encapsulate at least one of (i) the first and second messages, or (ii) the third and fourth messages for transmission utilizing one of: CXL over Ultra Ethernet Transport (UET), CXL over Ethernet, CXL over NVLink, CXL over Ultra Accelerator Link (UALink), CXL over RDMA over Ethernet (RoCE), or CXL over RDMA over InfiniBand.

9. The apparatus of claim 1, wherein the first messages comprise CXL.io or PCIe Configuration Request Transaction Layer Packets (Configuration Request TLPs), and the computer is further configured to block the following configuration Read/Write Requests: CfgRd0, CfgWr0, CfgRd1, and CfgWr1.

10. The apparatus of claim 9, wherein the first messages further comprise memory TLPs, and the apparatus is further configured to send, to the device, data indicative of at least one of the following from the memory TLPs: addresses, traffic class, or attributes.

11. The apparatus of claim 1, wherein the computer is further configured to block more than 80% of the first and third messages after Link Layer Initialization.

12. The apparatus of claim 1, wherein the first messages comprise CXL.io or PCIe Memory Transaction Layer Packets (Memory TLPs) comprising physical addresses, and the apparatus is further configured to perform address translation from memory address space in CXL.io MRd TLP type of the host to memory address space in CXL.io MRd TLP type of the device.

13. The apparatus of claim 1, wherein the apparatus is further configured to receive, from the host, a CXL.io memory transaction, and to utilize non-transparent bridging (NTB) to enable the host to read data, from the device, based on mapping a physical address space window assigned to the device by the computer to a physical address space window of the host via a Base Address Register (BAR).

14. The apparatus of claim 1, wherein the apparatus is further configured to: receive from the device Transaction Layer Packets (TLPs); terminate the TLPs; send to the host translations of at least the following terminated TLP types: Memory Read (MRd), Memory Write (MWr), and Completion with Data(CplD); and block the following terminated TLP types: Configuration Read (CfgRd0, CfgRd1) requests, Configuration Write (CfgWr0, CfgWr1) requests, and Completion for Locked Memory Read (CplDLk).

15. The apparatus of claim 1, wherein the apparatus is implemented as: (i) a card comprising at least one of the following connectors: Mini Cool Edge IO (MCIO), Quad Small Form-Factor Pluggable Double Density (QSFP-DD), CD (400 Gb/s) Form Factor Pluggable (CDFP), Octal Small Form Factor Pluggable Module (OSFP), or Octal Small Form Factor eXtra Dense Pluggable Module (OSFP-XD); (ii) a card mounted in a CXL slot of a motherboard of the host; (iii) a card mounted in a CXL slot of a motherboard of the device; or (iv) a semiconductor device comprising of at least two transceivers each capable of operating in at least one of Non-Return-to-Zero (NRZ) or 4-level Pulse Amplitude Modulation (PAM4) signaling.

16. A method, comprising:
receiving, by a Compute Express Link (CXL) Endpoint from a host, first messages conforming to a first CXL.io protocol and second messages conforming to a first non-CXL.io protocol;
receiving, by a CXL Root Port from a device, third messages conforming to a second CXL.io protocol and fourth messages conforming to a second non-CXL.io protocol;
terminating the first CXL.io protocol;
processing at least some of the first messages in a manner that does not necessitate translating and sending corresponding translated first messages to the device;
terminating the first non-CXL.io protocol;
translating at least a quarter of the second messages (translated second messages); and
sending the translated second messages to the device.

17. The method of claim 16, further comprising: terminating the second CXL.io protocol;
processing at least some of the third messages in a manner that does not necessitate translating and sending corresponding translated third messages to the host; terminating the second non-CXL.io protocol; translating at least a quarter of the fourth messages (translated fourth messages); and sending the translated fourth messages to the host.

18. The method of claim 17, wherein each of the first and second non-CXL.io protocols is selected from at least one of CXL.mem protocol or CXL.cache protocol; wherein more than half of the first and third messages are processed in a manner that does not necessitate translating and sending corresponding translated first and third messages to the device and host, respectively;
and wherein more than half of the second and fourth messages are terminated, translated, and sent to the device and host, respectively.

19. The method of claim 16, further comprising encapsulating at least one of the first or third messages for transmission utilizing one of: CXL over Ultra Ethernet Transport (UET), CXL over Ethernet, CXL over NVLink, CXL over Ultra Accelerator Link (UALink), CXL over RDMA over Ethernet (RoCE), or CXL over RDMA over InfiniBand.

20. The method of claim 16, further comprising encapsulating at least one of (i) the first and second messages, or (ii) the third and fourth messages for transmission utilizing one of: CXL over Ultra Ethernet Transport (UET), CXL over Ethernet, CXL over NVLink, CXL over Ultra Accelerator Link (UALink), CXL over RDMA over Ethernet (RoCE), or CXL over RDMA over InfiniBand.

21. The method of claim 16, wherein the first messages comprise CXL.io or PCIe Configuration Request Transaction Layer Packets (Configuration Request TLPs), and the computer is further configured to block the following configuration Read/Write Requests: CfgRd0, CfgWr0, CfgRd1, and CfgWr1.

22. The method of claim 21, wherein the first messages further comprise Memory TLPs, and further comprising sending, to the device, data indicative of at least one of the following from the memory TLPs: addresses, traffic class, or attributes.

23. The method of claim 16, further comprising blocking more than 80% of the first and third messages after Link Layer Initialization.

24. The method of claim 16, wherein the first messages comprise CXL.io or PCIe memory Transaction Layer Packets (memory TLPs) comprising physical addresses, and further comprising performing address translation from memory address space in CXL.io MRd TLP type of the host to memory address space in CXL.io MRd TLP type of the device.

25. The method of claim 16, further comprising receiving, from the host, a CXL.io memory transaction, and utilizing non-transparent bridging (NTB) to enable the host to read data, from the device, based on mapping a physical address space window assigned to the device by the computer to a physical address space window of the host via a Base Address Register (BAR).

26. A non-transitory computer-readable medium comprising instructions that, when executed by a processor, cause the processor to perform the method of claim 16.

27. An apparatus, comprising:
a first switch port configured to communicate with a host utilizing first messages conforming to a first CXL.io protocol and second messages conforming to a first non-CXL.io protocol;
wherein CXL denotes Compute Express Link;
a second switch port configured to communicate with a device utilizing third messages conforming to a second CXL.io protocol and fourth messages conforming to a second non-CXL.io protocol; and
a computer configured to:
terminate transactions routed to the computer and associated with the first CXL.io protocol;
process at least some of the first messages in a manner that does not necessitate translating and sending corresponding translated first messages to the device;
terminate transactions routed to the computer and associated with the first non-CXL.io protocol;
translate at least a quarter of the second messages (translated second messages); and
make the translated second messages available to the second switch port for communication with the device.

28. The apparatus of claim 27, wherein the apparatus functions as a switch, and each of the first and second switch ports belong to one of: a Hierarchy Based Routing (HBR) switch port, a Port Based Routing (PBR) switch port, a Virtual CXL Switch (VCS) that comprise a single Upstream Switch Port (USP) and one or more Downstream Switch Ports (DSPs), a Switch Interface Port, or a Switch Physical Port.

29. The apparatus of claim 27, wherein the first switch port couples the host to a first Virtual CXL Switch (VCS), the second switch port couples the device to a second VCS, and the first and second VCSs are coupled via the computer.

30. The apparatus of claim 27, wherein the first messages comprise CXL.io or PCIe Configuration Request Transaction Layer Packets (Configuration Request TLPs), and the computer is further configured to block the following configuration Read/Write Requests: CfgRd0, CfgWr0, CfgRd1, and CfgWr1, or, alternatively, further configured to support Configuration Requests as a Completer for at least the following configuration Read/Write Requests: CfgRd0 and CfgWr0.

\* \* \* \* \*